United States Patent
Jia et al.

(10) Patent No.: US 9,134,353 B2
(45) Date of Patent: Sep. 15, 2015

(54) COMFORT-DRIVEN OPTIMIZATION OF ELECTRIC GRID UTILIZATION

(71) Applicant: DISTRIBUTED ENERGY MANAGEMENT INC., Poulso, WA (US)

(72) Inventors: Jimmy Jia, Seattle, WA (US); Jason Crabtree, Alexandria, VA (US)

(73) Assignee: Distributed Energy Management Inc., Poulsbo, WA (US)

( * ) Notice: Subject to any disclaimer, the term of this patent is extended or adjusted under 35 U.S.C. 154(b) by 0 days.

(21) Appl. No.: 14/564,079

(22) Filed: Dec. 8, 2014

(65) Prior Publication Data

US 2015/0094968 A1    Apr. 2, 2015

Related U.S. Application Data

(63) Continuation-in-part of application No. 12/802,705, filed on Jun. 10, 2010, now abandoned, which is a continuation-in-part of application No. 12/799,310, filed on Apr. 21, 2010, now abandoned, which is a continuation-in-part of application No. 12/584,789, filed on Sep. 11, 2009, now abandoned, which is a continuation-in-part of application No. 12/583,270, filed on Aug. 17, 2009, now abandoned, which is a continuation-in-part of application No. 12/462,986, filed on Aug. 11, 2009, now abandoned, which is a continuation-in-part of application No. 12/459,990, filed on Jul. 10, 2009, now abandoned, which is a continuation-in-part of application No. 12/459,811, filed on Jul. 7, 2009, now abandoned, and a continuation-in-part of application No. 12/383,993, filed on Mar. 30, 2009, now abandoned.

(60) Provisional application No. 61/208,770, filed on Feb. 26, 2009.

(51) Int. Cl.
*G01R 21/133* (2006.01)
*G06Q 40/04* (2012.01)
*G06Q 50/06* (2012.01)

(52) U.S. Cl.
CPC .............. *G01R 21/133* (2013.01); *G06Q 40/04* (2013.01); *G06Q 50/06* (2013.01)

(58) Field of Classification Search
CPC . G06Q 50/06; G06Q 50/00; G06Q 10/06312; Y04S 40/22; Y04S 40/00; H04B 3/54; G01R 22/00
See application file for complete search history.

(56) References Cited

U.S. PATENT DOCUMENTS

2008/0319893 A1*  12/2008  Mashinsky et al. ............. 705/37
2010/0106332 A1*  4/2010  Chassin et al. ................. 700/278

OTHER PUBLICATIONS

Abdelkader, S.M., "Allocating transmission loss to loads and generators through complex power flow tracing," Generation, Transmission & Distribution, IET, vol. 1, No. 4, pp. 584-595, Jul. 2007 doi: 10.1049/iet-gtd:20060344).*

*Primary Examiner* — Mischita Henson
(74) *Attorney, Agent, or Firm* — Galvin Patent Law LLC; Brian R. Galvin

(57) ABSTRACT

A system for electric grid utilization and optimization comprising a communications interface executing on a network-connected server and adapted to receive information from a plurality of iNodes, the plurality of iNodes comprising a source iNode, a sink iNode, a plurality of transmission or distribution iNodes, an event database coupled to the communications interface and adapted to receive events from a plurality of iNodes via the communications interface, a modeling server coupled to the communications interface, and a statistics server coupled to the event database and the modeling server, wherein the modeling server, receives a request to establish an allocation of at least one of transmission losses, distribution losses, and ancillary services to a specific sink iNode, computes at least one virtual path for electricity flow between a source iNode and the specific sink iNode, the computed path being determined based on optimization of perceived comfort of users in affected areas.

3 Claims, 37 Drawing Sheets

COMFORT-DRIVEN OPTIMIZATION OF ELECTRIC GRID UTILIZATION

CROSS-REFERENCE TO RELATED APPLICATIONS

This application is a continuation-in-part of U.S. patent application Ser. No. 12/802,705, titled "System and Method for Participating in Energy-Related Markets", filed on Jun. 10, 2010, which is a continuation-in-part of patent application Ser. No. 12/799,310, titled "System and Method for Trading Complex Energy Securities", filed on Apr. 21, 2010, which is a continuation-in-part of patent application Ser. No. 12/584,789, titled "SYSTEM AND METHOD FOR ELECTRIC GRID UTILIZATION AND OPTIMIZATION" and filed on Sep. 11, 2009, which is a continuation-in-part of patent application Ser. No. 12/583,270, titled "Dynamic Pricing System And Method For Complex Energy Securities", filed on Aug. 17, 2009, which is a continuation-in-part of patent application Ser. No. 12/462,986, titled "Method for Managing Energy Based on a Scoring System", filed on Aug. 11, 2009, which is a continuation-in-part of patent application Ser. No. 12/459,990, titled "System And Method For Fractional Smart Metering", filed on Jul. 10, 2009, which is a continuation-in-part of patent application Ser. No. 12/459,811, titled "Overlay Packet Data Network For Managing Energy And Method For Using Same", filed on Jul. 7, 2009, which claims priority to provisional application Ser. No. 61/208,770, filed on Feb. 26, 2009, and is a continuation-in-part of patent application Ser. No. 12/383,993, titled "System and Method for Managing Energy", filed on Mar. 30, 2009, the specifications of each of which are hereby incorporated in their entirety by reference.

BACKGROUND OF THE INVENTION

1. Field of the Art

The present invention is in the field of energy management, and in particular in the area of market-oriented energy distribution using smart grids. Yet more particularly, the present invention pertains to systems for the active management and trading of energy-related securities and resources via energy exchange markets, and the utilization of energy market information in the adjustment of connected systems and devices with a focus on perceived comfort levels for building inhabitants or other affected users.

2. Discussion of the State of the Art

While a robust electric power grid is widely recognized as a vital infrastructure component of a developed economy, technological progress in the field of electricity grid systems has not kept up with the pace of other important technological fields such as telecommunications. Most of the electric grid infrastructure has been in place for decades, and the basic architecture conceived by Thomas Edison and enhanced by the likes of George Westinghouse and Samuel Insull still prevails. Additionally, the current regulatory scheme in the United States discourages large-scale investment in transmission and distribution infrastructure, with the unfortunate result that the grid is often running near capacity.

A number of techniques have been devised to assist in maintaining grid stability during times of high stress, which normally means peak usage hours but also includes periods during normal usage when part of the grid goes offline, thus reducing the effective capacity of the grid or a region of it. It is commonplace for "peaking generators", often operated by independent power producers, to be placed online at peak periods to give the grid greater capacity; since periods of high demand tend to lead to high wholesale power prices, the business model of peaking generator operators is premised on operating their generators only when the price that can be obtained is high. Large utilities, desiring to avoid the use of high-priced peaking generators when possible, also routinely participate in demand response programs. In these programs, arrangements are made by independent third parties with large commercial, industrial, or institutional users of power to give control to the third parties over certain electric loads belonging to large users. These third parties make complementary arrangements with electric utilities to provide "negative load" during peak periods, on demand, by shedding some portion of the loads under their control when requested by the utility. Typically the cost to the utility of paying these aggregators of "negawatts" (negative megawatts, or negative load available on demand) is much less than the corresponding costs the utilities pay to peak generators for actual megawatts. That is, the utilities pay for "dispatchable load reduction" instead of for "dispatchable peak generation", and they do so at a lower rate. This arrangement is attractive to the utilities not only because of the immediate price arbitrage opportunity it presents, but also because, by implementing demand reduction, the utilities are often able to defer expensive capital improvements which might otherwise be necessary to increase the capacity of the grid.

A problem with the current state of the art in demand reduction is that it is only practical, in the art, to incorporate very large users in demand reduction programs. Large commercial and industrial users of electricity tend to use far more power on a per-user basis than small commercial and residential users, so they have both the motive (large savings) and the means (experienced facilities management) to take advantage of the financial rewards offered by participation in demand management programs. Additionally, large users of electricity already are accustomed to paying a price for power that depends on market conditions and varies throughout the day, and they often have already invested in advanced building automation systems to help reduce the cost of electricity by conserving.

Unfortunately, a large portion (roughly 33%) of the electric power used during peak periods goes to small users, who do not normally participate in demand management. These users often are unaware of their energy usage habits, and they rarely pay for electricity at varying rates. Rather, they pay a price per unit of electricity used that is tightly regulated and fixed. Partly this is due to the fact that the large majority of small businesses and homes do not have "smart meters"; the amount of power used by these consumers of electricity is measured only once per month and thus there is no way to charge an interval price (typically pricing is set at intervals of 15 minutes when interval pricing is in effect) that varies based on market conditions. Furthermore, the loads in the homes and businesses of small electricity users are invisible to the utilities; it is generally not possible for utilities to "see", much less to control, loads in homes and small businesses. Loads here refers to anything that uses electricity, including but not limited to lighting, heating ventilation and air conditioning (HVAC), hot water, "white goods" (large appliances such as washers, driers, refrigerators and the like), hot tubs, computers, and so forth.

One approach in the art to improving the situation with small users is to install smart meters at homes small businesses. While the primary motivation for doing so is to enable interval-based usage measurement and the communication of interval-based prices to the users, it is also possible to provide the consumer with much more information on how she uses energy than was possible without a smart meter. Given this granular usage information, utilities and some third parties also hope to be able to send signals, either via pricing or "code red" messages (which ask consumers to turn off unnecessary loads due to grid constraints), or both. In some cases, third parties seek to provide visibility and control to utilities so that, when consumers allow it, the utilities can turn loads off during peak demand to manage the peak. A related method involves the use of "gateway" devices to access a consumer's (again, referring to residences, businesses, and institutions) home area networks (HAN) to communicate with or turn off local devices.

It is a disadvantage of the techniques known in the art that the consumers and small businesses are not, in general, provided with any substantial financial incentives to participate in demand reduction programs (other than merely by saving because they use less power). The "virtual power provider" generally sells "negawatts" as previously described by aggregating demand response capability of many small users and selling demand response services to the utility. This method similarly discourages consumer participation, because the majority of the financial rewards associated with the demand response are not generally passed along to the consumer. The companies that aggregate demand typically charge utilities for the peak reduction, but the consumer is unable to sell their available "negawatts" directly to a utility. This is problematic because this methodology reduces consumer incentives to participate in demand side management, which is a necessary component of modern grid management. And adoption is hampered by the general lack of willingness on the part of consumers to allow utilities to control significant portions of their electricity usage with the consumer having little "say" in the matter. And, from the utilities' point of view, the large variations in consumer usage patterns means that it is much harder for utilities to gage how much demand reduction is enough, in advance; compared to large, stable users such as large office buildings or industrial facilities, utilities face a complex mix of user patterns that are difficult to predict and virtually impossible to control. As a result, at the present time almost no demand reduction takes place among consumers and small business users of the electric grid.

Another problem in the art today is the incorporation of distributed generation and storage systems, which are proliferating, into grid demand management systems. In many cases, consumers are unable to do more than to offset their own electric bills with generation units (such as microturbines powered by wind, or solar panels on a roof, or plug-in electric hybrid vehicles that could add energy to the grid when needed), because utilities have neither the means nor the motivation to pay them for the extra electricity they generate. Many states require utilities to buy excess power generated; but, without an ability to sell that generated power at a price that represents a more holistic view of its value that includes "embedded benefits" (i.e. at a rate that may consider, but is not limited to, the effect on enhancing local power quality, proximity to loads, type of power generated and the associated reduction in carbon and other negative externalities—like sulfur dioxide and nitrogen dioxide—and the reduced capital costs resulting from the reduction of required capital investments in infrastructure), most distributed power generation remains economically unfeasible, to the detriment of all parties. With the growing number of markets associated with trading negative externalities associated with electrical power generation (most prominently including carbon, but also nitrogen dioxide and sulfur dioxide), it is necessary to fully account for the value of such energy sources and storage options, and to ensure that double counting of environmental benefits that are related to the generation and distribution of the electricity itself is not conducted. Sulfur dioxide and nitrogen dioxide became regulated in the U.S. under the 1990 Clean Air Act Amendments, which established the EPA's Acid Rain Program to implement a cap-and-trade method to reduce harmful emissions from the electric power industry. Additionally, while storage units may allow users to avoid peak charges and to even the flow of locally generated power (for instance, by storing wind power during high wind conditions and returning it when the wind conditions are low), it is generally not possible for users to sell stored power to the grid operator at its true value for the same reasons.

An additional challenge associated with integrating distribute energy resources with the grid is the lack of a cost-effective means of aggregating distributed power generation into a form that can be traded in a manner similar to the large blocks of power that are bought and sold by more traditional commercial power plants like coal and nuclear. Complex industry rules discourage participation and even consolidators have been hesitant to enter the market given the high set up costs associated with communications, staffing, and industry monitoring. A mechanism is needed to enable equal participation of distributed energy generators (e.g. solar panels on the roof of a home) and traditional power generators in order to encourage the development of these resources.

An underlying difficulty that contributes to the problems already described is that consumers (commercial, industrial, institutional, or residential participants in energy markets) have no way to differentiate between one unit of energy and another in energy distribution systems, such as the electric grid, that are best viewed as "continuous-flow energy networks". This type of network can be contrasted with "discrete- or packet-flow energy distribution networks" such as the coal distribution system. The global oil distribution network is a good example of a hybrid, or mixed, energy distribution network that uses both discrete-flow and continuous-flow techniques at various points in the network. With continuous-flow energy distribution networks such as the electric power distribution system (or grid) and the natural gas distribution system, the units of energy are indistinguishable physically, one from another, at the point of consumption. That is, a consumer cannot differentiate one kilowatt of electricity arriving at her home or business from another, and in general has no ability to differentiate between energy having desirable qualities (to her) such as renewability, low carbon footprint, derivation from local or at least domestic (as opposed to foreign) sources, and so forth. Since the physical properties of electricity or natural gas are essentially fixed and do not vary based on the source, the only attributes consumers can know are quantity and price. While in some cases utilities make available about information about the aggregate sources of their electricity, and while they may in some cases make a small number of "packages" available to consumers based on differing mixes of sources (for instance, "black, green and in between" menu choices based on percentage of renewable or low-carbon sources for each option, with prices varying accordingly), it is in general true that consumers have no information about the particular energy they are using at any given time, and no ability to make informed choices as energy consumers.

Today's energy distribution networks are "information-poor" and treat energy as a commodity that is only differentiated by price. What is needed is an "information-rich" energy distribution network.

One approach to addressing the "information-poor" nature of current distribution systems that provide energy to consumers (taken herein to mean residential, industrial, institutional, and commercial consumers of energy) is "smart metering". Smart meters are a natural extension of the well-established electricity meters that today measure electricity usage at virtually all consumer locations. Under the older (pre-smart meter) system of measuring electricity usage, human meter readers would physically go at regular, long intervals (monthly or bi-monthly, generally) and read a current value, typically in kilowatt-hours, of total energy consumption at that site since the meter last "rolled over" (passed its maximum reading and started over at zero). This new value would have the previous value subtracted from it to give the energy used in the period since the last meter reading. There are two main problems with the older meter system: first, meter readers are expensive; second, because readings can only practically be taken at long intervals, there is no way for utilities to measure usage specifically during particular time intervals such as a peak hour. Without the ability to make readings at frequent intervals (a common desired target is to have fifteen-minute readings), it is practically impossible for utilities to offer or impose demand-based pricing schemes, for instance where electricity prices are set higher during periods of peak demand. For very large consumers, utilities and the consumers have found common ground and the consumers have allowed sophisticated measurement systems to be put in place (or have done it themselves), and have switched to demand-based pricing; these large consumers typically have building automation and energy control systems that allow them to manage energy usage and to avoid excessive usage during peak periods. By switching to demand-based pricing, these consumers get a lower overall energy bill because prices during periods of low demand are typically much lower than the fixed prices used in non-demand-based pricing schemes (usually these prices are set as fixed tariffs and reflect an average of peak and low usage prices that would have been charged in demand-based pricing schemes).

While to some extent the problem of obtaining frequent usage readings has been solved for very large consumers, the situation is very different for residential and small commercial users, who collectively account for approximately 50% of electricity usage in the United States. A solution that is currently favored by the utility industry as a whole is to gradually shift the entire user base to "smart meters", which are energy meters that are connected via a data network to the utility and are able to take readings at arbitrary time intervals under the control of the utility. Deployment of smart meters, among other things, makes it possible for utilities to implement demand-based pricing schedules for all consumers served by smart meters, which is extremely important for utilities and consumers alike (as demand-based pricing should help to control demand especially at peak periods). But the cost of deploying smart meters is quite high, typically reaching several hundred dollars per installed smart meter. With tens of millions of ratepayers in the United States alone, switching completely to smart meters will likely cost many billions of dollars, and it will take a considerable period of time.

Besides their high costs, smart meters suffer from another disadvantage, albeit one which would not trouble utilities themselves. Since smart meters are being deployed exclusively by utilities in the United States (since it has always been the responsibility of the utilities to install, maintain, and own usage meters), widespread deployment of smart meters will tend to lock in consumers with their local utility. This situation, which prevails today, is in sharp contrast to the situation in the telecommunications industry, where many consumers have a choice of carriers, even for local service. If real-time markets are not developed in parallel with smart meter deployments, smart meter deployment will reinforce utilities' stranglehold on their consumer base, which may not serve the best interests of consumers or the economy as a whole. If developed in parallel, smart meter deployments and parallel market-based network management can have many synergistic effects.

Another aspect of the problem of energy management in more market-oriented, information-rich scenarios is the determination and management of risk. There are several relevant areas of risk that must be considered by market participants. These include familiar risks such as the creditworthiness of counterparties in energy transactions, but these familiar risks are taken into unfamiliar territory when large numbers of less sophisticated market participants are considered (such as where small businesses and residences participate in demand response management programs or contribute power to the grid for distributed energy sources). Other types of potentially relevant risks are new, including such novel risks as the risk that, when large numbers of small participants elect to respond to a demand response management signal, their geographic distribution creates stability problems on the grid. In order for efficient markets that combine both demand response and distributed energy generation to be possible, and to be attractive to prospective market participants, the overall risk profiles of participants and of the derivative energy securities traded on such markets must be visible and must maintain the confidence of these participants. Furthermore, development of real-time energy markets requires that uncertainty and variability of loads and sources on the network be quantitatively and qualitatively transparent and manageable through tradable financial and physical trading rights. As markets continue to develop into more effective tools to integrate increasingly large numbers of participants, two types of risk must be simultaneously managed in market-based smart grid solutions: financial risk and system operations risk. This is a distinct challenge compared to the purely financial risks that are commonly measured and allocated in financial derivatives.

In addition to the practical challenges associated with integration of large quantities of renewable energy resources and distributed energy resources (generation and storage), the energy markets must have tools to effectively price the effect of infrastructure reliability on the network due to the physical limitations of the network to deliver electricity to end-users. This requires that reliability ratings for actual physical infrastructure assets can also be described qualitatively and quantitatively for inclusion in real-time markets and futures markets for energy derivatives. The scoring of infrastructure reliability is an important part of quantifying system operations risk inherent in the system that must be accounted for in financial models if risk is to be allocated in an appropriate and socially optimal manner.

In addition to challenges in management of the grid, the existing energy market structure results in inefficient pricing and taxation of market externalities. The inability to effectively attribute system losses (e.g. transmission losses) to network/market participants stems from the current inability to facilitate nodal allocation of energy on continuous flow energy networks (that is, allocation of real costs and externalities associated with energy transformations on a node-by-node basis, for instance by assigning a carbon cost to electricity losses on a high-voltage transmission line and then allocating that cost to each user of electricity which was transmitted along that transmission line). In a continuous flow energy networks with proper energy information overlay networks, it is possible to effectively attribute the negative externalities of power generation, transmission, distribution, and storage to end consumers with particularity, such that the end-to-end environmental effects of energy usage can be quantified. Once quantified and attributed to end consumers, more effective means of pricing pollution and other negative externalities can be explored by government beyond methods such as cap-and-trade that are currently being considered. With end-to-end accountability it is possible to tax pollution in the final goods and services produced directly, which increases transparency and affects consumer behavior in order to help reach national or supra-national environmental goals.

Another important aspect of managing energy markets is pricing of derivative energy securities. When considering instruments which consist of aggregated demand energy reduction or distributed energy generation obligations, there are two important financial aspects to consider: the appropriate price for the instrument, and the actual price to be paid to the various entities who voluntarily have committed to carry out certain demand reduction or distributed generation actions on demand in return for financial compensation. The derivative energy securities are similar in nature to commodities futures, in which a price is paid on an open market for the right to buy or sell a certain commodity at a certain price at or by some definite time in the future. The price for the instrument is distinct from, but dependent on, the price of the underlying commodity, and a purchaser of such a commodities future instrument who plans on actually taking (or making) delivery of the commodity has to consider both the price to be paid for the instrument and the ultimate price of the commodity (as compared to the market price at the time of the settling of the contract) to determine whether or not to proceed with a purchase (or sale) of such a futures contract (or financial instrument). But in commodities futures, the actual delivery of commodities on settlement of a contract is not facilitated or managed by the market or exchange that handled transactions involving the futures contract; what is traded on such exchanges are contractual obligations only. Parties to final contracts for delivery and receipt of contracts have resort to legal mechanisms in the case of failures of counterparties to fulfill their obligations, without the involvement of the exchange that made the market in the futures contracts. In situations where exchanges may actually involve themselves in the delivery of the underlying physical assets being traded, and may take on a certain measure of risk with regard to such deliveries, the pricing of futures contracts becomes more complicated as there may be at least three parties bearing some measure of risk associated with each contract: a buyer, a seller, and an exchange.

As the electric grid system continues to integrate increasing numbers of diverse market participants, the markets which determine the relationship between parties interacting on the network will continue to become ever more important. In fact, future reliability is likely to be provided through market operations, and not the decisions or actions of central planners. The development of complex energy markets capable of effectively managing operation of the grid within the physical, operational, and policy constraints required will require the development and implementation of new trading tools to interact with the markets.

At the core of these new markets will be the trading platforms that provide new ways to integrate engineering and business decisions to manage the physical and financial risks that, in the case of the electric grid, are coupled due to the unique constraints of the network. In order to manage the diverse energy resources, spiking demand, and continuously increasing uncertainty and variability, all market participants require new tools to interact with developing markets that enable them to effectively manage physical and financial risk.

Current methods for managing the utilization of network assets (including, for example, transmission and distribution network lines) are suboptimal. This is due to lack of visibility to most players regarding line losses (which are often as much as 8-10% of electricity generated) and system requirements such as ancillary services, both of which remain unattributed to end-users. For example, voltage support required for a large factory is not attributed to the factory in any meaningful way, leading to a free-rider problem. Although Supervisory Control and Data Acquisition (or "SCADA") systems often provide extremely low-latency data feeds to utility network operations centers (or "NOCs"), these systems are often not configured in a manner that enables wide area network optimization and utilization to occur. The use of transmission and distribution assets across many service areas by many different physical and energy asset holders is critical to providing more transparent and efficient markets that are capable of meeting the energy challenges faced by the United States and many other nations.

Challenges with the pricing and trading of transmission rights, in many cases, are linked to the fact that electrons flow over all parallel paths inversely proportional to the impedance of the path, and do not follow any "specified" contractual path (as assumed in physical transmission rights). Loop flow becomes a problem when bilateral transactions between market participants extend to cause flow problems in third-party systems (i.e. other parts of the network). More generically, this problem is a direct result of the inability to directly control the flows between any two points on the network within the grid network without influencing line flows elsewhere on the system. In short, simplified "shortest distance" contract paths across the electric grid network are neither technically nor economically efficient. It is this highly interconnected nature of the electric grid system that requires new approaches for managing dispatch, network utilization, and network optimization.

It is common in the art to base the entire operation of the grid on the concept of control areas that are premised on the concept that loads and resources will maintain an instantaneous balance across the network. This assumption of uniform power quality and instantaneous balancing of energy assets on the network is not necessarily useful. Control Area concepts are not required for efficient and reliable provision of services and management of the electric grid. In fact, the assumption that all users require the same power quality and consistency of access is in some cases detrimental to parts of society who may be unable to pay for such services or end up paying for such services without understanding the true sources of the associated costs. It is also common in the art to utilize Area Control Error (ACE) as the metric with which to manage control areas. This is generally specified by a standards or regulatory agency that tells system operators to keep their ACE within tight limits in two key ways: first, that the control area balance (on an instantaneous power basis) is kept in balance with the rest of the interconnection at least once every ten minutes and second, that the control area's energy imbalance remain within a specified limit (generally 0.2-0.4% of peak demand) every ten minutes. The control area concept and many of the centralized dispatch and scheduling mechanisms utilized today introduce large inefficiencies into the system and provide problems for the provision of effective low cost energy services due to scheduling and dispatch limitations associated with fixed scheduling mechanisms. New systems and methods that are able to provide effective tools for customers to purchase electricity according to their needs and desires as "services down the wire" are possible if correctly implemented.

Another challenge of energy is that the end consumer requires energy to run their home or business. Rarely do they have an understanding of the complexities of how energy pricing works. Instead, they focus on how to generate revenue or control the costs of their own business or residence. End users are primarily interested in the end-state and benefit that energy enables. For instance, end users value the delivery of comfort, convenience, mobility, security, among other tangible economic benefits. The state-of-the-art of energy management lacks a translation mechanism of turning the complexities of energy into tangible, physical experiences As an example, the value of comfort can be delivered by adjusting the control system of a central heating system, boiler, space heater, sunlight etc. Users lack an ability to optimize their total comfort based on economic variables.

It is an object of the present invention to utilize a system and method for enabling nodal allocation of electricity and the effective utilization and optimization of transmission and distribution infrastructure of the electric grid system, such that intelligent adjustments may be made to connected devices and systems to optimize perceived comfort levels.

SUMMARY OF THE INVENTION

Accordingly, the inventor has conceived and reduced to practice in a preferred embodiment of the invention, a system and method for enabling nodal allocation of electricity and the effective utilization and optimization of transmission and distribution infrastructure of the electric grid system, using information obtained or exposed via the invention to optimize comfort levels in an iNode or eNode network.

In a preferred embodiment of the invention, a system for electric grid utilization and optimization, comprising a communications interface executing on a network-connected server and adapted to receive information from a plurality of iNodes, the plurality of iNodes comprising a source iNode, a sink iNode, and a plurality of transmission or distribution iNodes, an event database coupled to the communications interface and adapted to receive events from a plurality of iNodes via the communications interface, a modeling server coupled to the communications interface, and a statistics server coupled to the event database and the modeling server, is disclosed. According to the embodiment, the modeling server, on receiving a request to establish an allocation of at least one of transmission losses, distribution losses, and ancillary services to a specific sink iNode, computes at least one virtual path for flow of electricity between a source iNode and the specific sink iNode. Also according to the embodiment, the modeling server further computes, for each transmission or distribution iNode included in the computed virtual path, at least one energy loss and allocates a portion thereof to the specific sink iNode. The iNode information is used to optimize the operations of equipment that delivers energy benefits, such as user comfort.

In another preferred embodiment of the invention, a method of utilizing an electric grid, comprising the steps of: receiving a request at a network-connected modeling server to establish an allocation of at least one of transmission losses, distribution losses, and ancillary services to a specific sink iNode; computing at least a virtual energy flow path between a source iNode and the specific sink iNode; computing at least one energy loss for each transmission or distribution iNode included in the computed virtual path; allocating a portion of each computed energy loss to the specific sink iNode; and utilizing the information to optimize equipment operations to deliver lowest-cost user comfort, is disclosed.

BRIEF DESCRIPTION OF THE DRAWING FIGURES

The accompanying drawings illustrate several embodiments of the invention and, together with the description, serve to explain the principles of the invention according to the embodiments. It will be appreciated by one skilled in the art that the particular embodiments illustrated in the drawings are merely exemplary, and are not to be considered as limiting of the scope of the invention or the claims herein in any way.

Figure 24:
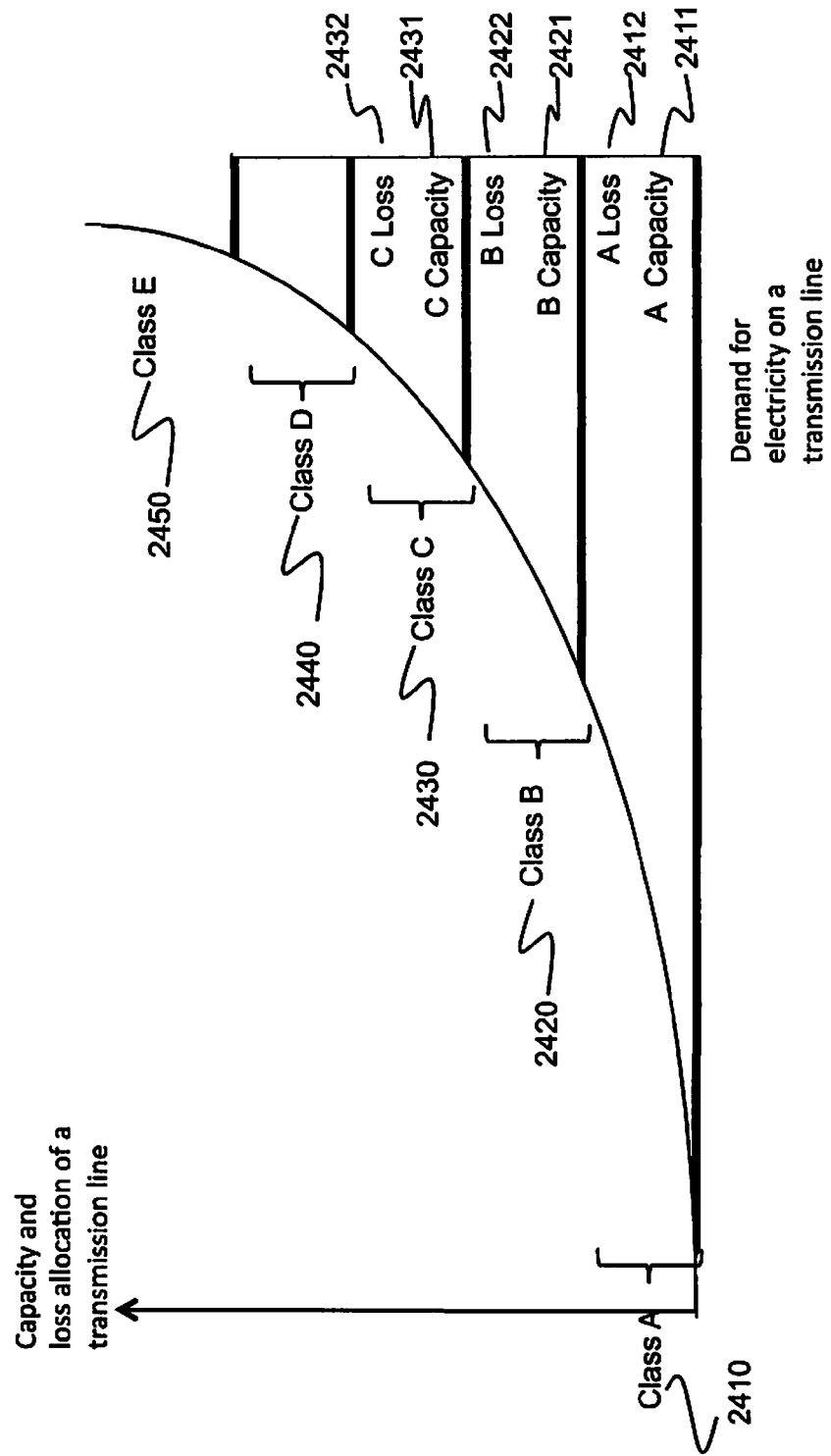

FIG. 24 provides an illustration of an exemplary embodiment of the invention illustrating creation of different tiers or classes of transmission rights.

Figure 25:
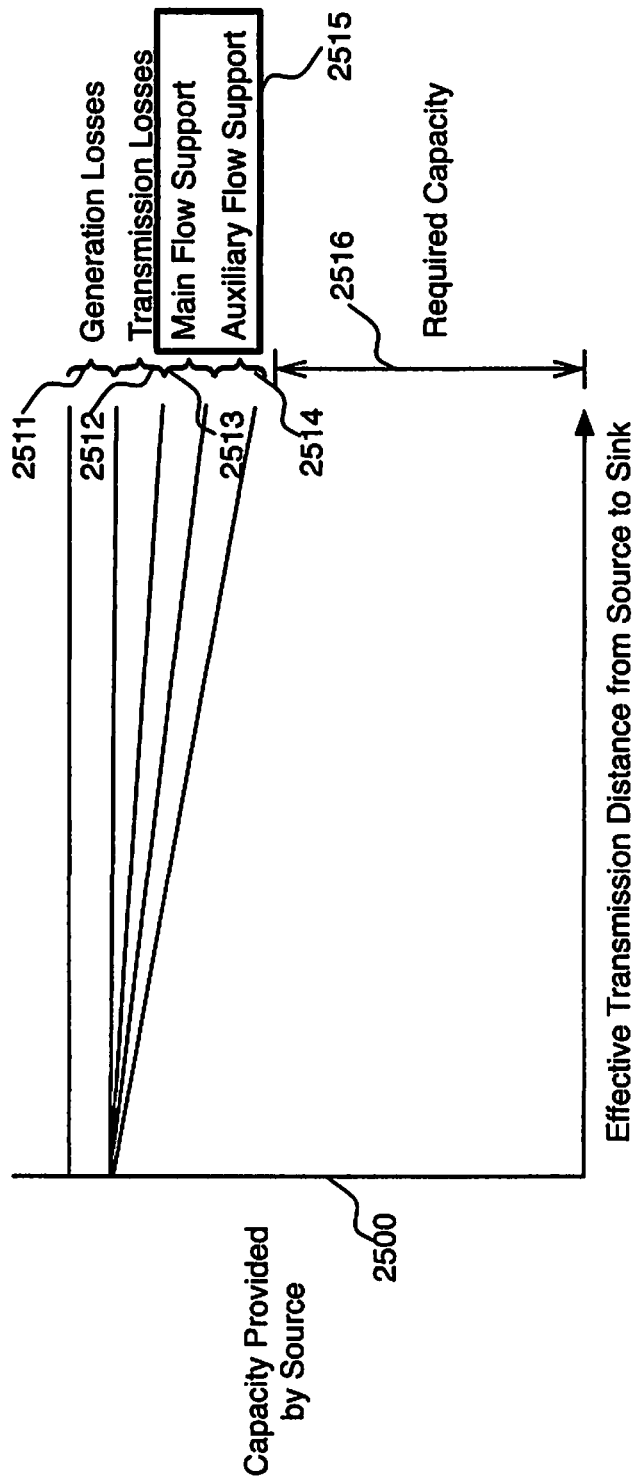

FIG. 25 is a diagram of an exemplary "packet" of energy information that is overlaid on physical energy grid by a data network, according to the invention.

Figure 26:
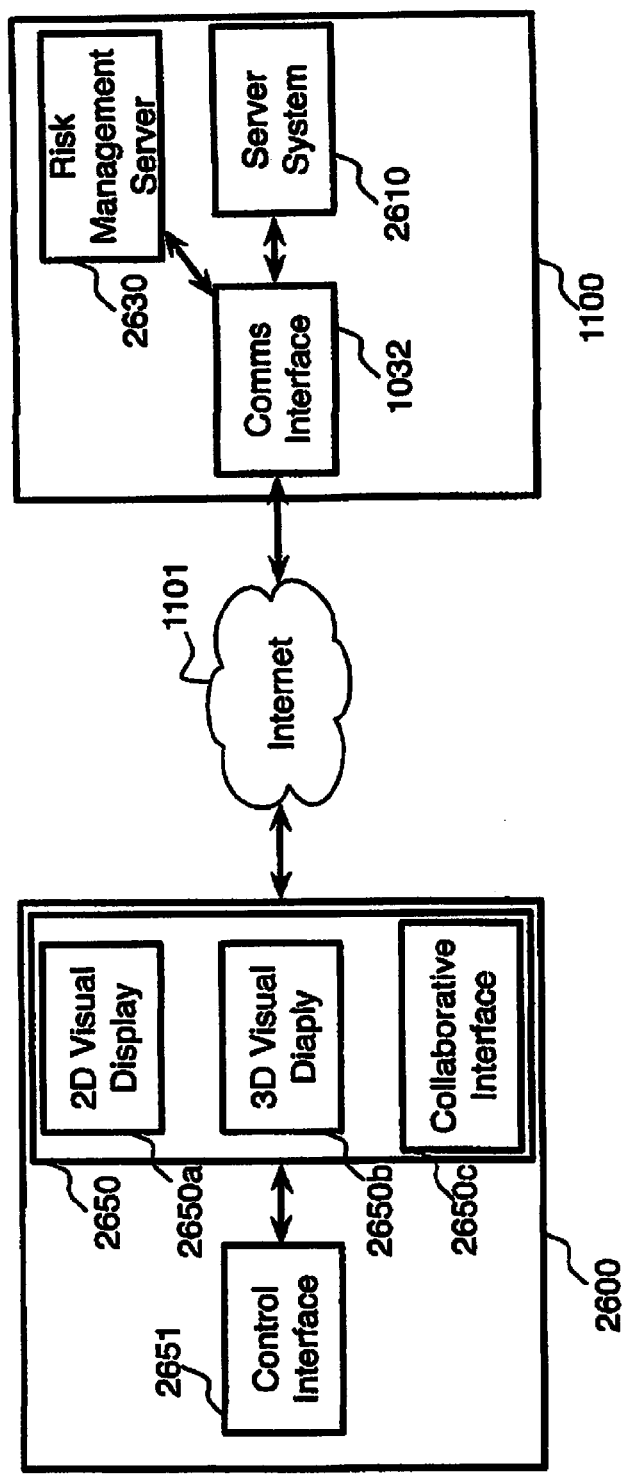

FIG. 26 is a block diagram of a system for efficient user interaction with a digital energy exchange, according to an embodiment of the invention.

Figure 27:
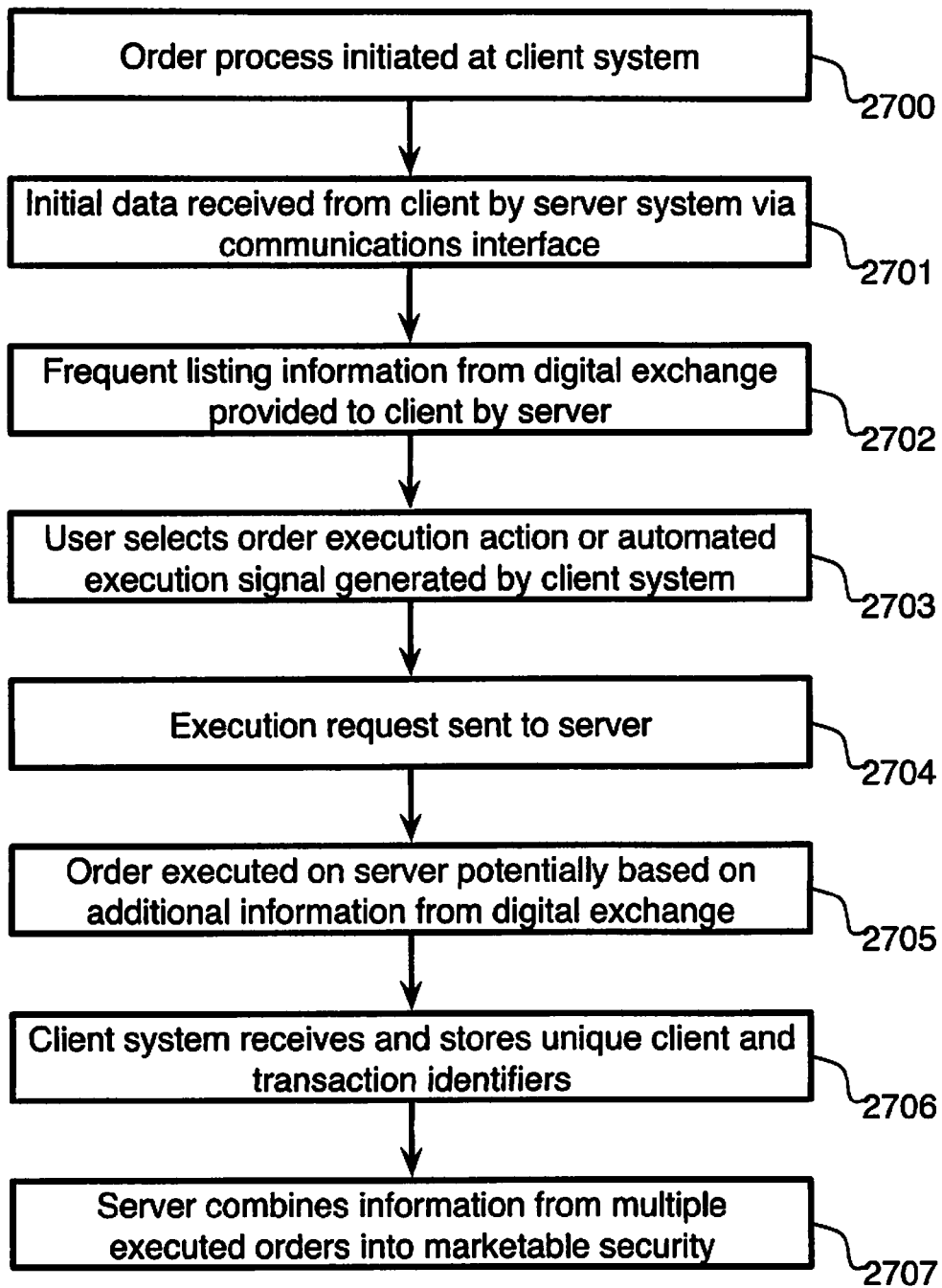

FIG. 27 is a diagram of a process for conducting single-action scheduling, participation, or confirmation of an energy event according to an embodiment of the invention.

Figure 28:
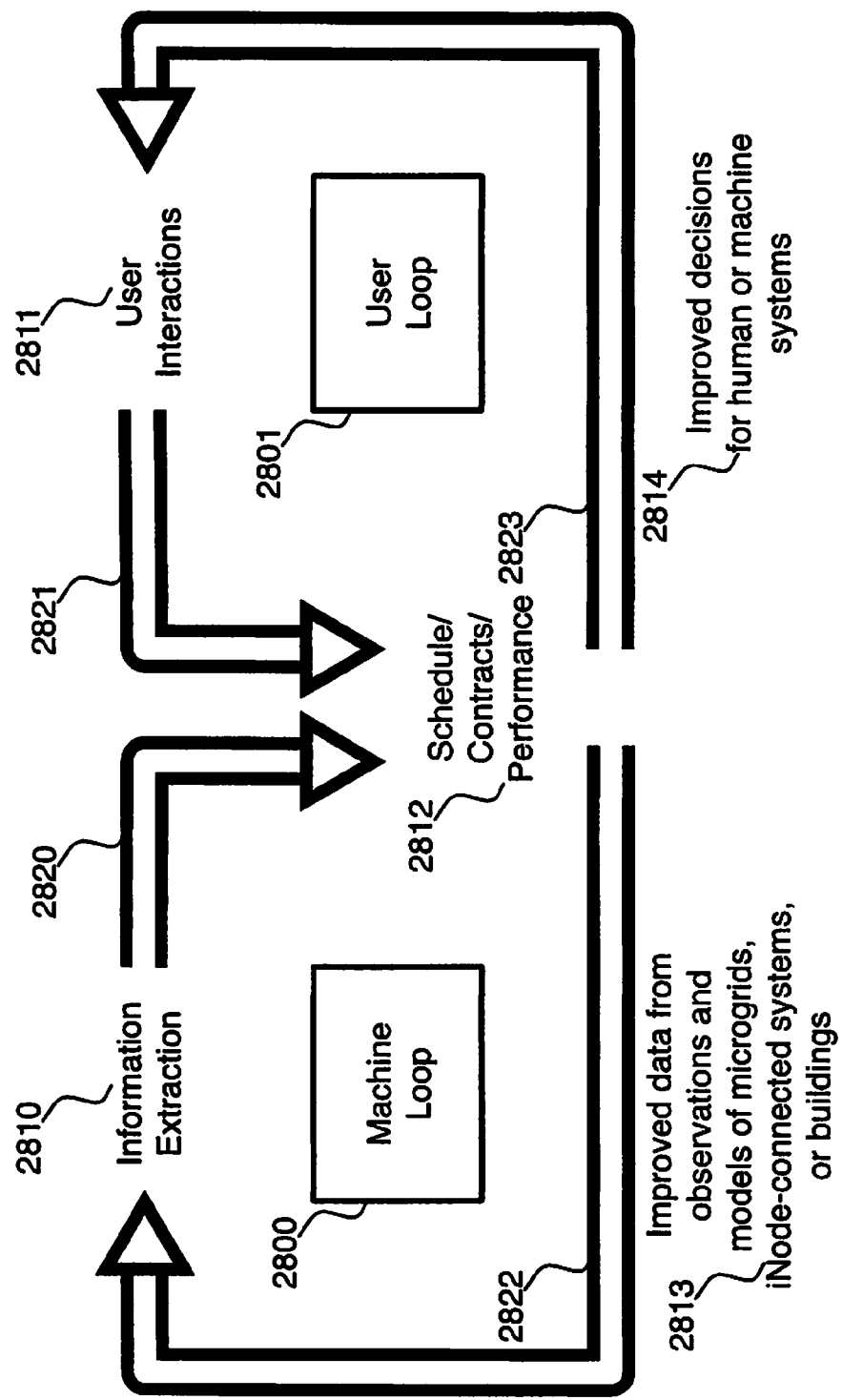

FIG. 28 is a diagram of a process for conducting synergistic information extraction and user data pairing for energy and externality-related decisions or optimization of operations according to an embodiment of the invention.

Figure 29:
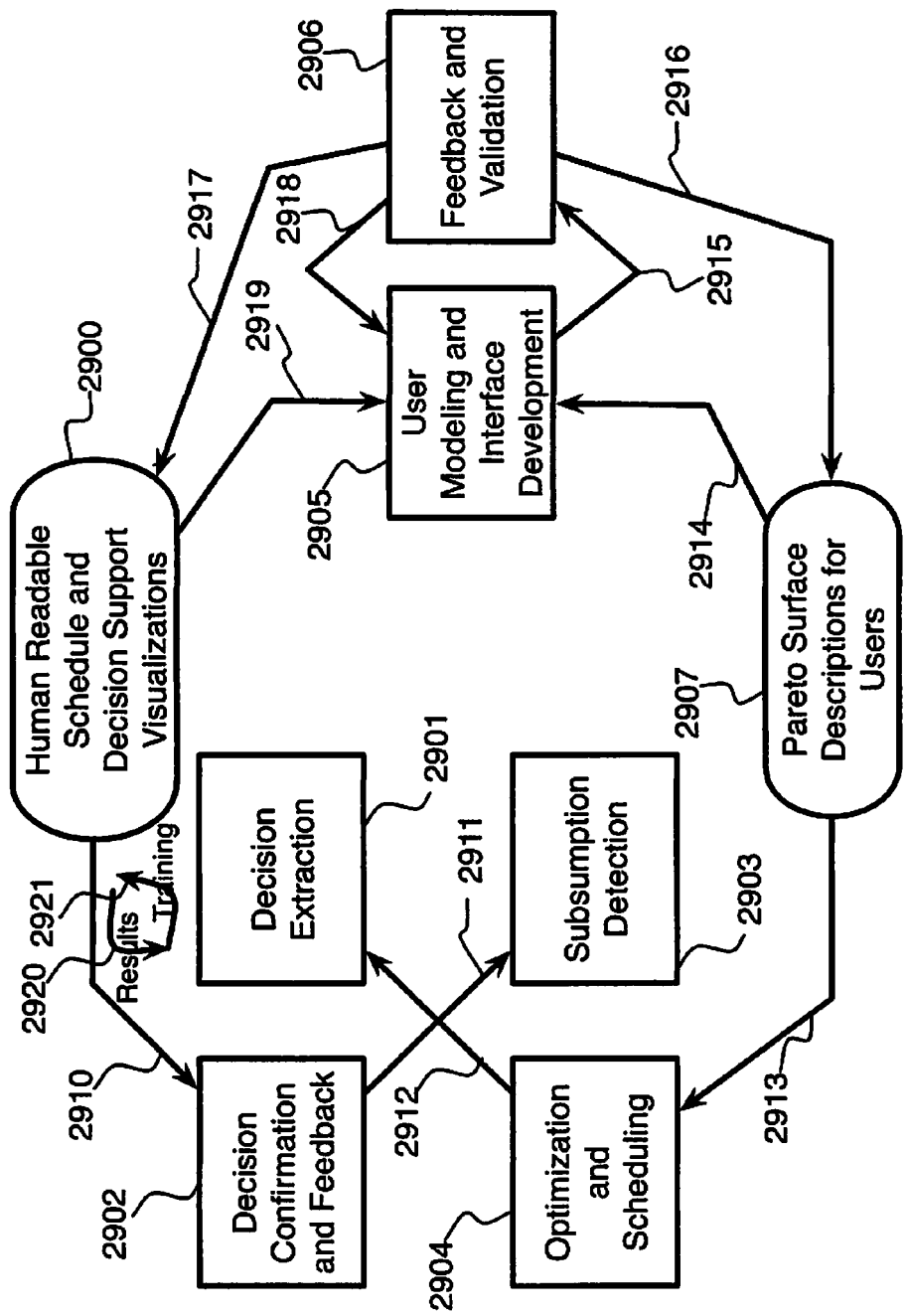

FIG. 29 is a diagram of a process for a learning system that enables enhanced decision support or decision automation to be provided for client systems or iNodes by a network-connected server system according to an embodiment of the invention.

Figure 30:
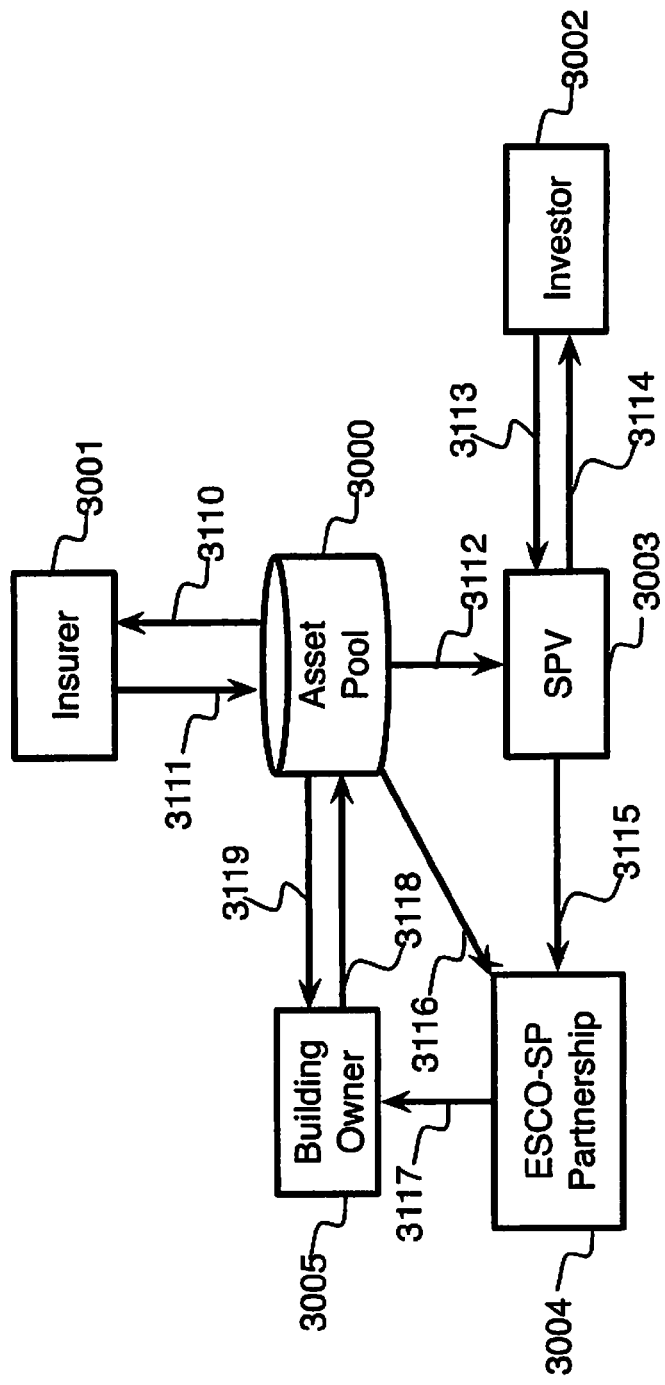

FIG. 30 is a diagram of a process for managing cash flows associated with variable or fixed, or both, energy efficiency projects to enable more cost-effective financing and risk mitigation according to an embodiment of the invention.

Figure 31:
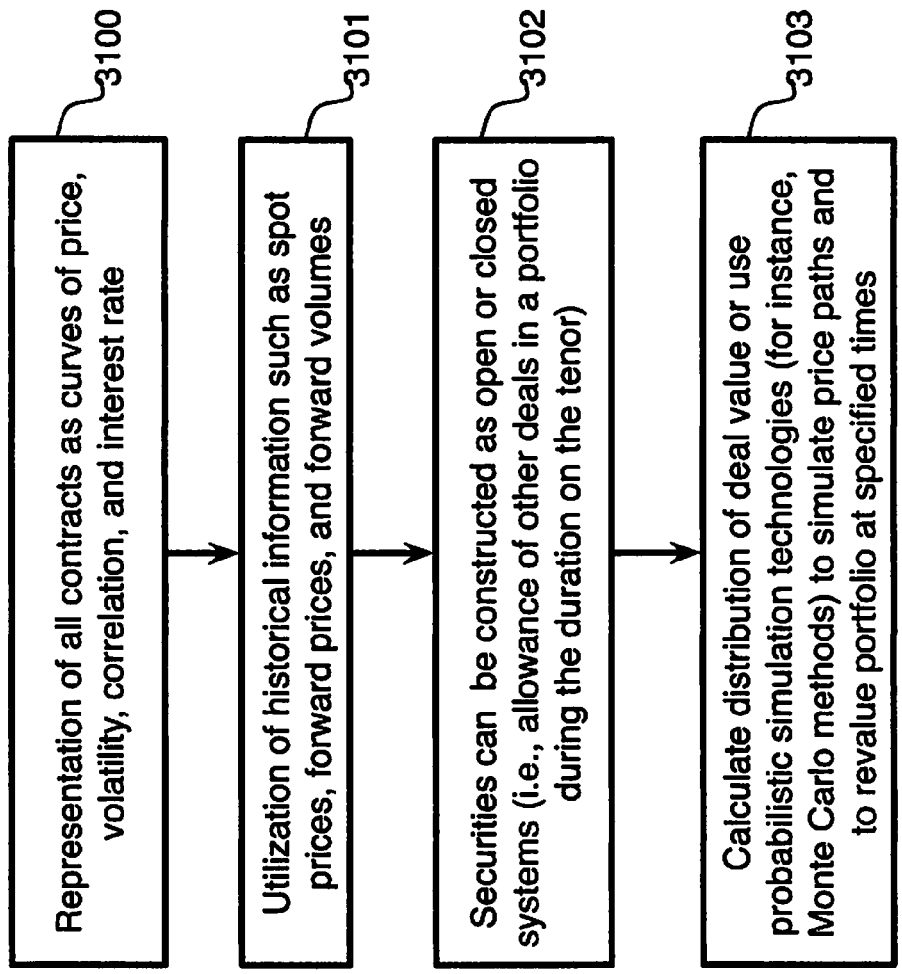

FIG. 31 is a diagram of a process for risk mitigation for energy efficiency, distributed energy, or demand response securities during a securitization process and during the life of a contract, according to an embodiment of the invention.

Figure 32:
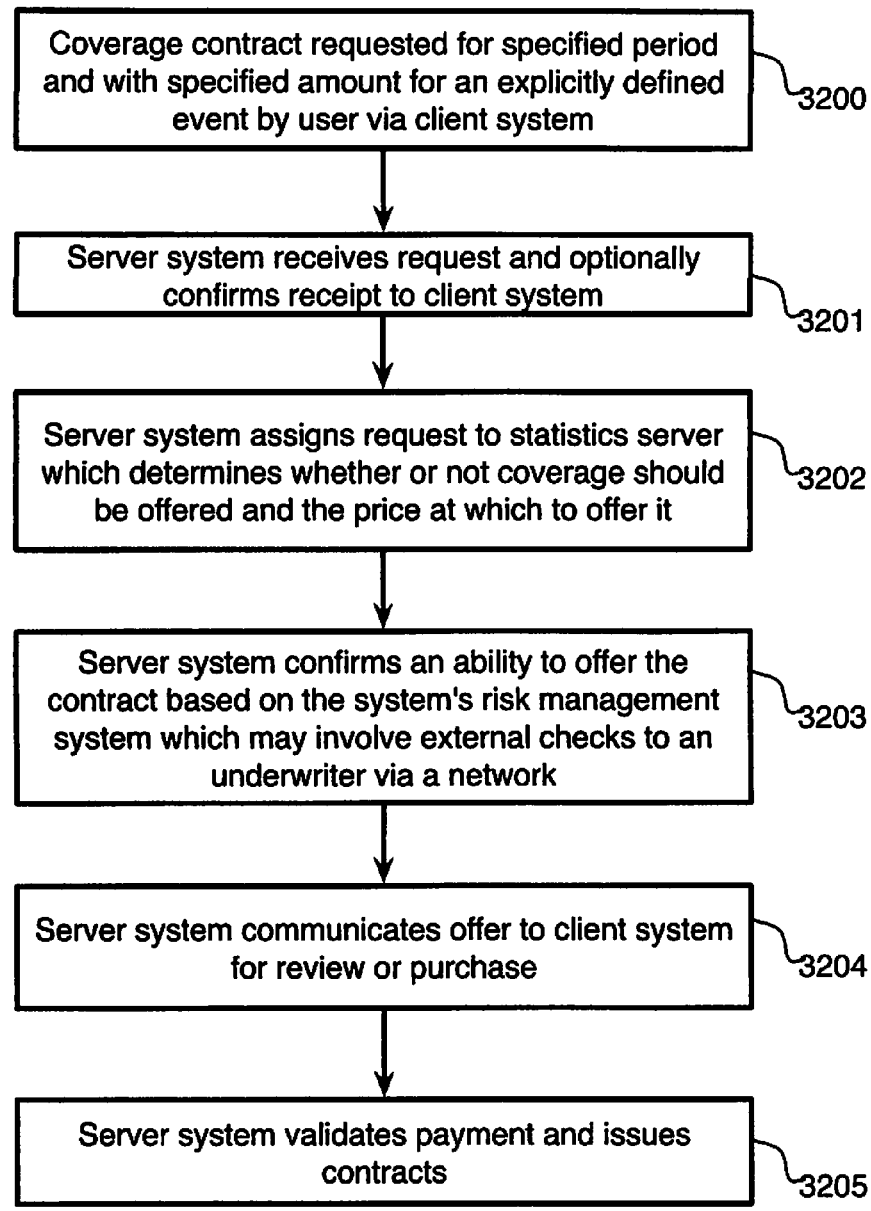

FIG. 32 is a diagram of a process for energy-related coverage contracts administered by a network-connected server system according to an embodiment of the invention.

Figure 33:
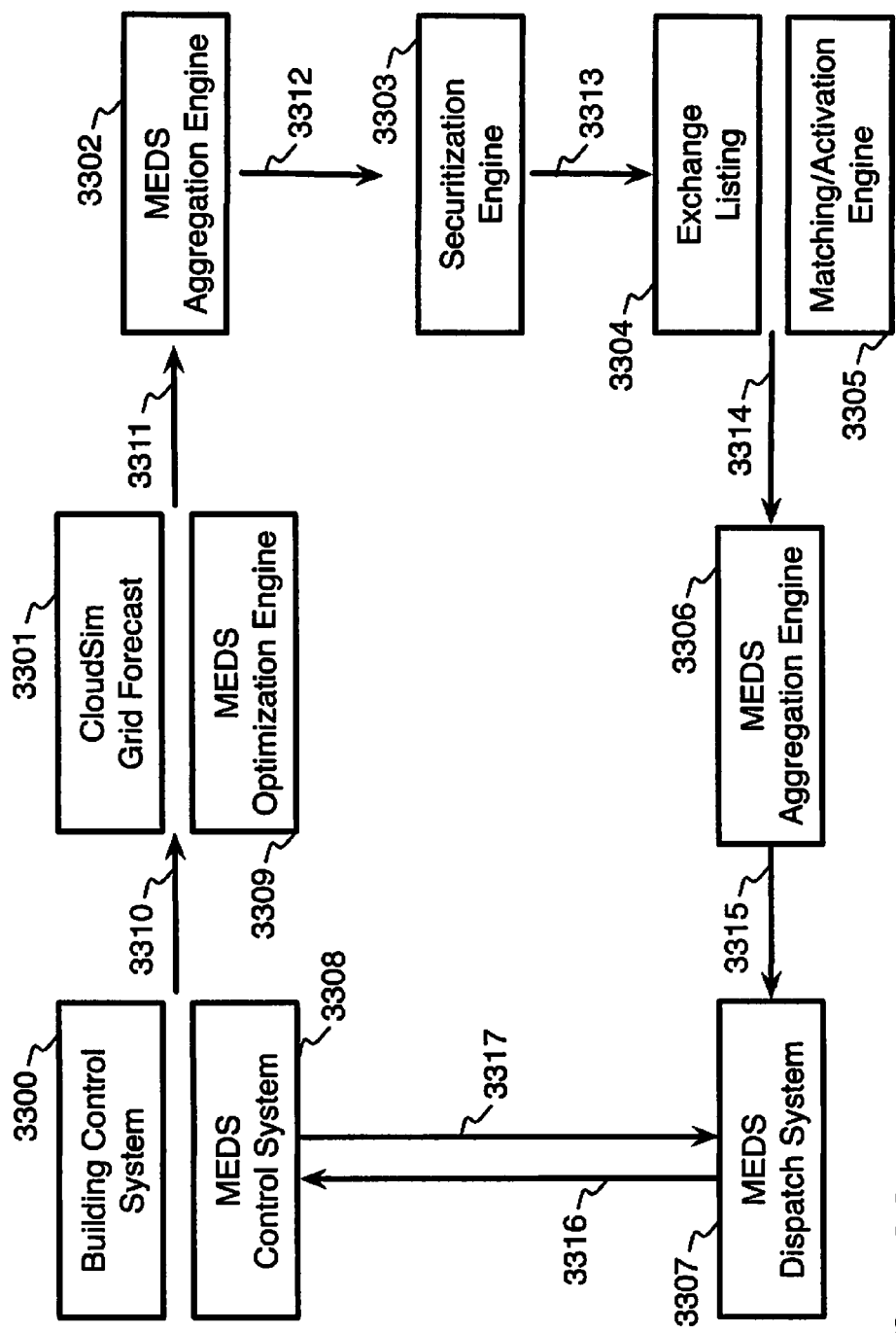

FIG. 33 is a diagram of a process for a network-connected server system providing energy decision support or optimization services to microgrids or buildings to enable iNodes or client systems to participate in energy-related securities on a digital exchange, according to an embodiment of the invention.

Figure 34:
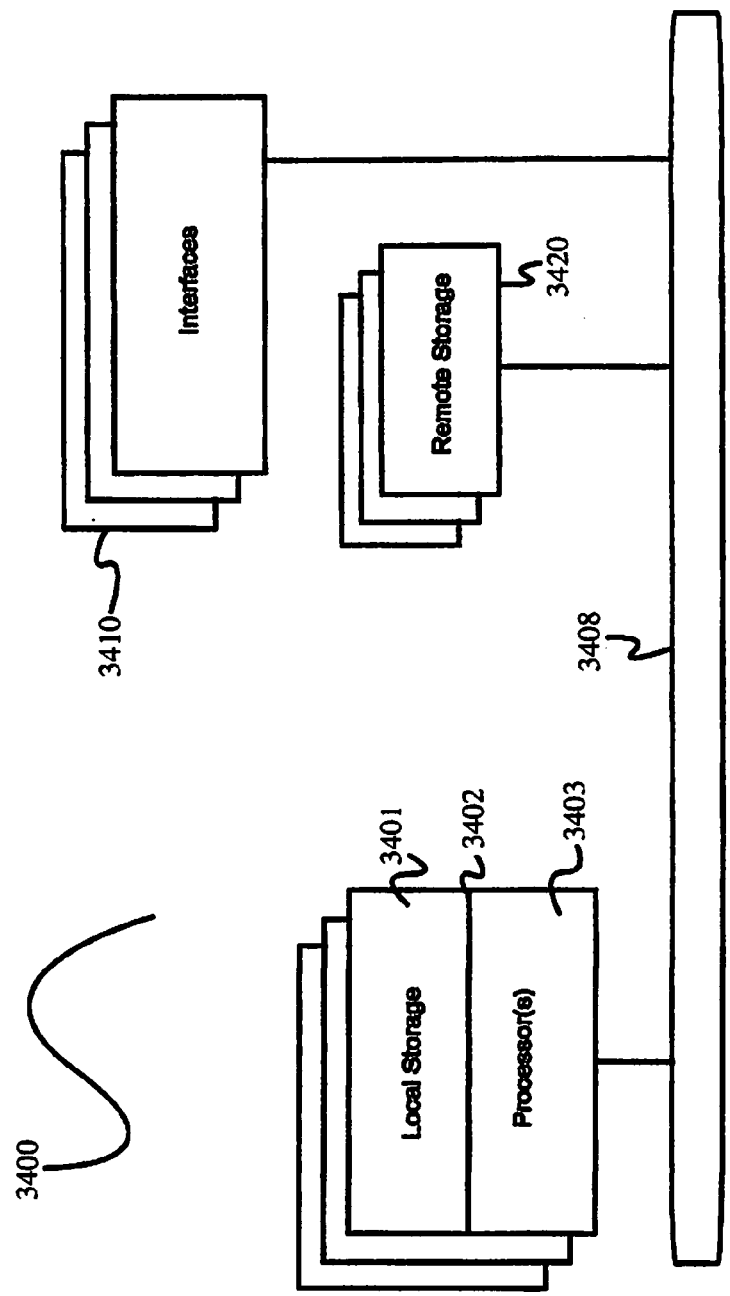

FIG. 34 is a block diagram illustrating an exemplary hardware architecture of a computing device used in an embodiment of the invention.

Figure 35:
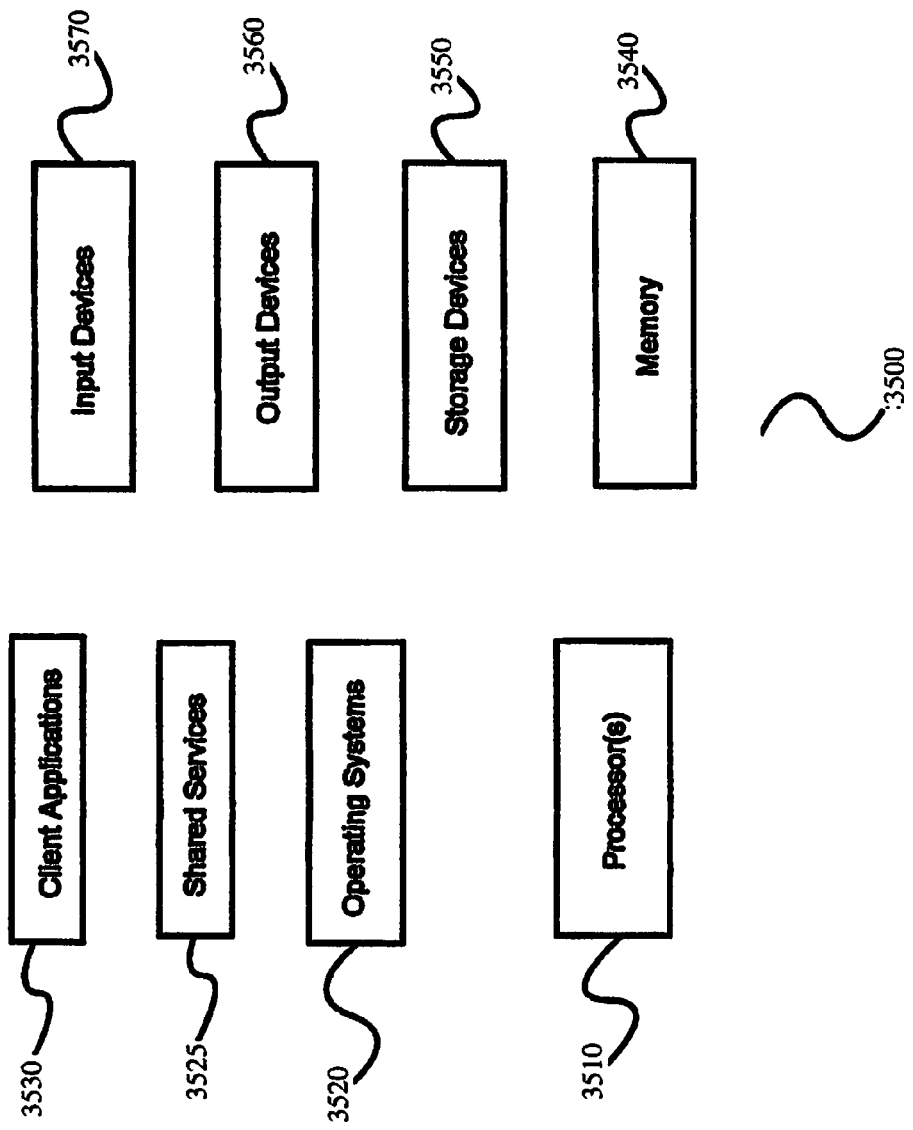

FIG. 35 is a block diagram illustrating an exemplary logical architecture for a client device, according to an embodiment of the invention.

Figure 36:
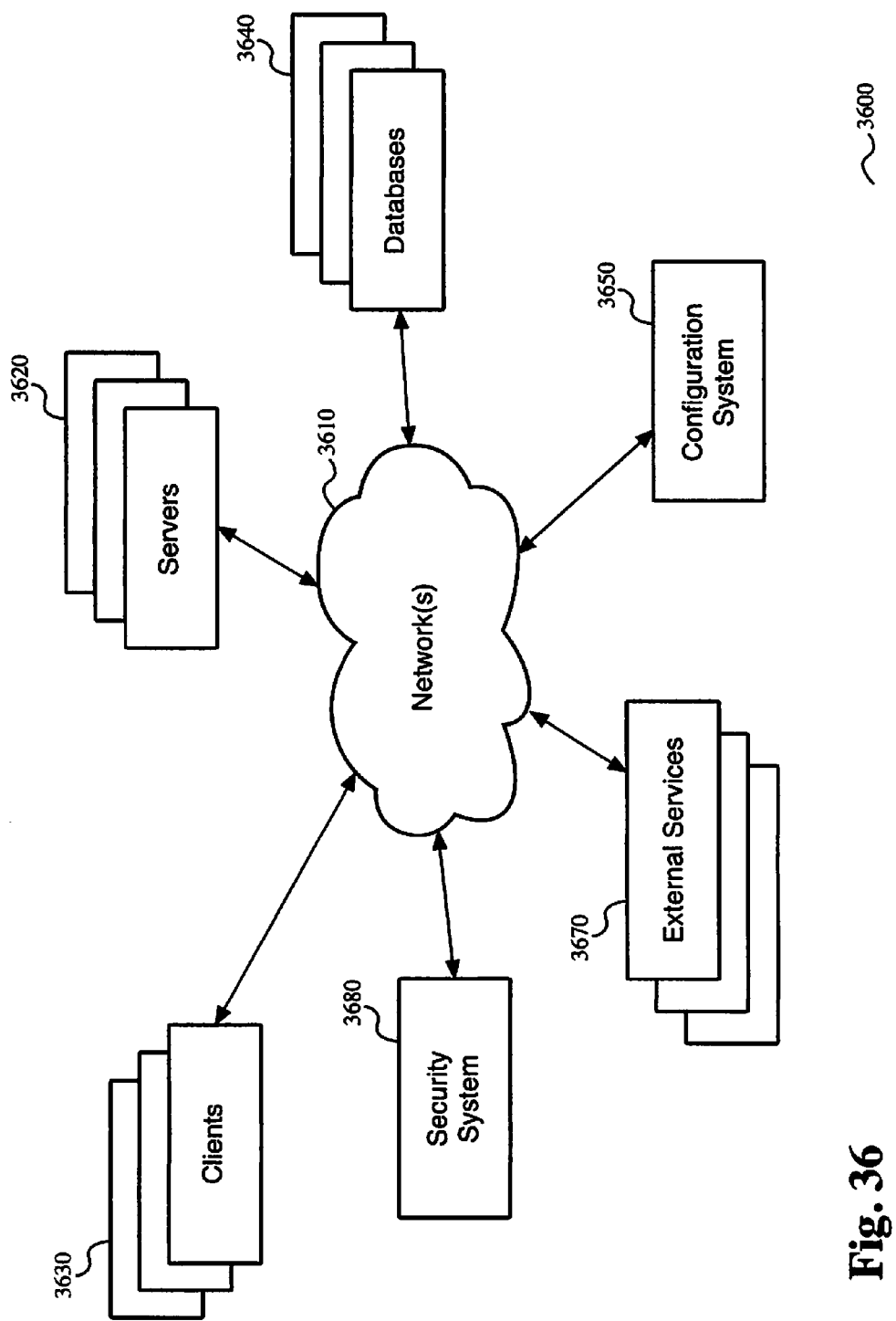

FIG. 36 is a block diagram showing an exemplary architectural arrangement of clients, servers, and external services, according to an embodiment of the invention.

Figure 37:
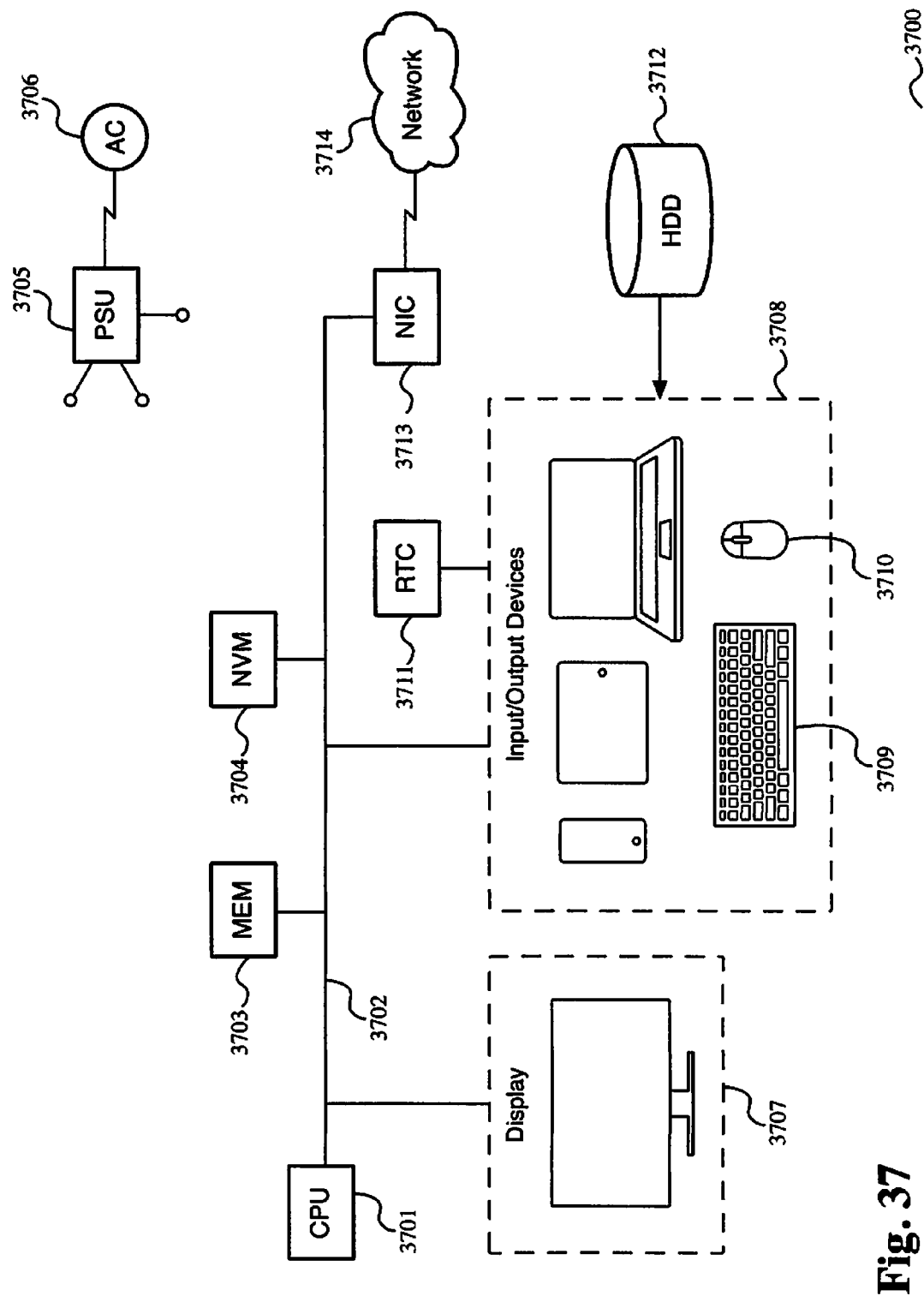

FIG. 37 is another block diagram illustrating an exemplary hardware architecture of a computing device used in various embodiments of the invention.

DETAILED DESCRIPTION

One or more different inventions may be described in the present application. Further, for one or more of the inventions described herein, numerous alternative embodiments may be described; it should be appreciated that these are presented for illustrative purposes only and are not limiting of the inventions contained herein or the claims presented herein in any way. One or more of the inventions may be widely applicable to numerous embodiments, as may be readily apparent from the disclosure. In general, embodiments are described in sufficient detail to enable those skilled in the art to practice one or more of the inventions, and it should be appreciated that other embodiments may be utilized and that structural, logical, software, electrical and other changes may be made without departing from the scope of the particular inventions. Accordingly, one skilled in the art will recognize that one or more of the inventions may be practiced with various modifications and alterations. Particular features of one or more of the inventions described herein may be described with reference to one or more particular embodiments or figures that form a part of the present disclosure, and in which are shown, by way of illustration, specific embodiments of one or more of the inventions. It should be appreciated, however, that such features are not limited to usage in the one or more particular embodiments or figures with reference to which they are described. The present disclosure is neither a literal description of all embodiments of one or more of the inventions nor a listing of features of one or more of the inventions that must be present in all embodiments.

Headings of sections provided in this patent application and the title of this patent application are for convenience only, and are not to be taken as limiting the disclosure in any way.

Devices that are in communication with each other need not be in continuous communication with each other, unless expressly specified otherwise. In addition, devices that are in communication with each other may communicate directly or indirectly through one or more communication means or intermediaries, logical or physical.

A description of an embodiment with several components in communication with each other does not imply that all such components are required. To the contrary, a variety of optional components may be described to illustrate a wide variety of possible embodiments of one or more of the inventions and in order to more fully illustrate one or more aspects of the inventions. Similarly, although process steps, method steps, algorithms or the like may be described in a sequential order, such processes, methods and algorithms may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the invention(s), and does not imply that the illustrated process is preferred. Also, steps are generally described once per embodiment, but this does not mean they must occur once, or that they may only occur once each time a process, method, or algorithm is carried out or executed. Some steps may be omitted in some embodiments or some occurrences, or some steps may be executed more than once in a given embodiment or occurrence.

When a single device or article is described herein, it will be readily apparent that more than one device or article may be used in place of a single device or article. Similarly, where more than one device or article is described herein, it will be readily apparent that a single device or article may be used in place of the more than one device or article.

The functionality or the features of a device may be alternatively embodied by one or more other devices that are not explicitly described as having such functionality or features. Thus, other embodiments of one or more of the inventions need not include the device itself.

Techniques and mechanisms described or referenced herein will sometimes be described in singular form for clarity. However, it should be appreciated that particular embodiments may include multiple iterations of a technique or multiple instantiations of a mechanism unless noted otherwise. Process descriptions or blocks in figures should be understood as representing modules, segments, or portions of code which include one or more executable instructions for implementing specific logical functions or steps in the process. Alternate implementations are included within the scope of embodiments of the present invention in which, for example, functions may be executed out of order from that shown or discussed, including substantially concurrently or in reverse order, depending on the functionality involved, as would be understood by those having ordinary skill in the art.

The inventors provide, in a preferred embodiment of the invention, a system for managing continuous-flow energy distribution networks that is particularly adapted for managing electric power demand and distributed generation capacity among a large number of consumers, such as residential, small and large commercial, institutional (that is, hospitals, schools, and the like), and industrial users. The system relies on an overlay packet data network comprised of energy information nodes, or iNodes, which overcomes the previously discussed limitations by overlaying a rich set of informational attributes on continuous energy flows such that consumers can use these information attributes and dimensions to make informed energy choices. A key advantage of the invention is that while a single physical network carries power from all sources, the available energy at any given node is priced and allocated separately as a finite resource based on data attributes of the system. These prices, when combined with user needs, can create lowest-cost deliver of energy services and energy benefits.

Furthermore the new system enables consumer preferences to be implemented through selection of energy sources by explicitly named sources, or brands, or by any of a large number of information attributes or dimensions. The system of the invention enables new consumer behaviors such as paying more for certain energy source types, or even avoiding purchase (embargoing) of certain energy types or suppliers (for example, some consumers may choose to undertake the difficult path to becoming a "no coal electrical household (or business)" by refusing to take any coal-based electricity, no matter the cost (or even the lack of availability of alternatives for some periods). In addition, information attributes create a large opportunity for commercial branding, advertising, search and market making, in addition to passing on regulatory compliance information to consumers.

For the purposes of describing the invention, two related terms are used herein. An "eNode" is a physical node in a continuous flow energy distribution system at which energy is stored or transformed (in the sense that generation and consumption of electricity are both energy transformations, since energy is never created nor destroyed). Examples of eNodes include switches and breakers, generators, motors, electric appliances, home power distribution panels, meters, central heating systems, lighting controls, and so forth. The continuous flow electrical distribution network can be thought of as a network of "pipes" or "channels" connecting a large number of eNodes; electricity flows through these channels (mostly these are wires of course) and is transformed, stored, controlled, and measured at various eNodes. While the examples described herein will be electrical network examples, the same descriptions could be made by reference to other continuous flow energy distribution networks, or the continuous flow portions of mixed energy distribution networks, without any loss of generality; the invention should be understood to have as its scope any continuous flow energy distribution systems and the focus on electricity should be understood as being exemplary and not limiting.

A key element of the invention is the use of an overlay packet data network comprised of "iNodes" and coupled to the continuous flow energy distribution network of eNodes that was just described. In general, iNodes are associated with (or coextensive with) corresponding eNodes, and have interfaces capable of bidirectional data exchange with other iNodes. For example, where a metering device is placed in a physical network (this is an example of an eNode), an iNode would be a data device adapted to receive readings from the metering device and to pass those readings on, via a packet data network, to other iNodes. Conceptually, the entire physical, continuous flow, energy distribution network may be overlaid by a packet-based data network of iNodes that communicate sensor readings, perform calculations related to the energy flows in the energy network, send control signals to actuating elements in the physical network (such as a signal to open a breaker, or to start a generator), and communicate information pertaining to the energy network to interested users (both human and automated).

Although modularity of iNodes it is not necessary according to the invention, most iNodes described herein are highly modular in nature so they can be easily connected peer-to-peer and in trees or hierarchies and inserted into networks at different levels. Modular design has as advantages the facilitation of scalability, flexibility, security, robustness, standardization, and suitability for progressive deployment.

The use of a network of iNodes makes it possible to collect detailed data about usage patterns from large numbers of energy users, including how these usage patterns vary during various time periods, including peak demand periods and periods when sources of renewable energy (such as wind or solar) are unavailable or are available in abundance. Additionally, detailed data on how each user reacts (either automatically or otherwise) to management signals sent during peak demand or other periods, is collected. For example, some users may significantly reduce demand when requested, and may do so promptly. Other users, conversely, may not react at all, or may react sporadically. The same variations in response may occur among operators of distributed generation or storage facilities. There are many reasons why reactions will vary, and even why reactions may significantly deviate from demand reductions that were explicitly volunteered by a user. For example, when a peak period arrives, a user who volunteered to participate in demand reduction might be on vacation, or out of their home for any reason, and so many of the loads that would be targeted may already be secured (turned off). Similarly, some user-owned distributed generation facilities may be able to react to management signals by changing the generation profile, while others (for instance, solar systems) may not be able to change in response to demand management signals (because they are dependent on the sun or another uncontrolled factor). Collecting data about the variability and uncertainty of these various human-machine systems that participate in the market enables more effective management of the overall system by providing more market intelligence to ensure better decision-making by all members of the complex electrical system.

According to an embodiment of the invention, this usage data is analyzed to create response profiles for each affected user. A response profile reflects an amount of load likely to be actually reduced (or generated) by a user, when requested. The profile may be quite complex, reflecting the varying predicted behaviors for a user on different days, at different times, during different seasons, and so forth. Response profiles can also be generated, according to the invention, on classes of users, large or small, who behave in similar ways; it is not necessary for each user to have an individual response profile. Furthermore, response profiles can be quite dynamic; for example, a response profile may express a conditional behavior such as "if there has been usage of at least X kwh in the two hours prior to the period of interest, then the user is likely at home and the expected response is Y; otherwise the expected response is Z". In the example given, Z would likely (but not necessarily) be less than Y, and would reflect the fact that both fewer loads are likely to be active (because the user is away, as inferred by lack of use in the earlier period) and that no user reaction to any demand reduction request is possible because the user is likely not at home. In other embodiments of the invention, users may have home automation systems implemented and could receive notification via email, SMS text message or other means while away from home, and thus be enabled to take actions to reduce load when needed; this capability would be reflected in the response profile for such users or classes of users.

In an embodiment of the invention, consumers and small businesses participate voluntarily in supply (generation and storage) or demand (consumption) management programs by establishing preferences. Preferences can take many forms. In some cases, users may state that certain loads are "off limits" or "critical", and can never be turned off remotely for any load conditions. Other loads may be given one or more attributes that can used to determine if the load is available in any given situation for remote deactivation. Attributes could include time of day, length of time since the load was turned on, length of time since the load was last remotely deactivated, level of criticality of the demand reduction effort, price to be paid for shedding the load ("don't take this load offline remotely unless I will be paid $1 for the sacrifice"), or even the communication required to confirm (for example, "this load can only be turned off if a message is sent to its automatic controller and the automatic controller states that it is safe to turn off the device"). Another user might express the preference that stored solar energy will be placed on the grid when the price is at a certain level, or when the level of criticality of the peak is sufficiently great. It will be appreciated that any number of consumer or small business preferences are possible for controlling when and whether one or more loads are made available for remote deactivation. Moreover, the same considerations that apply for deactivation can also be applied for activation in the case where generating capacity or storage capacity is available. Consumers and small businesses may have, in aggregate, substantial amounts of power in storage or ready to be generated on demand, if the management system was in place to request it and to manage it. Again, each user's supply-side resources (generation and storage capacity) can be made available according to preferences established by a user. Each response profile also reflects the geographic location of the user or class of users to whom it pertains. This information is important for determining which utility, and which particular grid locations (such as substations, tie lines, or regions) will be affected by the activation of the response profile, and to what extent.

In an embodiment of the invention, a number of response profiles are combined to create a response package. Because statistical behavior of users whose profiles are combined in the response package is known, and because a large number of profiles are normally combined into a package, it is possible according to the invention to estimate with good accuracy how much load reduction (or generation) each response package represents. For example, a response package made up of the collected response profiles of 10,000 consumers might be expected to yield 1.5 MWh (megawatt-hours) of load reduction during a particular 15-minute peak load period. Each time this response package is "invoked" (that is, each time a signal is sent to all the users represented by the response package), the actual demand change effected is measured, and used to refine the statistical model for each response profile and for the response package as a whole. In this way, according to the invention, the system for energy management continually adjusts to maintain highly accurate models of supply and demand changes in response to invocations of response packages (reductions through load shedding or additions through generation of power or release of power from storage). As with response profiles, each response package has a geographic element. For instance, it may represent elements (loads and generation/storage elements) spread across a particular utility's area of responsibility, or it may represent elements in a particular urban region.

In a preferred embodiment of the invention, response packages are made available for purchase by third parties. Purchasers could be utilities who desire to directly manage demand, or they could be aggregators who resell demand management to utilities at peak period. According to the invention, a given response package can be sold for any time period at any time in the future (or indeed for the current time period). Thus a response package for reducing load in San Francisco by 10 MWh for the 15-minute interval starting at noon on Friday, Mar. 31, 2010 could be sold at any time before 12:15 on that day. Because the package is sold, according to a preferred embodiment of the invention, on an open market, it is likely that the price would vary over time based on market participants' estimates of the likely demand for power at the critical time for this package (that is, at 12:00 on March $31^{st}$). In principle, the package can be sold more than once according to the invention, although in the end only one "owner" is able to actually elect to invoke the demand response action represented by the package. It should be noted that actual exercise of the demand response action represented by any given response package is necessary according to the invention; if load conditions are markedly different from what the final purchaser expected, that entity may elect not to incur additional costs (described below) by actually exercising the demand response action.

According to an embodiment of the invention, consumers make their preferences concerning their willingness to participate in on-demand energy management actions (that is, load reductions or provision of power from generators or storage systems) known in advance. Since consumers are unlikely to be willing to enter into long-term forward contracts for electric power actions that they may find quite unpalatable when a critical day arrives (for instance, if the weather is much warmer than expected, consumers may balk at letting their air conditioners be turned off), it is possible according to the invention for consumers to override their preferences at any time. Indeed this is one of the reasons that relying on consumers for demand response is so problematic, and why utilities seek to have remote control whenever possible (although this is rarely possible, and is even illegal in some jurisdictions because of regulatory requirements). In order to provide a level of control that consumers will want or require, and to provide a reasonable energy management capability to utilities, the combination of a number of consumers' (again, these can also be businesses) response profiles into response packages of sufficient size that they will be large enough to be useful and will have predictable statistical behavior, is carried out. According to a preferred embodiment, when a utility or other entity actually invokes a response package (for instance, by actually requesting the demand to be reduced by 10 MWh during the critical period), all of the end users that make up the response package are sent signals directing them to take the appropriate actions which they previously volunteered to take. While some will fail or refuse to do so, this has generally already been taken into account by building the response profiles and the response package to reflect the statistical patterns that this particular package of users has shown in the past, so according to the invention the actual demand response seen should closely approximate that specified as the "rating" of the response package (in the example above, the rating would be 10 MWh of demand reduction in the target time period).

Actual responses that occur when a response package is invoked are measured according to an embodiment of the invention. This measurement is used to refine statistical models used for response profiles, as described above. Also, according to an embodiment of the invention, an invoking entity (an entity which invoked a supply or demand response action associated with the response package) may optionally only be charged according to a supply or demand response that actually took place. For instance, while 10 MWh was forecasted and requested, if only 9.5 MWh was actually achieved, the price paid by an invoking entity would be reduced. Any reduction could be linear, so that in the example given the entity's actual price is reduced by 5%, or it could be set by any formula agreed in advance by the parties in the marketplace (for instance, the price difference could be set at 5% reduction for any shortfall from 0% to 5%, 10% for any shortfall above 5% but less than or equal to 10%, and so forth). It should be appreciated that any price adjustment schema can be used according to the invention, and that similar adjustments (or no adjustment) could be made if the response action exceeded what was requested (typically, one would expect that any overage would not be charged to an invoking entity, but this is not required according to the invention).

Figure 1:
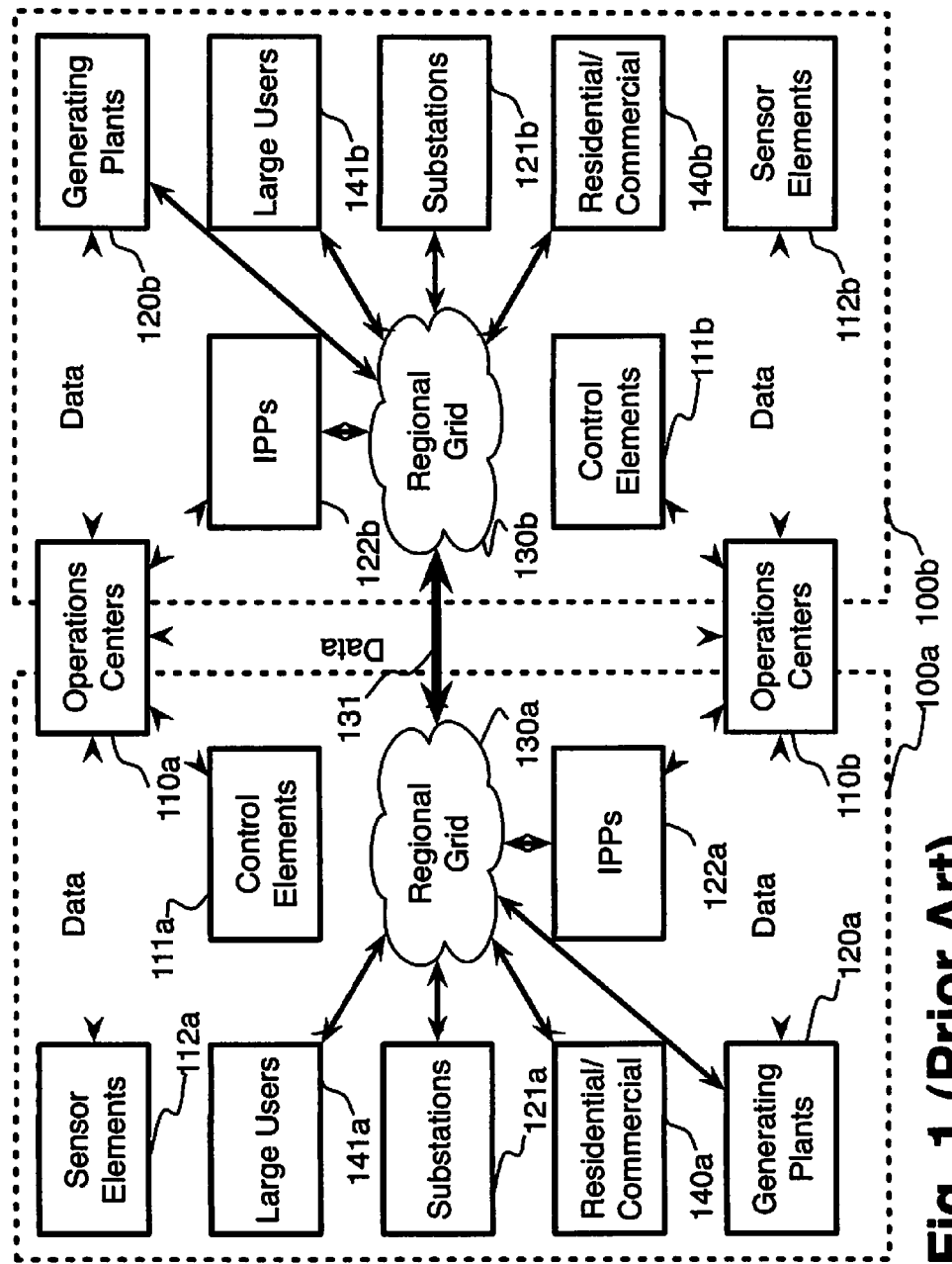
FIG. 1 (PRIOR ART) is a block diagram illustrating common elements of electric power distribution systems.

FIG. 1 illustrates many of the elements of continuous-flow electricity distribution networks as currently known in the art, and is provided to give some context to the embodiments illustrated in subsequent figures and described below. Electricity is generated in a large number of utility-owned generating plants 120 as well as many independent power producers 122 such as wind and solar farm operators, peaking load providers, and the like. The generated electricity is placed onto one or more regional distribution grids 130. Regional grids are often interconnected by high-voltage interconnects 131 so that electricity can flow relatively freely from where it is generated to where it is consumed. Power is delivered variously from regional grids via substations 121 (although substations 121 are not always used) to large users 141, residential and commercial users 140, and others. Grid operations are controlled from one or more operations centers 110, which rely on measurements from sensor elements 112 to measure grid operating parameters (such as voltage, frequency, phase, current, switch positions, device temperatures, and many others). Changes to grid operations, such as isolating faults, are carried out under control of operations centers 110 using one or more of a large number of control elements 111. In the art, and illustrated by dashed lines, operations centers are typically connected by specialized data links to control and sensor elements, and they also routinely share data between them. Several standard protocols, including SCADA and OASIS, are used for data communications between electric utilities, and within electric utilities to connect with devices. However, in the art there are no means established for data communications between utilities and most non-utility entities, with the exception of wholesale markets, independent power producers, and some large industrial and commercial energy users who have integrated to the utilities' communications protocols. Hence electrical distribution networks today are typified by very limited data connectivity, both in terms of device coverage (most electrical devices are not connected in any way) and in terms of participation by all potentially interested parties (the vast majority of entities that use electricity are completely disconnected from the grid in the sense of data, and have no visibility at all into real-time conditions, nor any ability to make meaningful decisions about their consumption of energy.

Figure 2:
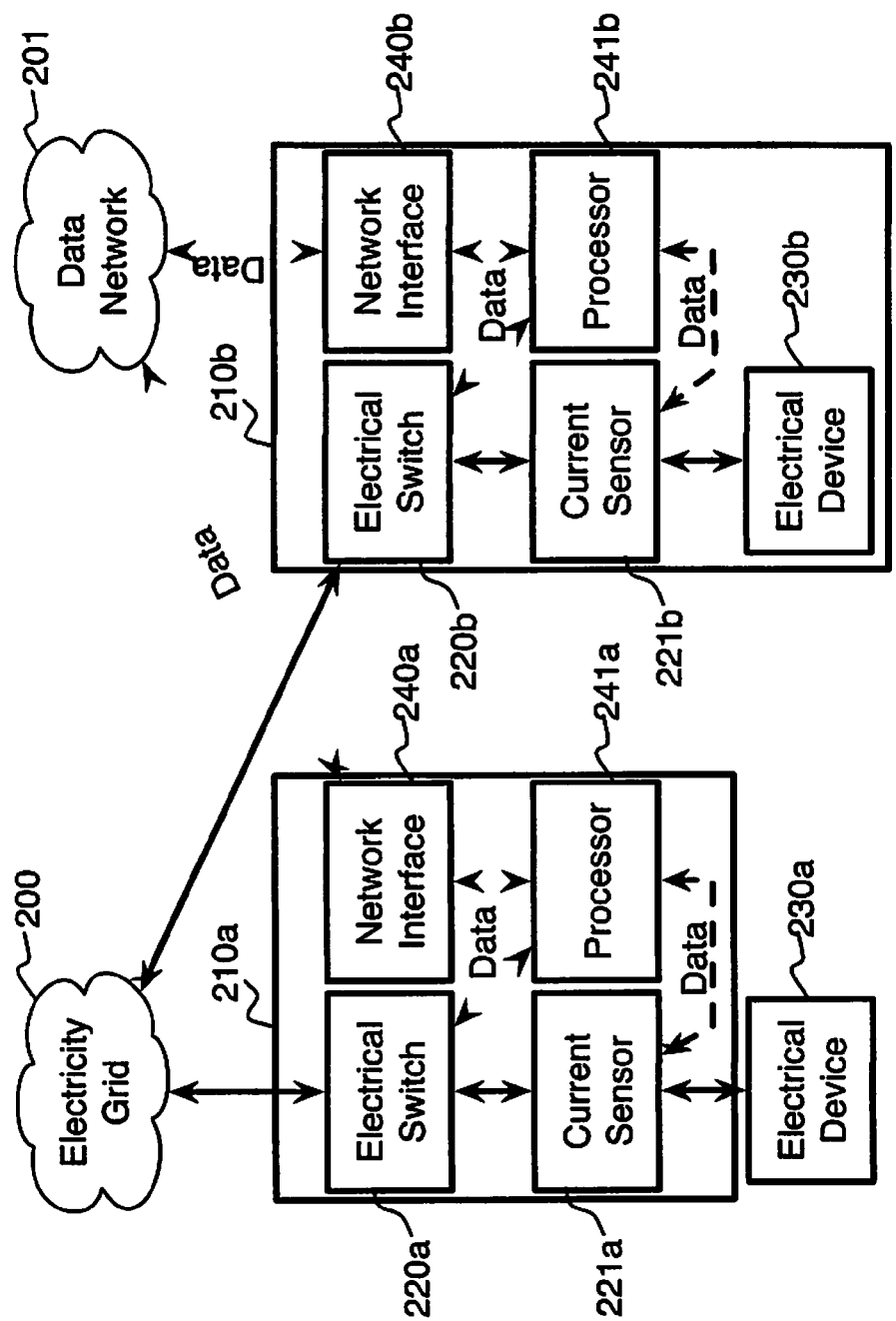
FIG. 2 is a block diagram of simple energy information nodes (or iNodes) according to an embodiment of the invention.

FIG. 2 illustrates two examples, according to a preferred embodiment of the invention, of device-level iNodes. iNodes 210a and 210b are each associated with a single electrical device 230a and 230b. Each electrical device is responsible for delivering a user need or energy service and benefit. Each electrical device is connected to the electricity grid 200 via an electrical switch 220 that interrupts flow when required, and optionally via a current sensor 221 which can measure real or reactive current (current sensors are well-known in the art). These components can optionally be provided, as shown in FIG. 2, as internal components of iNodes 210. In an embodiment of the invention, iNode 210a is a device which can plug in to a standard wall socket and pass electricity through electrical switch 220a and current sensor 221a to external electrical device 230a, which in some embodiments is plugged into female receptacles provided in the packaging of iNode 210a. It is not necessary that the iNode be configured for plugging in to wall sockets; in other embodiments iNode 210a is wired directly in to a facility's electric system. When hard-wired in to electrical power, iNode 210a may either also have hard-wired electrical connection out to electrical device 230a, or as before it may have standard electrical sockets for the connection of one or more electrical devices 230a. iNode 210b is an example of embodiments in which electrical device 230b is an integral part of an iNode; for example iNode 210b could be a smart appliance that is wired in the normal way to electrical grid 200 typically via household or building-level power distribution panels (not shown). iNode 210b essentially illustrates a smart device that is both an eNode and an iNode. In some embodiments, iNodes comprise only current sensor 221a or electrical switch 220a, rather than both. For example, an iNode might be designed to measure current through an eNode (electrical device 230) but not to interrupt power to it. For example if electrical device 230a is a generator with independent control circuitry, iNode 210a would be able to measure generated power from generator 230a and feed that data to data network 201.

According to preferred embodiments, iNodes comprise at least a processor 241 such as a standard microprocessor or a customized processor (both very common in the art), and a network interface 240, which is connected to data network 201. Processor 241 is adapted either to receive input readings from current sensor 221 or electrical switch 220 (or both), or to send output signals to electrical switch 220, or to do both. In addition, in other embodiments iNodes can comprise voltage sensors, temperature sensors, voltage regulators (to receive output from processor 241), or any other sensing or actuating devices known in the art. iNodes are defined by the interoperation of one or more electrical sensors or actuators with a processor 241*a* that can communicate with other processors 241*b* by passing data through network interface 240*a* across data network 201 to another network interface 240*b* associated with the other processor 241*b*. Various embodiments showing different arrangements of iNodes to accomplish different purposes will be illustrated and described with reference to FIGS. 3-12; in all of them, and all other embodiments of the invention, it should be understood that any arbitrary sensor or actuator elements can be used in any given iNode, but all iNodes have at least a processor 241, a network interface 240, and at least one means of sensing or controlling eNodes (electrical devices 230).

Data communications between iNodes in any given embodiment can be accomplished using any data communications protocol known in the art (or indeed any novel proprietary protocol); the invention does not rely on, nor require, any particular data communications protocol. Common protocols that may be implemented in network interfaces 240 include transmission control protocol (TCP), universal datagram protocol (UDP), hypertext transfer protocol (HTTP), Java remote procedure calls (RPC), simple object access protocol (SOAP), and the like.

Figure 3:
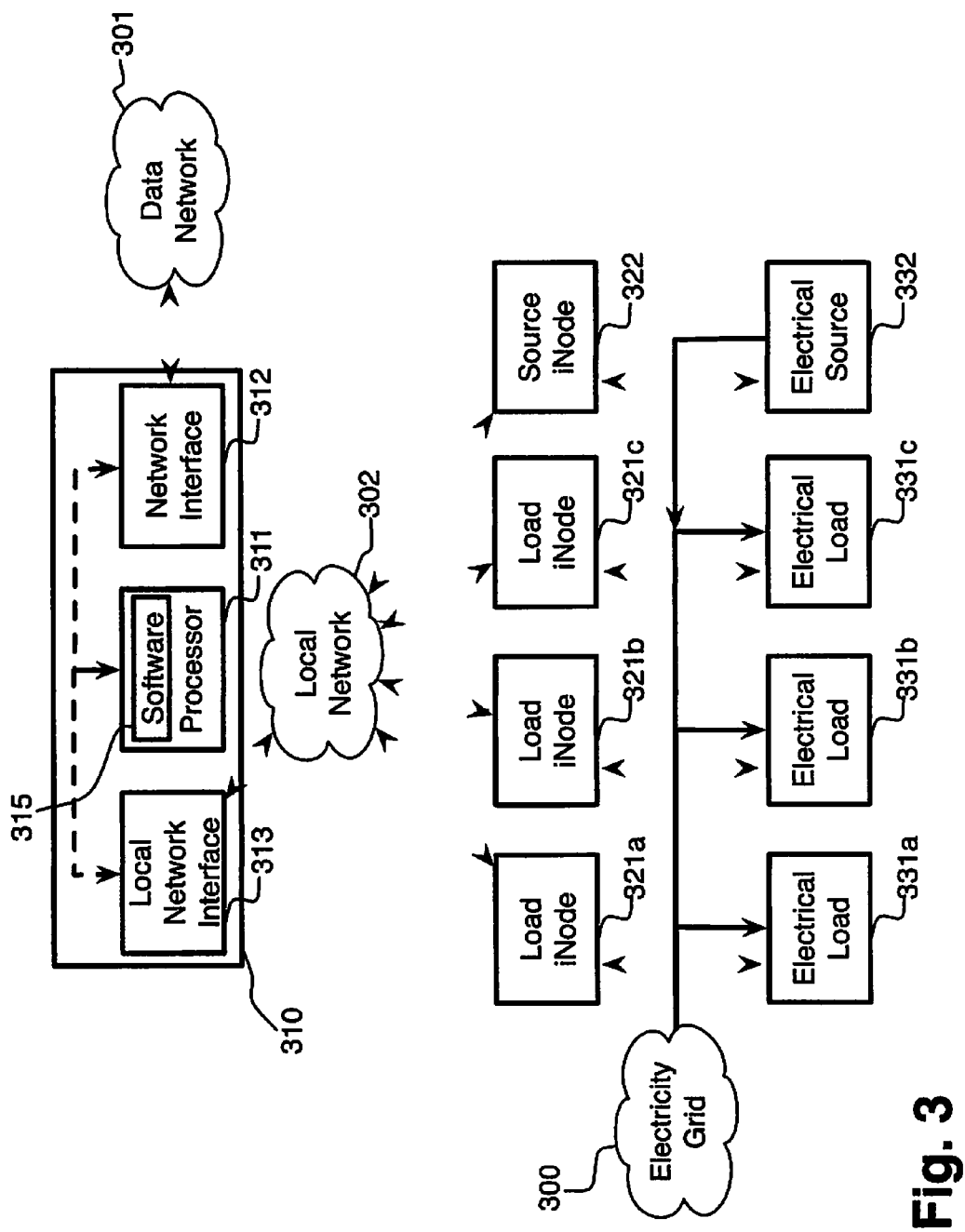
FIG. 3 is a block diagram of a home energy management network according to an embodiment of the invention.

FIG. 3 illustrates a typical home or small business energy management system, according to an embodiment of the invention. Electrical power is sent from electricity grid 300 to electrical loads 331, again usually through a power distribution panel and often via a electricity usage meter (both not shown for simplicity). Electrical loads 331 can include any electrical devices that consumer electric power, such as heat pumps and air conditioners, lights or common lighting circuits, hot tubs, computers, ovens, ranges, refrigerators and other kitchen appliances, and any number of other electrical devices common in the art. One or more electrical loads 331 are coupled with load iNodes 321, for example of the type shown in FIG. 2 as iNodes 210. It is not necessary that every load 331 in a given home or small business has a coupled iNode 321; in many cases only some loads will be monitored or controlled by an iNode. Also, load iNodes 321 may vary among themselves in terms of the degree of coupling with their respective loads 331. Some may measure current only, others may measure current and voltage, while yet others may measure those plus frequency. Some may in fact measure nothing at all, but serve only as controllers. Similarly, some iNodes 321 will have no ability to control or interrupt electric power to its respective electrical load 331, while others will be able to interrupt load, and yet others will be able to modify the characteristics of the electric power or control the operation of the electrical load 331. Also, some iNodes 321 may be coupled to a plurality of electrical loads 331, while others may (as shown) only couple to one. In some embodiments, one or more electrical sources 332 are also present in a home or small business. Some examples of electrical sources common in the art include solar panels or arrays, wind turbines, or small internal combustion generators. Electrical sources or generators feed power into the home power system and, if it generates more electricity than is used in the home, they can actually cause electricity to flow back to electricity grid 300. Source iNode 322 is an iNode similar to those iNodes 210 described above, and is adapted to sense the power being generated by electrical source 332. In some embodiments source iNode 322 is also adapted to control, particularly by starting and stopping but potentially also by regulating output, electrical source 332. The various iNodes (321 and 322) are connected via local network 302 to gateway iNode 310. Local network 302 is commonly a simple home data network such as is provided through use of a wireless router connected to or embedded in a broadband modem (such as a cable or DSL modem). In other cases, local network 302 is a small business LAN. In a preferred embodiment, local network 302 is a wireless communications network formed using a specialized protocol such as ZIGBEE™ that is designed for low-power wireless data communications. Such networks are useful because it allows load iNodes 321 and source iNodes 322 to be equipped with inexpensive and low-power wireless communications capability, and therefore greatly assists in facilitating easy installation of iNodes since in most homes and small buildings any wired data network is usually separate from electrical power wiring networks. Low power is important in these wireless applications because it allows low-cost transmitters that have long battery life. In other embodiments, local network 302 is of a data-over-power-lines design, several of which are known in the art (for example, Lonworks™). These are less common and often more expensive than wireless networks, but they have the advantage of requiring only one wiring system and of avoiding some of the problems with wireless coverage that are common in buildings (and which sometimes require the installation of a number of wireless repeaters that receive and retransmit wireless signals to aid in their propagation throughout buildings). In other embodiments, local network 302 may be identical with external data network 301, as when each source iNode 322 and load iNode 321 is directly connected either to the Internet or to a neighborhood or building-wide (as where the group of iNodes shown in FIG. 3 belongs to a tenant in a commercial building or an apartment building) wireless data network. Gateway iNode 310 is so called because it acts as a gateway between local iNodes such as source iNode 322 and load iNodes 321. In some cases it also acts as a network gateway as is illustrated in FIG. 3, acting to bridge the local network 302 and external data network 301 such as the Internet (in cases where local iNodes are directly connected to external data network 301, this network gateway function would not exist, and gateway iNode 310 is optional depending on the information flow desired according to each embodiment).

Gateway iNode 310, in an embodiment of the invention, comprises a processor 311 and a local network interface 313, as well as a network interface 312 for coupling to external data network 301. In configuration where local iNodes connect directly to external data network 301, gateway iNode may only have one network interface 312. Gateway iNodes 310 at a minimum have an operating system operating on, and a storage medium (not shown) coupled to, processor 311; in all figures showing processors in iNodes, it is intended to be understood that some form of local storage and an operating system are understood to be included in the processor element; these are not shown to avoid undue complexity but are considered to be inherent to the functioning of any processor.

In various embodiments of the invention, software 315 executes on processor 311 to carry out the key logical functions of gateway iNode 310 as part of an overlay packet data network overlaid across some set of elements (331 and 332 in the embodiment illustrated in FIG. 3) of the electricity distribution network of electricity grid 300 and its connected elements (that is, an electricity distribution network as referred to herein refers to networks comprising one or more of the elements of FIG. 1 coupled by one or more electricity grids 130 (or 300). For example, in some embodiments software 315 receives (via local network interface 313) updates from local load iNodes 321 and source iNodes 322 concerning their state; example of such updates include current, voltage, frequency, true and reactive power readings, as well as settings of control elements such as switches. Updates may be sent from local iNodes on a regular basis, for example every 15 seconds, or when a value changes by some specified minimum amount, for example when changed by more than 10% from average of last five readings, or when polled by software 315. Software 315 in some embodiments sends control signals to control elements associated with local iNodes. For example, in response to a signal received from data network 301, software 315 could automatically shed some or most electrical loads under its control (that is, controlled by actuators or control elements in turn controlled by one of its child load iNodes 321a-c) by sending signals to the appropriate load iNodes instructing them to interrupt current to one or more of their controlled loads. Similarly, software 315 could, in response to a signal from data network 301 or at a scheduled time (determined from a schedule stored in its associated data storage), send a signal to source iNode 322 instructing it to start or to stop generating electricity, or to change the amount being produced. In these embodiments, gateway iNode 310 becomes a key element of a system that enables dispatched electricity supply or demand management, as it is adapted to be connected via data network 301 to one or more dispatchers, to process received signals in order to determine precisely what is to be done locally, and to carry out the requested actions by sending control signals to one or more child iNodes associated with it (generally in the same household, or tenant); it is also adapted for being a data collection element of a larger system by managing the collection of operating data from all of its child iNodes, processing that data as by aggregating it, and passing the data "upstream" via data network 301 to other system elements that may for example aggregate data from a large number of gateways 315.

Figure 4:
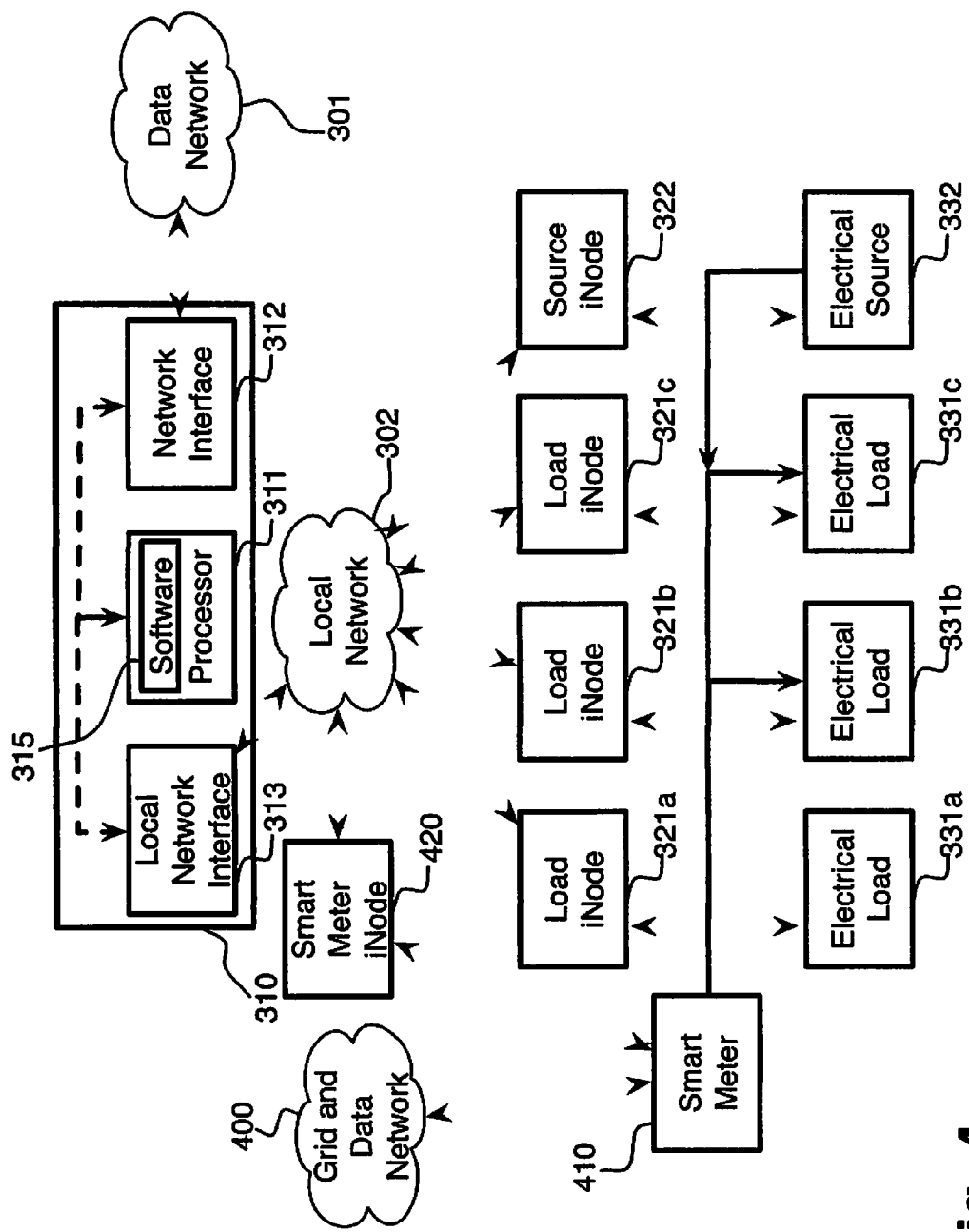
FIG. 4 is a block diagram of a home energy network with an integrated smart meter according to an embodiment of the invention.

In another embodiment of the invention, and referring to FIG. 4, an energy management network for a home or small business similar to that of FIG. 3 is illustrated, with the addition of smart meter 410. Generally, all users of electricity who draw at least some of their power from electric grid 400 are provided (by the utility) with a meter for measuring the amount of energy used at a particular location. In the past, and still today in a large proportion of locations, meters are read by human meter readers on a monthly or semi-monthly basis. This presents obvious cost implications for utilities, which must pay those readers, and has led to many innovative approaches (including having consumers read their own meters with periodic unannounced audits by an external, utility-pair meter reader). Recently, a wave of introductions of automated meter reading (AMR) systems has been seen. These have quickly been succeeded by a more useful innovation, the smart meter 410, and its accompanying advanced metering infrastructure (AMI). While one of the goals of utilities in automating meter reading has been to reduce and eventually eliminate the need for human meter readers, another potentially much more lucrative motivation has been the possibility of obtaining meter readings on a frequent basis instead of only once per month. If meters are read, for example, every fifteen minutes, then utilities are able to measure how much energy is used by each ratepayer (consumer, whether commercial, residential, institutional, or industrial) during peak usage periods. This is an essential precondition to the very desirable (from the utilities' point of view) shift to variable pricing schemes. In a variable pricing scheme, the price of a unit of electricity (typically measured in kilowatthours, or kwh) is varied based on demand. During peak periods, the cost of generating electricity is commonly much higher, as expensive (and often independently operated by for-profit IPPs) peaking power plants must be utilized for a portion of the overall load; by contrast, during low-demand period most power is generated by very low-cost sources such as large coal plants and hydroelectric plants. Smart meters make all this possible, partly by being connected to the operations centers of utilities by a data network associated with the grid (shown together as grid and data network 400). In most cases, smart meters are designed to enable integration of home automation systems via local network 302. For example, small businesses or homes with wireless automation systems for managing lighting, HVAC (heating, ventilation, and air conditioning) systems, and the like are able to integrate these systems with smart meters. Often this is done to enable consumers to participate in optional (or even mandatory) demand response programs in which utilities are allowed to turn off, automatically, certain loads to reduce demand during peak periods (typically providing a discount to consumers willing to enter into such arrangements as an inducement to do so).

In an embodiment of the invention, smart meter 410 is integrated with a home energy management network according to the invention through smart meter iNode 420. Smart meter iNodes act in effect as a gateway to the smart meter and to the utility beyond. As such, it will typically have an internal architecture similar to that of gateway iNode 315, although this is not necessary as in some cases smart meter 410 can be integrated directly with local network 302, as when a ZIGBEE™-compliant smart meter is used with a ZIGBEE™ home energy management network. In some embodiments, smart meter iNode acts as a load iNode, passing meter readings to gateway iNode 315. Gateway iNode 315 is able, with the benefit of meter-level usage data (which provides data about total usage in the home or business), to calculate (in software 315 operating on processor 311) the amount of load that is not monitored or controlled by load iNodes 321 by subtracting from the total the total load that is monitored by load iNodes 321. Analogously, if source iNode 322 is measuring a non-zero amount of generated power, the total unmonitored load can be calculated by subtracting from the smart meter reading the total of load iNode readings and adding in all source iNode readings. This capability is useful because it allows unmonitored loads to be accounted for, and in some cases users could be prompted to secure (stop) unmonitored loads in a demand reduction scenario, in effect adding a manual load reduction capability that can be mediated by gateway iNode 315. There are any number of uses to which a system comprising an integrated smart meter 410, gateway iNode 310, and a variety of load and source iNodes 321 and 322 can be put, according to various embodiments of the invention. For example, if a utility sends a demand response signal directing the user corresponding to smart meter 410 to reduce a certain amount of load immediately, this reduction can be managed by gateway iNode 310. Gateway iNode 310 could carry out the requested demand reduction in a variety of ways. It could direct one or more load iNodes 331 to interrupt their power (that is, to turn off their loads), to provide some of the required reduction. It could direct source iNode 322 to actuate its control of electrical source 332 in order to start the generator or to increase the amount of electricity it generates. It could even coordinate, over data network 301, with other gateway iNodes to request that they shed some of the load cooperatively (of course, issues of verifiability will arise in such a scenario, and particularly of verifiability of non-duplication: the same load reduction should not be counted twice).

Figure 5:
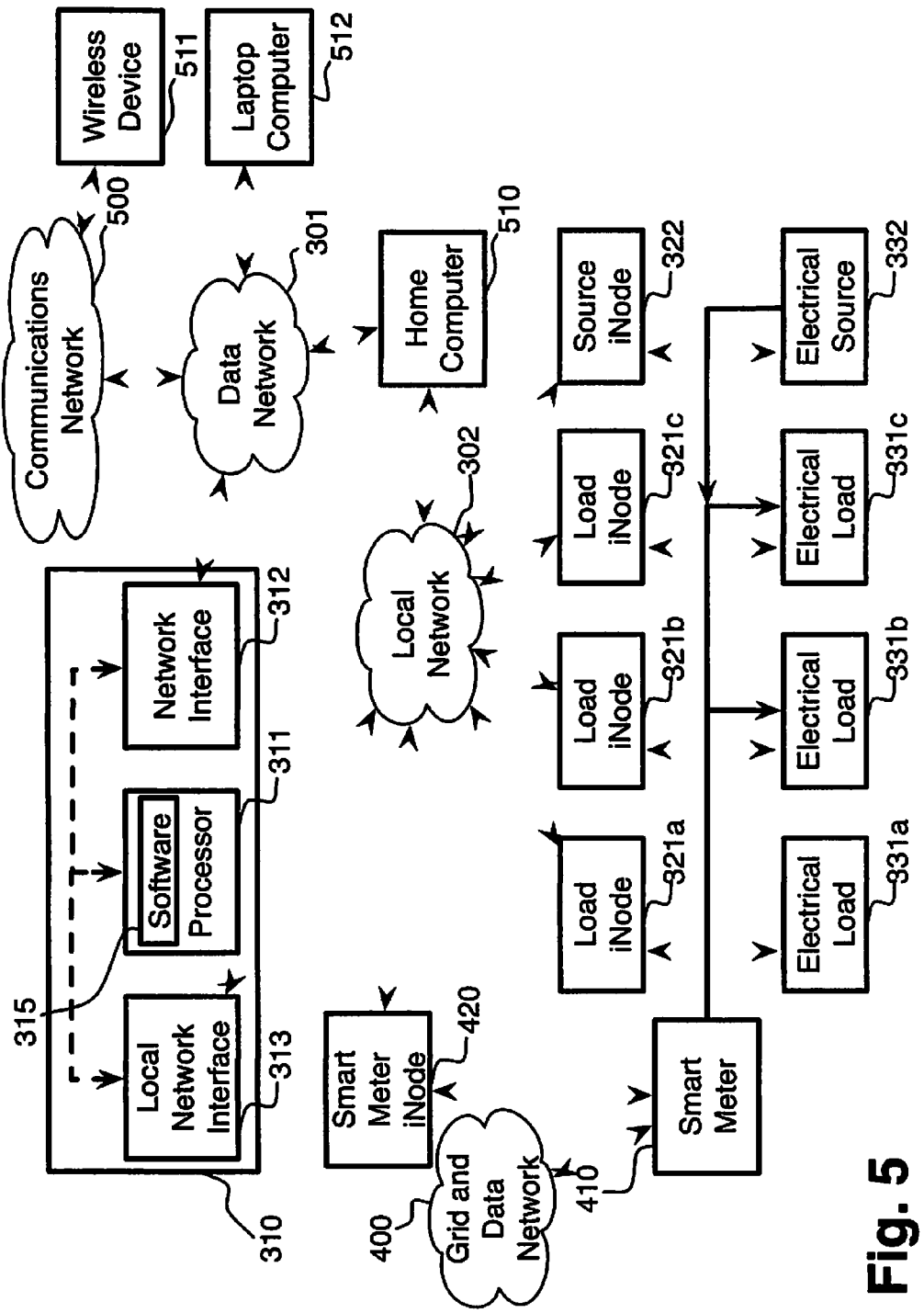
FIG. 5 is a block diagram of various means for users to interact with home energy networks according to the invention.

FIG. 5 illustrates several (although by no means all) of the ways in which human users can interact with home or small business energy management networks according to embodiments of the invention. In a preferred embodiment of the invention, a user accesses information, establishes preferences, and takes actions concerning energy management using home computer 510. Home computer 510 may be a desktop personal computer, a laptop, a "netbook" (a small portable computer with wireless data networking built in and limited capabilities), or any other general purpose computer. Home computer 510 may be connected separately to local network 302 and to external data network 301 (for instance, the Internet), or it may be connected to both through a broadband router, as is common in the art (that is, with this common configuration, home computer 510 can access other computing devices including possibly various iNodes via local network 302 and remote data sources via external data network 301 using a single network interface card that is connected to a broadband router. In some embodiments, gateway iNode 310 may connect to home computer 510 only via the Internet (often through the use of a remote website operated by another entity for the purpose of allowing homeowners and small business operators to manage their energy management networks. This approach would be common where, for example, local network 302 is a specialized wireless network based on a standard such as 802.15 or ZIGBEE™; desktop computers are typically not equipped to interface with such networks. In other embodiments, users may interact with their home energy management networks from remote locations using laptop or handheld computers 512 and communicating over external data network 301 (for example, the Internet); in other embodiments, users may interact using mobile devices connected over communications network 500 (typically a wireless network with data capabilities, as are common in the art today). Wireless device 511 could be a laptop computer equipped with a cellular modem (or wireless broadband access card), a mobile phone (especially, but not necessarily, a smart phone such as an iPhone™ from Apple, a Blackberry phone, or a phone based on Google's Android operating system), or a handheld computer equipped with wireless connectivity. Interaction using any of the devices shown in FIG. 5, or any comparable devices known in the art capable of acting as communicating data processing devices, may be accomplished using web browsers (when a third party service or a gateway iNode 310 provides web-based access services), or a dedicated software application that is adapted to interface using appropriate protocols with gateway iNode 310 or a third party service that mediates access to gateway iNode 310.

Figure 6:
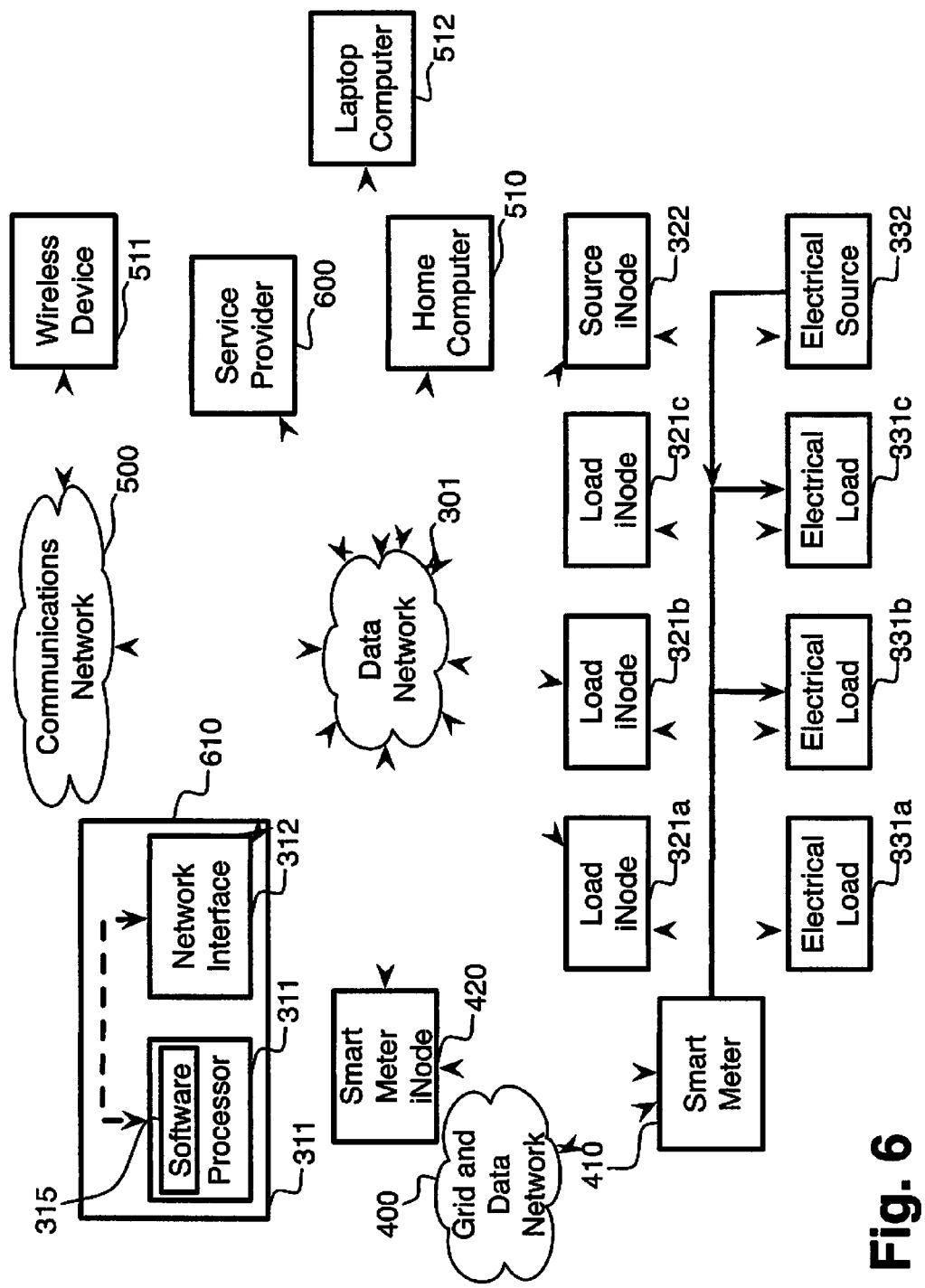
FIG. 6 is a block diagram of an embodiment of the invention in which device-level iNodes are directly connected to the Internet.

According to an embodiment of the invention, and illustrated in FIG. 6, iNodes are connected directly to external data network 301 rather than being connected through gateway iNode 610. Accordingly, gateway iNode 610 is only required in this embodiment to have one network gateway (although obviously a gateway iNode 310 with two network interfaces could be used, with one of the interfaces merely remaining idle). Also, although not shown separately, in another embodiment a mixed approach is taken: some iNodes connect to the external network 301 via a gateway iNode 310 with two network interfaces, while others connect directly to external data network 301 as shown in FIG. 6. While load iNodes 321, smart meter iNode 420, and source iNodes 322 could be hard-wired to connect only to gateway iNode 610 over external data network 301, in some embodiments local iNodes would connect to a service provider 600 over external data network 301, and identify themselves, for instance by each iNodes' providing a unique serial number to service provider when first connecting. The system disclosed in FIG. 6, like all embodiments of the invention described herein, is not limited to use in a particular type of venue such as homes or small businesses; the use of homes and small businesses is exemplary and not limiting. For example, load iNodes 321 could be a large number of dispersed electrical loads possibly under the economic control of a large number of entities. For instance, laptop charging stations in public places could be deployed by the owners or operators of the various public places, and made accessible to third party users such as travelers or coffee shop visitors via service provider 600. In some embodiments, patrons wishing to recharge laptops would connect via data network 301 to service provider 600 and make a small payment (or a donation to a charity), and service provider 600 would then send a signal to enable a corresponding electrical device 331 (i.e., outlet) allowing the patron to recharge. In another embodiment, such patrons could identify themselves and their utility provider and account number, and any electricity usage in (for example) electrical load 331a would be measured by iNode 321a and passed to service provider 600, who could then pass the data on to an appropriate utility provider for billing (possibly collecting a percentage fee which may then possibly be shared with the owner or manager of the location at which the charging patron is located). This example should make clear that there are many economic scenarios enabled, envisioned and encompassed by the invention, and it is reiterated that these examples should not be considered as limiting the scope of the invention.

Figure 7:
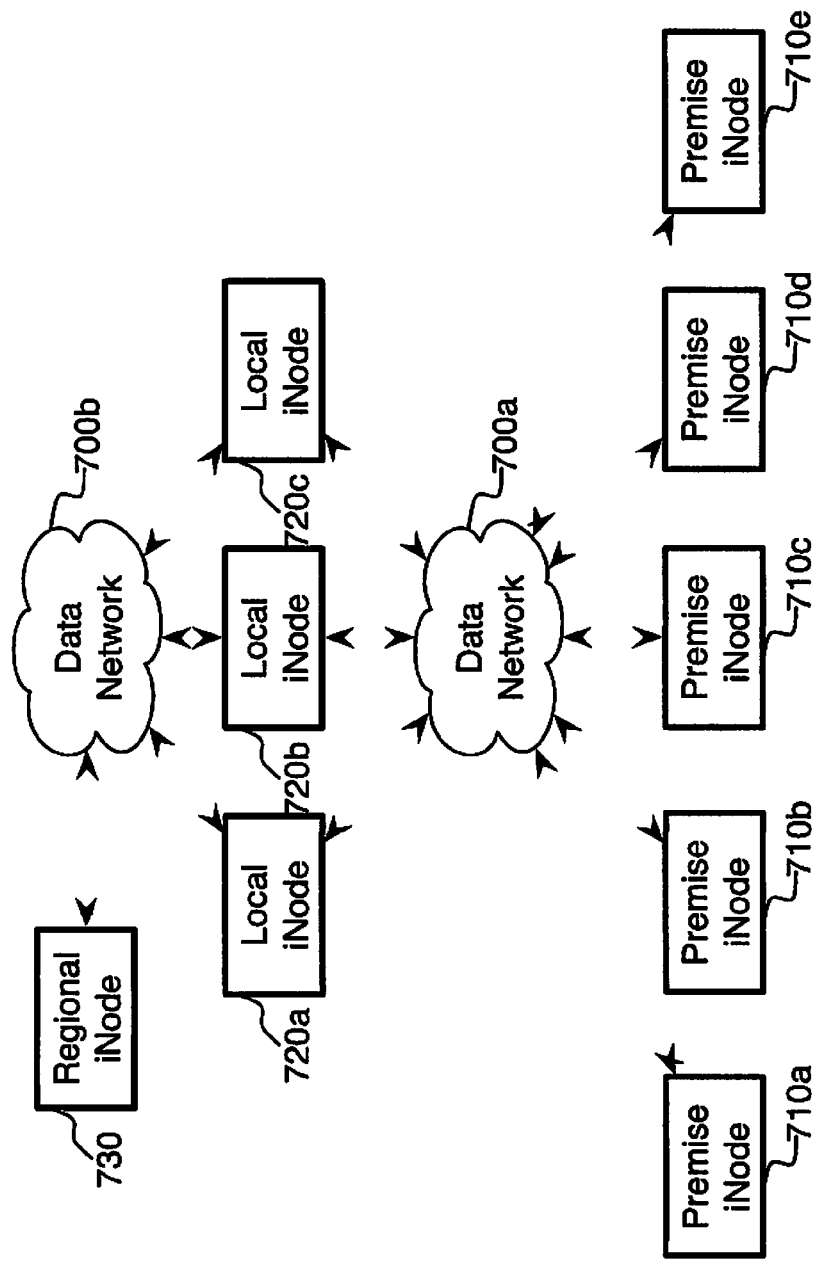
FIG. 7 is a block diagram of an embodiment of the invention in which home iNodes are connected to local iNodes such as neighborhood energy management systems.

In a preferred embodiment of the invention, illustrated in FIG. 7, a hierarchical arrangement of iNodes is illustrated. A plurality of premise iNodes 710 is connected to one or more local iNodes 720 via data network 700a. Optionally, a plurality of local iNodes 720 is connected to one or more regional iNodes 730 via data network 700b. Many permutations and combinations are possible. Premise iNodes commonly, in embodiments of the invention, have child iNodes corresponding to particular electrical loads, sources, and so forth. As an example, premise iNode 710a may be a gateway iNode of a home energy management network of a type such as those illustrated in FIGS. 3-6. It could be a gateway iNode for a tenant in a commercial office building. It could be a gateway iNode for a single building in a college campus or a high school. It could be an isolated source iNode for a diesel generator normally used as an emergency power supply for a large retail establishment but configured to start on demand under control of a local utility during extreme demand periods. Similarly, local iNodes 720 could be of many types and could have many purposes, without departing from the scope of the invention. For example, a local iNode 720b could be a neighborhood cooperative energy management system's central node, receiving inputs from a utility (regional iNode 730 in this example) concerning desired demand levels, and from a plurality of home gateway iNodes 710. The neighborhood energy management system could coordinate among the participating neighborhood residents' premise iNodes 710 to, for example, coordinate the starting of heat pumps and air conditioning compressors during periods of high heat load (which are usually also periods of high electricity demand), in order to ensure that no two compressors or heat pumps start within a specified time of each other (heat pumps, compressors, and the like have high starting currents, and when many attempt to turn on nearly simultaneously, large load spikes can be experienced that can destabilize grid operations). Neighborhood management systems could also coordinate to ensure that the overall energy usage of a particular neighborhood does not exceed some specified limit (coordination is carried out by sending signals to premise iNodes 710 and in effect operating the premise iNodes and the local iNode as a distributed software system for optimizing energy usage profiles of the neighborhood as a whole). In another embodiment, one or more of premise iNodes 710 is a distributed storage system operated as a common asset of a local iNode and its child iNodes; for instance, a neighborhood may invest in distributed battery storage systems, and possibly also in several generating devices, and these may be operated under control of local iNode 720b to manage overall load as viewed by regional iNode 730. Additionally, in such an arrangement, when prices are high due to high demand, local iNode 720b could direct generators and storage systems to deliver power to the members of the local community to avoid their having to pay the higher prices; storage could be "topped off" later when prices drop back to their normal, lower levels. This type of power management would actually be a boon to utilities as well as to their customers, as it is often quite expensive for them to deliver power during peak periods, and many of the ratepayers remain on fixed, regulated tariffs that are much lower than peak prices. In some embodiments, data networks 700a and 700b are identical (often the Internet serves both functions, but other single networks could also do so). It should be appreciated from these examples that the overlay packet data network approach of the present invention allows a wide range of deployment architectures, of which the examples given are a subset. For instance, there could be many layers of hierarchy, and a given premise iNode 710 could be logically connected to, and communicate with, and possibly even be controlled by, more than one local iNode 720, and a local iNode 720 could be connected to, communicate with, and possibly even be controlled by, more than one regional iNode 730. Or, in another embodiment, several distinct layers beyond the three layers shown in FIG. 7 are possible. And, in yet other embodiments, a given iNode may participate as a local iNode 720 with respect to certain applications or subnets, as a premise iNode 710 in other applications or subnets; that is, a given iNode could function at different hierarchical levels for different purposes. Moreover, in highly interconnected scenarios, it may be more useful to think of iNodes as being arranged in a web. And, since iNodes are generally associated with corresponding eNodes or physical elements of the underlying continuous flow energy distribution network (on top of which the overlay packet data network is overlaid), the architecture of large scale distribution of iNodes according to some embodiments of the present invention will often come to resemble the hub-and-spoke-with-hierarchical-subnets arrangement of typical large-scale electrical distribution systems.

Figure 8:
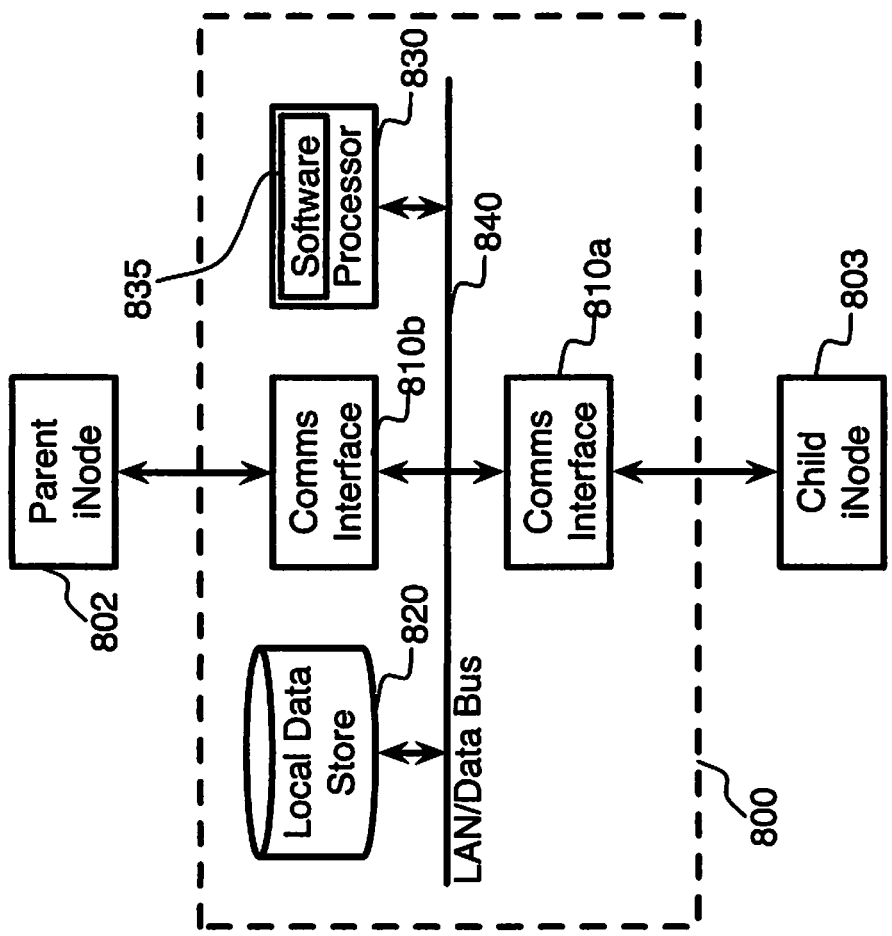
FIG. 8 is a block diagram of a local iNode according to an embodiment of the invention.

FIG. 8 shows an exemplary architecture, according to an embodiment of the invention, for intermediate iNodes 800 (intermediate in that they have both child iNodes 803 and parent iNodes 802, as for example the local iNodes 720 in FIG. 7). Like gateway iNodes 315, intermediate iNode 800 is equipped with one or more communications interfaces 810, depending on whether it needs to connect with more than one network. In some architectures, intermediate iNode 800 is connected to parent iNode 802 and child iNode 803 by the same data network 700. As with all iNodes, intermediate iNode 800 also comprises a processor 830 executing software 835. In some embodiments, intermediate iNode 800 also comprises a standalone local data store 820, above and beyond such basic storage as is generally associated with processor 830, and which is in many cases a relational database, but need not be. In many embodiments, since intermediate iNode 800 may be managing loads and sources (and data) from a large number of child iNodes 803, the functions of local data store 820, communications interfaces 810, and processor 830 may execute on physically separate machines connected by an internal data bus or local area network (LAN) 840. In some embodiments, local data store 820 is used to store configuration data for child iNodes 803 and intermediate iNode 800, such that, on startup, intermediate iNode 800 reads appropriate configuration data from local data store 820 and sets internal operating parameters accordingly. Additionally, intermediate iNode 800 may gather network addresses of child iNodes 803 and parent iNodes 802 with which it is associated on startup, and in some embodiments, upon gathering these address locations, intermediate iNode 800 initiates data communications with one or more of the child iNodes 803 and parent iNodes 802 whose addresses were obtained. Local data store 820 may also store transactional data concerning transactions such as demand response requests received from parent iNodes 802, demand response requests sent to child iNodes 803, or in another embodiment the identities of iNodes that bought generated power from a child source iNode 803. Since large numbers of intermediate iNodes of considerable computational power may be deployed in arbitrary network topologies including structures that can be described mathematically as highly-connected graphs, an overlay packet data network consisting of many low-level iNodes 803 associated with physical eNodes or energy resources and a rich set of intermediate and high-level iNodes 800, can be expected to be highly scalable, robust against incidental or maliciously-induced failures of any set of devices, and capable of computations of considerable complexity, such as the optimal routing of electricity throughout a nation-sized grid with many separate participating entities.

Figure 9:
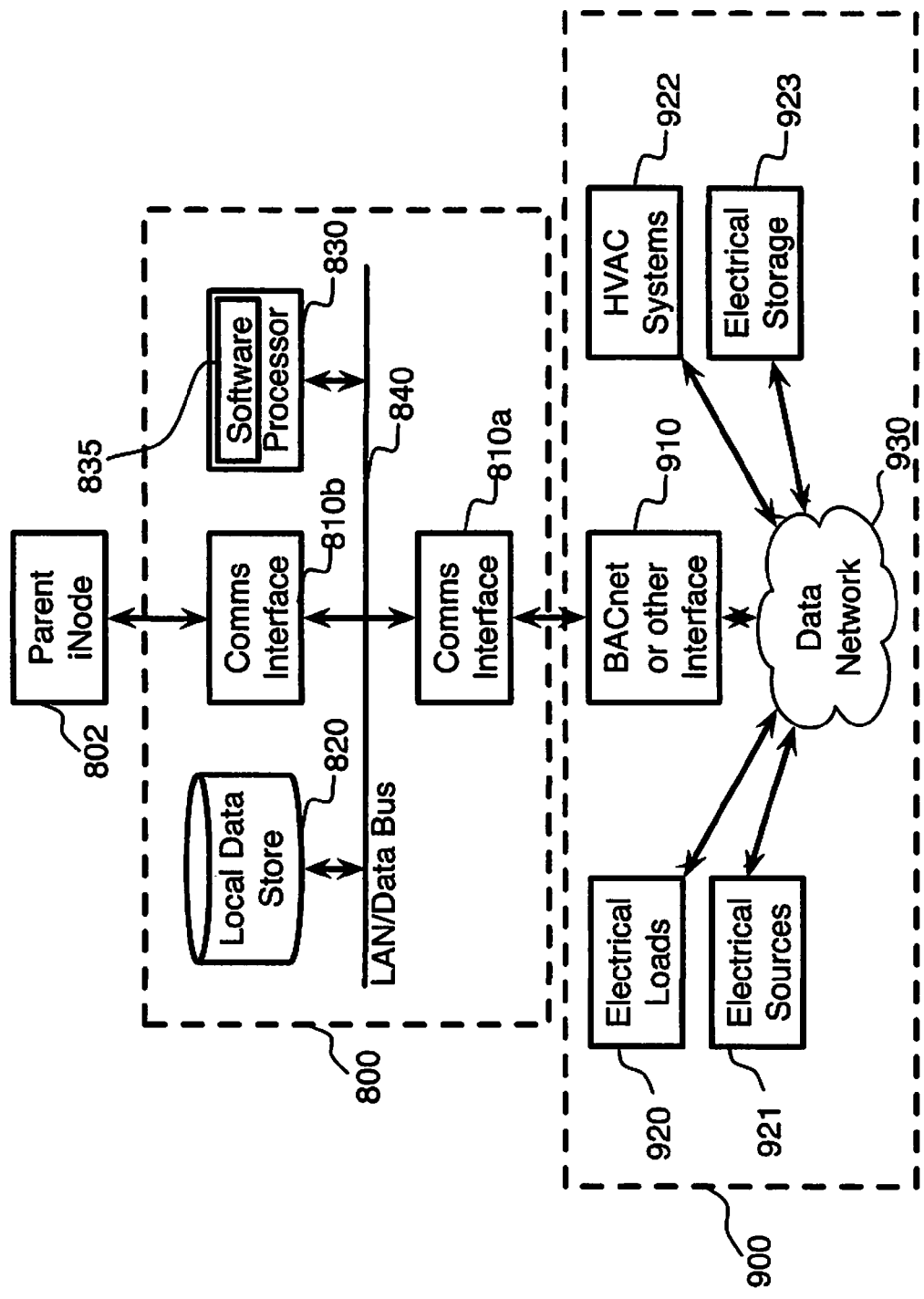
FIG. 9 is a block diagram of a commercial building energy management system with an iNode according to an embodiment of the invention.

FIG. 9 illustrates another embodiment of the invention according to which a commercial building automation and energy management system 900 is integrated via an intermediate iNode 800. Many large commercial, institutional and industrial facilities already have quite sophisticated building automation and energy management systems 900 in the art. Commonly, these systems monitor, measure, and control HVAC systems 922, electrical storage devices 923 such as large-scale batteries, electrical sources 921 such as solar arrays or emergency generators, and of course myriad electrical loads 920. In many cases, building automation and energy management systems communicate internally, and make themselves accessible to external systems, by communications interfaces 910 using one of several standard data exchange protocols such as BACnet. There are several such protocols, including Lonworks and proprietary interfaces for particular control equipment manufacturers. In one sense, one may think of these large-scale systems as very large, complex electrical devices or eNodes 230, which have attributes common to electrical loads, sources and storage systems. Accordingly, under a preferred embodiment of the invention, an intermediate iNode 800 is closely coupled to a building energy management system 900 through communications between BACnet interface 910 and communications interface 810a, which is adapted to be able to pass BACnet messages to and from BACnet interface 910. Of course, Lonworks or other proprietary or open data exchange protocols used by building automation and energy management systems 900 can also be used instead of BACnet without departing from the scope of the invention.

Figure 10:
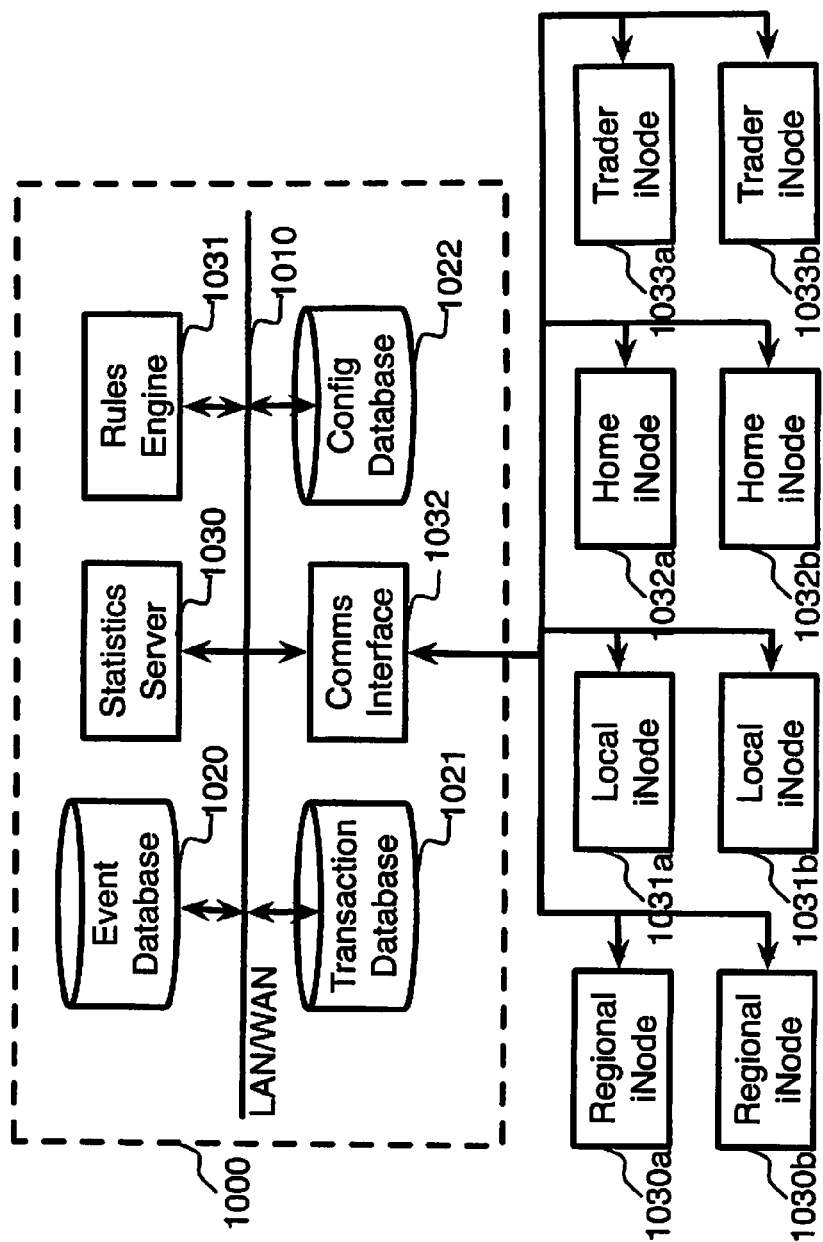
FIG. 10 is a block diagram of a digital energy exchange according to an embodiment of the invention.

FIG. 10 illustrates a digital exchange 1000 according to an embodiment of the invention. A communications interface 1032 is adapted to communicate with a plurality of regional iNodes 1030, local iNodes 1031, home iNodes 1032, and trader iNodes 1033. Communications interface 1032 is adapted to provide one or more interface means for connection to remote iNodes. Interface means may support various standards such as HTTP, SOAP, RPC, XML, SCADA, VXML, and the like, or may be implemented in a proprietary way; the scope of the invention should not be taken as limited to any particular means of communication between the digital exchange 1000 and end users and their energy resources. Digital exchange 1000 may be implemented on a single server or other computing device, or its functions may be dispersed among several servers or computing devices as desired. The various modules of the digital exchange shown in FIG. 10 communicate with each other via a network 1010, which can be a local area network (LAN), a wide area network (WAN), the Internet, or any other network capable of providing for communication between the various elements of a digital exchange 1000.

A configuration database 1022 stores information pertaining to the configuration of the components of a digital exchange 1000, as well as information pertaining to users who have registered with the digital exchange 1000. When new users connect with a digital exchange via communications interface 1032 from a user interface via a remote iNode (1030, 1031, 1032, or 1033), they are guided through a registration process. Details of this process will vary in accordance with the invention, but will typically include at least the collection of identifying information concerning the user and information to enable the communications interface 1032 to connect to a remote iNode associated with the user, as appropriate. According to an embodiment of the invention, when a user provides information enabling a communications interface 1032 to find and connect to an associated remote iNode, the communications interface 1032 queries the remote iNode to obtain a list of devices or energy resources monitored and addressable by remote iNode. For instance, a home iNode 1032a may return a list of several loads and one or more generators or storage devices. Optionally, a user may view the list of associated devices or energy resources and provide detailed information about one or more of the devices or energy resources. For example, a user might start with a list of monitored outlets and appliances that was obtained by communications interface 1032 from home iNode 1032a, and manually provide the information that outlet #7 has a Dell Inspiron computer connected to it, outlet #8 has a 17-inch monitor connected to it, appliance #1 is a Kenmore washer of a specific model, and so forth. The list of "acquired" devices or energy resources, and all associated amplifying information concerning those devices or energy resources, are stored in configuration database 1022. According to an embodiment of the invention, configuration database 1022 is also populated with a set of data about the standard energy usage profiles of known brands and models of electric devices. For example, information may be stored in configuration database 1022 concerning the power consumption of various models of Kenmore washers and driers, as well as additional detailed information such as the various duty cycles and their associated power consumption profiles (the consumption of power by a washer, for instance, will vary dramatically at different stages of its various duty cycles). Information concerning precautions to be observed when considering deactivating particular devices is also optionally stored in configuration database 1022; for instance, it may be unsafe for a washer to turn it off during a spin cycle, whereas it might be perfectly safe to turn it off during a fill cycle.

According to a preferred embodiment of the invention, user preferences are stored in configuration database 1022. While interacting with digital exchange 1000, users are given options to express preferences for how their energy resources may (or may not) be used by a digital exchange 1000 to build response profiles and response packages or to execute energy management actions that involve the user's energy resources. As discussed above, preferences can be quite wide-ranging according to the invention, and may include mandatory preferences (preferences that a digital exchange is not allowed to violate, such as "never turn off my television on outlet #14"), or optional preferences with conditions (for example, "if the price is more than X degrees, and my hot water temperature is at least Y, and it is between 8:00 am and 4:00 pm local time, you can turn off my hot water heater for as long as needed or until the temperature drops to Z degrees"), or highly permissive preferences ("you can do whatever you want to this load, whenever you want").

According to a preferred embodiment of the invention, events are stored in event database 1020. According to the invention, a very wide range of events may be stored in event database 1020. For example, each packet of data concerning the state of a device or energy resource can be considered an event and stored in event database 1020. To illustrate, consider a washing machine that is monitored and controlled by a home iNode 1032b in the home of a user of a digital exchange 1000. When the washing machine turns on, an event is generated to record that the device activated at a specific time. If the home iNode 1032b is configured to pass frequent power readings for the device, then a series of events of the form "device N was consuming X kilowatts at time T" is passed by home iNode 1032b via communications interface 1032 and stored in event database 1020. Similarly, if a response package is activated, and event is generated; if a particular response action is requested, an event is generated, and if the requested action is taken, another event is generated; all of these exemplary events are stored in event database 1020. It is desirable, according to the invention, to capture events at as granular a level as is possible for any given configuration (for example, as in the case of home iNode 1032b described above, it may only be possible to have information at the level of detail of a home, whereas in the case of another home iNode 1032a discussed above, device-level granularity is possible). According to the invention, configuration changes may also constitute events and be stored in event database 1020, enabling an audit trail to be maintained (that is, configuration database 1022 stores the current configuration but event database 1020 will have a complete record of changes to configuration database 1022). Extraneous events, which are events not directly recorded by remote iNodes, or other sources within the digital exchange infrastructure, may be entered manually or automatically into the event database 1020. For instance, if a third party provides weather forecast information or actual weather information (for example, "it is snowing in Wichita at time 1:00 pm"), this information can be stored in event database 1020. This is useful according to the invention because it may be possible to correlate changes in aggregate load across many connected users (connected to the communications interface 1320) with weather phenomena in a very detailed way.

It should be appreciated that exemplary forms of event or other data that may be recorded or collected for storage may vary, and may comprise any potentially-available data that may be useful in utilization optimizations. For example, to focus on comfort-driven optimization (that is, to optimize utilization for user comfort, rather than for example optimizing with the ultimate intention of lowering costs or increasing efficiency), a variety of time-based data, weather information, energy generation data, sensor data values, or metadata pertaining to such information or optimization in general, may be collected or utilized according to the embodiment. In this manner, a variety of optimization operations may become possible according to the nature and quantity of data being recorded, and the recorded data may be varied in the pursuit of a particular optimization or according to a particular arrangement. It should therefore be appreciated that a wide variety of data, effectively any data available within or provided by an iNode or eNode system, may be utilized according to the embodiment and any limitations or constraints described herein are merely mentioned as exemplary details according to specific arrangements, embodiments, or use case scenarios.

According to a preferred embodiment of the invention, transaction database 1021 stores information pertaining to partial, pending, completed, and closed transactions. According to the invention, partial transactions may include transactions to which only one party is committed at a given point in time; for instance, an offer to sell the right to invoke a particular response package at a particular time in the future, or a request to obtain a specified level of demand reduction at a specified time in the future, when neither the offer nor the request has been taken up by a second party. Pending transactions according to the invention include situations where two parties are committed to a transaction but the underlying energy actions have not yet been consummated; for instance, if a utility has purchased the rights to invoke a response package at a specified time but either that time has not yet arrived or, if it has arrived, the utility has chosen to not execute the response package yet. Completed transactions are transactions for which the underlying energy resource actions have been taken. Closed transactions are transactions for which all settlement actions, such as verifying actual energy response actions taken, by user, allocating funds among various users who participated, and satisfying all financial aspects of the transaction for all parties involved, have been completed.

It should be appreciated by those practiced in the art that the various databases described herein are for illustrative purposes only. The functions of all of them can be included in a single database system, or the functions could be distributed over a larger number of database systems than outlined herein, without departing from the spirit and the scope of the invention. For example, a configuration database 1022 could contain only configuration information pertaining to physical things such as locations of remote iNodes, and consumer preference information could be stored in a separate preferences database, without departing from the scope of the invention. What is relevant to the invention is the set of information stored and the uses to which it is put, rather than precisely how it is stored; the field of database management is very advanced and those having practice in that art will appreciate that there are many considerations having nothing to do with the instant invention that may dictate one or another particular architectural approach to database storage.

According to an embodiment of the invention, statistics server 1030 calculates a plurality of statistics based on data take from or derived from one or more of a configuration database 1022, a transaction database 1021, and an event database 1020. Statistics can be calculated on request from clients of the statistics server 1030 such as a rules engine 1031 or remote iNodes provided via communications interface 1032. Statistics can also be calculated according to a prearranged schedule which may be stored in a configuration database 1022; alternatively statistics may be calculated periodically by statistics server 1030 and pushed to clients or applications which may then choose to use the passed statistics or not. According to an embodiment of the invention, statistics server 1030 is used to characterize an expected response profile of a plurality of end users of a digital exchange 1000, which response profile may be for a particular period of time or for any period of time; optionally time-specific and time-independent response profiles for a plurality of end users may both be calculated. According to another embodiment of the invention, statistics server 1030 is used to characterize expected response from a response package built up from a plurality of end user response profiles, which expected response may be for a particular period of time or for any period of time; optionally time-specific and time-independent response forecasts for a plurality of response packages may both be calculated. Statistics can be stored in a separate database such as an event database 1020, or they may be delivered in real time to a requesting client or application such as a rules engine 1031.

According to various embodiments of the invention, statistics server 1030 calculates statistics based on a wide variety of available input data. For example, statistics server 1030 can calculate the expected load reduction to be delivered by a single end user or a collection of end users on receipt of a request for a reduction in load. This may be calculated based on any available data from event database 1020, transaction database 1021, configuration database 1022, or any other data source accessible to statistics server 1030 (for instance, weather data passed directly in to statistics server from a third party via communications interface 1320). Data elements which may be used to calculate response profiles may include, but are not limited to, past history of responses to similar response requests at the same or different times and on the same or different days. Response profiles can be calculated based on a type of load to be reduced; for example, if a user has volunteered to make several resistive loads such as water heaters and resistive space heaters available for reduction on demand, expected response may be calculated by estimating the probability that said loads are actually active at the time of a request, based on previous history of the activation times for said loads. Alternatively, said resistive loads might always be on, yet an end user might occasionally override response actions locally, and statistics server 1030 may estimate likely load reduction by estimating the probability that an end user will override a demand reduction signal based on previous override history. In both of these examples, and indeed in any statistical calculation made by statistics server 1030, previous history data can be for the user concerning whom a statistics is being calculated, or it can optionally be historical data from a plurality of users who are judged by statistics server 1030 to have similar characteristics. This allows, for instance, a new user to be incorporated readily into the system and methods of the invention by allowing historical data for already-active users with similar characteristics to be used to estimate the expected behaviors of said new user. In an embodiment of the invention, demand management may be achieved by altering duty cycles of appropriate loads rather than merely turning them off; for example, setpoints of an advanced thermostat could be adjusted by one or more degrees in order to reduce the aggregate HVAC load controlled by the thermostat, or a hot water heater could be allowed to stay offline until water temperature drops to some predefined temperature, at which point the heater would turn on. In these cases, the preferences are stored in a configuration database 1022, and statistics server 1030 calculates expected response by, for example, deriving a response function, expressed as a function of time (where time can be defined in various ways, such as the time since the last duty cycle started, the time since a critical parameter was last reached, or the time from the response request's transmission to the device; this list is not exhaustive and should not be taken as limiting the scope of the invention), which characterizes the typical response for the device. Then, a calculation of the likely response can be made using this function and included in a response profile. Note also that whenever information about a device type, such as a particular type or model of washer, dryer, thermostat, or any other device, is contained in a configuration database, information from either the manufacturer of a device or an aggregated history from many such devices used by various participants in digital exchange 1000, can be used in lieu of actual usage information from any particular user if desired. In this way, response profiles can be built up with high accuracy for even very new users (or for users who do not have equipment that enables current or power measurements per device, as upon listing various devices a response profile can be built using typical response profiles for each device the user lists).

In another embodiment of the invention, expected response profiles can be based at least in part on information that is either real time in nature or nearly so. For example, when information about current status of equipment (on or off, and potentially at which point in a duty cycle) can be gathered, it can be used to modify a response profile by taking into account the fact that loads which are already off cannot be turned off to save power. Similarly, scheduled loads, when known to statistics server 1030 (by being stored in configuration database 1022), can be leveraged by taking into account the fact that a given load is scheduled to turn on in a period of interest, and overriding the schedule to keep it off, thus achieving a predictable load reduction for the period of interest.

In another embodiment of the invention, users can be assigned an "energy risk rating" analogous to a credit rating. Statistics server 1030 calculates energy risk ratings by taking into account past user history, particularly concerning the degree to which a user honors his commitments. For example, if a user volunteers (by establishing preferences that are stored in configuration database 1022) to allow 3 kilowatts of load to be controlled by digital exchange 1000 during periods of demand response (or by volunteering to provide generated power of 3 kilowatts from a home wind turbine), and then fails to actually deliver according to what was volunteered (either because devices were off and therefore not available for load shedding, or wind was not available, or any other reason), then statistics server 1030 decrements the energy risk rating for said user. As with credit scores, time can be a key parameter in adjusting energy risk ratings; after a series of failed commitments, it takes some time before the energy risk rating will rise back up following a change to actually honoring commitments.

It should be appreciated that the examples of statistical data generation provided heretofore are exemplary in nature and do not limit the scope of the invention. Essentially any statistics that can be calculated based on data available about users, their loads and available energy resources, their behaviors (for instance, one might be able to infer that a user is at home based on dynamic behavior of power usage, and use this to predict how responses might differ from those of a user away from home; in fact, preferences can be stated according to away or at home profiles, which can be inferred or directly declared as is done with home security systems when a user clicks "Away" to tell the system he is leaving the house), the consistency of their responses, their demographics, and so forth.

According to a preferred embodiment of the invention, rules engine 1031 or an equivalent software module capable (equivalent in the sense that it meets the functional description provided herein, which is often done using a standards-based rules engine, but need not be so limited) receives events or notifications from one or more of the other components of the invention and executes any rules linked to said events or notifications. Events could be received from a third party via communications interface 1032 (as when a user elects to invoke a response package that he has purchased through digital exchange 1000), or from statistics server 1030 (as when a statistic exceeds some configured threshold), or from one of the databases (as when a data element is added or changed). Events can also occur, and fire rules, based on calendars; for instance, a daily event might fire which causes a new set of response packages, for times during the day that is one week or one month in the future, to be created and stored in configuration database 1022 (and made available for purchase on digital exchange 1000 via communications interface 1320). When an event is received, an event handler in rules engine 1031 evaluates whether any rules are configured to be fired when an event of the type received occurs. If so, rules are executed in an order stipulated, as is commonly done with rules engines. Rules can generally invoke other rules, so an event's firing may cause a cascade of rules to "fire" or execute; rule invocation and execution continues until no further rules are remaining to be fired. Rules are stored alternatively either in the rules engine 1031 itself, or in configuration database 1022. In an embodiment of the invention, rules are established for the management of response packages, so that when a user changes or adds configuration data relating to loads or energy resources that can be controlled by digital exchange 1000, a rule is fired which causes the user's response profile to be recalculated and the revised response profile to be stored in configuration database 1022. Typically, whenever a response profile is added or changed, a rule will fire which either recalculates the expected statistical behavior of any response packages of which the changed user's response profile is an element, or determines if the newly added or changed response profile should be added to an existing or a new response package. Inclusion of a response profile in a response package may be based on a number of factors, including but not limited to the geographic location of the facility (home or small business) associated with the new user (for instance, if all users within a given substation's service area are to be included in a single response package), the demographics of the user (for instance, if a response package comprised of "affluent greens" is maintained, and a new user matching that profile is added), or the type of generation equipment available at the new user's facility (for instance, if all wind power generators are bundled into a plurality of wind-based response packages). In this latter case, in an embodiment of the invention the wind profiles of the geographic locations of various users who together comprise a response package can be combined by statistics server 1030 into a composite wind generation response package profile that can then be used to announce to prospective buyers the availability of specified amounts of wind power at specified times. In some cases, there may be an insufficient number of response profiles in a given region, or of a given type, to make a reasonably sized (and reasonably well-behaved, which typically is a consequence of having a statistically significant mix of response profiles in a single response package) response package; in these cases, when a new user or set of resources (associated with an existing user) is added that is in the same region or has the same type, a rule is triggered which checks to see if there are now enough users, or enough load (or generating capacity) to create a new response package. If the answer is yes, then a new response package is created, and a request is sent to statistics server 1030 to calculate the expected responses of the new response package. When the results are returned from the statistics server 1030, they are stored in configuration database 1022 and any rules for making the response package available via communications interface 1320 are invoked. In this fashion (and through the use of scheduled events as discussed above), an inventory of available response packages is made available to potential buyers on digital exchange 1000.

Another example of rules which are triggered by events according to the invention is when a demand for service is placed at the digital exchange 1000. In an embodiment of the invention, when a consumer's preference, stored in configuration database 1022, states that a given load should only be operated when power of a certain type is available (for instance, "don't run my dishwasher except using wind power"), and the consumer desires to operate the given load, then a request is placed to the digital exchange 1000 for a package of wind power of sufficient quantity to provide for the given load. The placement of such a request constitutes an event which is stored at event database 1020 and passed to rules engine 1031 to determine if any rules are fired by the event. In this case, a rule would be fired which determines if there is any wind power available in sufficient quantity to provide for the given load. If not, a message is sent via communication interface 1320 to the appropriate remote iNode to so inform the user. If there is a single source of wind suitable for the given load, then the capacity of a response package associated with the source is decremented for the relevant time interval (it could be the current time interval or a future time interval, for example when the given load is to be operated according to a schedule at a future time) by an amount equal to the expected demand from the given load. If there is more than one suitable source available for the given load, then the rule that was invoked will either resolve the situation itself if it is so designed, or it will invoke a further rule to select from among a plurality of sources the one that is most appropriate. Selection of sources can be made according to any criteria, including but not limited to price, proximity to the requesting user, energy risk rating of the various response packages, or a fairness routine that spreads equally priced demand among a plurality of sources of supply.

It should be appreciated that the examples of rules provided in the above are exemplary only and should not be taken to limit the scope of the invention. Rules engine 1031 is the module that responds to events and that in effect creates an efficient market for energy based on aggregated response packages, which are in turn based on the detailed statistical behaviors of a plurality of individual users, loads and energy resources.

Figure 11:
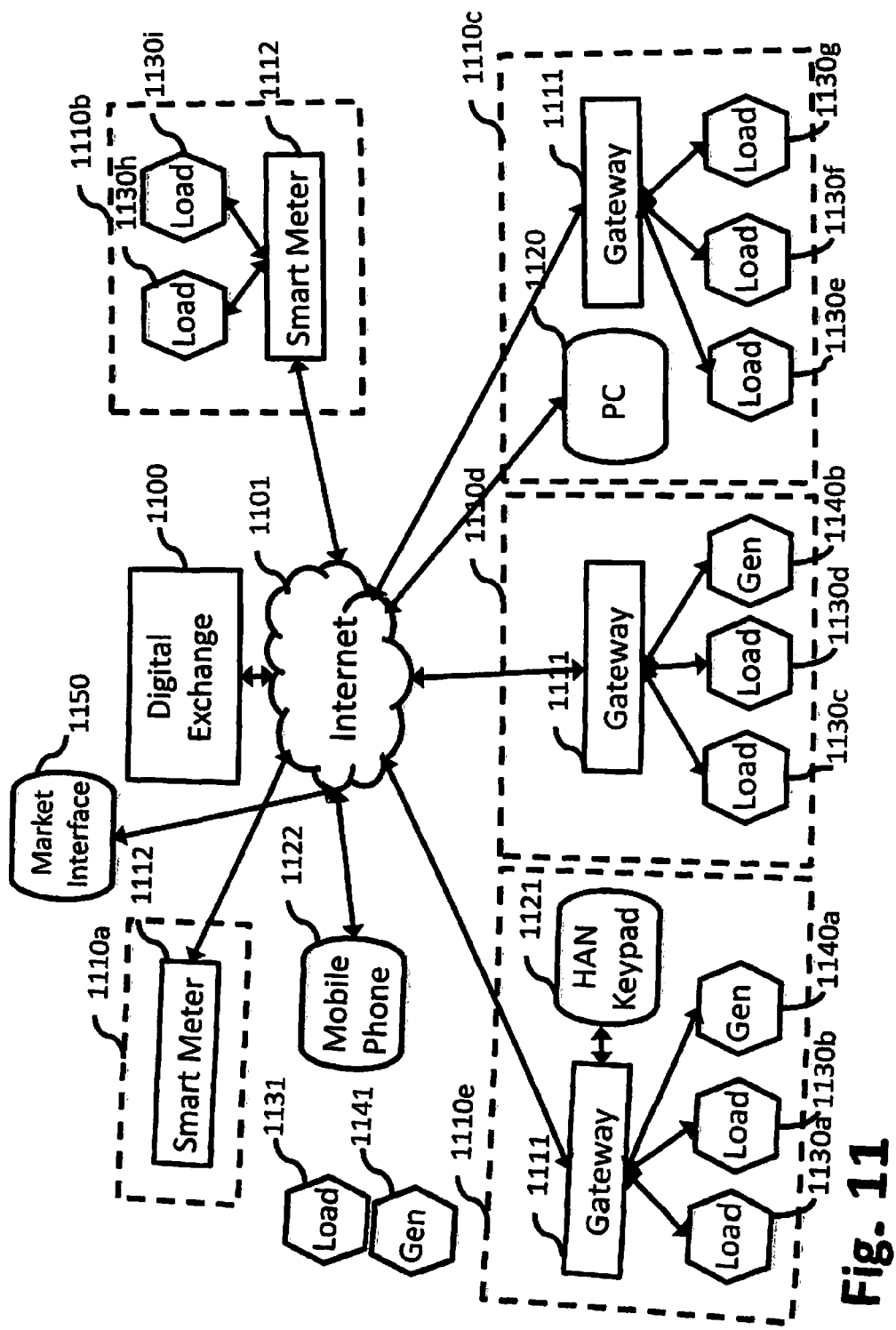
FIG. 11 is a block diagram of a digital energy exchange system according to an embodiment of the invention.

FIG. 11 illustrates a network architecture according to a preferred embodiment of the invention. A digital exchange 1100 acts as a control point according to an embodiment. Users such as small businesses and consumers participate by interacting with the digital exchange 1100. Interaction is normally conducted by connecting to the digital exchange 1100 via the Internet 11011, although this is not necessary according to the invention. Interaction between users and the digital exchange 1100 can be conducted by any suitable communications medium, such as wired or wireless telephony. In various embodiments of the invention, users interact with the digital exchange 1100 through the use of mobile phones 1122, personal computers (PCs) 1120, or a home area network (HAN) keypad 1121 such as might be used as part of a home automation system. While according to a preferred embodiment of the invention interaction data such as preferences or requested actions are passed over the Internet 1101 to and from users via one or more of these various devices, it should be appreciated that web-based services can today be delivered over a large and growing number of device types and communications networks without departing from the scope of the invention. For instance, a user could establish a multimodal voice-and-data session from a "smart mobile phone" over both the Internet 1101 and the wireless telephony network, and use both voice and data channels to interact with a digital exchange 1100 according to the invention. Furthermore, some market participants (that is, participants in an energy market established according to the invention through a digital exchange 1100), such utilities or energy aggregators, may interact with a digital exchange 1100 either directly or over the Internet 1101 from a market interface 1150. In some embodiments, market interface 1150 is a dedicated server operating software adapted to communicate with the digital exchange 1100 via hypertext transfer protocol (HTTP), extensible markup language (XML) or a specialized protocol using XML, remote procedure calls (RPC), the SOAP web services protocol, or any of a number of well-established data integration methods well-known in the art. Consumers and small business owners interact with a digital exchange 1100 in order to identify and authenticate themselves, to identify energy resources (for example, loads such as appliances, computers, hot tubs, etc., supply-side resources such as storage devices or generators, although the invention should be understood to encompass any energy resources capable of being controlled by homeowners or small business operators), and to establish preferences concerning how and when any resources so identified are to be available actions requested by the digital exchange 1100. Examples of preferences that might be expressed according to the invention are levels of criticality of loads, minimum prices at which resources are to be considered available for use, special times of day or particular days when specific resources (or even all resources) are to be considered available for use (or to be not available for use). In general, the invention should not be considered limited to any particular set or sets of preferences, as any preferences that may be useful to a particular user or groups of users and that is capable of being honored by a digital exchange 1100 are permissible according to the invention. Users may also establish preferences concerning what amount of data concerning a user or his energy resources a digital exchange 1100 is allowed to retrieve, and under what conditions (length of time, degree of anonymity, and the like) such data is to be allowed to be retained by a digital exchange 1100.

According to an embodiment of the invention, a home or small business 1110c comprises a plurality of electric loads 1130 that are connected to, and draw electric power from, an electric grid. At least some of loads 1130 are further adapted to communicate with a gateway 1111. Electric loads 1130 can be any kind of electric load capable of being operated in a home or small business, such as major appliances (washers, driers, and the like), electronics (computers, stereos, televisions, game systems, and the like), lighting, or even simply electric plugs (which can have any actual load "plugged into" it, or no load at all). In some embodiments, loads 1130 have current sensing and control circuitry capable of communicating with a gateway 1111 built in (for example, "smart thermostats" and "smart appliances", which are well-known in the art); in other cases, loads 1130 may be connected through wall sockets, surge suppressors, or similar switching devices, which are adapted to be able to communicate with a gateway 1111. In some embodiments, information about the current or power flowing through a load 1130 is passed to a gateway 1111. In other embodiments, only information about the status of the load, such as whether it is on or off, is provided to a gateway 1111. Communications between gateway 1111 and loads 1130 can be wireless, using a standard such as the ZIGBEE™ wireless mesh networking standard or the 802.15.4 wireless data communications protocol, or can be conducted using a wired connection using either power lines in the home or small business (broadband over power lines) or standard network cabling. The actual data communications protocol used between a gateway 1111 and a load 1130 may be any of the several data communications protocols well-known in the art, such as TCP/IP or UDP. According to an embodiment of the invention, a gateway 1111 is connected via the Internet 1101 to a digital exchange 1100 using an Internet Protocol (IP) connection; as with communications between user interface devices and a digital exchange 1100, communications between a gateway 1111 and a digital exchange 1100 can be established using any of the means well-known in the art, including but not limited to HTTP, XML, SOAP, and RPC.

In an embodiment of the invention, a home or small business 1110c communicates with a digital exchange 1100 via the Internet 1101 or a similar data network. According to the embodiment, data is pushed from a gateway 1111 to a digital exchange 1100 in order to provide information concerning condition of loads 1130. For example, gateway 1111, at a specified time interval, may report to digital exchange 1100 that load 1130e is running and using 1.5 amps of current (or 180 watts of power), and that load 1130f is off, and that load 1130g is running in power-conservation mode (for example, if load 1130g is a computer and is adapted to provide its energy-management mode to a gateway 1111). In other embodiments, gateway 1111 may pass periodic updates to digital exchange 1100 and supplement the regular updates with event-based updates (for example, when a load 1130f turns on). In yet other embodiments, digital exchange 1100 pulls data from gateway 1111 either on a periodic basis or on an as-needed basis. It will be understood by those having ordinary skill in the art that many combinations of push and pull, periodic and event-driven update strategies may be used by one or more gateways, or by a single gateway at different times, or indeed even by a single gateway at one time, with different techniques being used for different loads. Users in a home or small business 1110c can communicate with the digital exchange 1100 as described above using a PC 1120, a telephone such as a mobile phone 1122, a dedicated home area network keypad 1121, or directly on gateway 1111, which can alternatively be equipped with a screen such as an LED screen or a touchpad, and optionally with buttons, sliders and the like for establishing preferences that are then transmitted to the digital exchange 1100.

According to another embodiment of the invention, a home or small business 1110c comprises a plurality of electric loads 1130 that are connected to, and draw electric power from, an electricity grid 1160, and further comprises a plurality of generation and storage devices 1140 that are connected to, and adapted to provide power to, an electricity grid 1160. At least some of loads 1130 and generators 1140 (taken here to include storage devices that can provide electricity on demand to the grid 1160) are further adapted to communicate with a gateway 1111. Electric loads 1130 can be any kind of electric load capable of being operated in a home or small business, such as major appliances (washers, driers, and the like), electronics (computers, stereos, televisions, game systems, and the like), lighting, or even simply electric plugs (which can have any actual load "plugged into" it, or no load at all). In some embodiments, loads 1130 have current sensing and control circuitry capable of communicating with a gateway 1111 built in (for example, "smart thermostats" and "smart appliances", which are well-known in the art); in other cases, loads 1130 may be connected through wall sockets, surge suppressors, or similar switching devices, which are adapted to be able to communicate with a gateway 1111. In some embodiments, information about the current or power flowing through a load 1130 is passed to a gateway 1111. In other embodiments, only information about the status of the load, such as whether it is on or off, is provided to a gateway 1111. Electricity generators 1140 can be any kind of device capable of providing power to an electricity grid 1160, including but not limited to wind turbines or other wind-driven generators, photovoltaic cells or arrays or other devices capable of converting sunlight into electricity, electricity storage devices such as batteries and pumped hydro storage facilities, and the like. Communications between gateway 1111 and loads 1130 and generators 1140 can be wireless, using a standard such as the ZIGBEE™ wireless mesh networking standard or the 802.15.4 wireless data communications protocol, or can be conducted using a wired connection using either power lines in the home or small business (broadband over power lines) or standard network cabling. The actual data communications protocol used between a gateway 1111 and a load 1130 or a generator 1140 may be any of the several data communications protocols well-known in the art, such as TCP/IP or UDP. According to an embodiment of the invention, a gateway 1111 is connected via the Internet 1101 to a digital exchange 1100 using an Internet Protocol (IP) connection; as with communications between user interface devices and a digital exchange 1100, communications between a gateway 1111 and a digital exchange 1100 can be established using any of the means well-known in the art, including but not limited to HTTP, XML, SOAP, and RPC.

In an embodiment of the invention, a home or small business 1110c communicates with a digital exchange 1100 via the Internet 1101 or a similar data network. According to the embodiment, data is pushed from a gateway 1111 to a digital exchange 1100 in order to provide information concerning condition of loads 1130 and generators 1140. For example, gateway 1111, at a specified time interval, may report to digital exchange 1100 that generator 1140b is running and generating 500 watts of power, and that load 1130c is off, and that load 1130d is running in power-conservation mode (for example, if load 1130d is a computer and is adapted to provide its energy-management mode to a gateway 1111). In other embodiments, gateway 1111 may pass periodic updates to digital exchange 1100 and supplement the regular updates with event-based updates (for example, when a load 1130c turns on). In yet other embodiments, digital exchange 1100 pulls data from gateway 1111 either on a periodic basis or on an as-needed basis. It will be understood by those having ordinary skill in the art that many combinations of push and pull, periodic and event-driven update strategies may be used by one or more gateways, or by a single gateway at different times, or indeed even by a single gateway at one time, with different techniques being used for different loads. Users in a home or small business 1110d can communicate with the digital exchange 1100 as described above using a PC 1120, a telephone such as a mobile phone 1122, a dedicated home area network keypad 1121, or directly on gateway 1111, which can alternatively be equipped with a screen such as an LED screen or a touchpad, and optionally with buttons, sliders and the like for establishing preferences that are then transmitted to the digital exchange 1100.

According to another embodiment of the invention, a home or small business 1110b comprises a plurality of electric loads 1130 that are connected to, and draw electric power from, an electric grid 1160 via a connecting smart meter 1112 that is adapted to meter electricity usage within home 1110b. At least some of loads 1130 are further adapted to communicate with a smart meter 1112. Electric loads 1130 can be any kind of electric load capable of being operated in a home or small business, such as major appliances (washers, driers, and the like), electronics (computers, stereos, televisions, game systems, and the like), lighting, or even simply electric plugs (which can have any actual load "plugged into" it, or no load at all). In some embodiments, loads 1130 have current sensing and control circuitry capable of communicating with a smart meter 1112 built in (for example, "smart thermostats" and "smart appliances", which are well-known in the art); in other cases, loads 1130 may be connected through wall sockets, surge suppressors, or similar switching devices, which are adapted to be able to communicate with a smart meter 1112. In some embodiments, information about the current or power flowing through a load 1130 is passed to a smart meter 1112. In other embodiments, only information about the status of the load, such as whether it is on or off, is provided to a smart meter 1112. Communications between smart meter 1112 and loads 1130 can be wireless, using a standard such as the ZIGBEE™ wireless mesh networking standard or the 802.15.4 wireless data communications protocol, or can be conducted using a wired connection using either power lines in the home or small business (broadband over power lines) or standard network cabling. The actual data communications protocol used between a smart meter 1112 and a load 1130 may be any of the several data communications protocols well-known in the art, such as TCP/IP or UDP. According to an embodiment of the invention, a smart meter 1112 is connected via the Internet 1101 to a digital exchange 1100 using an Internet Protocol (IP) connection; as with communications between user interface devices and a digital exchange 1100, communications between a smart meter 1112 and a digital exchange 1100 can be established using any of the means well-known in the art, including but not limited to HTTP, XML, SOAP, and RPC.

In an embodiment of the invention, a home or small business 1110*c* communicates with a digital exchange 1100 via the Internet 1101 or a similar data network. According to the embodiment, data is pushed from a smart meter 1112 to a digital exchange 1100 in order to provide information concerning condition of loads 1130. For example, smart meter 1112, at a specified time interval, may report to digital exchange 1100 that load 1130*e* is running and using 1.5 amps of current (or 180 watts of power), and that load 1130*f* is off, and that load 1130*g* is running in power-conservation mode (for example, if load 1130*g* is a computer and is adapted to provide its energy-management mode to a smart meter 1112). In other embodiments, smart meter 1112 may pass periodic updates to digital exchange 1100 and supplement the regular updates with event-based updates (for example, when a load 1130*f* turns on). In yet other embodiments, digital exchange 1100 pulls data from smart meter 1112 either on a periodic basis or on an as-needed basis. It will be understood by those having ordinary skill in the art that many combinations of push and pull, periodic and event-driven update strategies may be used by one or more gateways, or by a single gateway at different times, or indeed even by a single gateway at one time, with different techniques being used for different loads. Users in a home or small business 1110*c* can communicate with the digital exchange 1100 as described above using a PC 1120, a telephone such as a mobile phone 1122, a dedicated home area network keypad 11211, or directly on smart meter 1112, which can alternatively be equipped with a screen such as an LED screen or a touchpad, and optionally with buttons, sliders and the like for establishing preferences that are then transmitted to the digital exchange 1100. It will be appreciated that the description above of the communications associated with a home or small business 1110*d* comprising both loads and generators is equally applicable to homes or small businesses in which a smart meter 1112 is used in place of a gateway 1111, with a smart meter 1112 performing similar functions to a gateway 1112 in addition to its normal role of metering power usage.

In some cases, homes 1110*a* may only pass aggregate electricity consumption data to a digital exchange 1100 from a smart meter 1112, either via the Internet 1101 or a special-purpose data communications network adapted for communications between smart meters 1112 and utility-based data systems. In these cases, even though there is no visibility at the digital exchange level to the individual loads and generators in homes 1110*a*, it is still possible according to the invention for a digital exchange to receive usage data (from smart meter 1112) and to send requests for action (for instance, via a text message to a mobile phone 1122 or even a phone call to a regular phone located at the home or small business 1110*a*, asking the consumer to shed unnecessary loads due to high electricity demand or to attempt to place any generating units online in response to a need at the electricity grid 1160). Since any changes in load measured by smart meter 1112 at home or small business 1110*a* would be sensed by digital exchange 1100 shortly after the request went out, the response profile of such smart meter-only users can be included in response packages according to the invention. Even further, it is possible to include entirely unmonitored loads 1131 and generators 1141 (again, taken to include storage systems capable of injecting power onto the grid 1160); "unmonitored" as used here means that the usage of loads 1131 and generators 1141 is not monitored in real time or near real time by digital exchange 1100. The use of unmonitored loads 1131 and generators 1141 can still be beneficial according to the invention. For example, in an embodiment of the invention some users register unmonitored loads 1131 and generators 1141 with the digital exchange 1100 using one of the user interface methods discussed earlier (for example, via a website associated with digital exchange 1100). Optionally, the registering user can also provide certified records of past operation of the unmonitored loads 1131 or generators 1141, which can be used according to the invention as input to be used in building a response profile for the unmonitored loads 1131 or generators 1141. These unmonitored response profiles can be included in larger response packages, with or without discounting of the capacity of the unmonitored loads 1131 or generators 1141 to account for the fact that these devices are unmonitored. Then, when a response package including such unmonitored loads 1131 or generators 1141 is activated, an activation message is sent to users of unmonitored loads 1131 and generators 1141 advising them of the required action to take. Messages are sent via any communications medium, including but not limited to phone calls, text messages, emails, or alerts on a website that may be monitored manually or automatically by users of unmonitored loads 1131 and generators 1141. Accounting for whether such users actually take the requested actions is done in two ways. First, the statistical profile of the response profile for such energy resources will include the expected behavior (for example, the action will be taken 55% of the times it is requested); this is used by digital exchange 1100 to build a response package that behaves as expected. Second, audits may be contractually required and conducted in which actual usage of unmonitored loads 1131 and generators 1141 is checked periodically (for example, monthly), by a third party or with sufficient safeguards against fraud as are needed to satisfy business needs of a digital exchange 1100. These needs will vary depending on the context. For example, some users of unmonitored loads 1131 and generators 1141 will want to voluntarily participate and expect no remuneration for their participation; in these cases, it is not important to have a level of confidence sufficient for the disbursement of funds, but only a level of understanding of expected behaviors to enable a refinement of the statistical model of the response profile. In other cases, users of unmonitored loads 1131 and generators 1141 will expect to be paid for their participation, and therefore will likely agree to contractual terms including right of audit, for example of tamper-proof device usage logs.

In another embodiment of the invention, one or more of loads 1130 are monitored by "clip-on" current measuring devices which are clipped around a load-bearing able in order to sense the current flowing through the cable. In an embodiment, the clip-on current sensor is adapted to monitor one or more phases of the main current flowing into a home or a small business, essentially acting (via its wireless connection to a gateway 1111) as a clip-on smart meter.

It will be seen from the various embodiments illustrated in FIG. 11 that essentially any arrangement of communications will suffice as long as it allows users of energy resources to establish their preferences, and operators of digital exchange 1100 to build statistical models of expected responses to requests to take action, and operators of digital exchange to send notification of requested actions to users of energy resources according to their preferences.

It should be further appreciated that in the various arrangements illustrated in FIG. 11, various control systems or interfaces may be utilized for manual, automated, or semi-automated adjustment or interaction according to the embodiment, such as to automatically perform adjustments to connected systems or devices. In this manner, data recorded and processed according to the invention may be utilized to drive adjustments to devices or systems "on the fly", in a real-time or scheduled manner in reaction to the recorded data or analysis or processing of the data. Such adjustments may generally be made with a concern for the comfort of users, such as inhabitants of a home or workers in an office. For example, based on recorded data, optimizations may be performed by adjusting heating or cooling settings (such as changing temperature set points or operating ranges), adjusting lighting controls such as brightness or hue, or adjusting air quality such as by controlling the amount of ventilation or filtration being utilized. In this manner, adjustments may be made to optimize not only for traditional factors such as cost savings or energy efficiency, but particularly with regard to perceived comfort levels, for example as may be desirable in residential settings.

Figure 12:
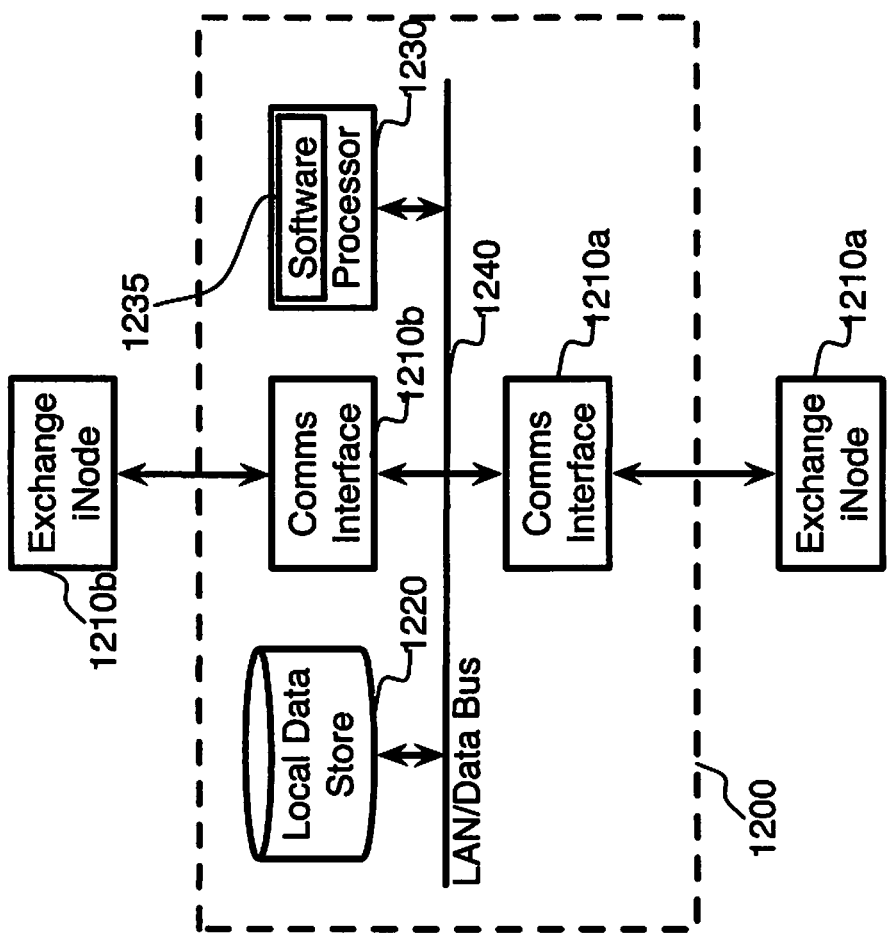
FIG. 12 is a block diagram of a trading iNode according to an embodiment of the invention.

FIG. 12 shows a trading iNode 1200, according to an embodiment of the invention. As with most intermediate iNodes, trading iNode 1200 comprises a processor 1230 with software 1235 operating on it, and at least one communications interface 1210. Communications interfaces 1210a and optionally 1210b and others, are adapted to exchange data with one or more exchange iNodes 1210, which carry out functions substantially similar to those described with reference to digital exchange 1100 in FIG. 11. Trading iNode 1200 will typically make heavy use of transactional logic, and in most embodiments trading iNodes 1200 will also comprise a local data store 1220. While trading iNode 1200 can be implemented entirely within a single computer, in many embodiments it will be preferable to use dedicated computers for one or more of local data store 1220, communication interfaces 1210, and software 1235, and some of these may even be provided in plural form for scalability or fault tolerance. When more than one computer is used in trading iNode 1200, a data bus or local area network 1240 enables communication between the various computers as is well established in the art. In some embodiments, network 1240 may in fact be the Internet or an intranet of a trading firm or the like. Software of trading iNode 1200 in some embodiments may be adapted to perform analysis on electrical system data provided by one or more exchange iNodes 1210 or by external sources (not shown), such as paid information services. Other embodiments may include automated trading software 1235 operating on processor 1230 that analyzes data collected and stored in local data store 1220 (or externally) and, based on these analyses and trading rules established by the user of trading iNode 1200, makes trades automatically when rules or conditions are satisfied, on one more of exchange iNodes 1210.

Figure 13:
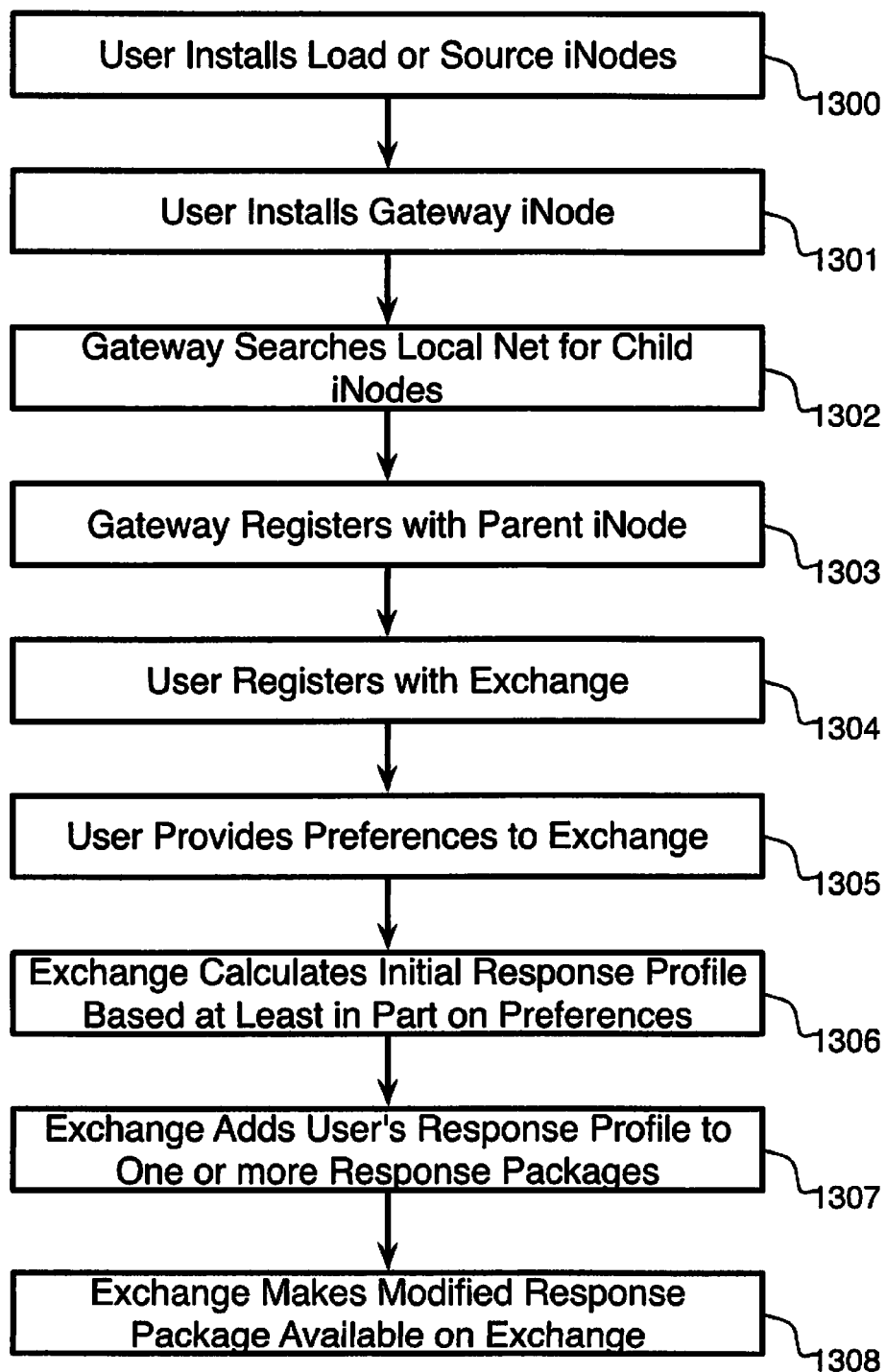
FIG. 13 is a diagram of a process for allowing consumers to express energy usage preferences, and to have those preferences carried out, according to an embodiment of the invention.

FIG. 13 outlines a method, according to an embodiment, for incorporating new users into a digital exchange 1100. In a preferred embodiment, a new user installs load iNodes 321 or source iNodes 322 in step 1300 to measure or manage one or more of the electrical resources under her control. In a second step 1301 the user installs gateway iNode 310 and the gateway, in step 1302, searches a local network for already-installed child iNodes 803 (typically those installed in step 1300). Once it has identified all of the installed iNodes that are visible to it and (optionally) configured to be controlled by it, in step 1303 gateway iNode 310 registers with a parent iNode 802. In some embodiments, gateway iNode 310 will have an address for a parent iNode 802 preconfigured in the device before it is distributed to users; in other embodiments users will have addresses of potentially relevant parent iNodes 802 available as part of the setup process. Typically gateway iNode 310, on registering with parent iNode 802, will upload a list of the identities and types of any child iNodes 803 it detected in step 1301. After installing gateway iNode 310 (which performs steps 1302 and 1303 autonomously under most embodiments, although this is not required), the user registers with digital exchange 1100, typically via a website provided with installation instructions. In most embodiments, newly registering users will be asked by digital exchange 1100 (or service provider 600, which could be any arbitrary third-party service provider; in some embodiments users register with intermediaries who participate in digital exchange 1100 on their behalf, without departing from the scope of the invention) to provide a serial number or other identifying information of the gateway iNode the user installed (in step 1301); this information allows digital exchange 1100 or service provider 600 to associate a human user with a set of iNodes (the gateway iNode 310 and its associated child iNodes 303). In optional step 1304, not necessarily performed immediately, a user is allowed to establish or provide a series of preferences to digital exchange 1100 or service provider 600, such as those discussed above concerning what demand management actions the user will allow. Based on these preferences (or, in their absence, based on default settings which may be based on a user's demographic profile), an initial response profile for the user is established in step 1306, generally by digital exchange 1100, which may have received relevant user-specific data from service provider 600. In step 1307, this response profile is optionally added by digital exchange 1100 to one or more response packages, which modified response packages may then be made available by digital exchange 1100 to its participants in step 1308.

Figure 14:
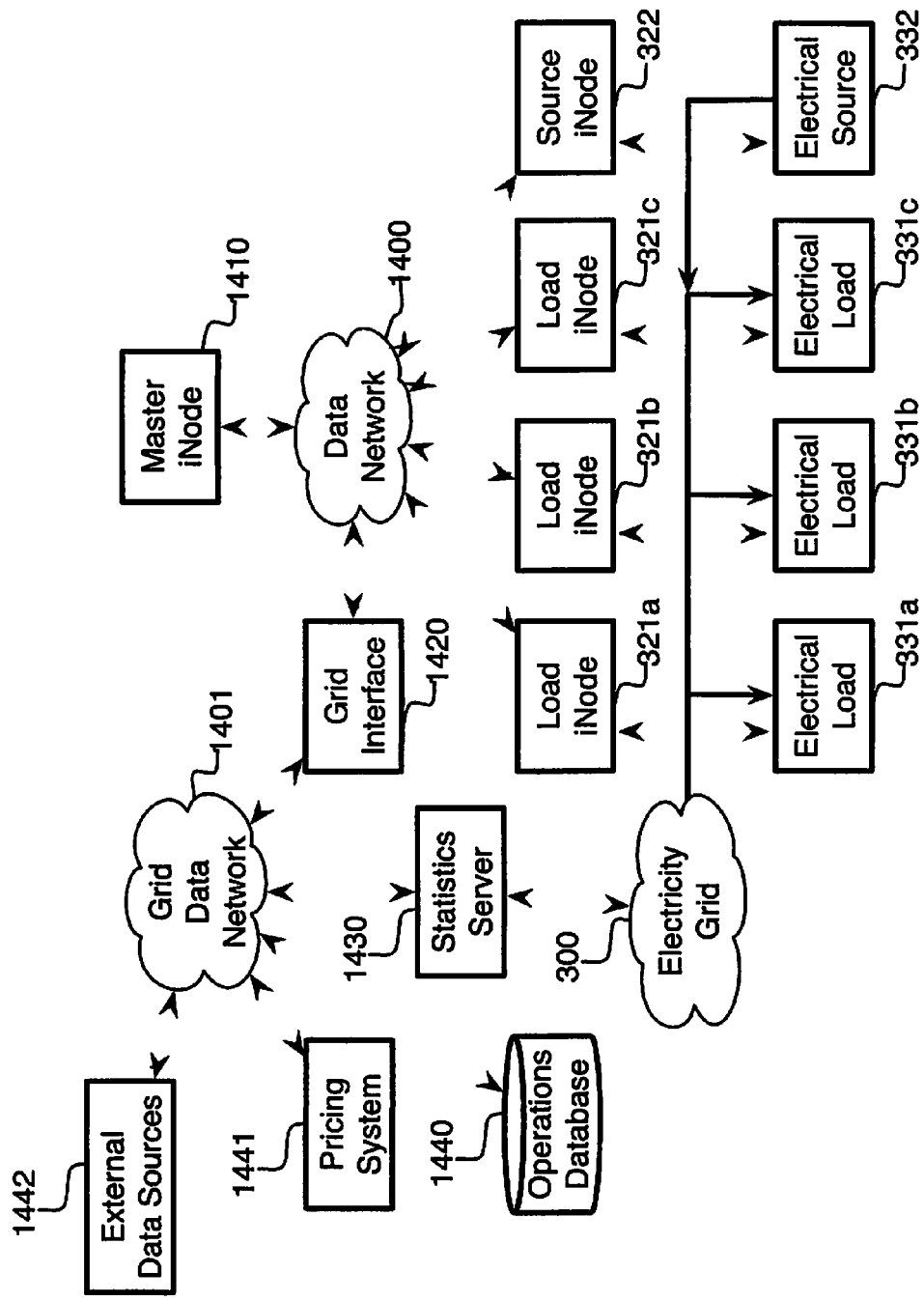
FIG. 14 is a block diagram of a fractional smart metering system according to an embodiment of the invention.

In a preferred embodiment, and referring to FIG. 14, a fractional smart metering system is disclosed. According to the embodiment, a plurality of electrical loads 331 and electrical sources 332 associated with one or more consumers of energy are monitored by associated load iNodes 321 and source iNodes 322 as described above in reference to FIG. 3. Each load iNode is adapted at least to record the energy usage in its associated electrical load 331, and each source iNode 322 is adapted at least to measure the energy generated by its associated electrical source 332. Load iNodes 321 and source iNodes 322 are connected via data network 1402 and master iNode 1410. Data network 1400 is in some embodiments a home area network or a local area network in a small business, but in other embodiments data network 1400 is the Internet. Master iNode 1410 receives from a plurality of load iNodes 321 and source iNodes 322 usage statistics concerning the consumption or generation of energy by the associated electrical loads 331 and electrical sources 332. As before, while in this example loads and sources are electrical in nature, it should be understood that they could also pertain to other types of energy such as natural gas, and the fractional smart metering system could be used to measure other forms of energy and to manage energy distribution networks other than electrical grids. Master iNode 1410 is adapted to receive usage statistics at predetermined time intervals, such as on a quarter-hourly basis, although master iNode 1410 in some embodiments is adapted to pull usage statistics on demand rather than to receive them periodically. Master iNode 1410 passes these aggregated usage statistics, which may optionally also include generation statistics, via grid interface 1420, to statistics server 1430, which is typically located in a utility operations center, but need not be. Statistics server 1430 is connected via grid data network 1401 to grid interface 1420; grid interface 1420 is, in some embodiments, a stand-alone server computer; in other embodiments, grid interface 1420 is a web page located on a host web server; in yet other embodiments, grid interface 1420 is a stand alone software application either distributed on disc to consumers or downloaded by consumers, and adapted to allow a master iNode 1410 or plurality of load and source iNodes to connect via network 1402 to itself in order to collect usage statistics which it then sends on via grid data network 1401 to operation center 1430. Grid data network 1401 is in some embodiments the Internet, while another embodiments it is a dedicated data network operated by utility. In some embodiments, load iNodes 321 and source iNodes 322 connect via data network 1400 directly to grid interface 1420, and no master iNode 1410 is present. In other embodiments, consumers participating in a smart grid fractional smart metering system such as that disclosed herein will have a variety of arrangements, some of them using a master iNode 1410 and plurality of child iNodes (such as load iNode 321 and source iNode 322), while others will have only source iNodes 321 and load iNodes 322, and yet others will have hybrid architectures in which Master iNode 1410 is present and aggregates statistics from a plurality of child iNodes, but there is a further plurality of iNodes that connect directly to grid interface 1420.

It will be appreciated that according to the invention, statistical information concerning energy usage and generation can be accumulated at statistics server 1430 without the use of smart meters. It will further be appreciated that an element of risk is introduced on behalf of the utility under this arrangement, since the utility does not directly own or control the iNodes that are the source of the aggregated statistics. This is quite different from the situation common in the art today, in which smart meters owned by the utility collect all usage statistics. In order to mitigate the risk, utilities may collect aggregate statistics for periods corresponding to the time period for which routine meter readings are available. This data is generally already collected by utilities, as it is the basis for their billing of ratepayers for actual energy usage (on a monthly or bimonthly basis usually). Usage data from traditional meter reading is obtained by statistics server 1430 from operations database 1440, which in many embodiments is a relational database containing financial and operational data pertaining to a utility, although other database formats and architectures may be used. The aggregate statistics obtained from iNodes via grid interface 1420 can then be compared to the usage data obtained operational database 1440 (again, this is the usage data collected from routine meter readings). Clearly the total from the iNodes should be less than or equal to the total amount obtained from the meter (which by definition is the total of all energy used by the particular ratepayer for the particular period measured using the meter), and furthermore the ratio of the total measured by iNodes divided by the total measured by a meter gives a good estimate of the proportion of the total energy load of the given premises that is monitored by iNodes. In one embodiment, this ratio is assumed to be more or less constant (although it can be recalibrated each time a meter reading is taken), and the total usage of energy for any given time interval can be taken to be the total measured by iNodes, divided by this ratio. Thus in this embodiment a utility is able to offer demand-based pricing to consumers without the necessity of installing smart meters. In effect, the aggregate of the iNodes for a particular ratepayer act as a "fractional smart meter", providing interval-based measurement (and two-way communications between utility and ratepayer in real time) for a fraction of the loads (and sources) present at ratepayer's premises. In some cases, regulators or consumers may be unwilling to allow prices to be set based on a sampling approach such as that just outlined. In these cases, a fractional smart metering approach may still be used according to the invention, in which the loads measured by iNodes (and in the generation of energy if measured) are priced according to a demand-based pricing scheme (as if a smart meter were physically present, measuring their energy usage on a small time interval basis), while the balance of energy usage (as determined by subtracting the total iNode-measured energy usage from the meter-measured usage) is priced as usual using a fixed price tariff.

In fractional smart metering systems according to the invention, it is important to be able to guard against fraud. One possible source of fraud would be to disconnect iNodes from data network 1400 during periods of peak demand (and therefore the price), and enter reconnect the iNodes during other periods. This would allow a fraudulent consumer to pay a lower-than-average price for iNode measured energy during periods of low usage (and low-price), while still paying the averaged fixed price tariff rates for all energy used during peak periods. To avoid this, in some embodiments a heartbeat mechanism (such as are well-known in the art) may be used to detect the disconnection of any iNodes. This does not protect, however, against fraud such as by disconnecting electrical loads 331 from load iNodes 321, in order that the electrical loads 331 can be operated without being detected by load iNodes 321. A more robust solution is to tightly integrate loads 331 and load iNodes 321 (or sources 332 and source iNodes 322), such as by encouraging the adoption of energy-efficient appliances with integrated, network ready, iNodes. Since many of the largest electrical loads used by consumers are appliances with integrated electronic controls, such as heating, ventilation, and air conditioning systems, refrigerators, stoves and ranges, dishwashers, water heaters, hot times, and the like, and since there is already precedent for the promotion of energy-efficient appliances by utilities and regulators, it is envisioned that iNode equipped appliances will allow fractional smart metering according to the invention to be practical.

In an embodiment of the invention, once fractional smart metering is in place based on received aggregate data from a plurality of source and load iNodes for a plurality of consumers of energy, statistics server 1430 computes usage values for time increments and passes them to pricing system 1441 in order to enable pricing system 1441 to compute demand-based prices for each consumer. Pricing systems 1441 that are adapted to compute demand-based pricing are well-known in the art; what is new is providing fractional-smart-meter-based usage data in one of at least two forms, according to the invention. One form is simply the total of energy usage net of generation by all monitored energy resources associated with a given consumer (monitored in the sense that an associated iNode is present and feeds data as described above to statistics server 1430). According to this embodiment, when a monthly (or bimonthly) meter reading is obtained and passed to pricing system 1441, the sum of all interval readings from iNodes (which were already priced based on demand) is subtracted from the total, and the remaining balance is billed at the normal, fixed tariff rate for the applicable consumer. In a second form, the ratio method described above is used to compute the total usage for each time increment based on fractional-smart-meter-based measurements (that is, by dividing the total energy usage, net of generation, measured by iNodes by the fraction computed previously for the applicable consumer of total energy load that is monitored), and to price the entire usage using demand-based pricing. If this embodiment is used, then when regular meter readings are obtained, the total energy usage measured by the meter can be compared to the total computed by summing each time increment's value that was obtained by the second form, and comparing the two values. If there is a significant variance (for example, a variance that exceeds a configurable maximum tolerance) between the computed and measured total usage, then the ratio method's results would be suspect. The variance could have been caused by normal fluctuations in energy usage among monitored and non-monitored loads (the two types of loads may not behave identically over time, so that the ratio of monitored load to total load would in fact fluctuate), or by fraud. In one embodiment, when this situation is reached, the first form is then preferentially selected by pricing system 1441; in other embodiments, utilities or regulators may decide that, where error is known, the total usage for each time increment is adjusted to the lower of a pro-rated amount based on total usage according to the "real" meter and the computed amount (in other words, resolve errors in favor of the consumer), although many other approaches are possible according to the invention. For example, in another embodiment statistics server 1430 computes an average percentage of total load consumed during each time increment for a sample of smart meter-equipped consumers similarly situated to the consumer of interest, and applies this percentage to the actual total usage of the consumer of interest to compute a value for each time interval.

It should be evident that the monitoring of a substantial portion of loads of a large set of consumers, using iNodes and without the necessity of deploying smart meters, makes possible a wide variety of demand management and demand-based pricing schemes that are mutually beneficial to utilities and their consumers. Achieving this without the need for massive deployments of smart meters that do little for consumers is highly desirable.

Figure 15:
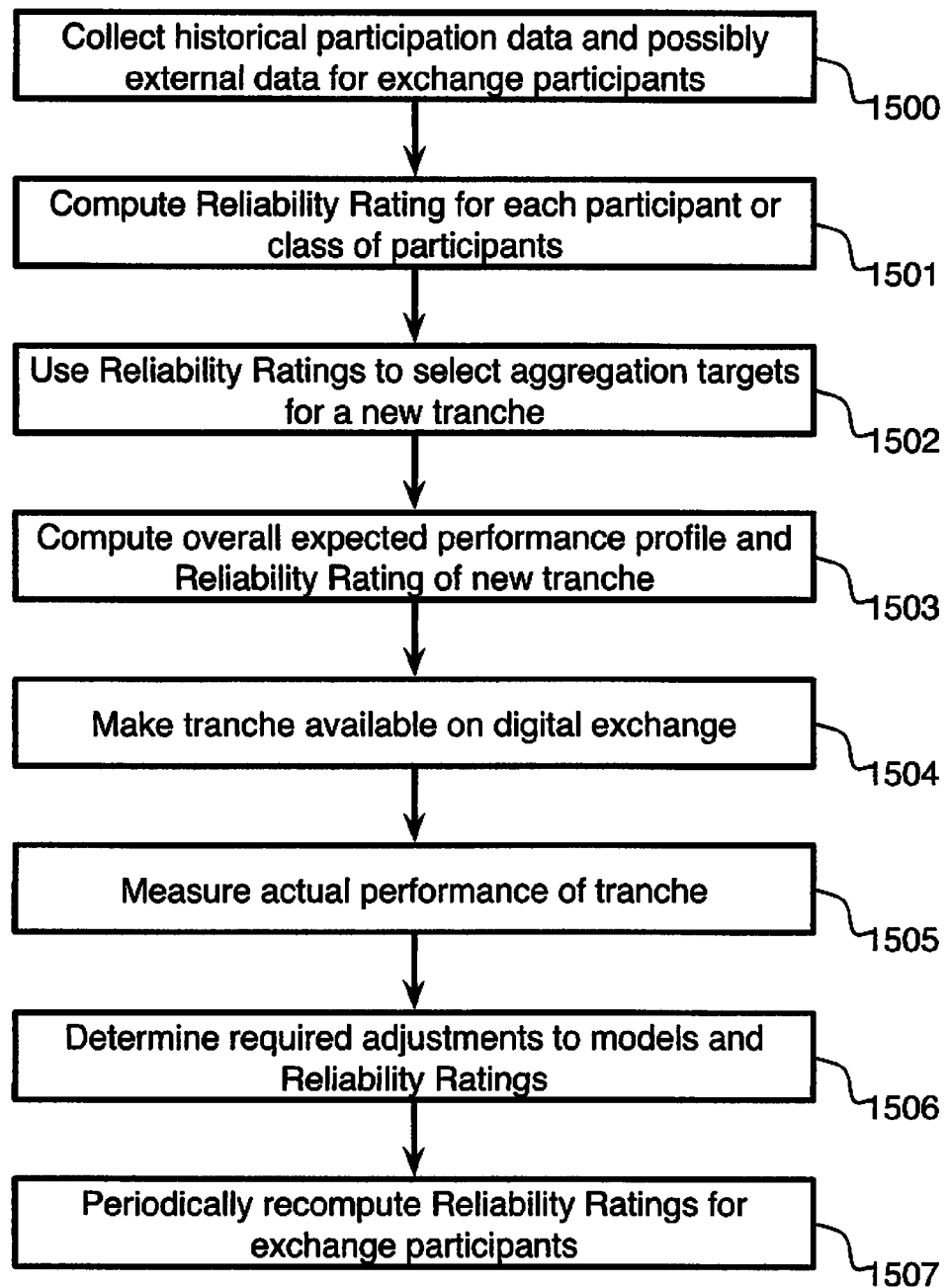
FIG. 15 is a diagram of a process for using reliability ratings to manage risk on a digital exchange, according to an embodiment of the invention.

In another preferred embodiment of the invention and referring to FIG. 15, participants in energy markets are assigned reliability ratings that are used to build aggregation models that exhibit predictable performance characteristics desirable to exchange operators and market participants. Reliability ratings can be considered roughly analogous to credit ratings in that they measure a probability that a participant in an economic exchange will perform as promised. In fact, the use of reliability ratings provides a valuable means for separating system limitations that may affect the actual response to an invocation of a given response package at a certain time from human behaviors that may also affect the actual response. Such separation of human factors from system factors (taken broadly to include details of system behavior within consumers' span of control as well as the "system" controlled by grid operators) is very useful because people similarly situated, or grouped based on common demographics and economic variables, may be profitably studied without regard to their particular electrical infrastructure (and similarly, similarly designed electrical subsystems will likely behave in predictable ways without regard to the personalities of their human possessors). In a first step 1500, detailed performance data concerning exchange participants' energy usage and market participation is collected. This data is collected (as described above in reference to FIG. 10) in event database 1020 and transaction database 1021. Performance data may be supplemented with detailed configuration data from configuration database 1022, the configuration data pertaining particularly to identity, capacity, type, and configuration of energy resources controlled by each participant. Data may be collected for the entirety of a participants' active participation in an exchange, but in many cases it may be preferable to collect data pertaining to specific time periods. Some of these approaches to time binning of performance data are described in more detail below. In step 1501 a reliability rating is computed for each participant, and optionally for groups of participants. These reliability ratings are then used in step 1502 to select aggregation targets for a new tranche (or for many new tranches), for example by selecting all retail consumers that have reliability ratings above some minimum threshold. A tranche is a response package (as defined above), or a group of response packages or parts thereof, of even an assemblage of particular response profiles, that are made available on a digital exchange for purchase and eventual optional activation at a specific time or during a specific time period. For instance, one tranche might be listed on an exchange as a collection of AAA-rated demand response packages in a particular utility operating area that is available for purchase and that can be activated as desired between a specific start and stop time on a specific date. In step 1503 an overall expected performance profile is calculated for each tranche created in step 1502 by statistically combining (using statistics server 1030, and as described with reference to FIG. 10 above) the expected response of the response profile associated with each participant included in the tranche in step 1502. In addition, a collective reliability rating for the tranche as a whole can be calculated. This is done in an embodiment by calculating a weighted average in which the reliability rating of each participant in the tranche is weighted by the expected total load available to be generated (or reduced) by that participant during the time period in which the tranche is eligible to be activated (recall that this may only be a portion of the total load available for control at the participant's site, since certain loads may routinely not be available during the relevant time period). Thus the reliability ratings of participants whose loads make up a larger than average fraction of the overall tranche's available load will be weighted more heavily in computing the tranche's reliability rating than that of a participant that makes only a nominal contribution to the overall available load of the tranche. In step 1504, tranches thus created and rated are listed for purchase on a digital exchange 1000. If a tranche is actually purchased and then activated in the time period in which it is allowed to be activated (again, as described above in reference to FIG. 10), then in step 1505 the actual performance of the tranche is measured. This is an important step because the very nature of the tranches, which are in effect derivative energy securities with two important risk dimensions, means that their behavior will be determined by a very complex mix of variables and will likely always be comprehensible only in statistical terms. In step 1506, actual response performance of tranches is compared to the expected performance, and a determination is made for each tranche whether the variation between expected and actual performance exceeds allowable limits. "Allowable limits" are typically internally set and used by the relevant digital exchange, although in some embodiments the price of tranches may be adjusted if the variance is too large; in typical embodiments, allowable limits are stored in configuration database 1022. In some embodiments, adjustments are only made in step 1506 when variances are outside of allowable limits, although within the scope of the invention adjustments could be made after each tranche is activated (keeping in mind that not all tranches are actually activated; tranches are in many respects like options, and it is not always desirable to exercise an owned option). In some cases, tranches assembled according to steps 1502 and 1503 are made available separately for a large number of time periods (for example, a tranche could be assembled that is appropriate for any weekday noon hour during summer months in a given region, and thus listed for each such time period); in these cases, adjustments can be made at the tranche level. More commonly, however, tranches exist only for one or a small number of time periods, and in any case it is desirable for digital exchange 1000 to be able to identify sources of variation and to control and price them accordingly, so it will more commonly be the case that adjustments will be made to individual response profiles (already described above) and to individual reliability ratings. Any adjustments are propagated to all affected response profiles and response packages and used in future tranches. Finally, in optional step 1507, periodic review of reliability ratings is conducted. For example, in some embodiments a monthly review of actual performance of the response profiles associated with each user will be reviewed and reliability ratings recalculated in order to account for changes in underlying behaviors. In some cases, changes will occur as participants become more proficient in their roles as distributed energy generators of demand response providers; in other cases, usage patterns will vary with seasons and with changes in underlying business or residential activity patterns of the participants.

It will be appreciated that many variations are possible in how the process outlined in FIG. 15 are carried out. Many of the more important exemplary variations will now be described, without limiting the scope of the invention. In some embodiments of the invention, each participant in a digital exchange will be given a single reliability rating that reflects their aggregate behavior (in terms of how reliably they satisfy requests for energy generation or demand reduction in response to activation of tranches). This would be appropriate for some participants whose behavior is very consistent, or for situations where a relatively simple model is desirable. But in other embodiments, it will be preferable to compute a plurality of reliability ratings for some participants. For example, some residential energy consumers may be quite reliable (that is, may quite reliably fulfill their obligations to generate energy or reduce energy demand when requested) during noon periods during the week, when children are at school and energy usage is both stable and flexible. On the other hand, the same consumers may be quite unpredictable on weekends when teenage children are at home. Using one reliability rating for such a participant will lead to large variances and will tend to reduce the value of tranches both to its host exchange and to its purchaser (and even to its participants, who only generate income as members of a tranche when they take requested actions). Similar problems may occur with businesses with highly variable patterns in energy usage and in the consistency of energy usage. Accordingly, in some embodiments of the invention reliability ratings are calculated, for some portion of participants, for independent time periods, for example particular days of the week, particular hours of the day, or particular months of the year. In most embodiments, for any given time period for which a tranche is to be assembled, there will be one reliability rating for each eligible participant.

In another embodiment of the invention, reliability ratings are calculated for classes of participants in addition to, or instead of, calculating reliability ratings for particular individual participants. In some cases, this is done because tranches are assembled from response profiles pertaining to neighborhoods or other collective participant groups. On other embodiments, reliability ratings are calculated for particular demographic segments in order that relatively new participants that have not built up a sufficient track record to have an individual reliability rating may be assigned a reliability rating associated with a demographic segment of which the new member is a group (thus providing at least a reasonable approximation of the likely risk level the new participant will introduce into a tranche). In some cases, where a new participant is a member of several groups for which reliability ratings have been calculated, an average of the reliability ratings of the groups is used as a proxy for the uncalculated individual reliability rating. It should be understood that methods of combination other than simple averaging could also be used, for example by weighting certain reliability ratings more highly than others because of their better probative value. An example of this would be the assignment of a greater weight to a reliability rating associated with the geographic location of a new participant rather than the age of the new participant. In other embodiments, reliability ratings for very small participants are not used because of the degree of statistical uncertainty that could be introduced; instead, a relatively large number of similarly situated participants (for instance, homeowners within a given income range and within a certain county) can be treated as an aggregate and a reliability rating for the entire group can be calculated in step 1501. In some embodiments, separate reliability ratings are calculated for demand response and for distributed energy generation, based on the likelihood (which is subject to verification by analysis of actual results in steps 1505 through 1507) that the behaviors associated with turning off presumably desirable electrical loads (which has a social or convenience cost) will differ significantly from the behaviors associated with operating exiting electrical generation devices (where it is likely that a more straightforward cost-based approach will be used). When separate distributed generation and demand reduction reliability ratings are used for a participant, the appropriate reliability rating is used for determining the contribution within a tranche of load iNodes 321 (use demand response reliability rating), and source iNodes 322 (use distributed generation reliability rating). In general, any arbitrary mixture of granularities of reliability ratings is possible according to the invention, as long as at least one reliability rating can be applied for each participant in a tranche (keeping in mind that default ratings can be used) in order to generate an overall reliability rating for the tranche itself.

In an embodiment of the invention, tranches are built "top down" by first deciding on a desired risk and overall tranche response profile for a new tranche and then selecting participant response packages or response profiles to populate the tranche, calculating the aggregate reliability rating and response profile iteratively and adding or removing participants until the desired overall profiles are achieved. This may be a preferable approach for exchanges desiring to have a balanced portfolio of derivative energy securities available for trading on the exchange, with liquidity in all risk ranges (that is, with an adequate supply of low-cost, high-risk tranches as well as higher-cost, lower-risk tranches). To illustrate the top-down approach, assume a very reliable, 10-megawatt demand response tranche is desired for a particular time period, further characterized in that all loads to be reduced must be in the operating area of a particular large utility; an exchange might desire such a tranche during expected high demand time periods because it expects a ready market for the tranches from the relevant utility or from traders who deal with it. The exchange, having thus defined the size, time, risk profile, will then assemble a candidate tranche from available participants (those that satisfy any other constraints, as in this example the geographic constraint). It should be appreciated by one having ordinary skill in the art that there a number of ways to iteratively build a tranche with the desired characteristics. In one exemplary embodiment, all of the eligible response packages (that is, those satisfying membership constraints such as demographic or geographic limitations) that have approximately the desired risk profile (for instance, those that have an relevant reliability rating that is within a small range around the desired tranche reliability rating) are added to the tranche, and a calculations of the overall tranche size (will it deliver 10 megawatts, after computing expected responses?) and its response and risk profiles are conducted. The results are compared to the desired results and actions are taken depending on the outcome of the comparison. For example, if the tranche does not yet encompass 10 megawatts of expected response, it will be necessary to add more participants, which can be done either by expanding the allowable range around the target risk profile and re-performing the initial steps, or by selectively adding small numbers of new participants with each new small group having approximately the desired risk mix (for instance, adding a participant who is more risky along with one who is less risky than the target profile). In another top-down approach, a set of tranches with the desired mix of risk profiles is stipulated, and various combinations of the available response profiles are attempted in an effort to optimize the overall mix by satisfying the largest number of tranche requirements possible. This is a well-known type of computational optimization problem of fairly high dimensionality, for which several approaches that deliver approximate results in reasonable computational time are known. Among these are constraint-based optimization, simulated annealing, genetic algorithms, and neural network approaches. It should be appreciated by one having ordinary skill in the art that the task of finding a near-optimal allocation of response profiles among the desired tranches to minimize the overall "tranche variance" (that is, the total amount by which all the tranches collectively fail to meet their target response and risk profiles) is one that, while challenging, is a familiar one for which several well-understood approaches exist. Any of these may be used without departing from the scope of the invention.

In some embodiments, a "bottom-up" approach to building tranches with desired risk profiles based on reliability ratings is used. An example where this approach may be preferred is when a high degree of specificity is desired in terms of geographical or market segmentation of participants. For instance, it may be desirable to build a set of "small business" tranches for each of several towns, possibly for political reasons or perhaps to support distinct marketing campaigns in each town. Another example where a bottom-up approach might be desired is when it important to build tranches that are specific to very narrow grid constraints, such as a plurality of tranches for which all participants are served by a single power plant or transmission line when limited importing of power from outside that district is important for economic or grid stability reasons. Yet another possible reason is when it is desired to build tranches with desirable attributes, such as tranches composed solely of wind-produced power, or other desirable environmentally-oriented tranches. Similarly, it may be desirable to build tranches with particular carbon budgets in mind. In all of these cases, it is more important to build tranches with participants (or similar loads/generation/storage assets within a disparate group of participants) of a particular type. In a fairly straightforward embodiment of the invention using the bottom-up approach, all eligible participants are first determined, and the total expected response for any given time period is determined (based on the response profiles of each participants). For example, it may be determined that all of the available wind generators for a particular period will likely generate 37.5 megawatts of electrical power during the period. Next, a decision is made about how to divide up the available contributions; in the example under discussion, one approach would be to establish three 10-megawatt tranches and one of 7.5 megawatts. Finally, the available participants are sorted in order of reliability rating and then assigned to the four targeted tranches by dividing up the sorted list into the appropriately sized chunks. By definition, this approach would give four tranches with different over reliability ratings; an alternative approach would be to assign the participants in order to get four roughly equally rated tranches. This is an example of a business decision that an exchange operator or aggregator would make. To get four roughly risk-equivalent tranches, there are again several well-known approaches, such as a round-robin assignment from the sorted (by reliability ranking) list, or simply randomly assigning each participant to one of the four tranches and then making one-for-one trades to balance them in terms of load and rating. Again, it should be clear to one having practice in the art that there are a large number of ways to divide up the available participants into tranches with desirable risk profiles and size breakdowns without departing from the scope of the invention; the examples given are exemplary in nature only.

In an embodiment of the invention, when an activated tranche falls outside of a desired variance band, the performance of each of the participants in the tranche is automatically examined (to make this concrete, "examined" here means mathematically examined by statistics server 1030 upon its notification of the firing of a rule by rules engine 1031, which in turn evaluated the rule after receiving notification of an event indicating completion of a tranche activation, the event possessing data elements that indicated an out-of-variance deviation from desired performance for the tranche). The examination determines, for each participant, whether that participant was one of the contributors to the problem (by varying excessively from its target performance level). Note that there may be many excessively out of variance participants, with some being too high and some being too low. Note also that in some cases digital exchange 1000 itself exerts a fair amount of control over the performance of a tranche by activating energy resources until the desired result is achieved and then stopping, so any evaluation of the performance of particular participants is made against the actual performance requested by digital exchange 1000 during the activation, not the nominal performance level established in the original tranche assignments. Finally, note that for a variety of reasons digital exchange 1000 may choose not to adjust reliability ratings immediately in the face of excessive variances for some or all of the participants (e.g. when a given exogenous factor—like an extreme heat wave—substantially changed); these are business decisions that according to the embodiment are reflected in the rules loaded into configuration database 1022. According to the embodiment, when immediate adjustment of reliability ratings is desired, these changes are generally immediately calculated by statistics server 1030 and the new values are loaded into configuration database 1022. The new values are used the next time tranches are being built with the particular participants whose reliability ratings were adjusted. In another embodiment of the invention, the calculation and update to reliability ratings may be delayed until it is convenient for the system operator to update such values and the make the associated changes in additional derivatives. In some embodiments, an alternative approach is taken in which all currently open tranches (that is, tranches which are listed on the exchange but not yet activated, regardless of whether they have been sold or not) in which any of the participants with adjusted reliability ratings are participating. In these cases, one or more participants assigned to each affected tranche have undergone a change in its reliability rating. According to the embodiment, for each such tranche, statistics server 1030 recalculates the expected response profile and reliability rating of the tranche using the newly changed reliability ratings of the updated participants, and then evaluates the result to see if the changes in overall expected tranche performance are significant. If they are, then the digital exchange 1000 has the choice of either notifying any buyers of said tranches of the possibility of change in performance, adjusting pricing, or changing the participant mix (if there are unassigned participants available for the affected tranches' time slots) in order to restore the tranches' statistical profiles.

Figure 16:
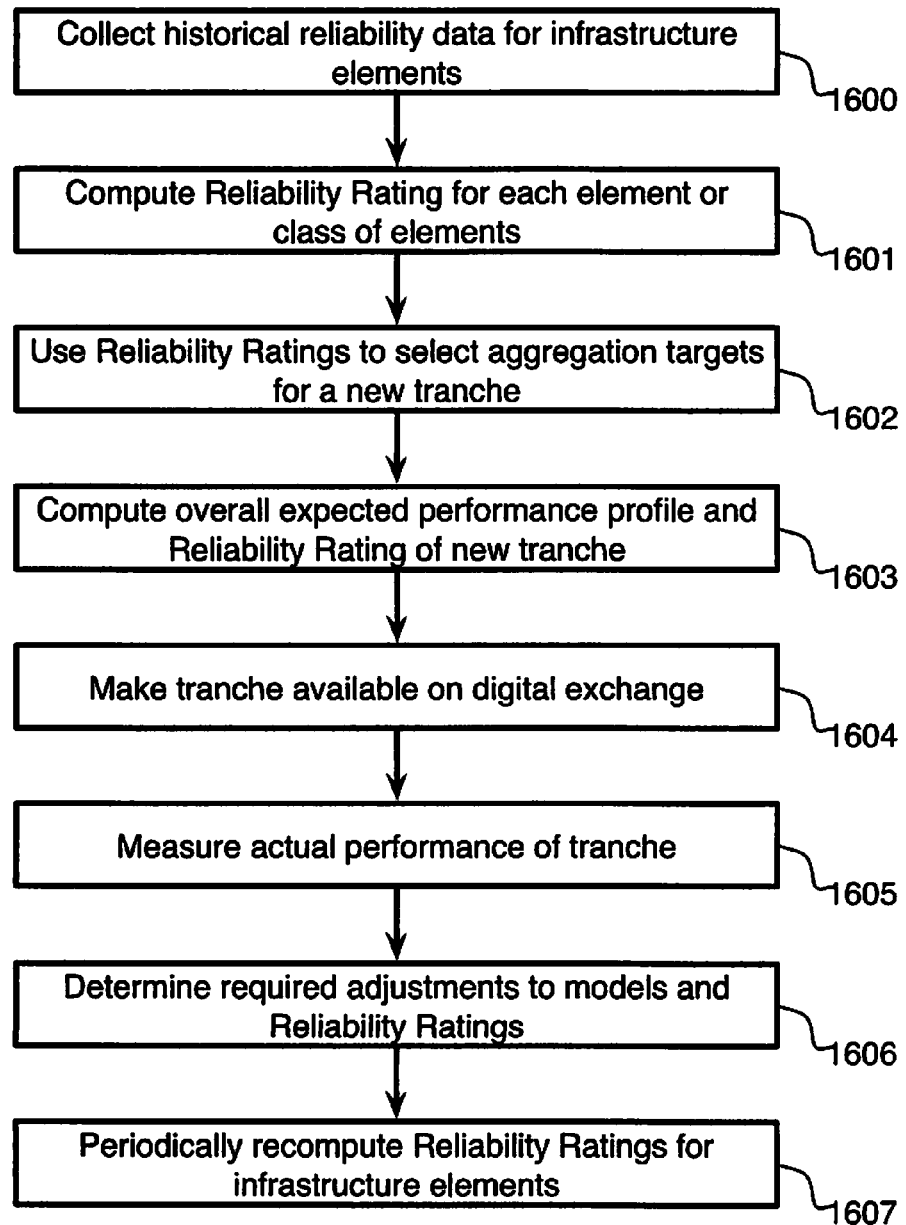
FIG. 16 is a diagram of a process for using infrastructure element reliability ratings to manage risk on a digital exchange, according to an embodiment of the invention.

FIG. 16 illustrates an embodiment of the invention in which infrastructure reliability, rather than participant reliability, is used to help manage energy resources. In some cases, such as commercial buildings, this is desirable in order to cleanly isolate physical characteristics of buildings from underlying behavioral characteristics of the people who use the buildings. In fact, considering residences, separation of "human reliability" from "systems reliability" allows creation of "portable profiles"; that is, if a consumer who has participated in an exchange according to the invention moves from one residence to another, where participation is renewed, it will be possible to immediately estimate the personal reliability of that consumer based on previous personal reliability ratings. If the characteristics of particular building and appliance systems was not separately computed, this would not be possible. In other embodiments, it is desirable to compute infrastructure reliability ratings in order to account for varying characteristics of actual grid elements, such as substations, large-scale generation facilities, frequency converters, large transformers, and so forth. Plus, different transmission paths on a grid will typically have different loss characteristics (that is, electrical loss in transmission due to heating losses in the wires over which the electricity is transmitted, and losses at various components such as transformers), both because of differing transmission path lengths (longer path usually will mean higher losses) and because of differing voltages (higher voltages generally mean lower losses), and other characteristics of each transmission path (such as cost to be paid to the operator of the facilities traversed on each transmission path to be considered). For these reasons alone it is advantageous, according to the invention, to compute infrastructure reliability ratings and to use them in ways analogous to those just described for participant reliability ratings.

In step 1600, historical reliability or performance data for infrastructure elements is collected from iNodes or external data systems 1442. Using one or more of the approaches described above pertaining to the various ways of computing participant reliability ratings, in step 1601 a reliability rating is computed for each infrastructure element to be evaluated. Again analogously to the steps of FIG. 15, in step 1602 reliability ratings for infrastructure elements are used to select elements for inclusion in one or more new tranches for creation of new derivative energy securities. In step 1603 the overall expected performance profile and reliability rating of new tranches is computed, and new tranches are made available for purchase on digital exchange 1000 in step 1604. Steps 1605 through 1607 are exactly equivalent to the analogous steps in FIG. 15, but applied to infrastructure elements rather than participants.

It should be noted that, in addition to time-based derivatives, spatial derivatives (that is, the rate of change of a variable with respect to position on the earth), are used by statistics server 1030 in some embodiments when computing infrastructure reliability ratings. Spatial derivatives may be useful in determining an underlying grid problem, for instance where the rate of failure of transformer increases as the distance to some point in space (that is, on the map; space can be considered two-dimensional for purposes of the invention), possibly because of an underlying problem such as excessive tree movement due to high winds, or even the presence of a disruptive actor.

Figure 17:
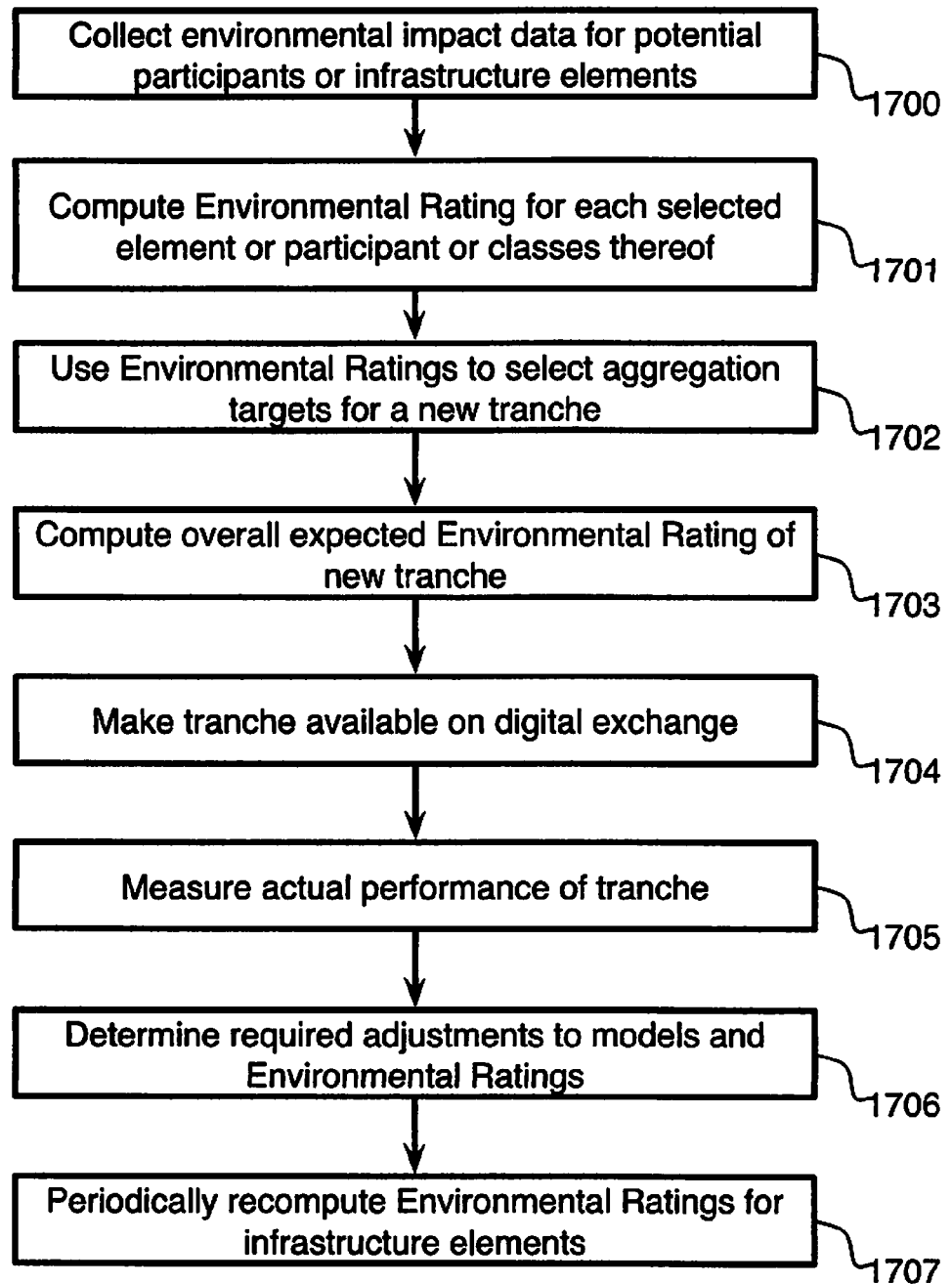
FIG. 17 is a diagram of a process for using environmental ratings to manage risk on a digital exchange, according to an embodiment of the invention.

FIG. 17 illustrates an embodiment of the invention in which environmental impact, rather than participant reliability, is used to help manage energy resources. Environmental impact can also be thought of as a measure of environmental negative externalities present for certain participants or infrastructure elements. For example, coal-based power plants generate electricity very inexpensively but emit large quantities of carbon (and smaller quantities of pollutants). In another example, a small business may operate a wind turbine and make that power available via digital exchange 1000, and it is advantageous to account for both the renewability (technically, a positive externality) of its power and the very low carbon footprint of its power. Some mechanisms, such as renewable energy credits (RECs) exist to compensate owners for use of desirable generation facilities (and to allow users to buy "green power" in effect), but they have severe shortcomings. In particular, Renewable Energy Credits or other similar tools that bundle environmental effects of energy into separate commodities are, at best, unclear to consumers because while they purport to represent cleaner energy (which may or may not be the case), such tradable credits are often traded without regard to their actual environmental effects and system benefits because they are not linked to geographic regions or time of use at all (let alone to time of use for an individual participant). For these reasons alone it is advantageous, according to the invention, to compute environmental ratings and to use them in ways analogous to those just described for participant reliability ratings.

In step 1700, historical environmental impact data for participants and infrastructure elements is collected from iNodes or external data systems 1442. Environmental data can be extracted from iNodes using nodal allocation techniques described previously. For example, if it is known that 25% of the energy flowing into load iNodes 321 associated with master iNode 1410 is derived from solar power, and the balance from a local coal-based power plant, then statistics server 1030 can compute the environmental impact of energy usage at iNodes corresponding to master iNode 1410. Similarly, if it is known from external data sources 1442 that a particular participant has purchased certain renewable energy credits, then the environmental benefit of those credits can be attributed by statistics server 1030 to that particular participant. Using one or more of the approaches described above pertaining to the various ways of computing participant reliability ratings, in step 1701 an environmental rating is computed for each participant or infrastructure element to be evaluated. Again analogously to the steps of FIG. 15, in step 1702 environmental ratings for participants or infrastructure elements are used to select elements for inclusion in one or more new tranches for creation of new derivative energy securities. In step 1703 the overall expected performance profile and reliability rating of new tranches is computed, and new tranches are made available for purchase on digital exchange 1000 in step 1704. Steps 1705 through 1707 are exactly equivalent to the analogous steps in FIG. 15, but applied to environmental ratings rather than reliability ratings.

It should be noted that, in some embodiments of the invention, some combination of the methods illustrated in FIGS. 15-17 is used. For instance, it will not always be desirable to form tranches solely on the basis of environmental ratings, without consideration of risks such as the risk of failure to perform or the risk of infrastructure failures or congestion. Thus in many embodiments one or more of participant reliability ratings, environmental ratings and infrastructure reliability ratings will be combined into one or more composite ratings and used to assemble tranches and to make them available for sale. Furthermore, the methods illustrated are exemplary only; in some cases participant reliability ratings, environmental ratings, and infrastructure reliability ratings will be used for purposes other than the assembling of tranches for sale on digital exchange 1000.

For example, in some embodiments of the invention, reliability and other ratings computed for users, participants, classes of users or participants, or particular infrastructure elements or buildings are made available over data network 1400 to affected or interested parties in a variety of settings that are well-established in the art as user interface media. For example, in one embodiment an energy consumer's reliability rating is provided as an input or as a downloadable widget or applet for inclusion on the participant's personal web page or the participant's home page on a social network such as Facebook™ or LinkedIn™. Users may choose to publish their environmental ratings to show they are "very green" or as an example to their friends and social network connections. Or they may elect to have the information provided in a private location in order to allow them to actively monitor either their participation in energy markets or their environmental footprint (or more specialized variants, such as their personal carbon footprint). Indeed, such information could be augmented with information gathered from exogenous sources in order to allow a participant to measure and perhaps actively manage their impact on the environment (or their profits from participation). In some embodiments, carbon footprint data pertaining to participants is gathered (via external data sources 1442), with their permission, from retailers (for example, by feeding data derived from the mashing up of point-of-sale purchase data for a given consumer and carbon footprint data of the specific products purchased, in order to provide an estimate of the carbon footprint of the participant). In fact, statistics server 1030 in some embodiments computes an estimated total carbon footprint (or total footprint in terms of any externalities, including other pollutants, renewability, labor exploitation, etc.) of a participant (or a class of participants, particularly where a class of participants is organized for the purpose of collectively improving their performance, as for example a "green neighborhood" or a "renewables society"), for display to the participant or class of participants via one or more user interface methods known in the art including, but not limited to, social networks, mobile phone applications, or web pages. Such computations can be performed by statistics server 1030 by collecting as much data as possible about the environmental impact of said participants from external data sources 1442 and from various iNodes 1410, 321, and 322, and then estimating the total fraction of energy usage measured by the iNodes (for example, by gathering total usage from operations database 1440 when utilities participate) and the total fraction of retail purchases measured by the available retail environmental impact data from external data sources 1442, and then extrapolating to estimate each participants' (or class of participants') total environmental impact. Such estimates could be adjusted by multiplying by a number greater than one to account for the unmeasured contributions such as energy usage at work, on the road, and so forth (although in some embodiments of the invention, participants who use electric vehicles or mass transit would be able to include transport data in the more accurate "as measured" part of their environmental footprints). It will be appreciated that there are many ways of computing estimated environmental impacts, or impacts from other externalities, once extensive electrical energy usage data is available to "seed the computation"; even in the absence of external data, proportional measured rates of environmental impact on a per-power-output basis could be compared to overall averages from the economy as a whole to estimate how much more or less than average a given participant uses (or contributes, in the case of negative externalities such as carbon). Thus according to the invention reasonably indicative measures of an individual's, or a household's, or a group's impact on the environment can be made using only data from iNodes.

Figure 18:
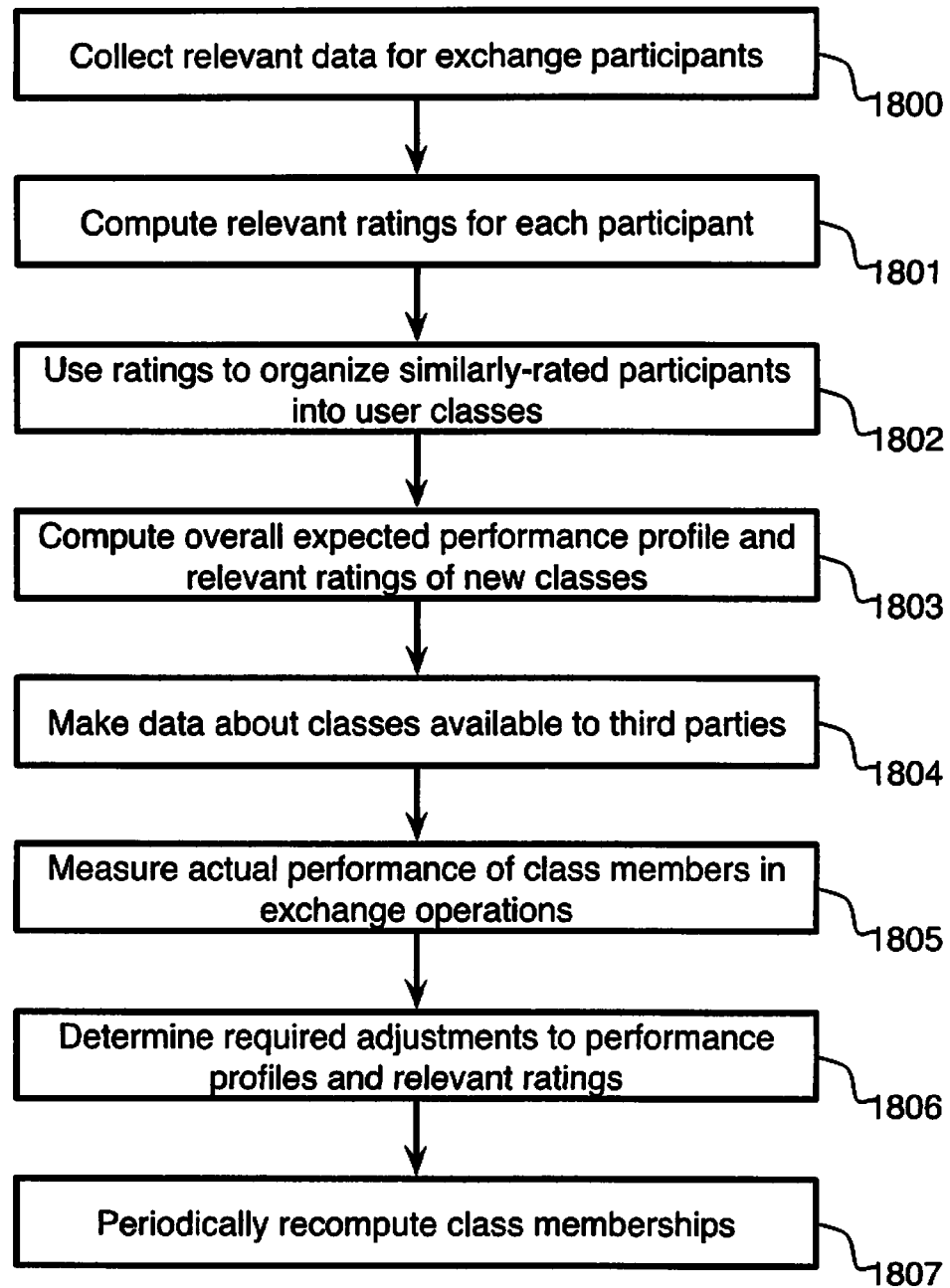
FIG. 18 is a diagram of a process for using user data to construct user classes, according to an embodiment of the invention.

FIG. 18 illustrates a method, according to an embodiment of the invention, for creating classes of participants (this is another example of the use of various ratings described above for purposes other than forming derivative energy securities). In step 1800, relevant data pertaining to exchange participants is collected from various sources previously described. Relevance of data is determined by the particular ratings which are to be calculated in step 1801. Examples include the various kinds of data, from iNodes and external data sources 1442, described above with reference to FIGS. 15-17. In step 1802, various ratings computed in step 1801 are used to organize participants into user classes, generally on the basis of similar ratings. For example, energy consumers who have poor financial credit ratings, low levels of participation and low reliability ratings on digital exchange 1000, and who live in certain districts served by a utility, might be grouped in step 1802 into a user class. Optionally, in step 1803 various expected response profiles and performance characteristics of newly created user classes are calculated; for example, an aggregate environmental rating and financial value of a user class is calculated by statistics server 1030 according to an embodiment. In step 1804, also optional, data computed in steps 1801 through 1803 is made available to third parties. For example, in one embodiment digital exchange 1000 makes information about the class just described (with reference to step 1802) available for a fee to a utility, which uses the information to propose a new tariff to a regulator in which a lower price is charged for energy supplied to the applicable geographical district, in return for which the utility is allowed to deliver a lower quality of power to that neighborhood. For example, it may be desirable for all parties to alleviate financial burdens on a particular user community in exchange for their being the first to see load reductions in cases of system overload. In a typical real-world scenario, regulators would require a utility in such a case to not limit power during periods of extreme high heat, if for example the affected district is a residential neighborhood. Today such Pareto-superior economic tradeoffs are not possible generally, but they become feasible when information-rich energy networks according to the invention are deployed.

Steps 1805-1807 are strongly analogous to the corresponding steps in FIG. 15, except they apply to inclusion or exclusion of particular users from user classes, rather than reliability ratings.

In another embodiment of the invention, user classes are created based on energy usage and environmental footprints of users, and this information is made available to government agencies for use in creating differential taxation systems to encourage environmentally responsible behaviors. For example, in some neighborhoods, tax credits could be provided to ratepayers (also citizens, taxpayers, and users) who achieve certain environmental footprint reduction targets, and optionally tax penalties could be applied to those who exceeded some minimal environmental footprint standard.

While the use of reliability ratings as just described provides a useful means for defining a plurality of energy derivative securities with varying price and risk points, it does not address the allocation of risk among the various parties. For example, when a tranche is created which provides for the generation, on demand, of 5 megawatts of wind-generated power, with a very high reliability rating, it remains unclear what happens if the activation request is satisfied only to a level of 4 megawatts. The buyer and activator of such a security expected to received 5 megawatts, presumably generated by a large number of independent power producers (for instance, by home solar panels and generation from small wind turbines), and may now have to buy the extra megawatt at a higher-than-bargained-for price, or he may simply have a shortage of one megawatt (he may choose to curtail some of his own electrical loads as a result). Clearly a very real cost is associated with the failure of the security, when activated, to deliver the expected energy response.

There are several ways, according to the invention, that this risk be allocated among an exchange, a buyer of a complex energy security, and the various participants whose agreement to shed load or generate electricity on demand are packaged into the security by the exchange. In some embodiments of the invention, the buyer of a security absorbs the added costs of the failure on the part of the exchange (or its participants) to deliver the promised additional load, and clearly in these embodiments it is the buyer who assumes the risk of such non-performance. In such cases typically the buyer will demand a lower price for such securities relative to others in which he does not assume such risks. In other embodiments, an exchange assumes the risk of non-performance, for instance by promising to deliver (following the previous example) 5 megawatts at an agreed price no matter what, if the security is activated. In these embodiments, if the 5 megawatts of supply is not achieved by activating designated response packages that were used to build the derivative energy security, the exchange activates additional response packages until the required supply level is achieved, or alternatively the exchange buys power on the open market (presumably at higher prices, since dispatching of distributed energy generation by buyers of energy securities will typically be done during periods of high energy demand and therefore high prices). In some embodiments, an exchange mitigates its own risk by passing on at least some of the costs of assuming the risk of delivery of the underlying energy resources associated with derivative energy securities to exchange participants who failed to meet their obligations to generate power (or reduce it, in the case of demand response activations). For example, the price paid to participants for their actual energy generation (or curtailment) in response to activations is, in some embodiments, determined at least in part by the reliability rating the particular participant has established. Participants who consistently honor their obligations and thus have higher reliability ratings will received higher prices for their energy actions taken in response to activations of exchange-traded securities, while those who consistently failed to honor their obligations would have low reliability ratings and would therefore receive significantly lower prices. In other embodiments, some participants who desire higher prices and who are confident of their ability to deliver select a different pricing arrangement in which they receive much higher prices each time they generate (or curtail usage of) power in response to activation of a response package of which they are part. In return for the higher prices, these participants agree ahead of time that, when they fail to take a requested action which they should, according to their established preferences have taken, then their accounts will be decremented by the same high price or the same price with an agreed upon discount rate. That is, they have to pay when they fail to meet their obligations. In most embodiments, the payments by a particular participant to the exchange for failing to execute promised energy actions will be capped at the level of payments the participant has received for a specified time period. That is, in most embodiments, consumers who elect to actively participate in demand response or distributed energy generation programs using a digital exchange will never have to pay the exchange anything, but their "earnings" can be reduced to zero if they fail to meet their obligations as often as they succeed. However, this is not a limitation of the invention; in some cases participants may be business entities attempting to arbitrage the exchange's market, and these participants may be willing (and be allowed) to be exposed to potential losses from their participation. For example, a "sub-exchange" might emerge in which a commercial entity arranges on its own behalf to have a large number of energy users participate in demand reduction and distributed energy generation programs through the sub-exchange, which itself acts as a participant on a "main exchange". Such a sub-exchange participant would assume the risks of non-performance while choosing to maximize the price received for actions taken, in the hope that, like a main exchange, they would be able to minimize or eliminate the risk of losses by actively managing their own participant base using their own methods and data or the main exchanges' methods and available data for aggregation of users into tranches.

In another embodiment of the invention, a "curve" (step or piecewise linear) is provided in each financial instrument that describes an incremental price for each megawatt of load shed (or generated, or discharged, depending on the purpose of the security) within a given time window for the response profile. Each curve has an associated probabilistic model which can vary along the curve (e.g. a historical Probability Density Function (PDF) showing the probability of being able to activate x number of megawatts of specific capacity). The PDF could have megawatt intervals matching each incremental megawatt bin on the price curve. This method provides an additional method of managing risk on the exchange. The market maker (the exchange) is able to protect itself from exposure associated with single point pricing models where it assumes responsibility for the performance of a security, but still enjoy the ability to have trading volume associated with the individual security; the megawatt bins on the pricing curve provide ample opportunity for market participants to hedge risk and to identify arbitrage opportunities. With varying incremental pricing for each megawatt bin along the curve (and the associated risk for each component of the tranche associated with such a curve), multiple owners could, in fact, each purchase portions of the same tranche from the exchange according to the invention. This allows for and encourages a high degree of market fungibility, because it enables small amounts of capacity (kW, MW, etc. . . . ) and small amounts of energy in other securities (kW-h, MW-h, etc. . . . ) to be traded, and sold, in part. It also enables a variety of smaller users to be "matched" via the exchange with large providers of energy resources on the electric grid.

In some embodiments of the invention, exchanges (primary or subsidiary) voluntarily maintain "reserves" by keeping a supply of response packages unbundled (that is, not allocated to any tradable security on the exchange) in order to be able to augment any response packages that threaten to miss their committed activation results. Maintenance of reserves obviously reduces the revenue potential for the exchange (which usually only generates income when securities are traded and when the underlying response packages of securities are activated); ideally, this reduction is more than offset by the increase in revenues resulting from the higher prices chargeable by the exchange when it agrees to assume the risk of non-performance.

Figure 19:
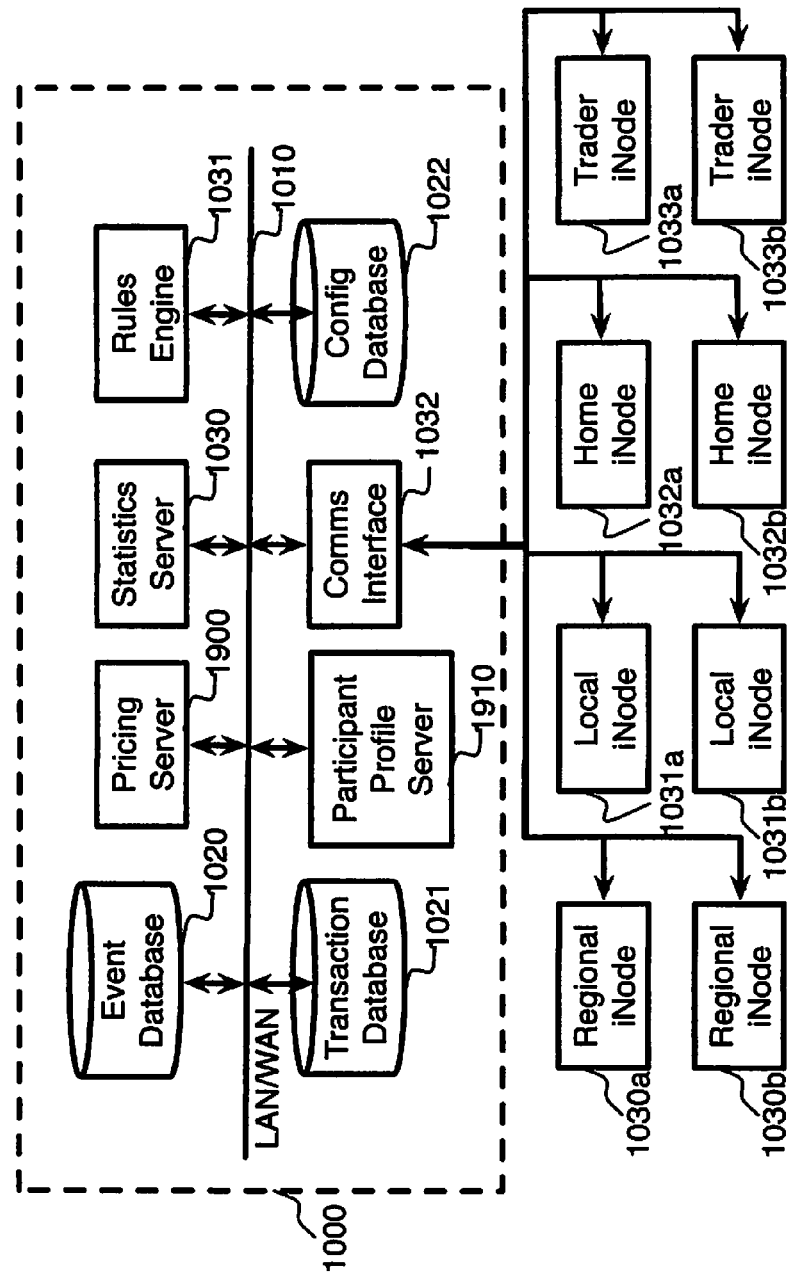
FIG. 19 is a block diagram of a dynamic pricing system according to an embodiment of the invention.

In a preferred embodiment of the invention and referring to FIG. 19, a digital exchange very much like the one illustrated in FIG. 10 and described above with reference to that figure is shown. The embodiment further comprises pricing server 1900, which is coupled via network 1010 to statistics server 1030 and rules engine 1031. Pricing server 1900 is adapted to retrieve data from various data sources within digital exchange 1000, including but not limited to configuration data from configuration database 1022, transaction data from transaction database 1021, and event data from event database 1020. Pricing server 1900 may also optionally be adapted to interact, via communications interface 1032, with one or more trader iNodes 1033, home iNodes 1032, local iNodes 1031, or regional iNodes 1030. As before, the allocation of functions between rules engine 1031, statistics server 1030, pricing server 1900 and the various databases (which are typically capable of performing computation using stored procedures or other methods known in the art), is exemplary in nature and highlights certain functional relationships within the invention. It is possible, within the scope of the invention, to combine the roles of one or more of these functions, or parts thereof, without necessarily departing from the scope of the invention. For example, the functions of pricing server 1900 could be combined with those of statistics server 1030 without loss of scope or functionality. Such an arrangement might be commonplace in some embodiments, as statistics server 1030 and pricing server 1900 perform related functions. Similarly, in some cases it may be desirable to distribute the functions of pricing server 1900 across several identically or similarly configured machines in order to achieve scale and robustness (i.e., fault tolerance) of the overall invention, again without departing from the scope of the invention. What will be appreciated by one having ordinary skill of the art, however, as he reads through the following descriptions of exemplary functions of pricing server 1900, is that the high dimensionality and complex nature of the computations envisioned by the inventors are only executable in any practical sense on specific machines that have been designed or configured to optimally meet the computational demands of pricing server 1900. An exemplary pricing server 1900 configuration comprises a general-purpose computer with multiple CPU cores, a very fast front-side bus for rapid memory access (such as 1 GHz bus clock speed), and several gigabytes of random access memory (RAM). In some embodiments, shared memory architectures are used, allowing each of the processors to access a shared memory containing common data elements. Pricing server 1900 may be programmed using multiple-threaded programming techniques known in the art, or using programming tools and file system architectures optimized for massively parallel computing. For example, in some embodiments pricing server 1900 will be implemented on a HADOOP™ computer cluster that acts as a single large-scale virtual computer, and will be programmed using the well-known MapReduce parallelization technique in order to allow for very large scale via the use of potentially hundreds or thousands of processors. In other embodiments, parallelized database systems such as GREENPLUM™ are used to achieve the necessary scalability. It should be appreciated that there are several implementation approaches available that are well-known in the art that will enable the scale needed to allow pricing server 1900 to rapidly perform complex computations such as the exemplary embodiments described herein as part of a large-scale energy derivatives market or digital exchange 1000; it is not imagined that it would be possible to carry out the functions of pricing server 1900 in one's head, or via a series of consultations of human beings working together. The same comments just made concerning architecture, scaling, and combinatory possibilities among functional elements of the invention apply equally to all of the software elements that comprise digital exchange 1000.

In an embodiment of the invention, pricing server 1900 provides real-time price quotes to traders associated with trader iNodes 1033, on request, for a plurality of derivative energy securities available to be purchased from digital exchange 1000. Note that once a security has been purchased from digital exchange 1000, it may be resold by the buyer to any other eligible participants in digital exchange 1000 at market prices, which are not set by pricing server 1900. Pricing server 1900 may, however, provide the starting price for newly listed (or at least heretofore unpurchased) securities, since digital exchange 1000 is often the first seller, as at least some securities traded on it represent aggregated response packages assembled by digital exchange 1000 as described herein. Starting prices for each security are computed by pricing server 1900 based on parameters passed to it by rules engine 1031, which normally sends a notification and request for pricing to pricing server 1900 when a new security is created. In typical embodiments of the invention, parameters passed to pricing server 1900 for initial pricing of securities comprise, at least, a time period (start time and duration) in the future when the security is eligible to be activated, an aggregate reliability rating of the tranche comprising the security, the size of the security (amount of energy involved), and a product identifier.

In another embodiment of the invention, pricing server 1900 receives requests from home iNodes 1032, local iNodes 1031, or regional iNodes 1030 for pricing information, and computes (or looks up; certain prices may be set to static values by digital exchange 1000) current prices for immediate energy resource actions which may be taken by automated agents operating with home iNode 1032 or by actual consumers who are interactively connected to one or more of the respective iNodes. According to this embodiment, digital exchange 1000 may elect to provide real-time pricing to potential "spot participants" who may elect to discharge (from generation or storage assets) electricity or to reduce demand in excess of, or contravention to, their normal preferences because of a strong market need that is reflected in high prices quoted by digital exchange 1000. According to the invention, market participants may also elect to absorb energy based on such pricing signals when it is favorable to increase consumption or store energy. For example, during a wind ramping event it is beneficial for wind providers and network operators to increase consumption and storage to absorb excess energy that would, otherwise, destabilize the network. Such a mechanism allows digital exchange 1000 to seek additional capacity "on the fly" in response to market demand or to serious events on the grid. For example, if a grid outage occurs in a region, digital exchange 1000 may elect to quote a high price for immediate demand reductions from any participating iNodes in the affected region. In a related embodiment, digital exchange 1000 proactively sends notifications of price changes to regional iNodes 1030, local iNodes 1031, home iNodes 1032, or even trader iNodes 1033 in order to stimulate market-based actions among the various participants associated with the respective iNodes. The ability to provide dynamic price signals to participants of all sizes (as required or via push reporting), and to selectively do so based on any of a number of discriminators such as location or region of target iNodes, type of consumer associated with target iNodes, probability that devices at target iNodes will be available to meet the need (this can be determined dynamically based on historical performance data, as discussed above), and any other relevant attributes of iNodes or their associated market participants.

According to the invention, there are several different types of securitized products that may be assembled by, and traded on, digital exchange 1000. Several possible products will be described here as examples of securities, although it is emphasized that the following product descriptions collectively comprise an exemplary list, and not a complete list, of product types that may be offered according to the invention. A very simple type of product is a real-time energy allocation contract. An exchange may opt to retain capacity in reserve, not only for risk mitigation (as mentioned above) but also to provide a volume of distributed energy or aggregated demand reduction that may be purchased and immediately activated (this embodiment operates very much like a spot market for a commodity). In addition, some participants in control of one or more energy resources may choose to participate only in real-time transactions, in essence using their energy assets (e.g. storage capability, distributed generation capability or demand reduction capability) as a means to execute arbitrage strategies. In some embodiments digital exchange allows such participants to set their own minimum prices for distributed generation or demand reduction, while in others such participants are limited to either participating or not, and the exchange sets the real-time price using pricing server 1900. This latter approach is preferable in some embodiments, as pricing server 1900 attempts to set a price that will maximize overall value to digital exchange 1000 or the electric grid as a system. If digital exchange 1000 offers one or more securities that require it to internally manage risk, and a price is set too low, encouraging use of real-time response packages, there is a risk to the exchange that any reserve it requires for covering its own risk positions (contracts to deliver or curtail power in which the exchange bears the risk of failure, as described above), and thus be forced, in the event that the participants bundled in a security fail to meet their obligations, to buy energy assets on the open market at unfavorable prices. In most cases, it is likely that the exchange will use external risk management for traded securities by leveraging the flexibility of the PDF curves previously described, which enable incremental pricing along the curve for each response profile within each "bin" of energy sized as determined by the exchange (e.g. MW, kW, etc. . . . ). In such a scenario, the pricing for such securities will, as the market becomes more liquid with size and sophistication of participants, be entirely external. Although the exchange (via either or both of statistics server 1030 and pricing server 1900) can provide extensive market intelligence information to participants that can help quantify the value of such securities, it is not necessary, according to the invention, for digital exchange 1000 to actively price anything to be traded on the system.

Real-time energy allocation products provide an excellent example for illustrating a variety of means pricing server 1900 uses according to the invention to deliver adaptive prices in very complex energy markets. In an embodiment of the invention, digital exchange 1000 charges premium process for most energy securities by assuming all risk of non-performance and guaranteeing buyers of energy securities a minimum (or fixed) availability of energy generation or demand reduction resources at the specified time. To offset the potential risk, digital exchange 1000 also maintains a reserve of response packages to compensate for shortcomings from the resource packages included in its various marketed securities. Additionally, in order to provide a hedge against those resources remaining idle due to full performance by participants included in activated energy securities, digital exchange 1000 maintains an active spot market, offering real-time energy allocation units that are activated as soon as purchased (or in some cases, within some very short time period thereafter). The best mechanism for digital exchange 1000 to optimally balance demand for real-time allocations against the exchange's need for risk mitigation and thereby to deliver profits is pricing. Specifically, digital exchange 1000 is in a position from which it can dictate several key price variables in what is a very complex system in order to drive the system's equilibrium away from unprofitable to profitable operating regimes. Digital exchange 1000 can set prices dynamically for real-time allocation contracts and (provided it has arranged contractually for the privilege) by varying the payoff to participants in energy resource actions such as distributed energy generation and demand reduction. Additionally, digital exchange 1000 can set the starting price at which securities are offered when they are created, although this price mechanism is weaker, but probably most common, because it is carried out significantly before the time period where real-time decisions are being made, and because while digital exchange 1000 can ask for a certain price for a given security, it may be forced to adjust that price if no buyers are available who are willing to pay that price.

In order to determine optimal pricing strategies in this example (and indeed in many other exemplary embodiments), pricing server 1600 in an embodiment uses discreet event simulations in which likely outcomes over a large number of simulation experiments performed iteratively over a wide range of parameter combinations are calculated. After a large number of simulations, parameter combinations are reviewed and a suitable parameter combination that delivers stability of the network, high profitability, and stable results is selected automatically. "Stability of results" refers to the variance of key output variables (revenues, profits, idle capacity levels, etc.) for a given parameter combination; in some cases a few simulation tests with a given parameter combination will show very good profitability, but other tests with the same parameters will show very poor results. In such situations, the variance of key output variables is high and the parameter combination can be considered relatively unstable. "Stability of the network" refers to a range of values describing a regime in which the solution meets the physical, operational, and policy constraints under which the grid operates. Acceptance criteria such as maximum variance or more preferably a combination of profitability and stability (for instance, maximizing profitability subject to a maximum allowable variance) are provided to pricing server 1900 by rules engine 1031 or are obtained by pricing server 1900 directly from configuration database 1022; note that different products (or security types) may have different acceptance criteria. Acceptance criteria can be expressed for each individual security or for classes of securities, including geographic or market distributions, size of security (in terms of monetary value or amount of energy affected), or any other attribute by which securities can be grouped. When performing simulation testing, pricing server 1900 uses calculated performance and risk profiles for the security being studied, and historical data regarding likely demand in the time period to be simulated, to determine the statistical behavior of the various elements to be simulated (use of historical data or statistical profiles in simulation model building is well known in the art). In other embodiments, pricing server 1900 uses a combination of simulation and direct calculation to determine optimal prices, when sufficiently complete closed form mathematical functions are available to describe key system elements. For example, if it is determined from analysis of historical data that a simple price elasticity curve describes the relationship between price of real-time allocations and demand, then this function (which may be a simple linear relationship, or a polynomial approximation, or a spline, or a combination of several distinct functions which between them covers the whole range of possible values of the independent variable) may be used to compute needed quantities (or may be used as an input to a simulation model). In another embodiment of the invention, pricing server 1900 uses constraint-based optimization techniques known in the art to compute an optimal range of prices for various products. It will be understood by those having ordinary skill the art that there are many mathematical approaches to finding an optimal operating regime in a highly-dimensional parameter space; other candidate techniques include genetic algorithms, neural networks, Tabu search, simulated annealing, and the like. In another embodiment of the invention, the pricing server 1900 may not actively set a price, but may simply calculate optimal prices based on any one, or combination of, the factors described, and then make the calculated prices available to market participants to enable them to better participate.

In another embodiment of the invention, futures contracts (or "futures") are offered to buyers participating in digital exchange 1000, in which buyers purchase contracts granting them the obligation to activate a tranche (that is, a plurality of response packages each themselves consisting of a plurality of response profiles) of distributed energy generation, demand reduction, or both, at some fixed time or time period in the future on a particular "delivery date" or "final settlement date". Similarly, in another embodiment of the invention options contracts (or, a "options") are offered to buyers participating in digital exchange 1000, in which buyers purchase contracts granting them the right but not the obligation to activate a tranche (that is, a plurality of response packages each themselves consisting of a plurality of response profiles) of distributed energy generation, demand reduction, or both, at some fixed time or time period in the future on a particular "delivery date" or "final settlement date" In either case, (futures or options) for instance, a product of this type might grant the buyer the right or obligation to activate a dispatchable 10-megawatt tranche of distributed energy generation resources any time between noon and one o'clock in the afternoon on a particular day in the future. Futures are priced by digital exchange 1000 initially when they are placed on the market, as discussed above, as it is digital exchange 1000 that carries out any activation requests made by holders of such securities; in a sense, in some cases, digital exchange 1000 is the holder of the underlying commodity (energy) because it has the ability to send activation requests to a large number of potentially small owners of energy resources (who in turn are paid by digital exchange 1000 is they fulfill requested actions, said payment being at a price determined by digital exchange 1000 and potentially including adjustments based on the owners' respective reliability ratings). According to the invention, after energy resources are activated, payment from transactions on digital exchange 1000 may occur immediately, or at a later date, depending on the business decisions made by digital exchange 1000 to clear transactions and the nature of the contracts with market participants. Once a first buyer has purchased such a security, it may in some embodiments be listed on the exchange again by the holder of the security, and sold to any willing buyer at any price the buyer (and new holder) is willing to pay. It is expected that digital exchange 1000 will calculate (using pricing server 1900) its initial offer price based on historical behavior of similar securities, which will typically vary in price as the maturity (eligible activation) date approaches.

Initial prices of futures or options may be based on internal risk, external risk, or mixed models. Internal risk models refer to situations, described above, in which digital exchange 1000 assumes the risk of non-performance, while external risk models refer to situations, also described above, in which holders of futures or options assume the risks of non-performance. Generally prices of external-risk-adjusted futures will be lower than those of internal-risk-adjusted futures, as the lower price reflects the lower value of a security, which imposes a higher burden of risk on its holder. A mixed model is one where an intermediate path is taken, and both parties assume some part of the risk of failure to perform. There are a number of possible ways in which this can be accomplished. For example and in one embodiment of the invention, digital exchange 1000 offers futures and options contract for energy generation of a specified amount in which the quantity is specified to be a target amount plus or minus a tolerance range of a certain percentage; any amount within this tolerance range can be delivered, on activation, by digital exchange 1000 with no price adjustment. But if digital exchange 1000 fails to deliver at least the required minimum (target quantity less tolerance range), it will be obligated to pay a penalty or compensatory payment to the activating holder of the relevant security to compensate the holder for its additional costs resulting from receiving an inadequate amount of energy. On the other hand, if too much is delivered (that is, more than the target amount plus the tolerance range), digital exchange may again suffer a penalty; in most cases this will be because the activating holder of the relevant security will not be required to pay for any energy generated above the contractual maximum level, leaving payment for this excess to the digital exchange 1000. This embodiment provides one example of a mixed-risk model; it should be understood that it is merely exemplary, and that there are many other possible variations within the scope of the invention.

In another embodiment of the invention additional securities are made available by digital exchange 1000 to account for risk such that digital exchange 1000 is not responsible for underwriting the risk of non-delivery or over-delivery of energy resources. According to the invention delivery can refer to discharge or absorption of energy resources from the electrical grid. An additional security called an "energy default swap" or "EDS" may be offered on digital exchange 1000 to enable market participants to obtain protection for their obligations in energy markets due to their holdings of securities traded on digital exchange 1000. In one example, a "protection buyer" and a "protection seller" enter into a standardized contact relating to the financial obligations of the protection buyer with reference to a third party known as a "reference entity". For example a bilateral contract could be used where the protection buyer pays a periodic fee to the protection seller in return for a "contingent payment" by the seller upon a "delivery event" where the protection buyer's failure to deliver or over-delivery of some part of the energy resources specified in any number of energy-related securities may require payment as indicated in the relevant contract. The energy default swaps are used to enable further speculation or hedging of risks that underling energy securities are not settled as expected. EDS swaps offer protection if securities are cleared as expected, in return for regular insurance-like premiums. In another embodiment of this invention, an index of energy-default swaps is listed by digital exchange 1000. Such an "energy default swap index" or "EDS Index" is a series of energy default swaps based on a portfolio of bonds that consist of energy supply or consumption contracts with specified payment structures and delivery events. A decline in an EDS Index signifies investor sentiment that obligations of contract will not be met. Likewise, an increase in an EDS Index signifies investor sentiment looking for energy securities to perform better than expected. An EDS Index will have a number of series representing different realization times of securities and different tranches per series, using a weighting mechanism determined by statistics server 1030 based on actual volume of available securities to be indexed. An EDS Index enables the market to continuously update the value of underlying energy contracts, even as sentiment towards tranche performance continues to change. This is significant, because an EDS index gives digital exchange 1000 the capability to, if it so chooses, leave reliability ratings and expected performance profiles for response profiles and tranches fixed once initially created and listed on digital exchange 1000 while still enabling the market to hedge risk as reliability ratings or other ratings of underlying assets change prior to maturity or execution. According to the invention, a number of different indices such as EDS Indices can be created to enable hedging of risk and speculation on other underlying assets traded on digital exchange 1000.

In another embodiment of the invention, "variance swaps" may be listed and sold via digital exchange 1000. Variance swaps are a derivative contract that allows counterparties to trade the future realized volatility of an underlying asset against its current implied volatility via digital exchange 1000. This allows investors to speculate on or hedge risks associated with the magnitude of volatility in supply, demand, frequency, or other key metrics. Variable swap contracts are generally between two parties, with one party paying a fixed amount agreed upon at inception of a deal although, according to the invention, a group of smaller parties might be "matched" with a larger counterparty. The other party (or group of aligned parties) pays an amount based upon the realized variance of price changes of underlying products, which is one of the indices made possible by digital exchange 1000, statistics server 1030, and pricing server 1900. Net payoff to counterparties is a difference between variance of price changes of underlying products and a related index, and is settled in cash at expiration of each contract.

In another embodiment of the invention, "total return swaps" or "total rate of return swaps" for all or part of particular energy securities held, or for a portfolio of securities, are traded between two or more parties via digital exchange 1000. For example, a party might sell the total return (any future gains or losses) on a reference asset (a given held security or basket of securities) in exchange for a fixed or floating cash flow that is independent of fluctuations in the value of the reference asset with respect to time. This provides an additional type of protection for market participants such that protection against the loss of value irrespective of cause is also available above and beyond protections available against delivery events via the energy default swap.

In another embodiment of the invention, an "exchange traded fund" or "ETF" is created by statistics server 1030 from pools of assets (e.g. capacity, demand, bonds, etc. . . . ) on digital exchange 1000. Exchange traded funds enable fund managers to create investment vehicles that trade at approximately the same price as the net value of a collection of assets over the course of a trading day.

In another embodiment of this invention, conversion between either or both of energy types and their associated externalities can be exchanged in an efficient manner via digital exchange 1000. Though a liquid market place provided by digital exchange 1000 it is possible for counterparties to exchange "energy attributes" or externalities (e.g. $NO_x$, $SO_2$, Carbon emissions, etc. . . . ) in order to create more efficient markets to and improve ability of energy producers and consumers to participate fully in market-based solutions and to deal with environmental challenges. According to the invention, this may be done either where externalities remain coupled to the energy itself, or where they are decoupled and traded in their own right. However, this model encourages market integration, which can ultimately be used to re-couple energy and its associated externalities such that pollution and other externalities can be more appropriately priced In another embodiment of the invention, an insurance-like security product is marketed by digital exchange 1000. In order to aid large energy users or utilities to manage risk of their operations, digital exchange commits to maintain a specified level of dispatchable distributed energy generation or demand reduction in reserve for possible activation at an agreed price by holders of such securities. Such "insurance securities" are priced by digital exchange 1000 when placed on the exchange for initial purchase. Initial pricing of insurance securities will depend on several factors and will typically be computed by pricing server 1900 as described above, using simulation or other approaches. Factors that may, in some embodiments, influence initial pricing of insurance securities include the length of time during which the reserve will maintained, the amount of advance notice required to be given by a holder of an insurance security of intended activation of some or all of the reserve, the underlying response packages that are used as the reserve (and their potential value in other roles, as response packages used for reserves will not be available for other potentially profitable uses), and the presence or absence of forecasted major energy shortage or surplus events. To the extent that digital exchange 1000 is able to leverage its knowledge of large-scale market and grid dynamics to accurately forecast energy demand at least as it affects holders of such securities, it is possible for pricing server 1900 to calculate initial prices that should deliver profits to digital exchange. Once a first buyer has purchased such a security, it may in some embodiments be listed on the exchange again by the holder of the security, and sold to any willing buyer at any price the buyer (and new holder) is willing to pay.

In the event of activation by a holder of an insurance security, the holder is required to pay the agreed price for energy delivered (or demand response results delivered) as a result of such activation. In some embodiments of the invention, energy prices to be charged in event of activation are fixed at the time of sale of the insurance security, being an essential attribute of the security. In other embodiments, insurance securities are structured so that digital exchange maintains a reserve and guarantees adequate capacity, and so that prices of actual distributed energy generation or demand reduction delivered to a holder of such a security are set by the market, usually within limits (generally a maximum is set, but a minimum could also be established). Such an approach might desirable for holders of insurance securities who are willing to undertake a certain amount of price risk as long as they can be certain of having the power they need (or of being able to shed the power they need to, in the case of demand reduction insurance securities), when they need it; the price risk is offset by the generally lower initial sales price of such insurance securities (initial selling prices would tend to be lower because digital exchange would be able to generate higher revenue upon activation because activation will typically only occur when there is risk of supply for the holder, which typically would also be a time of high market prices for the underlying energy assets). As in the case of initial selling price of insurance securities, pricing server 1900 will in some embodiments be used to compute the fixed price (or the limits for securities that will use market-based prices) for actual energy asset usage, and this price (or these limits) will become part of the insurance security as marketed.

In some embodiments of the invention, insurance securities similar to those just described will be packaged with a slightly different "guarantee". In these embodiments, rather than guarantee that a fixed amount of capacity will be reserved for each specific insurance security contract sold, insurance securities are written to guarantee delivery at the prices specified, without specifically committing to maintain a specific level of reserves. According to these embodiments, statistics server 1030 computes for each time period (typically for each hour, but other time periods may be used) a minimum reserve level to be maintained (separately for distributed energy generation insurance contracts and demand response insurance contracts) by digital exchange 1000 in order to ensure that adequate reserves will be available for any likely combination of activations. Statistics server 1030 uses historical data concerning overall market demand for energy and historical patterns of insurance contract activations, as well as the reliability ratings and expected responses of the participants whose energy assets are in the reserve capacity, typically using iterative simulation experiments, to determine an optimal reserve level for each type of energy asset. Clearly digital exchange assumes a higher level of risk by using a single reserve of capacity to serve against a potentially large number of insurance securities rather than using a dedicated reserve for each insurance security individually, but this risk is assumed in order that higher overall profits may be obtained, as a far lower percentage of the potentially profit-generating assets available to digital exchange will be tied up in insurance contracts. Statistics server 1030 will typically, in its simulation runs, target the highest overall profit level or degree of electric grid system stability by computing system benefits as well as expected profits from selling insurance contracts (and from activations of insurance reserves, as these activations are profitable too; the profitability problem of large reserves is rather that in the absence of activations a large amount of capacity is "on the bench", not generating revenues for digital exchange 1000).

In another embodiment of the invention, insurance-like securities to protect market participants from actual physical reliability of assets are listed and sold on digital exchange 1000. The reliability profile and historical data for a given infrastructure asset primarily, albeit not exclusively, targeted at transmission and distribution (to include routine maintenance that may involve shutting down a given asset as well potentially cataclysmic events that can cause interruptions of service or operation) is calculated by statistics server 1030 and made available to participants. This information can be used by market participants to hedge against the risk that given energy securities purchased on digital exchange 1000 might lose value due to the isolation of such an asset from all or part of a distribution network. For example, if a large manufacturer purchases a futures contract for a large amount of electricity to be provided over the next year from a given supplier, there may be a strong desire to hedge against the risk that the given supplier becomes isolated from the grid due to a transmission line failure that results in a default on the initial contract, potentially exposing the manufacturer to additional risk from future, and unknown, market conditions. These insurance-like securities could be swaps, where protection is arranged between two or more counterparties, with or without an additional reference party, and with or without the involvement of digital exchange 1000 beyond listing and clearing of standardized contracts listed on digital exchange 1000. It will be appreciated that a number of other contractual arrangements could be standardized and utilized by digital exchange 1000 to match counterparties or groups of counterparties such that all market participants can more effectively hedge risk and operate more effectively.

In another embodiment of the invention, ancillary services securities are packaged and sold by digital exchange 1000. Today, utilities and grid operators use traditional generation assets (largely combined cycle gas turbine plants and diesel standby generators) to provide ancillary services for the electric grid. "Ancillary services" refers to any number of services to manage power quality according to operational, physical, and policy constraints of the electric grid system including, but not limited to: transmission-level frequency response, transmission-level regulating and standing reserve, transmission-level reactive power, distribution-level security of supply contributions, distribution-level quality of supply services, and distribution-level voltage and power-flow management services. According to the invention, demand-side management or distributed energy resources (storage or generation) can be packaged into securities to provide ancillary services by statistics server 1030 such that they can be listed on digital exchange 1000. Again, the use of response profiles and statistical models for risk can be provided to market participants such that risk can be effectively managed and allocated. The management of delivery uncertainty and the impacts of physical network constraints on the delivery of services can also be incorporated into the model. Prior to listing, or upon listing, pricing could be initially set, and possibly subsequently adjusted, by pricing server 1900. The use of available curtailable or interruptible loads along with, or independent of, distributed energy resources to provide ancillary services via an exchange is significant for a number of reasons. Through creation of a security to provide said services for a given time period (start time and duration) it is possible for users providing services by curtailing or interrupting loads, or by discharging energy into the grid system from a multitude of potential devices, to be fairly compensated for their participation in the market by providing a crucial service. This fair compensation is derived from the ability of the market to discern fair value by providing transparent opportunities for comparison to other options for meeting ancillary services requirements imposed by operational, policy, or physical network constraints. Moreover, via digital exchange 1000 market participants can effectively compare the impact and cost of ancillary services provision at various levels of the grid as a network (i.e. provision by commercial-scale entities at the transmission level or via demand side management and distributed generation at the distribution level). Differences in levels of service provision can have secondary and tertiary impacts on power quality within components of the service areas.

In another embodiment of the invention, transmission rights securities (both physical transmission rights (PTRs) and financial transmission rights (FTRs) with equivalent effect) can be listed individually, or packaged together as desired by a market participant and made available on digital exchange 1000 as either a primary or secondary market. A market participant (or issuing authority in a primary marker) lists transmission rights based on standard attributes required for trading on digital exchange 1000. Current transmission rights trading methods have almost no transparency on top of insufficient volume and a lack of firmness. As PTRs facilitate inter-zonal trades and price hedges they promote market liquidity by enabling market participants to enter new markets. FTRs can be described as an equivalent product to forward PTRs. FTRs are necessary in markets coupled exclusively implicitly in order to incorporate forward energy contracts and financial OTC (especially cross-border or interconnection) trading and solutions for transmission risk hedging. Increases in fungibility enable network participants to mitigate exposure to increasingly constrained physical network requirements that result in substantial tiered pricing increases. These transmission assets can be categorized into multiple products (i.e. base, peak, off-peak, etc. . . . ). With sufficient market liquidity and via digital exchange 1000 market parties can also use financial Contracts for Differences (CfDs). For example, one party might wish to buy a certain amount of energy in a 'Zone A' and sell it in a 'Zone B' whereas another party might intend to set up the exact opposite trade. In this scenario the settlement of CfDs is purely financial and the holders pay the difference between pricing zones. CfDs would allow rapid intra-day position movements and ensure coherence with futures markets for arbitrage opportunities such that a continuous trading approach is likely.

In another embodiment of the invention, congestion and loss management securities are packaged and sold by digital exchange 1000. Although secondary markets for transmission rights can have significant impact on congestion, the combination of securities available to market participants via digital exchange 1000 enables participants to better understand how multiple approaches may have synergistic effects and how a wide-area view of the network may yield greater efficiencies due to larger diversity of physical infrastructure assets, load requirements, and available generation and storage options. Utilities and grid operators today struggle with the limitations of the existing grid, and expectations are that this problem will only get worse as renewable energy sources are brought online (since these sources, such as wind and solar, are both highly variable and uncertain and are often located in regions where the grid is not ill-equipped to handle the increased demand, having been designed for an electricity industry built around large centralized generation facilities and large population centers with relatively consistent and predictable loads). To mitigate congestion and loss problems, digital exchange 1000 packages and sells congestion and loss management securities that commit to automatically take actions of a specified magnitude whenever load factors on a specified plurality of grid elements (such as tie lines) exceed a specified level. For example, if load on a specified tie line exceeds 75% of rated capacity, digital exchange 1000 would be obligated to automatically take action to reduce demand on the tie line by a fixed amount, such as 5 megawatts (or 50 MW for a transmission bus or interchange, etc.). Such "congestion and loss securities" are priced by digital exchange 1000 when placed on the exchange for initial purchase. Initial pricing of congestion and loss securities will depend on several factors and will typically be computed by pricing server 1900 as described above, using simulation or other approaches. Factors that may, in some embodiments, influence initial pricing of congestion and loss securities include the length of time for which the commitment to act exists, the underlying response packages that are likely to be used in congestion or loss management events and whether digital exchange 1000 (or a third party) will hold any such response packages in reserve against congestion or loss management events (and their potential value in other roles, as response packages used for reserves will not be available for other potentially profitable uses), and the presence or absence of forecasted major energy shortage or surplus events that may lead to congestion of relevant grid elements or large losses at key grid constraints. To the extent that digital exchange 1000 is able to leverage its knowledge of large-scale market and grid dynamics to accurately forecast energy demand at least as it affects holders of such securities, it is possible for pricing server 1900 to calculate initial prices that should deliver profits to digital exchange 1000 and optimal system benefits to grid and market participants. Once a first buyer has purchased such a security, it may in some embodiments be listed on the exchange again by the holder of the security, and sold to any willing buyer at any price the buyer (and new holder) is willing to pay. Such a security may also be relisted in part on the digital exchange 1000.

In another embodiment of the invention, securities are packaged based on particular business needs (e.g. balancing load within a given service area), preferences (e.g. use of demand resources, distributed generation, etc.), and asset characteristics, or combinations thereof, specified by a user and made available on digital exchange 1000. The user can specify primary, secondary, and tertiary criteria for structuring a response profile. In some cases, one or more particular types of security (e.g. loads, sources, transmission rights, distribution rights, etc. . . . ) can be packaged by statistics server 1030 into a composite security. For example, a user could have a need to provide voltage support, or other ancillary services within a region, where statistics server 1030 computes a combination of available demand resources and distributed generation sources that are available to meet the business need specified by the user. This composite group of assets is then packaged into a response profile which is subsequently tranched into tradable bins of varying assets based on the parameters set by the user within limits of rules set by digital exchange 1000. According to the invention, this "self-service" method of creating structured energy-related derivatives based on user preferences and needs can be used to create any number of complex energy securities to meet compelling business needs to manage diverse energy resources and both physical and financial risks associated therein. There are, according to the invention, a large number of ways to develop various securities based on relative weightings of quantitative assessments of underlying energy assets. For example, a user could choose to have a complex security where aggregation is primarily based on users of particular reliability ratings, is structured based upon a time-based derivative of such reliability ratings, and is further structured based on upon a specific geographic target region, or no region at all. This is another means of managing risk associated with digital exchange 1000 and market participants.

In another embodiment of the invention either or both a user and digital exchange 1000 can specify preferences for packaging of composite energy securities combining transmission-related rights with energy sources and sinks (loads) on a network into single securities or into composite "baskets" of securities. For example, packaging of transmission rights (across either or both transmission and distribution level assets) along with a particular energy source on a network may be carried out in order to enable "node-to-node" contracts to be entered into by market participants. By packaging a combination of energy assets required to provide energy services across a network, digital exchange 1000 can enable true nodal allocation of resources by combining energy assets from diverse market participants to rapidly create composite products. In another embodiment of the invention, additional line losses due to a marginal increase in transmission as a result of additional demand could be attributed to each additional user such that there was no negative effect on pre-existing arrangements with previously related parties on a network. This would, in effect, require a purchaser of end-to-end energy products to purchase sufficient energy such that line losses across transmission and distribution network paths used were offset. As line losses on a physically constrained network can be easily modeled, it is possible to attribute marginal increases in losses to particular purchasers responsible for increasing capacity utilization of affected lines.

In another embodiment of the invention, and as an example of assembly of energy securities to satisfy diverse business needs, market participants create "affinity portfolios" of energy securities. Examples of affinities could include hydro-generation, wind-generation, any "green" source, low carbon sources below a specified cap, solar or stored solar energy, etc. . . . . . It will be appreciated, according to the invention, that many such affinities can exist and that risk can be hedged as described. For example, a large consumer products company may elect to spend considerable funds to create a "green brand", in part by committing publicly to obtain 100% of its energy from green sources (which of course could be defined in many ways, as for instance that an energy source is "green" if it is either renewable or a very low carbon generator). Such a company may desire to purchase considerable futures contracts for various energy sources that meet its definition of green, in order to assure a ready supply of green energy. Furthermore, in order to hedge against the risk that it may be unable to obtain needed green energy, such a company may choose to engage in a diversified approach involving a variety of securities to minimize its exposure (for example, by using swaps to hedge financial risks and demand response options to cause others to shed loads and thus to both free up more green supply and to mitigate the environmental impact of any "non-green" power used by offsetting it with an equivalent reduction of non-green power used elsewhere on the grid), since the costs of re-branding would be grossly excessive.

In another embodiment of the invention a user could request a custom blend of assets in a structured security to be listed on digital exchange 1000 where the asset blend is determined by a consultation or survey of the user which is used by statistics server 1030 to create tranches which are subsequently priced by pricing server 1900, listed, and sold. According to the invention, the asset blend could be determined for the user by statistics server 1030 using either or both any unallocated energy assets available to digital exchange 1000 and energy assets contained in other securities which can be purchased (in their entirety or in part) to create a desired security meeting the needs or preferences of the user. The unique capability of digital exchange 1000 to facilitate continuous assignment or reassignment of energy assets to allocate them such that they provide the highest value to an electrical grid network as determined by the market is a unique function that enhances market integration, liquidity, and efficiency.

Figure 20:
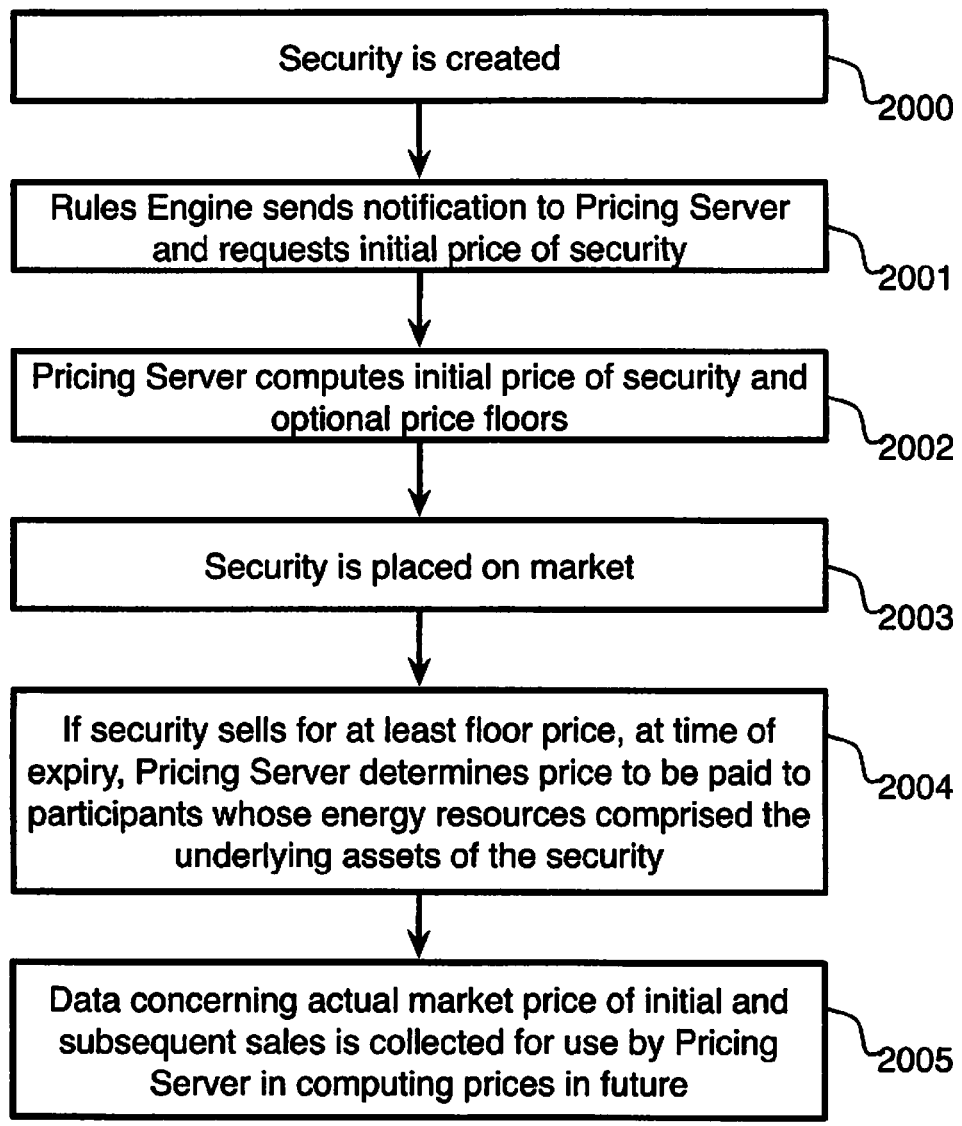
FIG. 20 is a diagram of a process for implementing dynamic pricing according to an embodiment of the invention.

FIG. 20 provides an illustration of an exemplary embodiment of the invention in which pricing server 1900 provides a dynamic pricing capability to digital exchange 1000. One or more of a particular kind of security, such as those described above in various embodiments of the invention, is created in step 2000, typically in response to the firing of a rule by rules engine 1031 in response to an event such as a timer event or the addition of new participants. If the security created is not characterized by having a fixed price (if it did, a simple data lookup into configuration database 1022 would provide the price), rules engine 1031 sends a notification to pricing server 1900 with all appropriate data elements (size and type of security, maturity date, reliability ratings of the underlying participants or an aggregate reliability rating, and so forth), requesting that pricing server 1900 compute an appropriate initial price of the new security, in step 2001. In some embodiments, pricing server 1900 will also be asked to compute a floor price to be quoted with the list price. In step 2002, pricing server 1900 computes the requested initial price and any optional price floors. Computation of prices can be accomplished by any of the methods discussed above, or any other method suitable for determining an optimal or near-optimal balance of risk and profitability. In some cases, pricing server will compute prices by simulating performance of the security in question in the context of the other securities active or contemplated to be active on digital exchange 1000 during the critical period (the period when the security being priced is eligible to be activated), in order to take into consideration any effects a given price for the security in question will have on overall profitability (rather than the local profitability of only the security being priced). This is important in many cases because if prices are set too low for certain securities (for example, insurance securities described above), the proceeds from their sale will not be adequate to compensate for the lost revenues (and presumably profits) that could have been obtained if the reserve assets were made available for other purposes, such as on the spot market. In some cases, pricing server 1900 will compute not only a desirable price (and possibly floor prices as well), but will also compute a target range of quantity of the securities in question to issue. For instance, in the case of insurance securities, it is usually desirable to limit the number of total securities offered for any period in order to limit the allocation of participant response packages to insurance reserves; an optimal total amount to be issued will necessarily depend on the price at which they are offered and the likely prices, revenues and profits that could be expected from other possible uses of the underlying response packages. Following pricing, securities are placed on the market by digital exchange 1000 in step 2003. In step 2004, if at least one of the priced securities sells for its starting price or for any price above its floor price (if one was set), at expiry of such securities pricing server 1900 will in some embodiments be requested (again, by rules engine 1031) to determine prices at which participating energy response packages' owners will be paid. That is, pricing server 1900 will if necessary compute the price to be paid to participants whose energy resources comprised the underlying assets of such securities. In step 2005, data is collected and stored in event database 1020 or transaction database 1021, as appropriate, concerning actual sales prices for securities created in step 2000, including any resales made by various holders of the securities. This data may be used by pricing server 1900 in subsequent pricing computations, as well as updated data on statistical behaviors of response packages (which can determine, for example, how much "raw" capacity must be reserved under an insurance security contract to ensure availability of the appropriate "effective" capacity—the amount actually achievable in an activation event). It is contemplated by the inventors that pricing will become more stable as data is continuously gathered and analyzed, so that starting prices will tend to be effective (that is, desired demand levels will be achieved at starting prices, because such starting prices already take into account realistic statistical expectations about market and grid behaviors).

Figure 21:
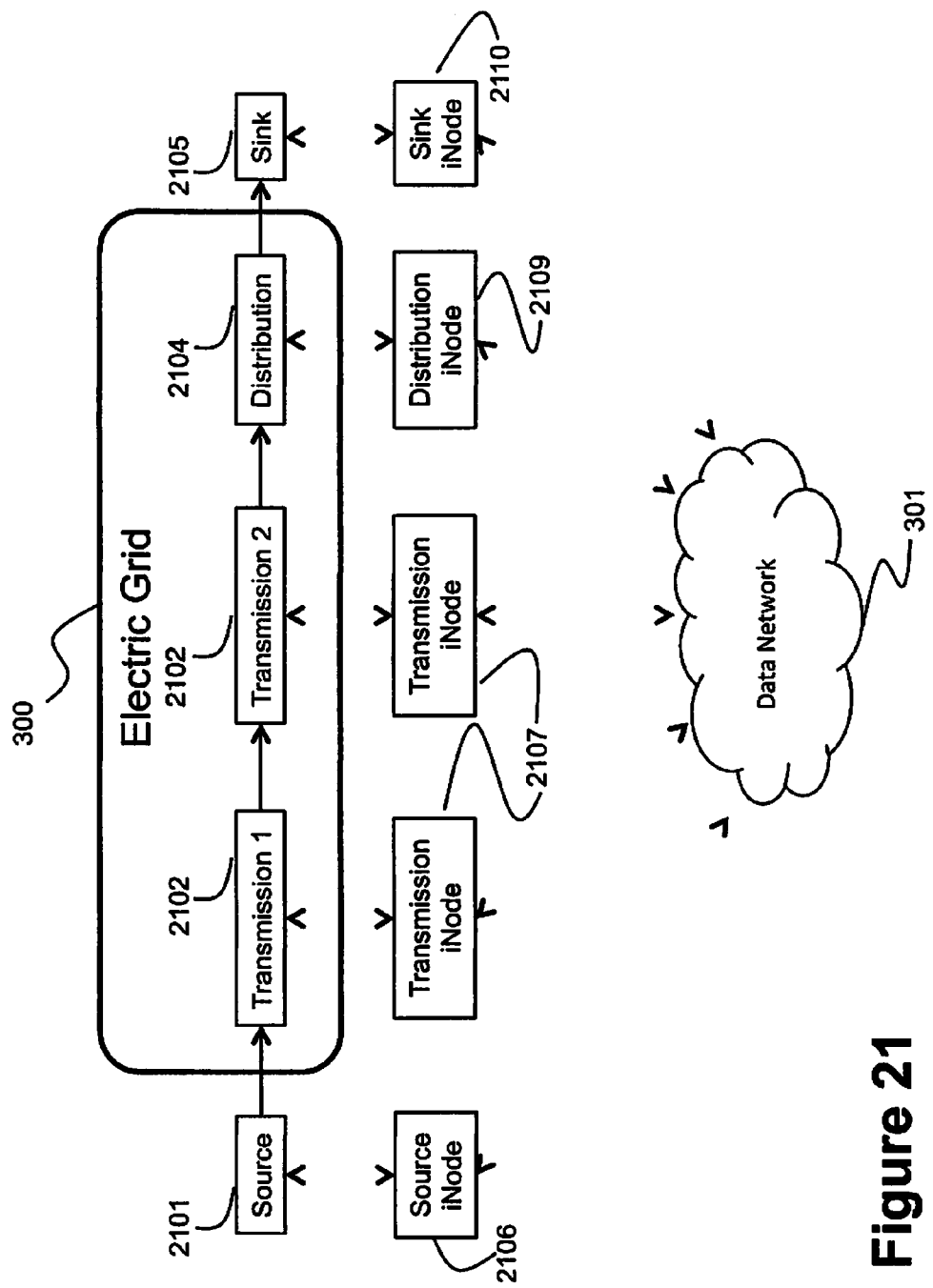
FIG. 21 is a diagram of an exemplary embodiment of the invention showing an iNode and data network corresponding to an end-to-end energy pathway across physical assets on an electric grid network.

According to an embodiment of the invention and referring to FIG. 21, in addition to iNodes' being coupled with electrical loads 331 and electrical sources 332, iNodes are also coupled to transmission equipment 2102 and distribution equipment 2104, and are adapted to collect data from both transmission equipment 2102 and distribution equipment 2104 arranged throughout electric grid 300. Transmission equipment 2102 generally are high-voltage systems (or extra high voltage (EHV) systems which are generally greater than 345,000 volts in the context of power transmission engineering) intended to transport (or transmit) electricity for long distances with low losses. Distribution equipment 2104 generally comprises medium-and-low-voltage systems used to distribute electricity from transmission systems 2102 to end users. Transmission iNodes 2107 collect information regarding state of transmission lines or equipment 2102 as energy is transmitted along paths from sources 2101 to loads or sinks 2105. Similarly, distribution iNodes 2104 collect information regarding state of distribution lines or equipment 2104 as energy is distributed from transmission systems 2102 to loads or sinks 2105. Variables such as voltage, current, frequency, wire resistance, phase, time, location coordinates, power flow limits, temperature, line sag, AC or DC, or others (including but not limited to external variables measurable at physical locations associated with transmission systems 2102 or distribution systems 2104, such as wind speeds, temperature, precipitation, and the like) can be collected by transmission iNodes 2107 and distribution iNodes 2109. These iNodes may use Supervisory Control and Data Acquisition (SCADA) or any number of other protocols and methods to relay sensor information from a network element to a server system via overlay packet data network 301. For example, a distribution substation is a distribution system 2107 with an associated distribution iNode 2109, and a high voltage DC-to-AC converter is a transmission system 2102 with an associated transmission iNode 2107. Both transmission iNodes 2107 and distribution iNodes 2109 may have hierarchies of subordinate iNodes in a similar fashion to the home iNode networks described with reference to FIG. 4 and elsewhere. Common examples of network elements likely to possess an associated transmission iNode 5007 include feeders, busses, transformers, wires, and instruments associated with transmission of electricity to end users. Each section of a transmission or distribution grid will typically affect one or more measured attributes or variables that can be measured and communicated to a server system by transmission iNodes 5007 and distribution iNodes 2109. For instance, a high voltage wire between two substations will have a loss related to electric current passing along it, and iNodes associated with each of the substations will be able to communicate information about losses, or factors which can be related to or indicative of losses, to a server system adapted to compute and account for losses. Examples of such server systems include digital exchange 1000 and also simulation and modeling server 2300 described below with reference to FIG. 23. Thus each device, such as a substation feeder or a voltage convertor, has a specific value assigned to it depending on how it affects properties of electricity being transmitted or distributed through, by, or under control of the device.

According to another embodiment of the invention, transmission iNodes 2107 or distribution iNodes 2109 (or both) are used for active management of power quality attributes associated with or controlled by transmission systems 2102 or distribution systems 2104. One example of this use of iNodes is the communication of detailed information (e.g. voltage, frequency, temperature, or current) relating to line characteristics from iNodes via data network 301 to modeling and simulation server 2300 or digital exchange 1000 to enable effective modeling of transmission dynamics, allocation of losses, or costs associated with network usage (including pricing of transmission costs or of unbundling of ancillary services due to imbalances on a network associated with facilitating a given transaction across the network) to market participants, or any combination thereof. This information can, according to the invention, be transmitted from transmission iNodes 2107 or distribution iNodes 2109, or both, using packet data network 301, to a server system connected to packet data network 301 via communications interface 1032. Once information from iNodes pertaining to either a transmission or a distribution network, or both (sometimes in terms of an effective end-to-end path from an energy source to an energy sink on a network, as in a fully nodal allocation system that allocates all costs, benefits, and externalities on a node-by-node basis throughout a network or a region of a network), it is possible for digital exchange 1000 to compute the performance of network assets on either a considered exemplary path, or similar alternate paths, or all possible paths or some portion thereof, using simulation and modeling server 2300, which may itself consider real data from an iNode network, simulated data, or both. When combined with data from other iNodes on packet data network 301 (for example, those associated with end users, generators, or storage operators), digital exchange 1000 enables market participants (or systems under their control) or dispatching authorities to dispatch energy generation and storage resources (such as pumped hydro storage, flywheel storage, wind generators, and the like), or demand-side resources, or both, in any combination, by discharging, consuming, or storing energy to or from the grid, helping electrical systems meet operational, policy, or physical constraints, or some combination thereof. For example, ancillary services, which are generally defined as functions performed by generation, transmission, system-control, and distribution systems to support generating capacity, energy supply, power delivery, and reliable operations, have large system inefficiencies and costs that are not attributed to end users in the current system. Generally, six primary ancillary service types are identified, although it is possible to describe additional subtypes within each: reactive power and voltage control, loss compensation, scheduling and dispatch, load following, system protection, and energy imbalance. Some ancillary services are premised on control area concepts that attempt to maintain instantaneous balance on transmission and distribution networks within specific spatial constraints. According to the invention, attributes related to provision of ancillary services can be measured or controlled by transmission systems 2102 and distribution systems 2104 coupled to transmission iNodes 2107 and distribution iNodes 2109. Additional attributes related to ancillary services may also be obtained from additional iNodes such as source iNode 2106 and sink iNode 5010. For example, a transmission operator is typically required by regulators to keep a certain amount of electricity in reserve (known as "operating reserves") to match generation to load in response to unexpected generation or transmission outages or shortages. Operating reserves are generally broken down into reliability reserves (which include spinning reserves that must be fully available within ten minutes) as well as supplemental-operating reserves that can be called upon to start providing electricity in ten minutes but must be fully available within 30 minutes. Operating reserves are generally about 3% of peak demand in the supplemental and reliability categories. Load-following reserves are similar to operating reserves in that they attempt to match demand increases associated with fluctuations in demand throughout the day. Load-following is generally broken into two components known as "ramping" and "fluctuations" which account for load changes above base load for a system. According to the invention, the utilization of packet data network 301 to communicate sensor information pertaining to power quality attributes on transmission or distribution networks from transmission iNodes 2107 and distribution iNodes 2109 enables digital exchange 1000 to make energy assets and securities available for purchase that are capable of meeting a network's needs from a diverse set of energy resources and market participants. Moreover, reliability ratings, risk indices, environmental impact ratings, efficiency ratings, and effects on a network calculated, at least in part, by simulation and modeling server 2300 or statistics server 1030, or both, enables high-frequency or low-latency trading to occur such that many more assets are available to meet network needs in real-time or near-real-time, in order that a network can not only facilitate bulk dispatch but also frequency support, voltage support, and the like, via exchange operations. Furthermore, in some embodiments, simulation and modeling server 2300 uses data obtained from iNodes via packet data network 301 to attribute various costs (monetary or externalities) of providing ancillary services of all types to particular consumers. In some embodiments of the invention, cost information, upon being calculated by statistics server 1030 or simulation and modeling server 2300, or both, is stored in transaction database 1021 in real-time, near real-time, or periodically.

According to another embodiment of the invention, transmission iNode 2107 and distribution iNode 2109 provide information via data network 301 to a server system, such as server system of digital exchange 1000, where simulation and modeling server 2300 or statistics server 1030 calculate and allocate transmission line losses and other attributes, typically by breaking them into discrete units (that is, fixed increments of line losses or other attributes such as fixed quantities of carbon emitted by sources responsible for a specific "unit" of transmitted electrical power), that can be assigned, attributed to, charges against, or allocated to particular physical network elements. In today's art, load transfer is typically allocated evenly across all users without regard of their location on a grid, or detailed characterization of their usage, or other factors that affect system losses and efficiencies. According to the invention, a source iNode 2106 records attributes related to generation of electricity injected from a source onto an electric grid system 300. Attributes recorded by source iNode 2106 may be related to a quantity (for example, capacity or energy) of electricity, to externalities associated with the generation of said electricity, or to other characteristics such as power quality, or even information related to the organization generating the electricity itself (or indeed any combination of these or similar attributes). Similarly, sink iNode 2110 or smart meter 1112 records a quantity of energy consumed and potentially also records other related attributes (such as power quality at time of consumption) depending on the sophistication of sensing equipment available. Sink iNode 2110 or smart meter 1112 data may vary substantially due to the wide range of hardware solutions provided by utilities to measure consumption, but generally utilities and others at least measure a total energy (in units such as kilowatt-hours) passing through a measured point prior to consumption. It is more beneficial if sink information is detailed, in terms of device-level granularity versus site-wide consumption granularity, in terms of number of variables (voltage, current, frequency, phase, temperature, and the like), and in terms of granularity in time (for instance by measuring variables on a minute-by-minute basis versus hourly or monthly readings). When sink and source data is combined with data from transmission iNodes 2107 and distribution iNodes 2109 on a server system, it is possible for digital exchange 1000 or an equivalent server system to calculate and report losses associated with individual energy transfers from source to sink across a grid network. For example, digital exchange 1000, upon receipt of sink, source, transmission, and distribution data, as applicable, via communications interface 1032 (and possibly after storing the data in event database 1020 on a real-time, near real-time, or periodic basis), simulation and modeling server 2300 or statistics server 1030 utilize information from event database 1020 and possibly exogenous data sources to determine total losses, costs, ancillary services required, transmission fees due to physical network asset owners, taxes or fees due to government or regulators, or externalities associated with one or more end-to-end energy pathways. The nature of electricity is such that power generated at one or more sources will take all possible paths (generally all parallel paths inversely proportional to the impedance of the paths themselves), just as water flowing from a source to a sink does not follow a single path (this is an inherent quality of electrical and water networks or grids). However, according to the invention, where a substantial portion of paths are instrumented in the sense of having a plurality of transmission iNodes 2107 and distribution iNodes 2109 capable of measuring power (electricity) flow along a path, statistical server 1030 and simulation and modeling server 2300, alone or in conjunction with each other, creates a virtual flow model in which all flows from sources and to sinks are attributed in various portions to specific possible paths, such that for each physical transmission eNode 2102 or distribution eNode 2103 all electricity is accounted for. Virtual models are created, according to the invention, by using various mathematical approaches to quantitatively model the network. Often, a model for pricing, dispatch, and the like will be based, at least in part, around Optimal Power Flow modeling (OPF) using any number of mathematical methods known in the art such as the lambda iteration method (also known as the equal incremental cost criterion), gradient method, Newton's method, linear programming method, interior point method, or others. For example, in an embodiment of the invention, distinct regions of a grid are treated separately, with interconnections to other grid regions being treated as sources or sinks, respectively based on whether net flow of power is into (source) or out of (sink) the region being analyzed which represent boundary conditions for a simulated or modeled portion of a network in a manner analogous to the control area concept. Then a graph-based mathematical representation of the region being studied is created in which each eNode within the region where an intersection occurs between a plurality of transmission lines or distribution lines is treated as a node of the regional graph (and the paths to other nodes are treated as graph edges). Then, working from either sinks or sources and stepwise back to the opposite (that is, sources or sinks), one of several iterative modeling approaches that is well-established in the art of network analysis is used to allocate all flows through each node respectively to a plurality of source-sink pairs in order to create a plurality of virtual paths that can be attributed to each source-sink pair. For each such virtual source-sink path (which has a throughput in terms of either capacity or energy, or both), a proper allocation of transmission losses and externalities can then be made based on the particular characteristics of each transmission system element 2102 and each distribution system element 2103. This is one method, according to the invention, for carrying out nodal allocation on a continuous-flow energy network; other methods are possible using other network modeling approaches known in the art, without departing from the scope of the invention. A key aspect of the present invention is the provision of means for a collecting sufficient substantial fraction of energy usage data and energy injection data to allow simulation and modeling server 2300, possibly in conjunction with simulation server 1030, to create a realistic virtual flow model of each addressed region of a grid. In some embodiments of the invention, not all regions of a grid system are modeled (for instance, regions where insufficient data is collected by iNodes might not be modeled). In these embodiments, as described above, junctions between modeled and unmodeled regions are treated effectively as sinks or sources for purposes of analyzing modeled regions. A particular junction node may in some instances switch over time from sink to source, based on changes over time of net inflows or outflows for modeled regions. Hence the timeliness of data collected, and the "time granularity" of the data, is important in determining the extent to which digital exchange 1000 is able to nodally allocate losses and externalities to particular sinks. Information concerning energy flows in virtual paths over time is stored in event database 1020 or transaction database 1021, or another data storage system associated with or coupled to digital exchange 1000 on a real-time, near real-time, or periodic basis. As mentioned before, the precise distribution of data among various databases is not a limiting factor in the scope of the invention, but rather is an implementation decision that has little relevance to the particular aspects of the invention described herein. It will be readily recognized by one having ordinary skill the art of database design that there may be any number of architectures and data distribution schemes that may be adopted according to various embodiments of the invention without limiting the scope of the invention as claimed. According to the invention, energy storage nodes can be treated as a sink or a source depending on the nature of the energy transformation occurring at a given instant.

Figure 22:
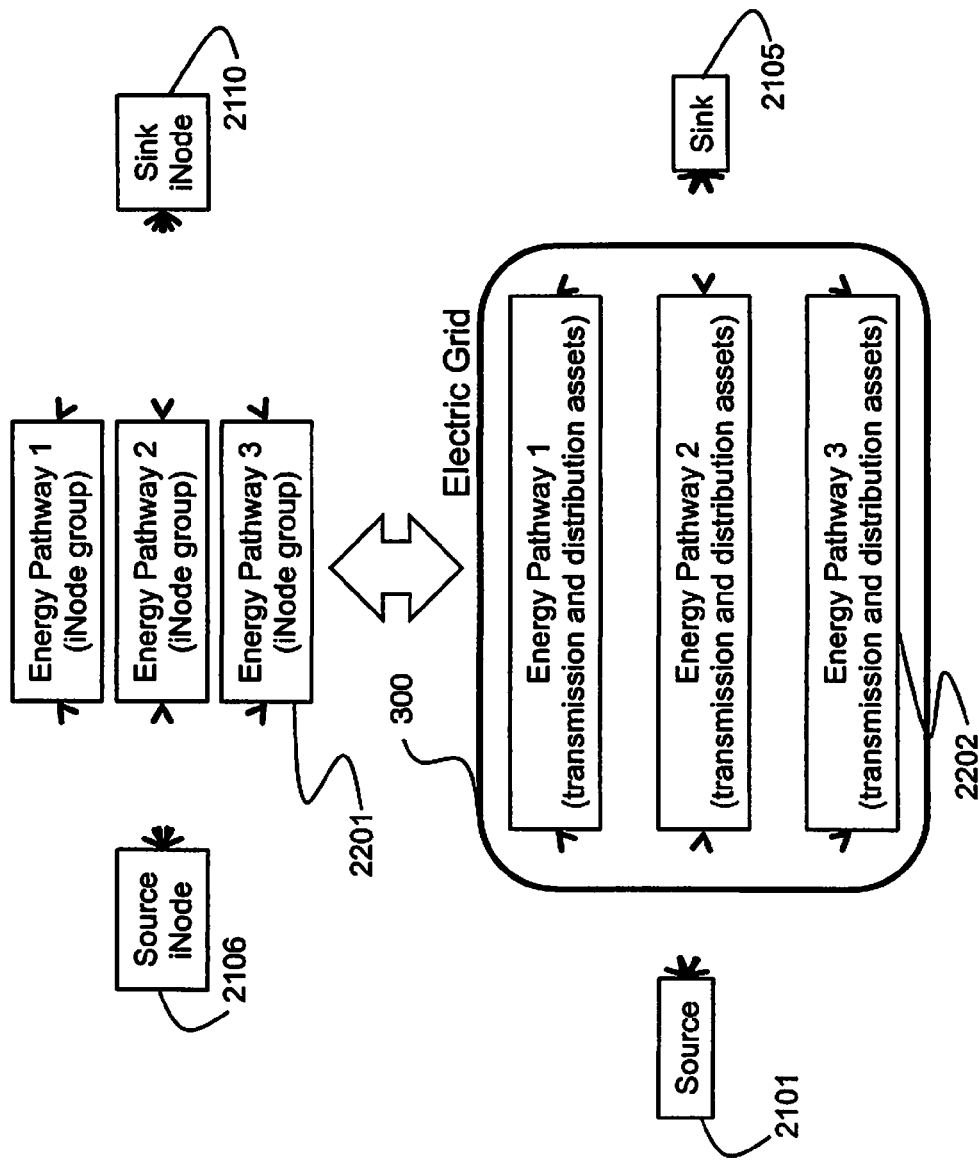
FIG. 22 is a diagram of an exemplary embodiment of the invention showing energy pathways for nodal allocation and corresponding iNode groups that can be used to find optimal virtual energy pathways across a physical energy grid.

According to the invention and referring to FIG. 22, iNodes along possible transmission paths from a source to a particular sink are aggregated with other similarly situated iNodes by digital exchange 1000 or an equivalent server system possessing information on grid topology in order to create a virtual pathway 2201 that connects a sink and source across electric grid network 300. Each virtual energy pathway associated with a corresponding group of iNodes represents a physical route and is linked to a combination of either or both other transmission iNodes 2107 or distribution iNodes 2109 (e.g. on wires, substations, feeders, or transformers). They are referred to as "virtual paths" because in fact while there is a physical meaning to a virtual path, it is not physically correct to assert that a specific number of electrons flowed from any one point on a grid to any other point following any particular graph. There will be a plurality of virtual energy pathways that connect any given source-sink pair on an electric grid network, and since there are many possible source-sink pairs there will be a very large total number of virtual energy pathways. Each energy pathway 2201 will have different attributes associated with it. It is thus possible for a customer, end user, generator, balancing authority, or other player interested in attributes of an energy pathway or the corresponding group of iNodes to take action based on these associated attributes. An exemplary response may be for a balancing authority to raise a transmission price, or for collective action of many market participants to do so, due to congestion on a certain path, or for an end user to demand "least-cost" for transmission or distribution of electricity, or both. By specifying end-to-end energy pathways, it is possible for a network to be managed in a plurality of ways that increase market transparency, fungibility of energy and externalities, and can increase efficiency. The use of virtual energy pathways linking sinks and sources is referred to as "nodal allocation" or "nodal management". For example, a developer may wish to transport energy from a currently un-developed or partially developed wind resource to a major metropolitan area 300 miles west of the energy resource. If the developer is unable to find adequate capacity on existing transmission lines in the region because they are grossly underinvested, instead of postponing the project until additional transmission lines are developed, the developer moves electricity generated at the wind resource over a combination of transmission and distribution lines to reach a storage facility near the metropolitan area that enables the developer to sell the energy produced. This may involve a plurality of utilities that own distribution or transmission assets, or both, between the wind resource and the storage facility, but via digital exchange 1000 and the associated control, modeling, pricing, event, transaction, and communications features of the invention the developer and the utilities are able to solve the problem in a way that enhances profitability and resilience of the system. Network flow paths or power quality is impacted directly by commands from digital exchange 1000 or from any similar server system to influence grid operations via communications interface 1032 based, at least in part, upon output from simulation and modeling server 2300 or statistics server 1030 which can be utilized to communicate with variable transformers (for instance to control tap ratio or phase shift angle), switched shunt control, other flexible alternating current transmission system (FACTS) devices or their direct current equivalents, or additional network control equipment via SCADA or similar systems.

According to a related embodiment of the invention, a server system, such as the server system comprising digital exchange 1000, is used to determine optimal transmission paths based on any number of parameters specified by a market participant to provide end-to-end transport for energy assets from source 2101 to sink 2105 across electrical grid network 300. These parameters may be stored on the server system of digital exchange 1000 or on a client system used to interact with digital exchange 1000 via Internet 1101 or a similar data network. The server system is able to provide "attribute-optimized" virtual transmission paths because losses can be effectively allocated to network users and losses, costs, and externalities can be controlled or reduced during an optimization process by simulation and modeling server 2300 or statistics server 1030 to improve overall system efficiency when possible by determining optimal flow paths and inducing particular flow patterns to serve loads as required. According to the invention, the term "allocated" herein means, "associated with, charged to, or linked to a given user". This represents an improvement over the present art because, currently, system operators, transmission companies, and other utilities often arbitrarily "allocate" losses to users without any rigorous analysis such as that provided by statistics server 1030 or simulation and modeling server 2300, or both. For instance, if a customer wishes to buy from a local plant but the most direct transmission route becomes congested due to high demand and prices rise dramatically, a new transmission pathway may be more cost effective if congestion costs are higher than extra transmission loss costs associated with the alternative pathway. Another potential situation is when a given customer wishes to purchase the cheapest possible electricity, or electricity with the least total overall impact on the environment (including environmental effects of energy delivery pathways used). In this case, transmission line costs represent a significant portion of a given power purchase that must be optimized to obtain least-cost electricity meeting a consumer's capacity and quality requirements. In a related embodiment of the invention, pricing server 1900 is used to calculate transmission fees payable to transmission and distribution network asset operators. Often, assets have carefully constructed capital recovery rates constructed by or in partnership with government agencies. Pricing server 1900 provides relevant pricing information to statistics server 1030 or simulation and modeling server 2300, or both, to enable them to complete calculation of an optimized energy pathway based on applicable preferences. It will be appreciated that, according to the invention, any organization or market participant in an energy grid may request attribute-optimized energy transport from digital exchange 1000, or based on analysis done by a participant or a third-party computer system. For example, it is not necessary for an end-consumer to directly receive the benefits of nodal allocation and attribute-optimized energy transport capabilities of the invention. It is possible for a load-serving entity to use attribute-optimized energy transport methods discussed herein to achieve cost savings that may, or may not, be provided to end consumers of the energy. In fact, entire companies or organizations could be constructed that either identify, or act upon, or both, arbitrage opportunities in electric grid networks to provide attribute-optimized delivery of energy assets from any number of sources and sinks on the network.

In another embodiment of the invention, pricing server 1900 computes fees associated with use of transmission and distribution assets and makes such information available to client systems interacting with digital exchange 1000. If requested by a user through a mapped client system, pricing server 1900 supports transmission cost estimation or analysis (including but not limited to optimization via statistics server 1030 or simulation and modeling server 2300, or both) to enable a client system to view some or all of the energy and externality assets, derivatives, and securities listed on digital exchange 1000 with a cost of transport included. Supporting "all-inclusive" or "end-to-end" pricing is an important feature of digital exchange 1000 that can significantly improve users' ability to interact with modern energy markets as they move towards fully liberalized and transparent structures that leverage the nodal allocation concepts covered herein.

FIG. 22 provides an illustration of an exemplary embodiment of the invention in which source 2101 is connected to a sink 2105 across electric grid network 300. In this example, there are three energy pathways connecting source 2101 with sink 2105, representing three selected combinations of transmission and distribution assets 2202 capable of transporting electricity from one node to the other. Above the physical network, iNode groups associated with the physical nodes and network paths are shown. Source iNode 2106 corresponds to source 2101, sink iNode 2110 corresponds to sink 2105, and energy pathway iNode groups 2201 each correspond with their respective physical network assets 2202.

According to the invention, utilization of iNodes and data network 301 linked to digital exchange 1000 can be used to provide additional means of managing market participants' interactions with electric grid network 300. The frequent monitoring and modeling of networks made possible by digital exchange 1000 via data network 301 with iNodes and simulation and modeling server 2300 enables market participants to buy or sell electricity of varying power quality (as well as capacity and total energy) from the grid. Due to the ability to allocate losses, ancillary services costs, externalities and other previously unallocated system components to network users, it is possible to provide opportunities for users to elect to sell or buy energy with varying quality depending on their needs, the system's ability to accommodate such needs, and the value of such energy. For example, a residential user who cannot afford electricity under a particular pricing scheme (for example, a time of use scheme) may elect to purchase energy "on the margin" (i.e. only when available) during peak hours, or to accept a lower quality of power (frequency fluctuations, voltage fluctuations, etc. . . . ), or to be treated as an interruptible load (for example, subject to automatic unloading without notice during times of system stress) in order to purchase power at a lower rate. Conversely, a data center providing website hosting services may wish to purchase power with an extraordinarily high power quality to minimize their systems' overall lifetime costs (which may be adversely impacted by voltage or frequency fluctuations). It is possible, via market activities on digital exchange 1000, to accommodate both scenarios by utilizing iNodes connected to digital exchange 1000. This enables user-specific (or even device-specific) quality of service delivery, which is achieved not only through varied reliability of power (for example, where a consumer with more elastic demand elects to participate in demand response more frequently), but also through power quality fluctuations (for example, frequency or voltage variance) such that overall welfare of consumers (especially those possessing more elastic demand curves) is improved. INodes are linked to physical infrastructure assets, some of which can be controlled via signals sent over data network 301. One such example is the use of an in-line transformer that is controlled via a matched iNode at a sink (for example, a residential user's meter or a connection from a grid to a data center) that can be used to enable participants to receive energy from transmission or distribution lines, or both, within power quality attribute ranges allocated to that nodal user via the marketplace on digital exchange 1000. In a related embodiment of the invention, iNodes and data network 301 provide a stable means of enabling transmission and distribution lines and assets to experience substantial changes in electricity flow or power quality without negatively affecting the provision of services.

In another embodiment of the invention, data gathered from transmission iNodes 2107, distribution iNodes 2109, and exogenous sources (including, but not limited to, utilities databases, AMI/AMR network provider databases, and the like) are evaluated by a statistics server or a simulation and modeling server (such as statistics server 1030 and simulation and modeling server 2300 on digital exchange 1000) in order to provide benchmarking data for a variety of market participants. Statistics server 1030 or simulation and modeling server 2300, or both, generate a number of important metrics and ratings such as efficiency ratings, peak utilization, average utilization, variance of utilization, power quality characteristics and variance of those characteristics as related to time or other characteristics or exogenous variables. It will be appreciated that any number of relationships may be explored by simulation and modeling server 2300 or statistics server 1030, or both, for a variety of purposes. For example, a common carrier's operation and maintenance of an asset may be compared with other similar assets or organizations, to provide market data and infrastructure data for market transparency, to refine simulation and modeling tools, or to improve operations or to schedule maintenance).

Figure 23:
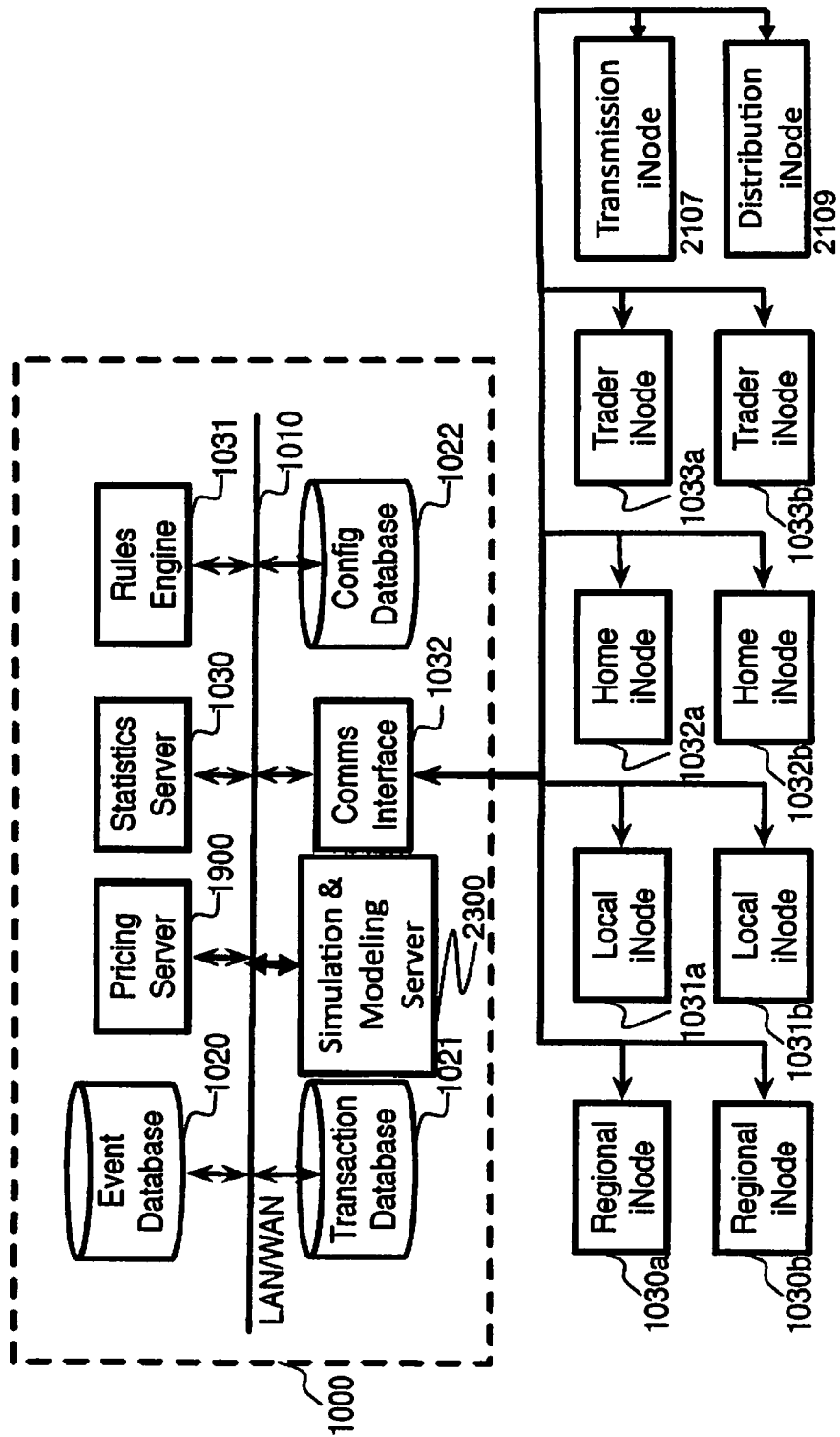
FIG. 23 is a block diagram of a digital energy exchange system according to an embodiment of the invention.

In another embodiment of the invention, and referring to FIG. 23, simulation and modeling server 2300, acting as a component of digital exchange 1000 (as shown), or as a standalone server platform communicating with components of digital exchange 1000 via communications interface 1032, performs a grid simulation to make possible performing "what-if" analyses to determine where the most cost-effective location is for new transmission lines. For instance, if there is frequent congestion along a particular route, the price of electricity for users who, at least in part, receive their electricity along that route may be very high. One method of lowering the cost of electricity may be to make capital investments in infrastructure in order to relieve the congestion. Simulation and modeling server 2300 is used to calculate a likely return on investment (ROI) of the new infrastructure by comparing a cost of building the new infrastructure against expected savings in electricity costs over a specified time period. As a further example, distribution-level ancillary services (for example, from distributed energy resources or demand assets) are a difficult problem to solve today due to challenges in controlling and monitoring the "last mile" of a system (referring to the last mile of distribution needed to get power to an end consumer). A distribution iNode 2109 is simulated for a large battery storage system on a distribution line, which could improve system reliability or enhance power quality, or both. The ROI of a battery storage system is calculated from the cost of a battery and the decreased operating expenses of maintaining voltage along that specific distribution line 2104. This information is utilized by digital exchange 1000 or a utility to justify rate recovery, to avoid capital expenditure fees or commissions, or to secure financing for a project.

According to the invention, many means of pricing transmission and ancillary services can be supported by digital exchange 1000 through the use of simulation and modeling server 2300 and pricing server 1900. For example, pricing server 1900 can compute a transmission charge directly related to the impact of each transaction on the system as calculated by simulation and modeling server 2300, while the ancillary services charges can be similarly computed by pricing server 1900 based on actual costs incurred on the system in order to accommodate a given transaction as calculated by simulation and modeling server 2300. Simulation and modeling server 2300 may use optimal power flow algorithms, constrained economic dispatch algorithms, or any number of algorithmic approaches to determine optimal paths for a given attribute (as specified by the user, regulator, or a third-party), although many other models for calculating optimal paths and the costs or prices associated can be similarly determined by digital exchange 1000.

According to another embodiment of the invention, and referring to FIG. 24, a server system, such as the system comprising digital exchange 1000, is utilized to provide a robust market for transmission rights trading that provides superlative opportunities to manage risk and reliability for market participants, regulators, and system operators. The ability to rapidly and accurately model and assign losses using simulation and modeling server 2300 (including incremental losses due to increased utilization) means that a hierarchy of transmission rights can be developed and allocated to market participants (by a regulator, an independent-system operator, a regional transmission organization, or via a market or auction). These rights may or may not have a hierarchy upon their issuance, but a secondary market can not only be utilized to provide a liquid marketplace capable of increasing market participant flexibility and reducing congestion, but can also be used to create a hierarchy of transmission rights that utilizes "tiers" or classes within each type of right (e.g. Physical, Financial, or Contracts for Differences). Each tier of rights is based upon incremental instantaneous losses associated with an increase in capacity of a given asset being utilized. For example, four regular classes of rights and one specialized right might be created as follows for a transmission line that has a normal operating capacity limit of 200 megawatts. In this instance, rights will be classified as A-E where A is the "highest" class or "tier". Class-A rights 2410 are created for a first 50 megawatts of capacity 2411 on a line, meaning that only losses 2412 that occur in the line if 50 megawatts of energy were passing through the line would be applied to users holding Class-A rights 2410. Similarly, Class-B rights 2420 holders might bear all of the marginal increase in losses 2422 associated with incremental capacity increase 2421 associated with increasing line utilization from 50 megawatts to 100 megawatts. This process continues for regular class C 2430 (with losses 2432 due to incremental capacity used 2431) and regular class D. A special class could be a specialized right (for example, an emergency right), which may or may not have limits on when or how it could be authorized for use. Specialized rights may be given only to specific user classes, or such rights may be freely available for any market participant to purchase. In this example case, a Class E special right provides a means of enabling line utilization to exceed its normal 200 megawatt operating capacity in order to operate at 250 megawatts for a given period. The Class E rights holder would again have to provide all of the energy required to offset higher line losses occurring due to increasing line utilization. Any number of schemes for assigning physical or financial responsibility for either losses or externalities, or both, can be developed using simulation and modeling server 2300, but this information is only of true value when linked to a market such as digital exchange 1000 that provides opportunities for managing such relationships in context with energy assets to be associated with such rights. Transmission-related securities may be traded in very small incremental units such that overall opportunities for risk hedging and arbitrage are increased. Smaller units also facilitate small entities' participating in markets by enhancing fungibility (and thereby reducing risk) associated with purchasing and holding many types of transmission-related rights. Large blocks of rights issued to market participants can be broken up and allocated to many separate parties in a secondary market. In a related embodiment of the invention, various classes of transmission rights have additional attributes, such as a 20-year term for Class A rights, which helps guarantee a revenue stream for a developer of such assets. Similarly, classes may be based on contractual agreements generated by digital exchange 1000, or interested parties, or both.

In another embodiment of the invention and referring to FIG. 25, a server system comprised of one or more of statistics server 1030 and simulation and modeling server 2300 automatically computes a total amount of generation assets required for purchase based on total requirements of an end user. For example, an end user wishing to deliver a specific capacity 2516 of energy at sink 2105 requests energy from digital exchange 1000 and is linked with source 2101 by digital exchange 1000. The exchange system, as previously described, determines an optimal energy pathway based on user preferences across electric grid 300 to provide an end-to-end solution for a market participant. Digital exchange 1000 calculates losses that the market participant will be required to absorb (comprising generation conversion losses 2511, transmission losses 2512, and losses due to ancillary services 2515 such as main flow support 2513 or auxiliary flow support 2514), and ensures that the participant purchases adequate energy capacity 2500 to cover all losses allocated to the particular energy transport transaction. Users may, or may not, be made aware that such losses were included in purchases of energy assets from one or more energy sources on electric grid network 300.

In another embodiment of the invention, an amount of excess energy required to maintain grid stability (for example, operating reserves or load-following reserves), is reduced. According to the invention, statistics server 1030, or simulation and modeling server 2300, or both, is used to forecast energy demand on a network. Forecasts may include any number of metrics already calculated by digital exchange 1000 to determine risk, reliability, efficiency, or other metrics related to electric grid management and resilience. Forecasts are used by statistics server 1030 to calculate resilience of an electrical grid network according to metrics specified by digital exchange 1000, third parties such as regulators, government agencies, consumer groups, or industry groups, or any combination of these. After calculating grid resilience for regions of a grid (in terms of space, or time, or both), a server system of the invention dynamically determines an amount of excess energy (otherwise known as reserves) that is required to ensure effective provision of services and stable operation of a grid based upon specified standards. Such standards may be stored by digital exchange 1000 in rules engine 1031, event database 1020, configuration database 1022, or any combination thereof. This dynamic system and method for managing excess energy required by a network significantly reduces overall system inefficiencies caused by inadequate tools to dynamically assess and manage risk, and allocates costs associated with such risks to network participants in a transparent way.

In another embodiment of the invention, it is possible to provide market-based mechanisms to enable self-regulation of frequency and voltage in an entirely decentralized manner with sufficient market participation by all connected sinks and sources on a network. The ability to allocate, and price, losses and marginal impacts on an interconnected grid network pertaining to each individual market transaction via digital exchange 1000 enables a homeostatic grid control mechanism to operate whereby a diverse group of market participants' individual interests provide sufficient grid stability and efficiency to no longer require active management, even though they may continue to require regulatory oversight and monitoring. Network connected iNodes are capable of sensing power quality characteristics (frequency, voltage, phase, and so forth), as well as a wide variety of pricing signals either directly linked to an electric grid network (for example, location-based marginal prices) or linked to other markets for related commodities (for example, natural gas, diesel, coal, carbon emissions, and so forth), such that iNode-controlled devices can automatically respond to optimize objectives at the asset level while communicating such responses to the network level to enable effective and stable system-wide management of energy resources.

Many well-known market mechanisms exist for managing commodity and online retail market that may be used by digital exchange 1000 according to the invention, and without departing from the scope of the invention. For example, while auction-type bidding for particular classes of capacity are possible, both with and without explicit inclusion of transmission-related costs associated with path-dependent losses and externalities along computed virtual transmission paths, it is equally possible, according to the invention, for digital exchange 1000 to carry out routine matching-type trading operations to connect sources and sinks while allocating transmission-related losses and externalities. When a sufficiently large number of market participants exists to ensure adequate liquidity, various bid-and-offer systems are envisioned in which digital exchange 1000 matches bids and offers to complete trades, possibly including market-level optimization of externalities or market-based stability constraints. That is, while carrying out routine trading operations in a manner analogous to those performed on established commodities exchanges, digital exchange 1000 of the invention may also preferentially match acceptable bids and offers such that, based on computations by simulation and modeling server 2300 (and possibly also or alternatively statistics server 1030), overall system stability is improved. For instance, when several acceptable bids are available to match to a given offer, digital exchange 1000 may select that bid to match which, taken in context of all other nearly simultaneous bids and offers being matched, will lead to the lowest overall transmission losses, or the highest overall power quality, or the best overall satisfaction of regulatory constraints, or a minimum overall environmental impact, or any combination of these and other similar factors.

According to another preferred embodiment of the invention, and referring to FIG. 26, an order to buy or sell a product listed on digital exchange 1000 is initiated by a client system or iNode 2600 (e.g. a Trader iNode 1033a or a Home iNode 1032a) and received by a server system 2610 on digital exchange 1000 via a communications interface 1032. Frequent listing information from digital exchange 1000 is sent to client system or iNode 2600 via push or pull reporting via communications interface 1032. In response to selection of an order execution action (e.g. a physical or virtual button that is clicked or depressed) or an automated signal received via an application programming interface or other system-level interface, client system or iNode 2600 sends a request to server system 2610 to purchase or sell a given product. The order or request (to buy or sell, etc.) is executed by server system 2610 based on client information stored on or accessible to server system 2610, including identification of a particular client system or iNode 2600 and energy resources or financial instruments directly referenced in a specific transaction or comprising a specific security or financial product. Client system 2600 receives and stores a client identifier as well as an event identifier associated with a given energy-related purchase or sale. Server system 2610 receives requests and combines client and event information associated with relevant client identifiers and energy resource identifiers into or with a given future or real-time energy security in accordance with stored billing, payment, account, or legal contract information whereby a client affects underlying energy or financial assets directly purchased or contained in a purchased security or basket of securities by initiation of an execution order from iNode or client system 2600 via an execution button, user motion, or signal. According to the invention, iNode or client system 2600 can also be a server for a subsidiary network itself. Communication between the various components referred to can, as is common in client-server environments, occur through the Internet 1101, a dedicated private network, or any other similar communications network. Communication to facilitate interaction in a client-server system according to the invention can be accomplished through a variety of protocols such as HyperText Transfer Protocol (HTTP), although more secure means may be utilized. Similarly, information presentation can utilize common web-based tools such as a Uniform Resource Locator (URL), web browsers (e.g. Mozilla Firefox™ or Internet Explorer™), and HyperText Markup Language (HTML). It is also possible, according to the invention, for interactions to utilize a proprietary communications protocol, methods for authentication and authorization, and non-repudiation using server system, or client system, or both (or within a subsidiary network of a client system) Other examples of communications protocols between client systems and server systems that might be used to facilitate interactions include well-known web services such as HTTP-POST methods using Remote Procedure Calling (e.g. XML-RPC) and protobuffers or widely used financial protocols used in algorithmic trading such as the Financial Information Exchange (FIX) protocol. Furthermore, server system 2610 can be one of any of the various server components, operating standalone or as a component of a larger server physical configuration, described above as server components of digital exchange, as further described in various exemplary embodiments below.

In another embodiment of the invention, an immersive method and system for presentation and management of energy-related information and securities comprising a client system or iNode 2600 (for example, trader Node 1033b, home iNode 1032b, or a commercial iNode) adapted to communicate with digital exchange 1000 via a communications interface 1032, a visual display 2650 comprised of a plurality of two-dimensional displays 2650a, three-dimensional displays 2650b, and multi-user collaborative interfaces 2650c, and an iNode or client system control interface 2651 capable of navigating iNode or client system displays 2652 and initiating execution orders, is disclosed. Typically control interface 2651 will consist of an alphanumeric input device which can be coupled with client system 2600, although a plurality of other control devices can be utilized (e.g. multi-touch surface computing interface where display and control interfaces are coupled, or visual sensing equipment that uses processors on client or server systems, or both, to recognize motions or auditory signals and thereby to control a client system 2600). According to an embodiment of the invention, an iNode, upon input from a client or a locally-connected client system 2600, graphically presents energy-related security information to user via the iNode or client system display 2652. INode or client system control interface 2651 is then used to control presentation of trading and electrical grid information based, at least in part, on a price of the presented energy securities. Optionally, iNode or client system display 2652 may present or require location or risk information, or both, associated with the presented energy-related securities or underlying energy-related assets. In many cases, a derivative, or rate of change, associated with various attributes of energy or associated externalities, or their underlying assets, may be desirable to present to users of client system 2600

In another embodiment of the invention, client system 2600 is comprised of a Personal Computer 1120 (or "PC") and a plurality of two-dimensional displays 2650a, three-dimensional displays 2650b, and multi-user collaborative interfaces 2650c can be connected to digital exchange 1000 via the Internet 1101 or similar communications network such that client system 2600 can be utilized to facilitate effective trading and management of electrical grid management and energy assets. Client system 2600 may, optionally, be connected to a control system (e.g. a building control system acting as an iNode) or may be connected only to digital exchange 1000.

According to embodiments of the invention, it is usually desirable to provide real-time or near real-time data and to support information transparency if operators and other market participants are to interact most effectively (or optimally) through markets. Multi-dimensional representation (for example, spatial and temporal representation) of a large amount of energy data, network data, financial data, externality data, user preference data, reliability ratings, or contract defaults provides market participants with an immensely improved experience that increases efficiency of human-machine interactions and provides more effective tools for automated decision-making, decision-support systems, or automated attention that can be facilitated by digital exchange 1000 or iNode or client system 2600.

The use of multi-user or collaborative operating environments, or both, for management of energy resources, electrical networks, or their related markets is particularly important to future management of electrical grids. According to the invention, iNode or client system 2600 can display large energy-related, risk-related, user-profile (including, but not limited to, behavior, type of participant, historical performance), and financial data sets using a special operating environment via two-dimensional display 2650a, three-dimensional display 2650b, or multi-user collaborative interfaces 2650c, and which can optionally incorporate multiple iNodes or client devices 2600 (e.g. traditional computers, surface computers, mobile applications) to form room-scale, building-scale, or organizational working environments. Moreover, iNodes or client devices 2600 can be connected, in parallel, peer-to-peer, or serial networks (or both) to form enterprise-scale trading and operations systems that can incorporate users from multiple geographic locations, business units, and even separate organizations or groups of organizations (e.g. associations of cooperative utilities who centralize trading and reliability management using markets to minimize costs and required expertise) if desired. This means that, according to the invention, large-scale applications that run interactively across one or more enterprise networks can be created using iNodes or client systems 2600 to interact with digital exchange 1000 either directly or via proxy, or both. These applications can then provide operators the ability to measure, monitor, assess, and predict performance of the system and of other market participants' performance. According to the invention, such combinations of tools for human-human interaction and machine-human interaction can best enable rapid incorporation of the latest sensing, data communication, visualization, computing, and interaction techniques to improve trading, risk management, energy asset management, and electric grid network management. Collaboration management and information management can, optionally, be accomplished via a variety of tools which authenticate user roles, data access, data ownership, and permissions to control common actions such as create, read, update, and delete (CRUD)

According to another embodiment of the invention, a participant graphically selects energy contracts or derivatives (which can include related externalities, or not), based upon the components of the grid which said energy resources affect, via an iNode or client system 2600, which subsequently communicates a "basket" of such energy assets or rights to server system 2610 for further review, analysis, purchase, sale, or "holding" as allowed by server system 2610. Additional contracts traded may also be reliant on energy or externality-related pricing, such as Energy Efficiency Asset-backed securities which depend on a value of energy savings as established from retail or wholesale pricing, at least in part, to provide cash flows to security holders.

According to the invention, this graphical selection of listed assets is made possible by metadata stored on server system 2610 and associated with given assets and products traded on digital exchange 1000. This information is then provided to iNode or client system 2600 based on preferences input by a user of iNode or client system 2600, which preferences can be stored on server system 2610 of digital exchange 1000, or iNode or client system 2600, or both. For example, preferences relating to geographic areas of interest may be stored on iNode or client system 2600 (or client server) and may be used to enable automated participation in, or decision support for, a given portion of market by an individual user or group of users. Storing and execution of preferences for a basket of traded goods combined with exact information about the nature of the traded goods on a physical network, and the optional ability to control eNodes via an iNode packet overlay network, will allow individuals to selectively participate in markets and to realize their preferences more exactly. Similarly trading or products related to actual goods traded on a physical network can be used to manage risk using similar concepts. For example, default swaps on demand response securities or on energy efficiency securities can be used by market participants. Users could choose to only trade in a specific item or class of items (whether classified according to physical or financial attributes) if they so desire, and thus elect to only visualize products and information related to such items or classes. For example, green energy-related products could be the only class of items of interest, and a user could restrict iNode or client system 2600 via preferences stored on iNode or client system 2600 to only present such information and metadata.

According to another embodiment of the invention, statistics server 1030 can be used to determine a particularly useful combination of assets, or securities possessing particularly useful underlying assets, that meet a given network participant's (e.g. an energy distribution company) compelling business need (e.g. voltage or frequency support). Although a physical outcome for commodities or externalities is often desirable, these assets can be commodities, derivatives, or any type of energy or externality-related asset which may affect the network participant. By automatically grouping many energy assets into securities or aggregated assets and presenting those to a user via a visual display, based on the most relevant combination of assets according to user specified preferences in server system 2610, trading systems, according to the invention, are capable of continuously improving relevance of complex securities and aggregated energy resources presented to market participants. According to the invention, this combination of energy assets may utilize forecasted network performance data (e.g. demand, supply, frequency, losses, voltage, etc.) or real data from a variety of exogenous sources (to include third parties or synchrophasors), or both. According to another embodiment of the invention it is possible for iNode or client system 2600 to determine a particularly useful combination of assets from one or more digital exchanges that may include digital exchange 1000. User participation in a market using statistics server 1030 to select or analyze potential securities or financial products of interest might be presented to a user for final confirmation or selection, but both the client or server system might be used to automatically select and purchase securities for a user of an iNode or client system 2600. Selection of securities might be computed based on a number of attributes (for example, minimizing cost or risk), but might also be based on additional factors (for example, user comfort in a facility) Actions taken on behalf of a user may include purchases from a market on digital exchange 1000 as well as authorization of listing or sales of assets or products into a market. As an alternative to direct action based on single or multiple user objectives alone or decision support requiring user confirmation, actions may be taken by iNode or client system 2600 or server system 2610 in digital exchange 1000 based on an inferred user decision intended to facilitate participation in the market as if the user selected the action directly According to another embodiment of the invention, it is possible for iNode or client system 2600, or a subsidiary network connected through an iNode or client system 2600 or an additional external network, to provide similar calculations such that an optimal "basket" of energy or externality rights, assets, or products can be constructed to meet a relevant business need. According to a related embodiment of the invention, pricing server 1900 can calculate an approximate or exact value of a set of energy assets packaged by digital exchange 1000 or pricing server 1900 such that a final purchaser can be charged some portion of the value of the transaction for the service provided in aggregating assets and rights by statistics server 1030 or by a third party. This means that pricing server 1900 can optionally be used, at least in part, to determine or compare a commission or fee levied on a given transaction or to perform "push reporting" or automated intelligence to an end-user based on data available from either exogenous sources (e.g. the Internet 1101) or digital exchange 1000, or both.

In another embodiment of the invention, pricing server 1900 of digital exchange 1000 obtains information from either event database 1020 or transaction database 1021, or both, at least in part to calculate a commission or transaction fee due to digital exchange 1000. Fees calculated by pricing server 1900 can include a variety of attributes based on any of preferences or rules set by digital exchange 1000, iNode or client system 2600, or an external party (for example, the Commodities and Futures Trading Commission or government agencies). Fees calculated by pricing server 1900 can then be recorded either instantaneously or in periodic intervals, or both, in transaction database 1021. Additionally, fees calculated by pricing server can be compared to historical averages, predicted fees, revenue projections, and a plurality of other data sets by statistics server 1030 which results may be held only for digital exchange 1000, or may be released by digital exchange 1000 to other individuals. It is also possible, according to the invention, for statistics server 1030 to calculate cost savings or other similar benefits for a market participant to change their account type (i.e. the legal nature of their relationship with digital exchange 1000 as expressed via a combination of trading and data volumes, allowances, fees and related requirements for margins, risk exposure, or other common requirements imposed by exchanges on members or traders on such platforms) such that a user can make better informed decisions about optimal means of structuring their relationship with digital exchange 1000 or other market participants. Pricing server 1900 of digital exchange 1000 may, optionally, be used to obtain fee information for client transactions which may be assigned to a different named user or legal entity that that which completed a transaction. For example, a client trading iNode (e.g. an electric vehicle) may connect to digital exchange and provision energy required for charging, but the fees for the transaction may be ascribed by pricing server 1900 to an electric-vehicle subscription service provider or similar power marketer (e.g. a transportation marketer or rental car company) which uses digital exchange 1000 to serve its customers but manages charges for energy or transaction fees, or both, due on the exchange on the clients behalf According to another embodiment of the invention, various metadata attributes (including, but not limited to, risk, reliability, energy, capacity resilience, or capital cost) pertaining to physical network assets or energy assets, as well as metadata related to derivatives of energy and financial products and assets, can be displayed to users with any of graphical, auditory, or sensory symbols and information. This information can be prioritized by server system 2610 on digital exchange 1000, a third party system connected to iNode or client system 2600 via the Internet 1101 or a similar communications network, or by iNode or client system 2600 itself. Prioritization of available energy, financial, risk, and other data can be based on participant-specific information stored on server system 2610 (at digital exchange 1000 or a third party location) or iNode or client system 2600. This hierarchy of data presentation can be determined based on participant-specific preferences or user-specific preferences (where "user" refers, for example, to a particular individual on a participant client system or client network system). Moreover, it is possible, according to the invention, for this hierarchy of information to be determined based on user surveys initiated by either iNode or client system 2600 or server system 2610 (again located either at digital exchange 1000 or at a third party location), or both.

According to another embodiment of the invention, a trading iNode 1033b has the ability to automatically execute trades using algorithmic trading strategies based on user information stored on exchange server system 2610 and on data feeds, either pre-processed or unprocessed, from synchrophasor measurements, other modern sensing technologies, network information, or pricing information which are obtained either directly by trading iNode 1033b (e.g. via local sensors or third-party services) or via digital exchange 1000. The ability to leverage such data feeds, often obtained through Supervisory Control and Data Acquisition (SCADA) or similar systems, but which could also potentially be obtained from any third party, is key to providing low-latency or high-frequency trading such that digital exchange 1000 is capable of utilizing many disparate energy assets to provide additional ancillary services (e.g. voltage support, frequency support, etc.) from assets which remain unallocated or activated during an energy event where absorption or discharge of energy from or into an electrical grid is beneficial or necessary. According to the invention, it is also possible for iNode or client system 2600 to utilize many disparate energy assets to provide direct aggregation of energy assets and only purchase unpackaged energy assets, or some combination of packaged and unpackaged assets from digital exchange 1000 or third parties. This means that iNode or client system 2600 could be used to choose to purchase, and optionally aggregate, assets from any of digital exchange 1000 and any combination of asset holders (e.g. direct clients, third parties, etc.), to develop structured or unstructured financial products from said assets, and to relist them or sell them to counterparties on digital exchange 1000, in other markets, or in bilateral agreements According to another embodiment of the invention, it is possible for a trading interface such as described above to also interact directly with exchanges of related commodities and derivatives exchanges or regulated-markets or OTC market-makers unrelated to digital exchange 1000. In this way, it is possible for users of the invention to simultaneously interact with wholesale energy, retail energy, other commodities, financial, and energy or externality-related derivatives markets simultaneously or nearly so, and to have combinations of products from one or more markets presented to them. For example, insurance products, coverage products, or derivatives capable of hedging risk exposure to fluctuations in energy costs or demand response failures might be presented to a user. This placement may be done by digital exchange 1000 or by a third party using data provided, at least in part, by digital exchange 1000. Recommendations may, optionally, be derived from past use of digital exchange 1000, or from an estimated profile of a user, which can be constructed by statistics server 1030 and relies on participation data from similar users. Alternatively, recommendations may optionally be derived based on risk exposure, actual or forecast network conditions, and actual or forecast data pertaining to products being viewed, purchased, or already purchased by user via an iNode or client system 2600. According to another embodiment of the invention, digital exchange 1000 or third parties may optionally present (or provide) additional information or products to users of client system 2600. This placement or provision, or both, of additional information, such as advertising, or additional products might be offered to users to improve user experience, reduce their risk, reduce transaction costs on the exchange, or any other business enhancing procedure or may solely be to generate additional revenues. For example, a third-party may be willing to pay for a coverage contract protecting an end-consumer's option to purchase energy to recharge their vehicle at some point in space-time as a result of the consumer holding the third-party's brand of credit card or as a means of targeting potential clients as part of a marketing campaign.

According to another embodiment of the invention, any server system connected to an iNode or client system 2600 via the Internet 1101 or similar communications network can be utilized for presentation of multi-dimensional (e.g. spatial, temporal, etc. . . . ) data related to a continuous flow electrical grid network. According to a related embodiment of the invention, any client system acting as a server for a subsidiary network can be utilized to interact with digital exchange 1000.

According to another embodiment of the invention, energy market information (e.g. transmission and distribution losses, energy generation type) can be integrated with other metrics related to environmental impact to provide a representation of externalities associated with a market participant's actions. This integrated information would improve decision-making and global efficiency of energy provision by allowing this information to be communicated on digital exchange 1000. Improved representation and accounting of losses and environmental impacts will increase transparency and improve pricing of goods on digital exchange 1000, especially if externalities become taxed or otherwise acquire value. Market participation could be modified to reduce net energy impacts between and during energy transformation events. For example, an iNode or client system 2600 might initiate trades that use information other than, or in addition to, cost such as environmental externalities. For example, statistics server 1030 can be used to compute externalities associated with a point-to-point energy transaction across a network that might be used by a user to procure power from digital exchange 1000.

According to another embodiment of the invention, iNode or client system 2600 can display information pertaining to other market participants or products on digital exchange 1000, or both, from either information stored on iNode or client system 2600, or on server system 2610, or on both. This information can be used by a user of an iNode or client system 2600 to enable a market participant to better understand additional information (for example, related to risk or reliability) associated with a given party, asset, derivative, or other product on digital exchange 1000. According to the invention, these additional attributes or metadata related to a particular participant or listed product can consist of various shapes or symbols that can be defined, at least in part, by a legend made available to a participant via iNode or client system 2600. According to a related embodiment of the invention, these symbols, colors, or other visual cues can also refer to energy assets or products that remain unallocated, are unprotected by additional measures to hedge against risk (e.g. an energy-default swap), or have some other attribute that is of interest to a user of iNode or client system 2600. It is also possible for such symbols, colors, and visual cues to be used in conjunction with auditory signals to alert users about a change in attributes such as risk, or in likelihoods of certain events occurring (for example, the probability of congestion occurring in a given region to which a participant has exposure or has indicated interest reaching a specific threshold), or about execution of a specific market transaction.

According to another embodiment of the invention, it is useful in operation of digital exchange 1000 and for market participants interacting with digital exchange 1000 to maintain a participant profile generated by statistics server 1030. This participant profile can be made available, or not, to market participants in general, or only to market participants acting as counterparties with the party to whom a specific profile pertains. Participant profiles can optionally be made available in their entirety or in part either before, during, or after a transaction via digital exchange 1000 takes place. Moreover, it is possible for release of profile information to take place based on rules specified by digital exchange 1000, on preferences of the participant, on preferences of a counterparty, or even on some combination thereof. Similarly, participant profile information can optionally be made available to users through third parties.

According to another embodiment of the invention, iNode or client system 2600 (or a client subsidiary network) can be used, at least in part, to upload information pertaining to energy-related or externality-related assets, indices, derivatives, or other securities that may be traded in other markets that are connected to the Internet 1101 or a plurality of similar communications networks. It is possible, according to the invention, for these additional products or assets to be incorporated into iNode or client system 2600 or server system 2610 related to digital exchange 1000, or both. Once incorporated into a portfolio associated with a given user, iNode or client system 2600 or digital exchange 1000 can calculate listed products related to the new portfolio of assets associated with a participant or only products related to a newly-added externally-traded product or asset. It is also possible, according to the invention, that a participant may use external markets to balance physical or financial risks associated with holdings on digital exchange 1000. For example, digital exchange 1000 can require users of a given class of assets to restrict their financial exposure to a given amount given some combination of factors calculated by statistics server 1030 as specified by digital exchange 1000 or by some third party (including, but not necessarily, a regulator). If a participant wishes to purchase more assets than would otherwise be allowed by digital exchange 1000 due to such restrictions on participant exposure, it is possible for the participant to reduce his exposure by obtaining protection from other markets or external parties in bilateral agreements. This is especially true if such products for risk management are not available on digital exchange 1000 directly. Information provided by iNode or client system 2600 can be sent to server system 2610 via communications interface 1032 and then validated by a participant profile server 1910 which communicates with digital exchange 1000 or a party that has provided external risk balancing for a participant via communications interface 1032. After the participant's external protection has been validated, statistics server 1030 recalculates the exposure available to the participant, such that participant is once again able to continue trading without a violation of regulations or contracts relating the participant to digital exchange 1000.

According to the invention, although digital exchange 1000 may, optionally, rely on a system of bilateral risk management tools such as those defined in the 1990s, it is desirable that more holistic methods be used to balance risk in the overall systemThis can help ameliorate challenges and shortcomings of such systems, which contributed to the Enron debacle and collapse. According to an embodiment of the invention, digital exchange 1000 may elect to use either multilateral netting or clearing, or both. Netting can be defined as the offsetting of positive credit exposure on one set of transactions with negative credit exposure on another set of transactions. Digital exchange 1000 may, optionally, establish a master netting agreement that can reduce potential discrepancies in legal attributes between market participants. Clearing requires that a bilateral transaction is broken up into two separate transactions and a central institution is substituted as counterparty to each original leg. For example, a system of multilateral netting and clearing can be used to offset and reduce overall risk in the system. This can help reduce overall credit risk (defined as the potential loss resulting from the failure of a counterparty to perform under a contract) in the market. Client systems may, optionally, be required to report current credit risks or margins that may be used by digital exchange 1000 to a risk management server 2630 in order to properly manage client system access or provide information to appropriate authorities as required by law. Risk management server 2630, in various embodiments of the invention, receives risk-related data from clients or from statistics server 1030 and computes aggregate risk profiles for given participants or securities, and optionally applies risk management business rules to determine what actions are required based on a given risk exposure. Risk management server 2630 may optionally be an additional set of business rules within rules engine 1031, or a set of additional statistical computation implemented in statistics server 1030, without departing from the scope of the invention. Similarly, risk management server 2630 will, in some embodiments, be architected as a set of distributed server applications, without departing from the scope of the invention. It will be appreciated by those having ordinary skill in the art that there are many functionally equivalent ways of architecting or arranging the functions described herein pertaining to risk management server 2630, and the arrangement shown in FIG. 26 is for illustrative purposes only.

According to another embodiment of the invention it is possible for a participant to specify a range of preferences that are communicated to server system 2610 and stored either on participant profile server 1910 of digital exchange 1000 or on a third-party server system, or both. These user preferences can indicate a great deal of information that can be utilized by server system 2610 to represent a participant's interest, or a group of participants' interests, in accordance with preferences specified such that their interactions with a market can be simplified greatly. While this is expected to most commonly apply to market participants who are not likely to be frequent traders and active speculators with their energy and externality assets (e.g. small businesses and homeowners) it is possible that more sophisticated organizations may elect to use similar services. These preferences for interaction with a market must be characterized in such a manner that machine interactions become clear to users and are easily understandable for planning purposes (e.g. in a home or business). According to the invention, energy assets (including but not limited to loads, generation, storage, or transmission rights) held by a user are presented either spatially or temporally, or both. Thus a user is able to manage preferences in a thoughtful and simple way that is somewhat analogous to "frames" of film that can be advanced or retracted to see changing values and system parameters. Furthermore, within each spatial or temporal "frame" a user can specify "bins" which each possess preferences relating to either control or trading of energy assets, or both. For example, a residential user can have six frames with which to organize loads in their home: early morning, late morning, lunch, afternoon, dinner, and evening. Within each frame, a residential user might have four bins with which to specify preferences for control or trading of their energy assets during that frame: "never control", "control whenever", "control for short periods", and "control only if not present". Thus, a user can arrange her home appliances into bins as desired within each temporal frame. More sophisticated users may wish to utilize spatial representations, especially if they have energy assets in a variety of geographic locations. For example, a participant with a properly mapped iNode or client system 2600 may wish to control assets at multiple buildings (e.g. a commercial property manager or cooperative). Additional preference setting features can include additional attributes or affinities related to control of energy consumption, generation, storage, or transmission. For example, it is possible that a user can create "bins" relating to particular energy types they wish to utilize to operate given devices and specify that such devices only run on such energy types (e.g. produced locally or solar only). According to the invention, it is also possible for a user to communicate information enabling iNode or client system 2600 or server system 2610 to automate trading or control based on an opportunity cost expressed by a user. Users may be able to specify business processes, comfort metrics, or individual appliances or tasks' importance based on "frames" for available incentives. For example a user may specify their willingness to change the temperature in their home or business in exchange for ten dollars per hour, twenty dollars per hour, or one-hundred dollars per hour This enables the client-system 2600, a third-party, server system 2610, or digital exchange 1000 to take automated action on their behalf or provide decision-support. This can enable a users to interact with the system based on their unique Quality of Service requirements to better attempt to achieve an optimum individual solution. Other users may set preferences that only enable digital exchange 1000 or iNode or client system 2600 to utilize their energy assets at higher values due to a higher actual or perceived cost associated with altering their behavior (e.g. an office building may only be willing to enable its HVAC equipment to stay off for 30 minutes or less, in order to keep workers cool on a summer day, unless there is a major pricing event such that the value of behavioral change may be extraordinarily high). In some cases, participants may indicate a preference based on attributes other than monetary compensation as primary or subsidiary tools for trading. For example, a user may generally wish to be paid a great deal for conservation during dinnertime, but if server system 2610 indicates that conservation will have a low monetary value but a strong effect on carbon emissions or some other externality a user may nevertheless elect to participate. It is possible, according to the invention, for server system 2610 to have determined such externalities from simulation and modeling of an electric grid system on simulation server 2300 (which may, according to the invention, be directly coupled to or connected via an external communications network to server system 2610), such that such externalities, or reduction thereof, can be attributed to the specific participant. According to the invention, methods for setting preferences can also include bins or frames for scheduling and planning for energy or externality events. For example users can assign various assets to bins or frames indicating amounts of time a user wishes to have in order to decide whether or not to participate in a given event. One such example would be a where a large manufacturer of aluminum is willing to shut down its operations, entirely or in part, depending on the value of the electricity they would otherwise be utilizing, if they are given adequate time to plan. Such a user can specify that two weeks' notice is required for a 50-megawatt reduction, where the entire plant would be shut down, but that only 5 hours' notice is required for a 5-megawatt reduction. Again, these different notification and confirmation requirement preferences can also include additional attributes like price windows, externalities to be saved (which may or may not be attributed to the user), and other metrics of interest, as specified by a participant using iNode or client system 2610. According to the invention, this system can be utilized such that users can elect to automate their participation with market structures entirely, or they may choose to automate participation for events within a specific range of specified parameters only and manually control their system for others, or they may request only to receive decision support which enables them to be informed by the system but to manually execute controls to execute any resulting decisions. According to a related embodiment of the invention, a user's range of acceptable operational parameters for a network connected device or system which is capable of interacting with markets might have a user-specified range of acceptable operating values for varying levels of compensation. This operational window can then be used by iNode or client system 2600 to control and dispatch loads within said operational window such that iNode or client system 2600 optimizes its local system based, at least in part, on forecast or actual prices for energy or externality-related products on digital exchange 1000.

In another embodiment of the invention, a user requests that digital exchange 1000 provides iNode or client system 2600 with pricing associated with energy transport across an electric grid. Pricing server 1900 can then communicate this information to iNode or client system 2600 such that pricing of energy assets, as viewed on iNode or client system 2600, can be viewed as "all-inclusive" prices. This means that a user would be able to view energy assets priced based not only on the asset itself, but also including all delivery costs across one or more network to a location specified by the user. It is also possible for a user to specify a number of favorites, such that common delivery locations can be stored on either iNode or client system 2600 or server system 2610 (such as participant profile server 1910), or both. In this example, iNode or client system 2600 can be used to procure energy in a node-to-node or point-to-point transaction across an electric power system such that a user of iNode or client system 2600 may interact with only relevant data. In this case, iNode or client system 2600 receives inclusive pricing information from digital exchange 1000, more specifically pricing server 1700, which is then used by iNode or client system 2600 to select optimal products or groups of products to meet a specific need required by iNode or client system 2600 or its user. According to the invention, it is also possible that iNode or client system 2600 may optionally compute some or all-inclusive pricing of energy transactions across digital exchange 1000. In a related embodiment of the invention, pricing server 1700 or iNode or client system 2600 may provide inclusive pricing of multiple assets to end users for other purposes. For example, an end user participating in a market may wish to purchase energy efficiency asset-backed securities with a limited range of exposure to energy prices' effect on performance of the target security. Digital exchange 1000 may be provided with information pertaining to overall investment risks and criteria desired by an end user via a network-connected iNode or client system 2600 communicating across a network such as the internet 1100. Digital exchange 1000 or a third-party, based at least in-part on data from digital exchange 1000, may then recommend a combination of financial products which effectively limit risk in the desired area, in this case risk that energy savings will be adversely affected by energy prices and that a value of an asset-backed security financing energy efficiency projects which depend on the value of such savings will thus deteriorate. In this case, energy efficiency default swaps, an insurance policy, a coverage contract, or a number of other products may be recommended to reduce risk exposure or complexity to an end userThis type of service may be especially valuable as end users become increasingly active in markets at the retail level over time.

According to another embodiment of the invention, similar systems and methods discussed for applications related to continuous flow electrical grid networks could be applied in similar fashion to other continuous flow energy networks such as natural gas.

FIG. 27 provides an exemplary embodiment of a streamlined order execution process according to the invention. In a first step 2700, an order to buy or sell a product listed on digital exchange 1000 is initiated by a client system or iNode 2600 (e.g. a Trader iNode 1033a or a Home iNode 1032a). The order initiation request is received in step 2701 by a server system 2610 on digital exchange 1000 via a communications interface 1032. In optional step 2703, frequent listing information from digital exchange 1000 is sent to client system or iNode 2600 via push or pull reporting via communications interface 1032. In step 2703, a user (or authorized electronic agent on the client system acting on the user's behalf) initiates an order execution action (e.g. a physical or virtual button that is clicked or depressed), or an automated signal received is generated via an application programming interface or other system-level interface, and in step 2704 client system or iNode 2600 sends a corresponding request to server system 2610 to purchase or sell a given product. The order or request (to buy or sell, etc.) is executed in step 2705 by server system 2610 based at least in part on client information stored on or accessible to server system 2610, including identification of a particular client system or iNode 2600 and of energy resources or financial instruments directly referenced in a specific transaction or comprising a specific security or financial product. Client system 2600 receives and stores a client identifier in step 2706, as well as an event identifier associated with a given energy-related purchase or sale. In step 2707, server system 2610 receives requests and combines client and event information associated with relevant client identifiers and energy resource identifiers into or with a given option, future, or real-time energy or externality security in accordance with stored billing, payment, account, or legal contract information whereby a client affects underlying energy, externality, or financial assets directly purchased or contained in a purchased security or basket of securities by initiation of an execution order from iNode or client system 2600 via an execution button, user motion, or signal.

In another preferred embodiment of the invention, a Multidimensional Energy Decision System [MEDS] is provided, which is a form of a linked building optimization and demand response platform that overcomes one or more of the previously discussed limitations through use of a series of decision processes capable of pushing intelligence to the edge of a grid to better enable decentralized management via participation in local and global energy, externality, and capital markets. A key innovation is that users are connected to a series of technologies which are capable of providing reactive and proactive control responses, allowing such technologies to infer desired user decisions based on an effective linking of decisions (i.e. user actions or choices) to tangible outcomes (e.g. comfort, business processes, etc.).

This concept is based on a synergistic pairing of information extraction from building automation, control, and monitoring systems with directly created content from users of said system. Observed information that may be extracted may include (but is not limited to) one or more device run times and efficiencies, as well as internal or external temperature and humidity data, and other building-specific or system-specific information, whereas user-generated content will include information relating preferences for comfort, business processes, or other tangible attributes with a relative importance that can be defined on an objective scale of any type (e.g. value in dollars, importance on a scale from one to ten, or any other objectively measurable or computable scale considered relevant by users).

In summary, an MEDS system comprises:
one or more buildings, campuses, or microgrids, each comprising:
physical systems capable of engaging in automated controls routines via a network connection;
physical connections to energy transfer locations where energy can enter, exit, be stored, transformed, switched, redirected, or measured, and;
a means of providing for interaction with humans or machines which are operating, at least in part, at the location;
a server system connected to a network such as the internet; and,
a connection to an energy distribution system (to include via the internet) such as the electric distribution system.

The system is characterized by the fact that a combination of machine learning (or any other artificial intelligence method) may be applied to observed data in conjunction with user-supplied information such that consumers' energy choices can be refined, automated, or both, in whole or in part based on local (i.e. site or building-level) needs as well as global needs (i.e., of an electric grid or segment thereof, or of a large corporation's overall energy management systems).

System according to the invention are strongly differentiated from existing solutions that focus on traditional technical metrics such as kilowatt-hours kW-h by its capability to relate energy consumption or cost-savings, or both, to business processes, user comfort, or other metrics, thus enabling users to make effective decisions.

In one embodiment of the invention, users are able to interact with an event-based system that simplifies complex temporal decisions such that users can interact with decision variables (i.e. choices) in discrete groupings or time periods hereinafter referred to as events. According to the invention, these events may be presented to a user in a variety of ways (for example, in a calendar or on a timeline) and through a large number of different electronic media such as web-based applications or pages, thermostats, mobile applications, trading interfaces, or even print media.

According to the invention, an event can be defined as a behavior-based activity that spans a time period that is either discrete or can be discretized by a server system such that a user can interact with it in a discrete form. Events may be defined based on common scheduling attributes such as hour, day, week, or by any combination of metadata from local systems (for example, building monitoring or control systems) or from exogenous information (for example, information pertaining to a heat wave), which may define a unique occurrence. Each discrete event can be depicted graphically to a user such that it is possible to comprehend temporal range of the particular event and such that any data pertaining to a decision faced by a user can be visualized. For example, a user may view a calendar that provides an event-based mechanism for viewing thermal comfort standards (for example, Fanger Predicted Mean Vote human thermal comfort index as defined by ASHRAE), based on expected, likely, known, or forecasted costs associated with maintaining that particular decision variable in an indicated range of values or at a specific value. According to the invention, selected decision variables may be determined by user preferences stored on a server system or may be determined automatically by a server system. Other examples of decision variables may be "dollar value saved", "kilowatts of capacity reduced", "kilowatt-hours of energy reduced or delayed", or a quantity of an externality such as carbon that results from a user's actions during a discrete period. Other metrics may be more user-specific (for example, hamburgers per kilogram of carbon emissions for a fast-food restaurant) or may relate to specific business processes of one or more end users at a given site or across a portfolio of sites. Additional comfort metrics may include indoor temperature and humidity readings. A simple example of this is shown in FIG. 28.

FIG. 28 illustrates an interaction process, according to the invention, between a user loop 2801 and a machine loop 2800. In a user loop 2801, users conduct interactions 2811 via one or more user interfaces known in the art, using information pertaining to schedules, contracts, and performance 2812 (and provided to support user interactions 2811 via one or more information flow paths 2823), in order to send decisions and information 2821 to change existing or create new schedules or contracts 2812. In a machine loop 2800, information about schedules, contracts, and performance 2812 is passed via a variety of means 2822, such as web services or remote procedure calls for example, to enable automated information extraction 2810 and processing, with the results of that processing being fed via interfaces 2820 to change existing or create new contracts, schedules, or performance 2812. The interaction of user loops 2801 and machine loops 2800 allows for improved decisions 2814 and for the collection and dissemination of improved data 2813 to allow more dynamic management of energy usage and devices.

For example, in an embodiment, drilling through discrete event data may be accomplished through a variety of user interactions 2811 conducted via various user interfaces known in the art, including for example web-based and mobile applications. User interface actions involving a discrete event may involve drilling down into event components (forecasted via simulation or extrapolation of historical data, or both), which can enable users to exert more direct control over specific actions and their associated economic or comfort metrics. Associated economic and comfort metrics presented to a user may include a cost to maintain thermal comfort levels at a given level or within a given range for a specific decision period (for example, a user may be willing to spend up to $25 to maintain a 72 degree Fahrenheit indoor temperature instead of letting a building cool to 71 degrees Fahrenheit on a cold morning) By using an event-based methodology for assessing decision variables and outcomes associated with energy transformation events, it is possible to better enable users to relate to energy markets which are coupled to their local systems or microgrids. It is through marginal decision-making and user feedback that users can train machine systems to take actions on their behalf that enable them to better participate in highly dynamic and volatile markets. According to the invention, it is possible for automated decision-making, data presentation and intelligence, or decision-support to involve numerous different forward or past time periods as part of a decision for any given event. For example, it is possible that an MEDS system of the invention may present a user with decisions related to suggested temperatures for an upcoming business day based on a yearly budget which may include past information pertaining to expenses in the given fiscal year as well as forecasts of energy consumption and cost.

Due to extreme volatility of prices in wholesale markets and in view of likely continued deregulation of electricity markets (which will further expose consumers to that volatility), marginal decision-making is an important evolutionary step towards a more responsive electrical distribution system; however, current systems remain inadequate for future needs. Simply put, the latency and uncertainty associated with human interactions with systems will typically be detrimental to larger systems, and end users can be better served by automated processes, which manage their relationships with external markets, at least in-part, on their behalf.

According to another embodiment of the invention, an MEDS system may also utilize intelligent methods of machine communication to obtain additional information from building occupants or microgrid users (whether machine or human). The use of an expert machine system to communicate with end users can provide additional information aiding MEDS systems in marginal decision-making. Communication methods may include a combination of text-based, numeric, or voice-based interaction frameworks. For example, the use of a server-based or client-based expert system (or some combination of each) using text-based chats can be used to communicate with users to ask whether or not they are actually too warm or if in fact they may desire their HVAC system to reduce indoor temperature at a marginal time. This can allow MEDS system according to the invention to further improve operational schedules based on confirmed constraints relating to business processes or comfort throughout a discrete time period. In this example, an office manager might respond via a chat window on a client system (e.g. a computer or mobile device) that a current temperature is sufficient and requires no change. An MEDS system, through an expert communication system, may optionally elect to provide additional metadata to users in messages sent to users, in order to aid users to better make decision on the margin. For example, an expert communication system may ask a user whether she would like to reduce an indoor temperature by 2 degrees Fahrenheit, or if she would prefer to save fifty dollars in an upcoming marginal decision period. In another embodiment of the invention, users are able to submit notifications to an MEDS system according to the invention, to initiate expert system response For example, a user may submit a message via a text-based interface from a client system, as previously described, stating that they are vacating a specific premises, or noting that comfort is unsatisfactory. In these examples, an expert system can deduce actions to take in order to remedy a situation noted by a user, if it is so configured. In this example, an MEDS system may, in response to user notifications, change current occupation settings for a selected area to "unoccupied" or reduce building temperature in the zone from where a complaint originated, respectively.

According to another embodiment of the invention, an MEDS system can connect to a background application which can be running on client systems that draw electric power, at least in part, from an MEDS-connected system. An MEDS server, located either onsite or at a remote data center, can connect to client devices directly or through any number of intermediate connections with other devices (e.g. through peer-to-peer networking), or both. Client systems (for example, office workstations, desktops, laptops, mobile devices, servers, and the like) running such a background application can be controlled individually or in aggregate groups of various sizes, or both, such that energy consumption can be altered. According to the invention, a number of techniques for limiting or controlling energy consumption may be initiated by an MEDS-connected application communicating with a client system. These may include varying processor speed, reducing telecommunications bandwidth, dimming monitors, changing performance of storage (e.g. hard drives or solid state memory), hibernating or shutting off machines, or any combination of these and other energy-affecting actions that can be taken in regard to client or server systems, many of which are well-known in the art. Again, through the optional use of an expert system, an MEDS system according to the invention may communicate directly with human or machine users to determine whether energy-saving measures are too extreme or alternatively could be made more aggressive at marginal times. For example, a chat window may be opened by a foreground or background application running on a network-connected client system that queries a user to ask if current machine performance was adequate or was negatively impacting the user's performance. This concept, similar to the marginal temperature considerations described above, can be used to better adjust forecasts for future energy events as well as to take action during a marginal event being considered by an MEDS system at the time of an information request. Furthermore, according to the invention, a background application may optionally track performance utilization of central processing units (CPUs) and other onboard equipment of client systems. This information may be relayed to a local MEDS server which can, in turn, send this information individually or in aggregate to a cloud-based MEDS system where additional expert systems and analysis techniques can be used to process data. This can enable a local or distributed MEDS system to present client systems' owners with information related to actual utilization of their client systems along with estimates of potential savings that could be achieved through hardware or software updates, or both. For example, a series of high-powered desktops might be replaced by a series of laptops. According to the invention, use of such data to direct advertisements to users directly through an MEDS system, through third-party applications and websites, or to sell data enabling others to target end-users for software, hardware, or other products related to this process is an important optional component of MEDS systems according to the invention. In another embodiment of the invention, an MEDS system uses an expert system to monitor and optimize temperature-controlling devices in a physical space in order to further optimize performance of computational resources. Due to effects of ambient temperature on efficiency of CPUs, this can be an important additional mechanism for optimization of facilities with significant computational resources whether in a traditional data center or an office environment.

In another embodiment of the invention, a combination of observed and user-supplied feedback enables previously unattainable levels of accuracy of, and improvements to, correlations of consumers to markets, as well as optimizing energy consumption and generation (that is, any energy transformations) onsite or across a portfolio of sites, which sites may choose to interact with electric distribution systems individually or in aggregate. FIG. 29 shows a high-level schematic of this process applied to an exemplary case of building performance optimization and management.

The process of pairing information about users observed by a system (for example, local thermostat settings overrides or changes by users who are uncomfortable) at an observed temperature (for example, from a building automation system) can then be used to link processes in interlocking feedback cycles to accelerate intelligent learning by control systems. Feedback from users may occur through a large number of mechanisms ranging from direct changes to local controls, feedback provided through web interfaces, feedback provided via mobile applications, or through third-party applications such as TWITTER™.

By utilizing a combination of machine learning approaches to information extraction and user content monitoring, it is possible to generate more robust relation-specific data, which can help train algorithms to better respond to exogenous events and information or local phenomena occurring on a site or in a building.

The ability to construct probabilistic models of energy transformation and efficiency opportunities is a differentiating element in MEDS systems. According to the invention, this information can be utilized in a wide variety of ways to further enhance relationships between and among end users and service providers, and can enable more economically optimal outcomes. Additional uses of automated lead generation include but are not limited to use of MEDS to: connect users across one or more facilities to their energy transformation events and associated externalities; create groups, defined by one of more shared attributes, which may choose to act as an economic unit when interacting with other parties ranging from electric grid systems to capital markets; validate and monitor long-term risks associated with securitized financial products or performance-based contracts or agreements that require validation and verification; provide automation to end users, microgrids, and any grouping them, allowing them to participate in energy, externality, and capital markets; continuously optimize energy performance of buildings or microgrids through any combination of user-generated (machine and human) content, analytical optimization methods (for example, mixed integer programming), machine learning (or other similar forms of artificial intelligence), or optimization via simulation (such as integrated thermal and load modeling tools).

In another embodiment of the invention, an MEDS system utilizes a series of processes to obtain needed information for optimization of user decisions related to operational processes such as energy procurement and dispatch of energy transformation events. Decision processes involved in scheduling dispatch of controllable energy assets (generation, storage, or consumption) require consideration of multiple objectives that may establish competing requirements for an end user. Due to the multidimensional nature of decisions related to energy consumption, a process for determining a utility of various outcomes for an end-user is required.

According to the invention, prior to optimizing a building in a continuous semi-automated or automated process, it is necessary to obtain information about user needs and preferences to properly adjust one or more objective functions based on explicitly stated or implied needs of end users in a particular facility. Determination of values which define a given user's Pareto frontier (or surface) are important to effectiveness of MEDS systems according to the invention.

In an exemplary embodiment of the invention, a network-connected server system obtains information pertaining to various outcomes (for example, pertaining to business processes or user comfort) from a client system via a web-based interface. Information is transmitted from a client system across a network such as the Internet and received by the server system, where credentials identifying the user can be validated against a database containing account information, which may be operated separately or as part of the server system. In an exemplary embodiment, after a user finishes completing a digitally recorded survey (where survey is defined as any series of questions, actions, or requests for other methods of providing feedback to a client system which can be digitally represented and transmitted to the server system for interpretation), the server system utilizes a statistics server to calculate a Pareto surface for competing objectives of a multidimensional optimization problem related to the survey. For example, a survey may seek user feedback on the relative importance of cost savings versus comfort ranging from nominal values to extreme values. When data from a wide range of questions is aggregated, this information can be used to construct an n-dimensional space, which represents a range of valid solutions for a corresponding multiobjective optimization problem as defined by the users' feedback pertaining to n variables of interest. This n-dimensional solution space can then be reduced to a Pareto frontier or Pareto set. A Pareto frontier describes a set of choices that are efficient potential solutions, and techniques for determining Pareto frontiers from a finite set of alternatives are well-established in the art of computer science. The invention's novel use of a client-server system for conducting surveys (gaining information) for use in constructing a Pareto set which can be explored by a network-connected statistics server is a significantly new addition to the concept of building optimization. Through the system's construction of acceptable ranges for priorities based on their relationships to other competing objectives, it is possible to effectively model a reasonable range of potential objective function values for use in optimization. When this capability is combined with data feeds (for example, weather data or energy commodity data) from exogenous sources and any data which may exist in an associated MEDS server system, the MEDS system can act as an effective proxy for human or machine decision-makers or provide decision support.

An exemplary description of a process by which user actions can be inferred utilizing information obtained via a direct survey or via an expert analysis which is made available to an MEDS server system may be as follows: determine a user's preferences for saving/earning money by changing system behavior; describe a Pareto frontier for a user using a statistics server; utilize the Pareto frontier to define key values in objective functions; utilize the resulting objective functions for initial solution selection (that is, narrow the solution space); determine solutions via either analytic or simulation based methods, or both; confirm selected simulations via controls routine or simulation model to validate that solutions obtained fall within an acceptable solution space; finalize scheduling options based on simulated solutions and seek decision from a MEDS server system; and either present decision options to a user or infer a user's decision based on the Pareto frontier (or relative weighting of the multi-objective optimization variables), or both.

When a client-server system and method for determining a Pareto set or other mathematical descriptions of one or more valid ranges of solutions is coupled with synergistic methods for information extraction, an MEDS system according to the invention becomes a strongly-differentiated platform enabling intelligent and decentralized management of buildings, campuses, and microgrids, which can accurately participate in complex markets and machine-to-machine transaction systems on behalf of users in a non-disruptive and optimal fashion.

Among other benefits of MEDS, end users employing systems according to the invention benefit from nearly continuous recommissioning of a building's HVAC schedule based on optimized overall dispatch schedules for a site. This can, according to the invention, lead to generation of additional value beyond cost savings, consumption reductions, or externality reductions, including in an exemplary embodiment procurement of additional Leadership in Energy and Environmental Design (LEED) points as defined by the U.S. Green Building Council, which can enhance monetary value of a building and its desirability to end users. According to the invention, automated dispatch and control of network connected devices capable of energy transformation is extendable to many other devices beyond HVAC systems such as data centers, lighting systems, computer loads, outdoor parking lights, plug loads, or any system that is controlled by centralized or decentralized computer systems. It is also possible, according to the invention, that any type of energy-related process which can be controlled by an MEDS system and is not location-dependent may be transferred between multiple geographic locations by an MEDS system to one or more connected buildings, campuses, or microgrids, which may be owned by one or more businesses or individuals using MEDS services. For example, computerized tasks such as data processing or website requests may be routed to a data center with a minimal cost of electricity, based either on local or global conditions, or both, and on values at either or both locations.

According to the invention, an MEDS system can also be connected to other forms of media for a variety of purposes related to public relations, marketing, sales, or awareness. Detailed information captured by MEDS systems can be leveraged by corporations, organizations, or individuals seeking to highlight responsible actions or improvements in sustainability. Because of quantitative modeling tools provided by MEDS systems according to the invention and described above, this information can be presented with a great degree of confidence and in many cases may be presented with actual descriptions of uncertainty which can be calculated by a network-connected statistics server. Integrated simulation and modeling capabilities, which enable MEDS systems to augment reality with additional information based on mathematical models, can enable MEDS-connected users to better leverage investments in MEDS and actions related to energy and environmental issues in print and social media (that is, TWITTER™, FACEBOOK™, and the many similar services known in the art), in various combinations, such that they can better realize full value of capital and behavioral adjustments related to these issues.

According to the invention, a MEDS system for benchmarking can also enable comparisons between MEDS-connected organizations and individuals. This information can be used in a variety of ways and may be presented only to account holders or made public via a MEDS user's website or via a third party platform (or both) A MEDS system according to the invention may be used to provide industry-standard benchmarking for clients who currently lack adequate access to information. For example, a group of large real estate clients might agree to let a MEDS system expose their anonymized data to one another in order to better benchmark their own building portfolios' energy consumption against other companies that they compete against. A MEDS system can optionally expose limited groups of users' data to one another in either an anonymous fashion or with explicit reference to users, or both. This information can be valuable to organizations seeking to stay competitive, and all organizations may benefit from increased transparency in addition to the obvious benefit for clients and grids from increased competition for energy efficiency. Another example may involve sharing of energy consumption information within a familial unit where anonymity may not be a concern. Similarly, various social groups may wish to share energy efficiency or consumption information via Facebook™ or other social networking solutions where attribution is desired.

According to the invention, periodic stress testing of buildings or microgrids may be used by a MEDS system to reduce risk relating to forecasting future events. As the value of energy on the electric power system is closely linked to its uncertainty and variability, any ability to accurately forecast future load and generation profiles of systems connected to an interconnected power system is critical. While MEDS systems according to the invention typically include a capability to generate forward models from simulated models of buildings or microgrids, there is substantial value in leveraging empirical data to improve the value of a given system. According to the invention, individual device commands, commands to groups of devices, or sample schedules may be initiated by a MEDS system to gather empirical data, which in turn can be used to ensure that end users and occupants are able to achieve maximum value for their interactions with an electric grid system. This information for induced events can be used to profile technologies in a building. For example, individual devices can be turned on and off such that a single kilowatt reader or metering device can be used to record a total energy consumption of each given device in a building in various configurations. A more specific example may include monitoring of a kilowatt meter while manipulating a variable speed of a fan, such as a fan of a Variable Air Volume box in an HVAC system. This information can then be used by a MEDS system to improve its optimization and forecasting techniques. This can be especially important for optimal participation in demand response events.

According to another embodiment of the invention, periodic stress testing can also be used to determine performance degradation of equipment during its lifetime. For example, chillers in commercial buildings may have been replaced and linked to a performance contract that guarantees a specified amount of savings over an expected lifetime of the contract. Periodic stress testing can validate that actual performance of machines is within the specified range. This, especially if combined with MEDS scheduling logs, enables MEDS to properly ascribe responsibility to users or service providers in the event of performance contract failures.

According to another embodiment of the invention, periodic performance or stress tests can be used to help generate reliability ratings for a specific customer. As reliability ratings for a customer may include both behavioral and physical aspects, an ability to collect empirical data from consumers connected to a MEDS system from time to time is important. By varying conditions in a stress event, (for instance, time of day, size of event, length of event, amount of advance warning, and the like), it is possible to better isolate a relative importance and characteristics of physical and behavioral attributes. This allows a service provider delivering MEDS-based services, for example, to enable people or organizations to maintain reliability ratings even when they change facilities. While active testing strategies may be crucial for assessing risk and generating performance profiles, MEDS systems according to the invention are also capable of using passive testing strategies to obtain valuable profiling information. MEDS systems need not necessarily issue direct commands or command sequences in order to derive test performance. Due to frequent, albeit optional, optimization of device scheduling and commands, measured results of executing a wide variety of schedules provides MEDS systems with substantial amounts of data that may be used to provide an effect equivalent to that achieved using active methods. MEDS systems may, optionally, enhance this passive ability further by varying characteristics associated with performance of building components related to energy, structure, or any other energy- or externality-related variable. For example, insulation values (R-values), device efficiencies, energy usage or similar variables may be varied to improve upon mathematical representations of building or microgrid systems used in optimization. Over time, exploration of a solution space for these parameters can be used to improve end users' understanding of their physical assets and a MEDS system's ability to optimize said system as a result.

According to another embodiment of the invention, a MEDS system can be used to provide control of microgrids and buildings based on actions take by or on behalf of a digital exchange 1000.

According to yet another embodiment of the invention, a MEDS system can be used to provide dynamic shaping and storage services for network-connected energy transformation assets (such as wind farms and solar power arrays) that are both variable and uncertain power supplies. It is possible to connect forward forecasts related to transformation events affecting a power grid that can be balanced using a MEDS platform. For example, a MEDS system can be paired with one or more wind farms and can dynamically optimize operating schedules or dispatch schedules of energy-related events at a portfolio of facilities such that an output of a coupled system is less variable or more certain. The ability to provide shaping and storage services leveraging existing infrastructure is a significant advancement over techniques in the art, which rely on Demand Response for stress reduction or ancillary services. Due to a MEDS system's ability to control load in a decentralized but precise manner, systems according to the invention are able to provide such services with quantifiable levels of risk. According to the invention, this enables a MEDS system to offer such services directly into power markets or to provide services directly to entities controlling or possessing energy transformation assets which are in need of shaping and storage.

FIG. 29 illustrates an exemplary process of decision flow according to the invention. Users interacting via human readable schedule and decision support visualizations 2900 perform various tasks pertaining to the MEDS system. For example, decisions are obtained or extracted and made visible users in a decision extraction step 2901, and decision confirmation and feedback 2902 is obtained from users in a loop of training 2921 and obtaining results 2910. Decisions once confirmed are passed to a subsumption detection process 2903 via interface 2911. Decisions are extracted from a scheduling and optimization process 2901 via an interface 2912. Optimization and scheduling processes 2901 obtain data needed for building optimized schedules from Pareto surface descriptions 2907 via an interface 2913. The left side of FIG. 29 thus shows a complex flow of information and decisions that allows for dynamic system learning and active optimization. The right side of FIG. 29 shows interrelationships between human readable schedule and decision support visualizations 2900 and pareto surface descriptions for users 2907. Information from each is passed via interfaces 29019 and 2914 to a user modeling and interface development process 2905, in which more and more accurate models of user behaviors are modeled based on ongoing provision of data, and in which from these models more effective interfaces are developed to continuously improve performance of user interfaces. Derived models and proposed interfaces are passed via interface 2915 to a feedback and validation process 2906, and feedback results (and validations when appropriate) are passed back via interface 2918; feedback and validation process 2906 thus operates as part of a loop in which users can evaluate models and proposed interfaces and provide meaningful feedback to them, and then evaluate the revised models and interfaces. Properly validated models and interfaces are then passed via interfaces 2917 and 2916 back to human readable schedule and decision support visualizations 2900 and pareto surface descriptions for users 2907, such that the utility of these user interfaces in supporting activities of the left side of FIG. 29 is continuously improved.

In another embodiment of the invention, synergistic information extraction for optimization of maintenance and services can be coupled with previously described systems for observation and control of buildings, campuses and microgrids, in order to provide a variety of services that can better manage the total cost of ownership related to operation of facilities. Processes analogous to those illustrated in FIG. 28 and FIG. 29 can be used to provide energy efficiency experts, service providers, and contracts with automated tools for lead generation and quantitative assessments of business value by leveraging a combination of extracted and user-supplied content. Again, the feedback loop thus established can be used to enhance learning of an intelligent server-based system capable of providing recommended actions and decision-support for business development related to energy efficiency, demand response, maintenance, and commodity consulting for clients' critical resources.

A wide variety of machine learning techniques may be employed in concert with a network-connected controls network that is capable of monitoring and controlling facilities through a variety of industrial automation systems and controls technologies that are well established in the art. Advantages of the instant invention pertain, among other things, to the ability of systems according to the invention to use expert user content in conjunction with observed information and analysis to provide forward-looking business intelligence, or decision-support. The ability to perform probabilistic assessments of value of future contracts, which the invention defines as either a combination of fixed efficiencies (such as from capital upgrades) and variable efficiencies (such as from demand response participation), or both, is a markedly different approach from current business intelligence practices, which rely almost entirely on historical data. Furthermore, the ability to automatically generate opportunities and leads from these energy transformation opportunities (which can be linked to local phenomena or forecasted or actual global phenomena, or any combination of these) represents a significant departure from business practices or technological capabilities in the art. This process can be applied to customers within a portfolio of a given service provider connected to an MEDS system through its own user interface or via a third party application accessing data obtained, at least in part, from an MEDS system.

According to the invention, a MEDS system is also capable of providing for direct advertisement placement through either its own user interface or third party websites, or both. The system is also capable of providing data enabling third parties to engage in ad placement utilizing, at least in part, data collected from either a MEDS system or a following process, or both. As the cost of capital and total cost of ownership dictate a majority of outcomes related to capital investments in energy-consuming equipment in business and homes, calculation and verification of savings over the life of a considered investment period are paramount. Thus, an MEDS system that includes an ability to use integrated thermal and load forecasting tools related to building systems can be of immense value when determining products and services that can provide compelling value propositions to end users. A MEDS system's connections to building systems or microgrid-connected systems can be used to determine which advertisements are most relevant for particular end users. Using information related to observed, forecasted values for buildings, these opportunities can be used to place advertisements to end-users themselves, or to assist in ad placements targeting service providers and retailers offering the goods themselves. Thus, a MEDS system and data can be used to advertise potential service providers or retailers to clients or vice versa. For example, a MEDS-connected building may have a design thermal insulation value of R-17 for its attic or crawlspace. Actual observations of the building via a MEDS system may indicate that an actual thermal value for the roof is closer to R-11 based on comparisons of simulated values and observed values over time. A MEDS system may then present a user with a recommendation to upgrade the insulation in question to R-19 or greater to save a specified amount of money over a forecasted period. Service companies or retailers wishing to install or sell insulation to end users may pay for opportunities to have their information displayed generally on a MEDS user interface, on a savings alert/recommendation itself, or to users through third party websites and other media. Similarly, a MEDS system could be used to advertise or sell pre-qualified leads and opportunities to service providers and retailers on a subscription, pay-per-click, or any number of other arrangements.

According to another embodiment of the invention, a MEDS system may use data obtained through its network-connected buildings and microgrids to provide additional mechanisms for manufacturers, retailers, installers, insurers, and others to better understand performance of physical devices. For example, a MEDS system may be used to measure, calculate, and optionally report or certify performance of physical devices across a wide variety of facilities. One such example would be the certification of performance of an air-conditioning device that may substantially underperform on a portfolio of buildings as compared to its manufacturer's specifications. By obtaining data and using a network-connected statistics server to process gathered information, a MEDS system may be used to generate performance reports linked to specific devices by attributes such as device type, device make, and device model These identifying attributes may then be used to provide information about said device to third parties or to expert systems (for example, an equipment replacement recommendation engine) operating as part of the MEDS system.

The ability to finance projects enabling end user participation in active energy markets and systems is one of the critical roadblocks to modernization of energy infrastructure in the United States. Most existing demand response participants are totally unaware of the value of their participation in wholesale markets via existing aggregators and many more remain unable to participate. Equally troubling are the challenges with obtaining adequate financing to enable end users to achieve potential savings (at local or system levels) from fixed efficiencies such as capital equipment upgrades.

The U.S. government and many other organizations have cited challenges with securing capital as one of the key impediments to achieving superior power systems reliability and cost-savings. Current practices consistently involve the use of commercial loans backed with real-estate assets (often on the facility selected to undergo an upgrade) to finance capital improvements geared at future savings. Performance-based contracting from Heating Ventilation and Air-Conditioning contractors to end users dominate the industry today, and each project involves human-intensive audits and contract negotiations, and often involves further effort by a performance-based contractor to secure insurance against any resulting contracts in the event that cash-flows from an end users' savings prove to be insufficient.

According to the invention, it is possible to reduce complexity and streamline a financing process for energy efficiency opportunities through direct securitization of energy efficiency projects. By combining probabilistic methods assessing a value of fixed and variable efficiencies of a project over time, cash flows from savings can be effectively allocated, discounted, and hedged such that risk can be adequately distributed among investors and capital markets can more effectively participate in modernization of end users' capabilities to optimize their interactions with electrical distribution systems.

According to the invention, one of the key challenges to spurring additional investment in energy efficiency and other innovative forms of financing for capital improvements is uncertainty and risk associated with long-term benefits for such securities. Furthermore, a common practice of renegotiating many of the terms comprising mainly bilateral and trilateral agreements between each counterparty results in large amounts of unnecessary costs due to associated legal fees, time delays, and projects which are never carried through to completion.

According to an embodiment of the invention, a securitized energy efficiency services agreement can be constructed and securitized while using a MEDS system for monitoring and verification of related assets over time. The construction of energy-efficiency securities enables investors to directly cover capital expenditures associated with forecasted fixed and variable efficiencies associated with a project (or both). Payments from end user based on observed performance measured by a MEDS system are then distributed to participants in a securitized structure in accordance with FIG. 30 or other similar manner.

FIG. 30 provides an exemplary embodiment, according to the invention, of a set of arrangements for the distribution of risks and returns from an asset pool 3000. Any or all of the parties illustrated in FIG. 30 may take on risk and obtain appropriate returns based on performance of an asset pool 30, without departing from the scope of the invention; that is, all of the parties illustrated in FIG. 30 and described herein are illustrative only, and do not limit the possibility of the addition of other parties, or the elimination of some of the shown parties, in MEDS systems according to the invention. Insurer 3001 is able to receive money 3110 in the form of risk or insurance premiums, and may be required to pay money 3111 to insured parties if default or other negative conditions occur. Building owner 3005 may participate by receiving funds 3119 based on agreed-upon returns when building-specific actions are taken (for instance, when a building owner 3005 sheds load on demand as part of an activation of an asset in asset pool 3000), and a building owner 3005 may be required to pay when making energy assets available to asset pool 3000 or as a result of failure to take required actions pertaining to an asset in asset pool 3000. In some cases, building assets are aggregated by partnerships 3004 between energy service companies (ESCOs) and service providers (SP), with the results that fee revenue generated by asset pool 3000 flows to partnership 3004 and then may be partially transmitted typically on a pro rata basis to building owners 3005. In some cases investors 3002 may combine to form a special purpose vehicle (SPV) 3003, investing money 3113 and receiving returns 3114 based on performance of asset pool 3000 (returns flow from asset pool 3000 to SPV 3003 via cash flow 3112), often with a services fee 3115 being paid to partnership 3004.

This illustrative and innovative structure builds upon practices in energy efficiency and power purchase agreements to provide a truly innovative system capable of enabling forecasting, risk assessment, aggregation, securitization, monitoring, and verification of energy efficiency projects to enable their widespread implementation by leveraging direct access to capital markets. It will be appreciated that a number of similar business arrangements can be created to better suit the needs of participants in a securitized efficiency product.

FIG. 31 illustrates an exemplary process according to the invention. In a first step 3100, all contracts are represented as curves of price, volatility, correlation, and interest rate, or as some combination of these variables. This allows a graphical and mathematical representation of the relationships between price, risk, and so forth, for use throughout the MEDS systems of the invention. In step 3101, historical information elements such as spot prices, forward prices, and forward volumes (to provide representative examples; other similar information items can also be added, and not necessarily all of these will be added in any given implementation of a MEDS according to the invention), are collected and utilized to build securities. In step 3102, securities are constructed, either as open or closed systems (that is, either allowing other deals in a portfolio during the duration on the tenor, or not), or both. Finally, in step 3103, a distribution of deal value is calculated, or optionally probabilistic simulation technologies (for instance, Monte Carlo methods) can be used to simulate price paths and to revalue a portfolio at specified times.

Upon aggregation, securities may or may not be priced by a network-connected pricing server as part of a digital exchange and listed for purchase. According to the invention, direct sale to investors, listing on an exchange, or any number of potential sales arrangements can satisfy conditions of the process detailed in FIG. 31. Furthermore, according to the invention, energy efficiency securities may be backed by capital equipment installed as part of a project, or may be unsecured by physical assets.

The ability of a MEDS system according to the invention to facilitate securitization of fixed and variable efficiencies, or both, will allow vested parties (for instance, regulators, utilities, end users, and investors) to construct effective incentive and rebate programs to further encourage end users of electricity to upgrade and install such dynamically optimized systems as part of a larger process of grid and market modernization.

In one embodiment of the invention, payments from participating facilities, campuses, and microgrids (which may be securitized on an individual or aggregate basis) are distributed through an electronic platform, although it will be appreciated that traditional payments such as posted checks and invoicing may also be used.

It will be appreciated that many other variations of this process can be constructed based on needs of participants in a particular securitization event and on existing and future regulatory environments in which securities will be traded.

According to the invention, credit risk and other risks to counterparties in the securities must have mechanisms to ensure adequate protection from risk such that business transactions and relationships are feasible and easily replicable. For securitized contractual obligations, managing credit risk is one of the core challenges which is currently impinging upon the development of energy efficiency and transformation improvement projects in the United States. According to the invention, credit risk is defined as any potential loss resulting from failure of one or more parties to honor their financial obligations. The critical aspect of credit risk is its relationship to market risk (risk that a portfolio will decrease due to a change in the market risk factors) and that it has asymmetric behavior. Credit risk is the complement of mark-to-market (MTM) gain or loss of a counterparty to perform under a contract. In the energy and efficiency space, non-performance can come in many varieties, ranging from contract frustration, renegotiation, and mutual concessions, to regulatory intervention. A unique ability of MEDS systems according to the invention is to connect with a variety of digital exchange technologies in order to provide unique mechanisms for managing such risks as actual performance, expected performance, and changes in risk profiles for given contracts and assets over time.

According to the invention, it is possible for securitized assets described herein to be managed such that a vibrant market can be maintained in a manner allowing a full range of vested parties to participate. This is extraordinarily challenging due to the vast arrays of different businesses (e.g. hedge funds, regulated utilities, producers of energy commodities, merchant energy producers, industrial consumers, financial institutions, standalone merchant energy companies, and standalone physical assets, municipalities) in addition to private consumers and small businesses that might choose to participate in such markets. The transparent management of risk associated with such processes will involve provision of a number of key pieces of information that will reduce advantages enjoyed by expert investors over individuals and less sophisticated participants. MEDS is designed to be coupled to a series of additional tools (such as power systems modeling applications) which can enhance its own forecasting and simulation capabilities by providing accurate information which can improve its ability to provide consumers and businesses of all types with information required to make educated decisions related to externality and credit risks and transactions in addition to energy transactions that can be initiated and managed by the system itself.

According to the invention, FIG. 32 illustrates an exemplary process in which credit risk can be represented and managed for securitized contracts participating in markets. In step 3200, a coverage contract is requested for a specified period and with a specified amount for an explicitly defined event by a user via a client system. In step 3201, a server system receives the request and optionally confirms receipt to the client system. In step 3202, the server system assigns the request to a statistics server 1030, which determines whether or not coverage should be offered and the price at which to offer it. In step 3203, the server system confirms an ability to offer the contract based on the system's risk management system, which may involve external checks to an underwriter via a network. In step 3204, the server system communicates an offer to at least one client system, which offer can then be reviewed and optionally purchased. Finally, in step 3205, the server system validates payment and issues binding contracts. MEDS may be able to take actions based on inferred user decisions, via direct user control, or any combination thereof, to manage risk exposure and contractual obligations of users in a market environment.

According to the invention, MEDS systems according to the invention are also capable of providing independent protection to utilities and investors related to growth in electricity demand, failures of energy efficiency projects to deliver on purported energy savings (whether financially or in terms of energy metrics), and against the impact of other exogenous factors that influence transformation and consumption of energy at campuses, facilities, and microgrids. Although MEDS systems can be used to provide real-time monitoring and verification for connected systems to insurers or performance contractors, it can also be used to provide a unique kind of business protection commonly referred to as coverage. According to the invention, coverage contracts may be constructed by any end user, performance contractor, or other party that may have some type of financial, regulatory, or other interest in a connected building. However, it will be appreciated that non-connected parties could also be potential participants in a speculative manner depending on regulatory considerations. Coverage contracts constructed between two or more counterparties would involve a simple contract initiation process such as that which is depicted in FIG. 32. In this process a server system and client system construct a contract for a specified period using factors related to a coverage being requested. For example, a coverage contract for building load exceeding 75 kilowatts of peak demand during the month of July could be constructed using elements such as the building's location, the dates (in this case July of a given year), the specific conditions (in this case exceeding 75 kW of peak demand), the maximum level of coverage for the facility, and the number of events to be covered. Similarly, other consumption-related, externality-related, or cost-related coverage contracts can be constructed for single buildings, campuses, and microgrids, or across portfolios of such assets. For example, a municipal utility serving electric customers in California may wish to hedge against large demand spikes that leave them with huge financial exposure to secure power during peak consumption in warm California summers. Peak consumption in a large portfolio of buildings could be protected against to reduce overall risk to a utility during its most precarious time of year. According to the invention, it is desirable, but not required, for buildings to be connected to a MEDS platform to participate in such contracts. It is likely that increased discount factors for investors in such contracts, and higher prices to coverage seekers, would occur for systems not connected to a MEDS platform, which would provide more accurate historical information and potentially active control mechanisms. That being said, the invention includes use of load or thermal simulation tools which may be used to model demand in addition to use of integrated weather models and other exogenous data feeds which can still provide sufficient levels of accuracy in assessing risk to offer contracts to involved parties.

Coverage contracts described in this invention can utilize MEDS, smart meter systems, or other forms of monitoring and verification to assess whether or not an event meeting agreed-upon payment terms in the coverage contract occurred. If so, contract participants can be notified and automated actions taken to distribute funds via either electronic or physical means, or both. Coverage contracts can enable payment based solely on occurrence of an event or based on some combination of other factors more traditionally associated with insurance contracts such as proof-of-loss, payment withholding, or claims processes. It is expected that a preponderance of such contracts would be settled solely on observed actions (such as meter readings for the peak demand or consumption example), measured by approved sensors (for example weather sensors, load monitors, device control systems, and the like).

FIG. 33 provides an illustrative diagram showing flows of data in a preferred embodiment of the invention. Data flows via interfaces 3310, 3311, 3312, 3313, 3314, 3315, 3316, and 3317 between various components of a system according to the invention. These interfaces are generally facilitated by digital networks including especially packet-based networks such as the Internet, although they need not be so implemented. In some embodiments, one or more of interfaces 3310-3317 may be carried out by passing data internally to a single computing device such as a general-purpose server system, and in some cases information may be carried as signals imposed on an electrical power system, for example. A building control system 3300 is a software system, generally executing on dedicated hardware designed for the purpose (although it can also be operating on a general-purpose computer), that monitors, measures, and controls energy-related assets within a building (such as fans, temperature and humidity sensors, valves, and the like). Virtual NOC (network operations center) control system 3308 is a system for managing energy assets and energy usage in a plurality of buildings by interacting with a plurality of building control systems 3300 associated with the buildings. Data from virtual NOC control system 3308 and building control systems 3300 is passed to a simulation-based grid forecasting system such as CLOUDSIM™, which is a computing system programmed to simulate electrical grid operations and executing on a plurality of distributed physical or virtual servers in a public or private cloud (that is, remotely at least from building control system 3300), and to a virtual NOC optimization engine which carries out computations with or without input from cloud-based grid simulations, to find optimal parameters for usage or management of energy assets monitored or managed by virtual NOC operations center 3308 or building control system 3300. Results from simulation-based grid forecasts and a virtual NOC optimization engine are passed to a virtual NOC aggregation engine, where inputs from a plurality of simulations 3301, optimizations 3309, and from a plurality of building control systems 3300 and virtual NOC control systems 3308, are aggregated and passed to securitization engine 3303, where they are combined to form marketable securities with defined risk and return profiles. These securities are then made available to one or more exchange listings 3304 and a matching/activation engine, which attempts to match willing buyers and sellers of various energy-based securities. When a buyer and seller match is made, or when an activation is requested by a holder of a security, that result is passed again to a virtual NOC aggregation engine 3306 (which could be the same as virtual NOC aggregation engine 3302, but need not be), and a plurality of generally time-correlated matches or activations is passed therefrom to a virtual NOC dispatch system 3307, which then dispatches (at appropriate times) signals to virtual NOC control system 3308 for further dissemination to building control system 3300, where requested energy asset actions (for instance, turning off of optional loads in response to a demand response activation) are carried out. Thus FIG. 33 illustrates an exemplary decision flow and data flow loop for a MEDS system according to the invention.

In an embodiment of the invention, logical abstraction of devices or eNodes within a network-connected server system or at an iNode or client system level can enable more effective management of complexity inside the server system or digital exchange 1000. This is as a result of the ability to deal with complexity towards the edges of a distributed system, as opposed to centralizing complexity using rules engines as is commonly done. According to the invention this can provide significant improvements to scalability and resilience in a system by reducing complexity in central components on which many other parts of the system may be dependent. Similarly, this logical abstraction enables a client system, iNode, or server system to create, via a manual or automated process, logical device improvements based on observed data (for example, an improved estimate of real-time energy consumption requirements for a non-metered device) or to create custom controls logic which might be used to interface with particularly complex or unique end-use devices, or eNodes, without any effect on the larger system.

According to another embodiment of the invention, buildings, campuses, and microgrids connected to a MEDS server system via a network such as the Internet may be optimized using any number of analytical and simulation-based techniques. This may involve use of stochastic optimization tools or mixed integer linear programming or other metaheuristics, which are capable of solving various components of or all of a global optimization problem, related to efficient operations of an end user system.

According to another embodiment of the invention, throughout operation of an end user system connected to a MEDS system, a variety of data fusion techniques can be utilized by the server system to leverage observed data collected from building automation and industrial controls systems that are connected to a MEDS system via a network.

In some embodiments of the invention, aggregation of end users occurs through service providers rather than directly within a MEDS system. For example, a server system is used by a wide variety of participants directly and thereby is enabled to aggregate additional users under one account associated with the server system, and may optionally allocate commissions from earnings/savings to said providers.

It should be understood that embodiments described herein are exemplary in nature, and any number of alternative architectural approaches well-known in the art of computer science (for instance, to improve scalability, security, or robustness) may be used without departing from the scope of the invention. For example, an intermediate computer can be used between a client system and a MEDS server to ensure a secure connection to MEDS (as an option) and to enhance system reliability/resilience, without departing from the scope of the invention. Such an approach could include use of an intermediate network-connected computer system as a proxy server between a MEDS system and a DDC control system within a building, campus, or microgrid.

According to the invention, the iNode and eNode components can be combined at any scale across the energy infrastructure. In one embodiment, represented in FIG. 34, the iNode component of pricing server 1900 can be used to create optimal schedules 2904 for equipment operations within a building. These schedules would deliver energy services, such as thermal comfort, lighting, mobility etc. at a cost-optimized control sequence. The control sequence is passed into the control system which executes the optimized schedule. An example of a control system is the building control system 3300. This results in the delivery of energy services 3400 that energy users value and require. A common end user value is comfort. Comfort can be provided in many cost-optimized manners that the iNode/eNode construct can meet. For instance, an end user can provide thermal heat by turning on the boiler, buying a space heater, letting sunlight into the building, increase the number of workers and computers that generate ambient heat, etc. Each one of these external variables can be entered into the statistical server 1030. The cost-optimal manner to reach thermal comfort can be determined, executed and delivered to the end user with minimal input and effort.

All of the embodiments outlined in this disclosure are exemplary in nature and should not be construed as limitations of the invention except as claimed below.

One or more different inventions may be described in the present application. Further, for one or more of the inventions described herein, numerous alternative embodiments may be described; it should be appreciated that these are presented for illustrative purposes only and are not limiting of the inventions contained herein or the claims presented herein in any way. One or more of the inventions may be widely applicable to numerous embodiments, as may be readily apparent from the disclosure. In general, embodiments are described in sufficient detail to enable those skilled in the art to practice one or more of the inventions, and it should be appreciated that other embodiments may be utilized and that structural, logical, software, electrical and other changes may be made without departing from the scope of the particular inventions. Accordingly, one skilled in the art will recognize that one or more of the inventions may be practiced with various modifications and alterations. Particular features of one or more of the inventions described herein may be described with reference to one or more particular embodiments or figures that form a part of the present disclosure, and in which are shown, by way of illustration, specific embodiments of one or more of the inventions. It should be appreciated, however, that such features are not limited to usage in the one or more particular embodiments or figures with reference to which they are described. The present disclosure is neither a literal description of all embodiments of one or more of the inventions nor a listing of features of one or more of the inventions that must be present in all embodiments.

Headings of sections provided in this patent application and the title of this patent application are for convenience only, and are not to be taken as limiting the disclosure in any way.

Devices that are in communication with each other need not be in continuous communication with each other, unless expressly specified otherwise. In addition, devices that are in communication with each other may communicate directly or indirectly through one or more communication means or intermediaries, logical or physical.

A description of an embodiment with several components in communication with each other does not imply that all such components are required. To the contrary, a variety of optional components may be described to illustrate a wide variety of possible embodiments of one or more of the inventions and in order to more fully illustrate one or more aspects of the inventions. Similarly, although process steps, method steps, algorithms or the like may be described in a sequential order, such processes, methods and algorithms may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the invention(s), and does not imply that the illustrated process is preferred. Also, steps are generally described once per embodiment, but this does not mean they must occur once, or that they may only occur once each time a process, method, or algorithm is carried out or executed. Some steps may be omitted in some embodiments or some occurrences, or some steps may be executed more than once in a given embodiment or occurrence.

When a single device or article is described herein, it will be readily apparent that more than one device or article may be used in place of a single device or article. Similarly, where more than one device or article is described herein, it will be readily apparent that a single device or article may be used in place of the more than one device or article.

The functionality or the features of a device may be alternatively embodied by one or more other devices that are not explicitly described as having such functionality or features. Thus, other embodiments of one or more of the inventions need not include the device itself.

Techniques and mechanisms described or referenced herein will sometimes be described in singular form for clarity. However, it should be appreciated that particular embodiments may include multiple iterations of a technique or multiple instantiations of a mechanism unless noted otherwise. Process descriptions or blocks in figures should be understood as representing modules, segments, or portions of code which include one or more executable instructions for implementing specific logical functions or steps in the process. Alternate implementations are included within the scope of embodiments of the present invention in which, for example, functions may be executed out of order from that shown or discussed, including substantially concurrently or in reverse order, depending on the functionality involved, as would be understood by those having ordinary skill in the art.

Generally, the techniques disclosed herein may be implemented on hardware or a combination of software and hardware. For example, they may be implemented in an operating system kernel, in a separate user process, in a library package bound into network applications, on a specially constructed machine, on an application-specific integrated circuit (ASIC), or on a network interface card.

Software/hardware hybrid implementations of at least some of the embodiments disclosed herein may be implemented on a programmable network-resident machine (which should be understood to include intermittently connected network-aware machines) selectively activated or reconfigured by a computer program stored in memory. Such network devices may have multiple network interfaces that may be configured or designed to utilize different types of network communication protocols. A general architecture for some of these machines may be described herein in order to illustrate one or more exemplary means by which a given unit of functionality may be implemented. According to specific embodiments, at least some of the features or functionalities of the various embodiments disclosed herein may be implemented on one or more general-purpose computers associated with one or more networks, such as for example an end-user computer system, a client computer, a network server or other server system, a mobile computing device (e.g., tablet computing device, mobile phone, smartphone, laptop, or other appropriate computing device), a consumer electronic device, a music player, or any other suitable electronic device, router, switch, or other suitable device, or any combination thereof. In at least some embodiments, at least some of the features or functionalities of the various embodiments disclosed herein may be implemented in one or more virtualized computing environments (e.g., network computing clouds, virtual machines hosted on one or more physical computing machines, or other appropriate virtual environments).

Referring now to FIG. 34, there is shown a block diagram depicting an exemplary computing device 3400 suitable for implementing at least a portion of the features or functionalities disclosed herein. Computing device 3400 may be, for example, any one of the computing machines listed in the previous paragraph, or indeed any other electronic device capable of executing software- or hardware-based instructions according to one or more programs stored in memory. Computing device 3400 may be adapted to communicate with a plurality of other computing devices, such as clients or servers, over communications networks such as a wide area network a metropolitan area network, a local area network, a wireless network, the Internet, or any other network, using known protocols for such communication, whether wireless or wired.

In one embodiment, computing device 3400 includes one or more central processing units (CPU) 3402, one or more interfaces 3410, and one or more busses 3406 (such as a peripheral component interconnect (PCI) bus). When acting under the control of appropriate software or firmware, CPU 3402 may be responsible for implementing specific functions associated with the functions of a specifically configured computing device or machine. For example, in at least one embodiment, a computing device 3400 may be configured or designed to function as a server system utilizing CPU 3402, local memory 3401 and/or remote memory 3420, and interface(s) 3410. In at least one embodiment, CPU 3402 may be caused to perform one or more of the different types of functions and/or operations under the control of software modules or components, which for example, may include an operating system and any appropriate applications software, drivers, and the like.

CPU 3402 may include one or more processors 3403 such as, for example, a processor from one of the Intel, ARM, Qualcomm, and AMD families of microprocessors. In some embodiments, processors 3403 may include specially designed hardware such as application-specific integrated circuits (ASICs), electrically erasable programmable read-only memories (EEPROMs), field-programmable gate arrays (FPGAs), and so forth, for controlling operations of computing device 3400. In a specific embodiment, a local memory 3401 (such as non-volatile random access memory (RAM) and/or read-only memory (ROM), including for example one or more levels of cached memory) may also form part of CPU 3402. However, there are many different ways in which memory may be coupled to system 3400. Memory 3401 may be used for a variety of purposes such as, for example, caching and/or storing data, programming instructions, and the like. It should be further appreciated that CPU 3402 may be one of a variety of system-on-a-chip (SOC) type hardware that may include additional hardware such as memory or graphics processing chips, such as a Qualcomm SNAPDRAGON™ or Samsung EXYNOS™ CPU as are becoming increasingly common in the art, such as for use in mobile devices or integrated devices.

As used herein, the term "processor" is not limited merely to those integrated circuits referred to in the art as a processor, a mobile processor, or a microprocessor, but broadly refers to a microcontroller, a microcomputer, a programmable logic controller, an application-specific integrated circuit, and any other programmable circuit.

In one embodiment, interfaces 3410 are provided as network interface cards (NICs). Generally, NICs control the sending and receiving of data packets over a computer network; other types of interfaces 3410 may for example support other peripherals used with computing device 3400. Among the interfaces that may be provided are Ethernet interfaces, frame relay interfaces, cable interfaces, DSL interfaces, token ring interfaces, graphics interfaces, and the like. In addition, various types of interfaces may be provided such as, for example, universal serial bus (USB), Serial, Ethernet, FIREWIRE™, THUNDERBOLT™, PCI, parallel, radio frequency (RF), BLUETOOTH™, near-field communications (e.g., using near-field magnetics), 802.11 (WiFi), frame relay, TCP/IP, ISDN, fast Ethernet interfaces, Gigabit Ethernet interfaces, Serial ATA (SATA) or external SATA (ESATA) interfaces, high-definition multimedia interface (HDMI), digital visual interface (DVI), analog or digital audio interfaces, asynchronous transfer mode (ATM) interfaces, high-speed serial interface (HSSI) interfaces, Point of Sale (POS) interfaces, fiber data distributed interfaces (FDDIs), and the like. Generally, such interfaces 3410 may include physical ports appropriate for communication with appropriate media. In some cases, they may also include an independent processor (such as a dedicated audio or video processor, as is common in the art for high-fidelity A/V hardware interfaces) and, in some instances, volatile and/or non-volatile memory (e.g., RAM).

Although the system shown in FIG. 34 illustrates one specific architecture for a computing device 3400 for implementing one or more of the inventions described herein, it is by no means the only device architecture on which at least a portion of the features and techniques described herein may be implemented. For example, architectures having one or any number of processors 3403 may be used, and such processors 3403 may be present in a single device or distributed among any number of devices. In one embodiment, a single processor 3403 handles communications as well as routing computations, while in other embodiments a separate dedicated communications processor may be provided. In various embodiments, different types of features or functionalities may be implemented in a system according to the invention that includes a client device (such as a tablet device or smartphone running client software) and server systems (such as a server system described in more detail below).

Regardless of network device configuration, the system of the present invention may employ one or more memories or memory modules (such as, for example, remote memory block 3420 and local memory 3401) configured to store data, program instructions for the general-purpose network operations, or other information relating to the functionality of the embodiments described herein (or any combinations of the above). Program instructions may control execution of or comprise an operating system and/or one or more applications, for example. Memory 3420 or memories 3401, 3420 may also be configured to store data structures, configuration data, encryption data, historical system operations information, or any other specific or generic non-program information described herein.

Because such information and program instructions may be employed to implement one or more systems or methods described herein, at least some network device embodiments may include nontransitory machine-readable storage media, which, for example, may be configured or designed to store program instructions, state information, and the like for performing various operations described herein. Examples of such nontransitory machine-readable storage media include, but are not limited to, magnetic media such as hard disks, floppy disks, and magnetic tape; optical media such as CD-ROM disks; magneto-optical media such as optical disks, and hardware devices that are specially configured to store and perform program instructions, such as read-only memory devices (ROM), flash memory (as is common in mobile devices and integrated systems), solid state drives (SSD) and "hybrid SSD" storage drives that may combine physical components of solid state and hard disk drives in a single hardware device (as are becoming increasingly common in the art with regard to personal computers), memristor memory, random access memory (RAM), and the like. It should be appreciated that such storage means may be integral and non-removable (such as RAM hardware modules that may be soldered onto a motherboard or otherwise integrated into an electronic device), or they may be removable such as swappable flash memory modules (such as "thumb drives" or other removable media designed for rapidly exchanging physical storage devices), "hot-swappable" hard disk drives or solid state drives, removable optical storage discs, or other such removable media, and that such integral and removable storage media may be utilized interchangeably. Examples of program instructions include both object code, such as may be produced by a compiler, machine code, such as may be produced by an assembler or a linker, byte code, such as may be generated by for example a Java™ compiler and may be executed using a Java virtual machine or equivalent, or files containing higher level code that may be executed by the computer using an interpreter (for example, scripts written in Python, Perl, Ruby, Groovy, or any other scripting language).

In some embodiments, systems according to the present invention may be implemented on a standalone computing system. Referring now to FIG. 35, there is shown a block diagram depicting a typical exemplary architecture of one or more embodiments or components thereof on a standalone computing system. Computing device 3500 includes processors 3510 that may run software that carry out one or more functions or applications of embodiments of the invention, such as for example a client application 3530. Processors 3510 may carry out computing instructions under control of an operating system 3520 such as, for example, a version of Microsoft's WINDOWS™ operating system, Apple's Mac OS/X or iOS operating systems, some variety of the Linux operating system, Google's ANDROID™ operating system, or the like. In many cases, one or more shared services 3525 may be operable in system 3500, and may be useful for providing common services to client applications 3530. Services 3525 may for example be WINDOWS™ services, user-space common services in a Linux environment, or any other type of common service architecture used with operating system 3510. Input devices 3570 may be of any type suitable for receiving user input, including for example a keyboard, touchscreen, microphone (for example, for voice input), mouse, touchpad, trackball, or any combination thereof. Output devices 3560 may be of any type suitable for providing output to one or more users, whether remote or local to system 3500, and may include for example one or more screens for visual output, speakers, printers, or any combination thereof. Memory 3540 may be random-access memory having any structure and architecture known in the art, for use by processors 3510, for example to run software. Storage devices 3550 may be any magnetic, optical, mechanical, memristor, or electrical storage device for storage of data in digital form (such as those described above, referring to FIG. 34). Examples of storage devices 3550 include flash memory, magnetic hard drive, CD-ROM, and/or the like.

In some embodiments, systems of the present invention may be implemented on a distributed computing network, such as one having any number of clients and/or servers. Referring now to FIG. 36, there is shown a block diagram depicting an exemplary architecture 3600 for implementing at least a portion of a system according to an embodiment of the invention on a distributed computing network. According to the embodiment, any number of clients 3630 may be provided. Each client 3630 may run software for implementing client-side portions of the present invention; clients may comprise a system 3500 such as that illustrated in FIG. 35. In addition, any number of servers 3620 may be provided for handling requests received from one or more clients 3630. Clients 3630 and servers 3620 may communicate with one another via one or more electronic networks 3610, which may be in various embodiments any of the Internet, a wide area network, a mobile telephony network (such as CDMA or GSM cellular networks), a wireless network (such as WiFi, Wimax, LTE, and so forth), or a local area network (or indeed any network topology known in the art; the invention does not prefer any one network topology over any other). Networks 3610 may be implemented using any known network protocols, including for example wired and/or wireless protocols.

In addition, in some embodiments, servers 3620 may call external services 3670 when needed to obtain additional information, or to refer to additional data concerning a particular call. Communications with external services 3670 may take place, for example, via one or more networks 3610. In various embodiments, external services 3670 may comprise web-enabled services or functionality related to or installed on the hardware device itself. For example, in an embodiment where client applications 3530 are implemented on a smartphone or other electronic device, client applications 3530 may obtain information stored in a server system 3620 in the cloud or on an external service 3670 deployed on one or more of a particular enterprise's or user's premises.

In some embodiments of the invention, clients 3630 or servers 3620 (or both) may make use of one or more specialized services or appliances that may be deployed locally or remotely across one or more networks 3610. For example, one or more databases 3640 may be used or referred to by one or more embodiments of the invention. It should be understood by one having ordinary skill in the art that databases 3640 may be arranged in a wide variety of architectures and using a wide variety of data access and manipulation means. For example, in various embodiments one or more databases 3640 may comprise a relational database system using a structured query language (SQL), while others may comprise an alternative data storage technology such as those referred to in the art as "NoSQL" (for example, Hadoop Cassandra, Google BigTable, and so forth). In some embodiments, variant database architectures such as column-oriented databases, in-memory databases, clustered databases, distributed databases, or even flat file data repositories may be used according to the invention. It will be appreciated by one having ordinary skill in the art that any combination of known or future database technologies may be used as appropriate, unless a specific database technology or a specific arrangement of components is specified for a particular embodiment herein. Moreover, it should be appreciated that the term "database" as used herein may refer to a physical database machine, a cluster of machines acting as a single database system, or a logical database within an overall database management system. Unless a specific meaning is specified for a given use of the term "database", it should be construed to mean any of these senses of the word, all of which are understood as a plain meaning of the term "database" by those having ordinary skill in the art.

Similarly, most embodiments of the invention may make use of one or more security systems 3660 and configuration systems 3650. Security and configuration management are common information technology (IT) and web functions, and some amount of each are generally associated with any IT or web systems. It should be understood by one having ordinary skill in the art that any configuration or security subsystems known in the art now or in the future may be used in conjunction with embodiments of the invention without limitation, unless a specific security 3660 or configuration system 3650 or approach is specifically required by the description of any specific embodiment.

FIG. 37 shows an exemplary overview of a computer system 3700 as may be used in any of the various locations throughout the system. It is exemplary of any computer that may execute code to process data. Various modifications and changes may be made to computer system 3700 without departing from the broader spirit and scope of the system and method disclosed herein. CPU 3701 is connected to bus 3702, to which bus is also connected memory 3703, nonvolatile memory 3704, display 3707, I/O unit 3708, and network interface card (NIC) 3713. I/O unit 3708 may, typically, be connected to keyboard 3709, pointing device 3710, hard disk 3712, and real-time clock 3711. NIC 3713 connects to network 3714, which may be the Internet or a local network, which local network may or may not have connections to the Internet. Also shown as part of system 3700 is power supply unit 3705 connected, in this example, to ac supply 3706. Not shown are batteries that could be present, and many other devices and modifications that are well known but are not applicable to the specific novel functions of the current system and method disclosed herein. It should be appreciated that some or all components illustrated may be combined, such as in various integrated applications (for example, Qualcomm or Samsung SOC-based devices), or whenever it may be appropriate to combine multiple capabilities or functions into a single hardware device (for instance, in mobile devices such as smartphones, video game consoles, in-vehicle computer systems such as navigation or multimedia systems in automobiles, or other integrated hardware devices).

In various embodiments, functionality for implementing systems or methods of the present invention may be distributed among any number of client and/or server components. For example, various software modules may be implemented for performing various functions in connection with the present invention, and such modules may be variously implemented to run on server and/or client components.

What is claimed is:

1. A system for electric grid utilization and optimization, comprising:
    a network-connected computer comprising program code stored in a memory and executing on a processor, the code adapted to an electric grid utilization and optimization system comprising:
    a plurality of communication interfaces adapted to receive information from a plurality of iNodes, the plurality of iNodes comprising a source iNode, a sink iNode, and a plurality of transmission or distribution iNodes;
    an event database computer coupled to the communications interface comprising program code stored in a memory and the code adapted to receive events from the plurality of iNodes via the communications interface;
    a modeling server computer coupled to the communications interface and comprising program code stored in a memory and the code adapted to receive a request to establish an allocation of at least one of transmission losses, distribution losses, and ancillary services to a specific sink iNode and compute at least one virtual path for flow of electricity between a source iNode and the specific sink iNode, and further wherein the modeling server further computes, for each transmission or distribution iNode included in the computed virtual path, at least one energy loss and allocates a portion thereof to the specific sink iNode; and
    a statistics server computer coupled to the event database and the modeling server, comprising program code stored in a memory and adapted to calculate a plurality of statistic from received information from connected iNodes;
    wherein the plurality of iNodes are coupled to a continuous flow energy distribution network of a plurality of eNodes;
    wherein the communications interface is further adapted to interact with at least a control device connected to at least a sink iNode;
    wherein the control device operates program code stored in a memory and adapted to configure the behavior of a connected sink iNode;
    wherein the communications interface interacts with the control device for the purpose of optimizing perceived comfort of a plurality of affected users;
    wherein the perceived comfort of the plurality of affected users is determined based at least in part on stored events in the event database;
    wherein the perceived comfort of the plurality of affected users is determined based at least in part on the statistics calculated by the statistics server;
    wherein the stored events are at least temperature and time-of-day.

2. The system of claim 1, wherein the affected users comprise at least a plurality of inhabitants of a building.

3. A method of utilizing an electric grid, comprising:
    a network-connected computer comprising program code stored in a memory and executing on a processor, the code adapted to an electric grid utilization and optimization system comprising the steps of:
    coupling a plurality of iNodes to a continuous flow energy distribution network of a plurality of eNodes;
    receiving, at a network-connected modeling server computer, a request to establish an allocation of at least one of transmission losses, distribution losses, and ancillary services to a specific sink iNode;
    computing at least a virtual energy flow path between a source iNode and the specific sink iNode;
    computing at least one energy loss for each transmission or distribution iNode included in the computed virtual path;
    allocating a portion of each computed energy loss to the specific sink iNode;
    determining the perceived comfort of the plurality of affected users based at least in part on stored events in the event database; and,
    determining the perceived comfort of the plurality of affected users based at least in part on the statistics calculated by the statistics server wherein the stored events are at least temperature and time-of-day.

* * * * *